(12) United States Patent
Favor et al.

(10) Patent No.: US 8,051,247 B1
(45) Date of Patent: *Nov. 1, 2011

(54) TRACE BASED DEALLOCATION OF ENTRIES IN A VERSIONING CACHE CIRCUIT

(75) Inventors: John Gregory Favor, Scotts Valley, CA (US); Paul G. Chan, Oakland, CA (US); Graham Ricketson Murphy, Sunnyvale, CA (US); Joseph Byron Rowlands, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 12/030,846

(22) Filed: Feb. 13, 2008

Related U.S. Application Data

(63) Continuation-in-part of application No. 11/781,937, filed on Jul. 23, 2007, now abandoned, which is a continuation-in-part of application No. 11/535,971, filed on Sep. 27, 2006, now Pat. No. 7,546,420, and a continuation-in-part of application No. 11/535,972, filed on Sep. 27, 2006, now Pat. No. 7,676,634, and a continuation-in-part of application No. 11/535,977, filed on Sep. 27, 2006, now Pat. No. 7,606,975, and a continuation-in-part of application No. 11/553,453, filed on Oct. 26, 2006, now Pat. No. 7,587,585, and a continuation-in-part of application No. 11/553,455, (Continued)

(51) Int. Cl.
*G06F 9/00* (2006.01)
*G06F 13/00* (2006.01)

(52) U.S. Cl. ........ 711/118; 711/141; 711/146; 711/154; 712/218; 712/220

(58) Field of Classification Search .................. 711/141, 711/118
See application file for complete search history.

(56) References Cited

U.S. PATENT DOCUMENTS 4,912,707 A    3/1990  Kogge et al.
(Continued)

OTHER PUBLICATIONS

Almog, Y. et al., Specialized Dynamic Optimizations for High-Performance Energy-Efficient Microarchitecture, Proceedings of the International Symposium on Code Generation and Optimization, 2004 (12 pages).

(Continued)

*Primary Examiner* — Matthew Bradley
(74) *Attorney, Agent, or Firm* — Osha • Liang LLP

(57) ABSTRACT

A circuit for tracking memory operations with trace-based execution is disclosed. Each trace includes a sequence of operations that includes zero or more of the memory operations. The memory operations being executed form a set of active memory operations that have a predefined program order among them. At least some of the active memory operations access the memory in an execution order that is different from the program order. Checkpoint entries are associated with each trace. Each entry refers to a checkpoint location. Executing one of the active memory operations updates a checkpoint location. During the operation of the circuit, none of the operations of a given trace has any effect on the execution unit's architectural state prior to committing that trace. Each trace becomes eligible for commitment after all operations in the trace complete executing. After the trace is committed, all of the checkpoint entries associated with the trace are invalidated.

7 Claims, 46 Drawing Sheets

Related U.S. Application Data filed on Oct. 26, 2006, now Pat. No. 7,568,088, and a continuation-in-part of application No. 11/553,458, filed on Oct. 26, 2006, now Pat. No. 7,568,089, and a continuation-in-part of application No. 11/591,024, filed on Oct. 31, 2006, now Pat. No. 7,747,822, and a continuation-in-part of application No. 11/923,638, filed on Oct. 24, 2007, now Pat. No. 7,783,863, and a continuation-in-part of application No. 11/923,640, filed on Oct. 24, 2007, now Pat. No. 7,870,369, and a continuation-in-part of application No. 11/941,900, filed on Nov. 16, 2007, now Pat. No. 7,849,292, and a continuation-in-part of application No. 11/941,908, filed on Nov. 16, 2007, now Pat. No. 7,937,564, and a continuation-in-part of application No. 11/941,912, filed on Nov. 16, 2007.

(60) Provisional application No. 60/889,547, filed on Feb. 13, 2007, provisional application No. 60/862,609, filed on Oct. 24, 2006, provisional application No. 60/721,385, filed on Sep. 28, 2005, provisional application No. 60/730,550, filed on Oct. 26, 2005, provisional application No. 60/730,810, filed on Oct. 27, 2005, provisional application No. 60/731,962, filed on Oct. 31, 2005, provisional application No. 60/731,785, filed on Oct. 31, 2005, provisional application No. 60/732,438, filed on Nov. 1, 2005, provisional application No. 60/832,848, filed on Jul. 23, 2006, provisional application No. 60/832,822, filed on Jul. 23, 2006, provisional application No. 60/832,609, filed on Oct. 24, 2006, provisional application No. 60/866,205, filed on Nov. 16, 2006, provisional application No. 60/866,203, filed on Nov. 16, 2006.

(56) References Cited

U.S. PATENT DOCUMENTS

| | | |
|---|---|---|
| 5,369,757 A | 11/1994 | Spiro et al. |
| 5,381,533 A | 1/1995 | Peleg et al. |
| 5,428,786 A | 6/1995 | Sites |
| 5,432,918 A | 7/1995 | Stamm |
| 5,491,793 A | 2/1996 | Somasundaram et al. |
| 5,568,380 A | 10/1996 | Brodnax et al. |
| 5,632,023 A | 5/1997 | White et al. |
| 5,644,742 A | 7/1997 | Shen et al. |
| 5,649,136 A | 7/1997 | Shen et al. |
| 5,673,408 A | 9/1997 | Shebanow et al. |
| 5,838,943 A | 11/1998 | Ramagopal et al. |
| 5,860,104 A | 1/1999 | Witt et al. |
| 5,913,925 A * | 6/1999 | Kahle et al. ............ 712/206 |
| 5,944,841 A | 8/1999 | Christie |
| 5,960,198 A | 9/1999 | Roediger et al. |
| 6,014,742 A | 1/2000 | Krick et al. |
| 6,018,786 A | 1/2000 | Krick et al. |
| 6,031,992 A | 2/2000 | Cmelik et al. |
| 6,052,769 A * | 4/2000 | Huff et al. ............ 712/3 |
| 6,055,630 A | 4/2000 | D'Sa et al. |
| 6,073,213 A | 6/2000 | Peled et al. |
| 6,076,144 A | 6/2000 | Peled et al. |
| 6,115,809 A | 9/2000 | Mattson, Jr. et al. |
| 6,170,038 B1 | 1/2001 | Krick et al. |
| 6,170,040 B1 | 1/2001 | Lee et al. |
| 6,185,660 B1 | 2/2001 | Mulla et al. |
| 6,185,675 B1 | 2/2001 | Kranich et al. |
| 6,189,141 B1 | 2/2001 | Benitez et al. |
| 6,205,545 B1 | 3/2001 | Shah et al. |
| 6,216,206 B1 | 4/2001 | Peled et al. |
| 6,339,822 B1 | 1/2002 | Miller |
| 6,351,844 B1 | 2/2002 | Bala |
| 6,389,446 B1 * | 5/2002 | Torii ............ 718/100 |
| 6,442,674 B1 | 8/2002 | Lee et al. |
| 6,449,714 B1 | 9/2002 | Sinharoy |
| 6,493,837 B1 | 12/2002 | Pang et al. |
| 6,538,997 B1 | 3/2003 | Wang et al. |
| 6,557,095 B1 | 4/2003 | Henstrom |
| 6,604,060 B1 | 8/2003 | Ryan et al. |
| 6,609,189 B1 | 8/2003 | Kuszmaul et al. |
| 6,671,766 B1 | 12/2003 | Vandenbergh et al. |
| 6,675,376 B2 | 1/2004 | Ronen et al. |
| 6,694,427 B1 * | 2/2004 | Mericas et al. ............ 712/227 |
| 6,694,457 B2 | 2/2004 | McKee |
| 6,738,926 B2 * | 5/2004 | Mathiske et al. ............ 714/15 |
| 6,779,087 B2 | 8/2004 | Saulsbury et al. |
| 6,785,890 B2 | 8/2004 | Kalafatis et al. |
| 6,799,263 B1 | 9/2004 | Morris et al. |
| 6,826,182 B1 | 11/2004 | Parthasarathy |
| 6,857,060 B2 | 2/2005 | Elias et al. |
| 6,874,138 B1 | 3/2005 | Ziegler et al. |
| 6,889,318 B1 | 5/2005 | Wichman |
| 6,895,460 B2 | 5/2005 | Desoli et al. |
| 6,950,924 B2 | 9/2005 | Miller et al. |
| 6,968,476 B2 * | 11/2005 | Barowski et al. ............ 714/15 |
| 6,981,104 B2 | 12/2005 | Prabhu |
| 6,988,190 B1 | 1/2006 | Park |
| 7,003,629 B1 | 2/2006 | Alsup |
| 7,010,648 B2 | 3/2006 | Kadambi et al. |
| 7,062,631 B1 | 6/2006 | Klaiber et al. |
| 7,085,955 B2 | 8/2006 | Prabhu |
| 7,133,969 B2 | 11/2006 | Alsup et al. |
| 7,136,992 B2 | 11/2006 | Maiyuran et al. |
| 7,139,902 B2 | 11/2006 | Lee |
| 7,188,368 B2 | 3/2007 | Swimmer et al. |
| 7,213,126 B1 | 5/2007 | Smaus et a |
| 7,269,706 B2 | 9/2007 | Agarwal et al. |
| 7,360,024 B2 | 4/2008 | Hironaka et al. |
| 7,366,875 B2 | 4/2008 | Rasche et al. |
| 7,415,598 B2 | 8/2008 | Dos Remedios |
| 7,487,341 B2 | 2/2009 | Wang et al. |
| 7,496,735 B2 | 2/2009 | Yourst et al. |
| 7,516,366 B2 | 4/2009 | Lev et al. |
| 7,536,591 B2 | 5/2009 | Varadarajan et al. |
| 7,546,420 B1 | 6/2009 | Shar et al. |
| 7,568,089 B1 | 7/2009 | Favor et al. |
| 7,571,304 B2 | 8/2009 | Chaudhry et al. |
| 7,577,690 B2 | 8/2009 | Chandrasekaran et al. |
| 7,594,111 B2 | 9/2009 | Kiriansky et al. |
| 7,600,221 B1 | 10/2009 | Rangachari |
| 7,606,975 B1 | 10/2009 | Shar et al. |
| 2001/0032307 A1 | 10/2001 | Rohlman et al. |
| 2002/0013938 A1 | 1/2002 | Duesterwald et al. |
| 2002/0095553 A1 | 7/2002 | Mendelson et al. |
| 2002/0144101 A1 | 10/2002 | Wang et al. |
| 2002/0147890 A1 | 10/2002 | Saulsbury et al. |
| 2003/0005271 A1 | 1/2003 | Hsu et al. |
| 2003/0009620 A1 | 1/2003 | Solomon et al. |
| 2003/0084375 A1 | 5/2003 | Moore et al. |
| 2004/0015627 A1 | 1/2004 | Desoli et al. |
| 2004/0034757 A1 | 2/2004 | Gochman et al. |
| 2004/0083352 A1 | 4/2004 | Lee |
| 2004/0107336 A1 | 6/2004 | Douglas et al. |
| 2004/0154011 A1 | 8/2004 | Wang et al. |
| 2004/0193857 A1 | 9/2004 | Miller et al. |
| 2004/0230778 A1 * | 11/2004 | Chou et al. ............ 712/228 |
| 2005/0012079 A1 | 1/2005 | Roberts et al. |
| 2005/0097110 A1 | 5/2005 | Nishanov et al. |
| 2005/0108719 A1 | 5/2005 | Need et al. |
| 2005/0120179 A1 | 6/2005 | Akkary et al. |
| 2005/0125632 A1 | 6/2005 | Alsup et al. |
| 2005/0289324 A1 | 12/2005 | Miller et al. |
| 2005/0289529 A1 | 12/2005 | Almog et al. |
| 2006/0053245 A1 | 3/2006 | Solomon et al. |
| 2006/0053347 A1 | 3/2006 | van Ingen et al. |
| 2006/0080190 A1 | 4/2006 | Furukawa et al. |
| 2006/0179346 A1 | 8/2006 | Bishop et al. |
| 2006/0184771 A1 | 8/2006 | Floyd et al. |
| 2007/0038844 A1 | 2/2007 | Valentine et al. |
| 2007/0157007 A1 | 7/2007 | Jourdan et al. |

| 2008/0034350 A1 | 2/2008 | Conti |
| 2009/0222596 A1 | 9/2009 | Flynn et al. |
| 2010/0031000 A1 | 2/2010 | Flynn et al. |

OTHER PUBLICATIONS

Chaparro, P. et al., Distributing the Fronted for Temperature Reduction, Proceedings of the 11th Symposium on High-Performace Computer Architecture, Feb. 12-16, 2005 (10 pages).

Colwell, R. P. et al., A ALIW Architecture for a Trace Scheduling Compiler, 1987, pp. 180-192 (13 pages).

Fisher, J. A., Trace Scheduling: A Technique for Global Microcode Compaction, IEEE Transactions on Computers, vol. C-30, No. 7, Jul. 1981, pp. 478-490 (13 pages).

Friendly, D. et al, Putting the Fill Unit to Work: Dynamic Optimizations for Trace Cache Microprocessors, Proceedings of the 31st Annual ACM/IEEE International Symposium on Microarchitecture, Nov. 30-Dec. 2, 1998, pp. 173-181 (9 pages).

Grunwald, D. and Ghiasi, S., Microarchitectural Denial of Service : Insuring Microarchitectural Fairness, Proceedings of the 35th Annual IEEE/ACM International Symposium on Microarchitecture, Nov. 18-22, 2002 (10 pages).

Hinton, G. et al., The Microarchitecture of the Pentium 4 Processor, Intel Technology Journal Q1, 2001 (12 pages).

IBM Technical Disclosure Bulletin, Grouping of Instructions, v. 38, n. 8, Aug. 1, 1995, pp. 531-534 (4 pages).

Katevenis, E. G., Reduced Instruction Set Computer Architectures for VLSI, Berkley, California 1983, pp. 67-68 and 190 (7 pages).

Rotenberg, E., Bennett, S., and Smith, J. E., Trace Cache: a Low Latency Approach to High Bandwidth Instruction Fetching, In Proceedings of the 29th Annual International Symposium on Microarchitecture, Dec. 2-4, 1996, Paris, France (11 pages).

Slechta, B. et al, Dynamic Optimization of Micro-Operations, Proceedings of the 9th International Symposium on High-Performance Computer Architecture, Feb. 8-12, 2003 (12 pages).

Smith, J. E. and Pleszkun, A. R., Implementation of Precise Interrupts in Pipelined Processors, Proc. Computer Architecture, 1985 (15 pages).

Tremblay, M., High-Performance Fault-Tolerant VLSI Systems Using Micro Rollback, Los Angeles, California, Sep. 1991, pp. 72-74, 81, 89-90, 102-104 and 246 (14 pages).

Vijaykumar, T. N., et al., Speculative Versioning Cache, IEEE Transaction on Parallel and Distributed Systems, vol. 12, No. 12, Dec. 2001, pp. 1305-1317 (13 pages).

Patel, S. et al., "rePlay: A Hardware Framework for Dynamic Optimization", IEEE Transactions on Computers, vol. 50, No. 6, Jun. 2001 (26 pages).

Tanenbaum, A. S., "Structured Computer Organization," Fourth Edition, Prentice Hall, Inc. 1984 (21 pages).

Patel S. J. et al., "Improving Trace Cache Effectiveness with Branch Promotion and Trace Packing," IEEE, 1998, pp. 262-271.

Tanenbaum, A. S., "Structured Computer Organization, Second Edition, Prentice Hall, Inc." 1984 (5 pages).

Office Action in U.S. Appl. No. 11/781,937, mailed Sep. 23, 2009 (35 pages).

Rotenberg, Eric et al., "Control Independence in Trace Processors," Proceedings of the 32nd Annual ACM/IEEE International Symposium on Microarchitecture, Haifa, Israel, Nov. 16-18, 1999 (23 pages).

Rotenberg, Eric et al., "Trace Processors," Proceedings of the 30th Annual ACM/IEEE International Symposium on Microarchitecture, Research Triangle Park, North Carolina, USA, Dec. 1-3, 1997 (12 pages).

Jacobson, Quinn et al., "Path-Based Next Trace Prediction," Proceedings of the 30th Annual ACM/IEEE International Symposium on Microarchitecture, Research Triangle Park, North Carolina, USA, Dec. 1-3, 1997 (11 pages).

Notice of Allowance in U.S. Appl. No. 12/030,857, mailed Apr. 23, 2010 (12 pages).

Notice of Allowance in U.S. Appl. No. 11/923,638, mailed May 12, 2010 (21 pages).

Office Action in U.S. Appl. No. 12/030,858, mailed Sep. 1, 2010, (9 pages).

Office Action in U.S. Appl. No. 12/030,862, mailed Sep. 17, 2010 (14 pages).

Office Action in U.S. Appl. No. 12/030,859, mailed Sep. 17, 2010, (14 pages).

Office Action in U.S. Appl. No. 12/030,855, mailed Jul. 28, 2010, (24 pages).

Office Action in U.S. Appl. No. 12/030,851, mailed Sep. 1, 2010, (11 pages).

Office Action in U.S. Appl. No. 11/535,971 mailed Oct. 8, 2008 (11 pages).

Notice of Allowance in U.S. Appl. No. 11/535,971 mailed Mar. 11, 2009 (4 pages).

Office Action in U.S. Appl. No. 11/535,972 mailed Mar. 4, 2009 (13 pages).

Office Action in U.S. Appl. No. 11/535,972 mailed Aug. 18, 2009 (8 pages).

Notice of Allowance in U.S. Appl. No. 11/535,972 mailed Oct. 9, 2009 (4 pages).

Notice of Allowance in U.S. Appl. No. 11/535,972 mailed Dec. 7, 2009 (4 pages).

Office Action in U.S. Appl. No. 11/535,977 mailed Mar. 10, 2009 (15 pages).

Notice of Allowance in U.S. Appl. No. 11/535,977 mailed Aug. 5, 2009 (4 pages).

Office Action in U.S. Appl. No. 11/553,453 mailed Sep. 25, 2008 (13 pages).

Office Action in U.S. Appl. No. 11/553,453 mailed Feb. 25, 2009 (4 pages).

Notice of Allowance in U.S. Appl. No. 11/553,453 mailed Apr. 22, 2009 (7 pages).

Office Action in U.S. Appl. No. 11/553,455 mailed Sep. 30, 2008 (13 pages).

Office Action in U.S. Appl. No. 11/553,455 mailed Feb. 25, 2009 (4 pages).

Notice of Allowance in U.S. Appl. No. 11/553,455 mailed May 12, 2009 (5 pages).

Notice of Allowance in U.S. Appl. No. 11/553,455 mailed Jun. 2, 2009 (3 pages).

Office Action in U.S. Appl. No. 11/553,458 mailed Sep. 25, 2008 (19 pages).

Office Action in U.S. Appl. No. 11/553,458 mailed Feb. 25, 2009 (4 pages).

Notice of Allowance in U.S. Appl. No. 11/553,458 mailed May 11, 2009 (5 pages).

Office Action in U.S. Appl. No. 11/591,024 Mailed Feb. 24, 2009 (8 pages).

Office Action in U.S. Appl. No. 11/591,024 mailed Jul. 10, 2009 (8 pages).

Advisory Action in U.S. Appl. No. 11/591,024 mailed Oct. 6, 2009 (1 page).

Notice of Allowance in U.S. Appl. No. 11/591,024 mailed Feb. 25, 2010 (12 pages).

Office Action in U.S. Appl. No. 11/781,937 mailed Mar. 15, 2010 (41 pages).

Office Action in U.S. Appl. No. 11/923,638 mailed Dec. 3, 2009 (18 pages).

Notice of Allowance in U.S. Appl. No. 11/923,640 mailed Mar. 3, 2010 (8 pages).

Notice of Allowance in U.S. Appl. No. 11/923,640 mailed Jul. 20, 2010 (4 pages).

Notice of Allowance in U.S. Appl. No. 11/923,640 mailed Oct. 18, 2010 (4 pages).

Notice of Allowance in U.S. Appl. No. 11/941,900 mailed Aug. 6, 2010 (16 pages).

Office Action in U.S. Appl. No. 11/941,908 mailed Sep. 17, 2010 (17 pages).

Office Action in U.S. Appl. No. 12/030,852 issued Jun. 11, 2010 (13 pages).

Notice of Allowance in U.S. Appl. No. 12/030,852 mailed Sep. 28, 2010 (9 pages).

Office Action in U.S. Appl. No. 12/030,865 mailed Oct. 19, 2010 (11 pages).

Office Action in U.S. Appl. No. 11/880,864 issued Oct. 4, 2010 (12 pages).
Office Action in U.S. Appl. No. 11/880,882 mailed Nov. 26, 2010 (20 pages).
Notice of Allowance in U.S. Appl. No. 11/880,862 mailed Dec. 3, 2010 (6 pages).
Notice of Allowance in U.S. Appl. No. 11/880,861 mailed Dec. 2, 2010 (6 pages).
Notice of Allowance in U.S. Appl. No. 11/782,140 mailed Nov. 15, 2010 (4 pages).
Notice of Allowance in U.S. Appl. No. 11/880,863 mailed Dec. 10, 2010 (10 pages).
Office Action in U.S. Appl. No. 11/880,864 mailed Apr. 12, 2010 (3 pages).
Office Action in U.S. Appl. No. 11/880,864 mailed Jun. 21, 2010 (12 pages).
Advisory Action in U.S. Appl. No. 11/880,864 mailed Dec. 3, 2010 (3 pages).
Notice of Allowance in U.S. Appl. No. 11/880,875 mailed Dec. 10, 2009 (7 pages).
Office Action in U.S. Appl. No. 11/880,875 mailed Mar. 8, 2010 (6 pages).
Office Action in U.S. Appl. No. 11/880,875 mailed Sep. 3, 2010 (7 pages).
Office Action in U.S. Appl. No. 11/880,875 mailed Nov. 26, 2010 (3 pages).
Office Action in U.S. Appl. No. 12/030,855, mailed Nov. 24, 2010, (29 pages).
Office Action in U.S. Appl. No. 11/782,163 mailed Dec. 20, 2010 (8 pages).
Notice of Allowance in U.S. Appl. No. 12/030,852 mailed Dec. 1, 2010 (9 pages).
Notice of Allowance in U.S. Appl. No. 11/880,859 mailed Dec. 23, 2010 (4 pages).
Notice of Allowance in U.S. Appl. No. 11/782,140 mailed on Feb. 1, 2011 (4 pages).
Office Action in U.S. Appl. No. 12/030,851 mailed Feb. 18, 2011 (21 pages).
Office Action in U.S. Appl. No. 12/030,865 mailed Feb. 24, 2011 (15 pages).
Office Action in U.S. Appl. No. 12/030,862 mailed Mar. 7, 2011 (6 pages).
Office Action in U.S. Appl. No. 12/030,859 mailed Mar. 21, 2011 (6 pages).
Notice of Allowance in U.S. Appl. No. 11/880,859 mailed on Mar. 4, 2011 (5 pages).
Notice of Allowance in U.S. Appl. No. 11/880,863, mailed on Mar. 21, 2011 (6 pages).
Notice of Allowance in U.S. Appl. No. 11/880,861 mailed on Mar. 23, 2011 (7 pages).

* cited by examiner

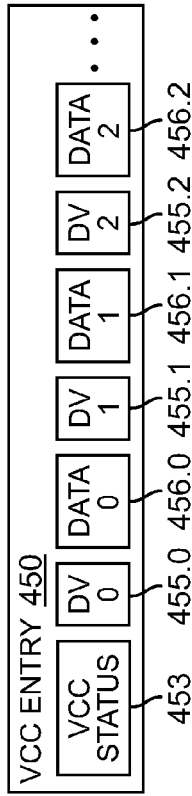
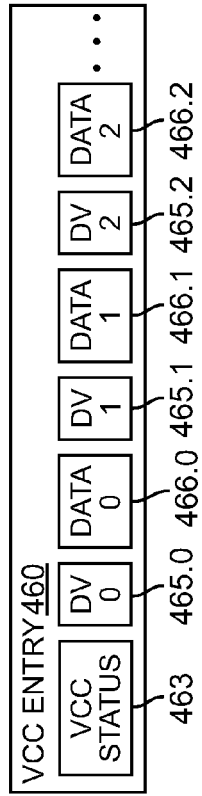
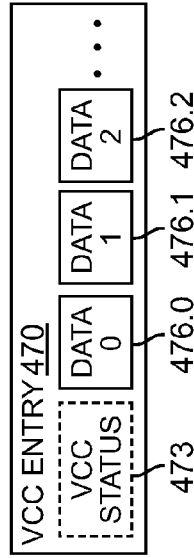
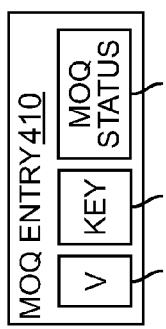
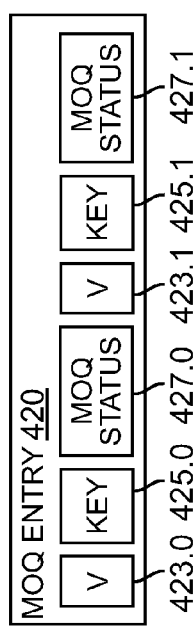
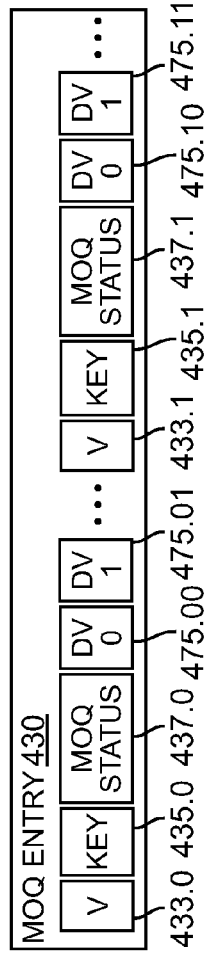

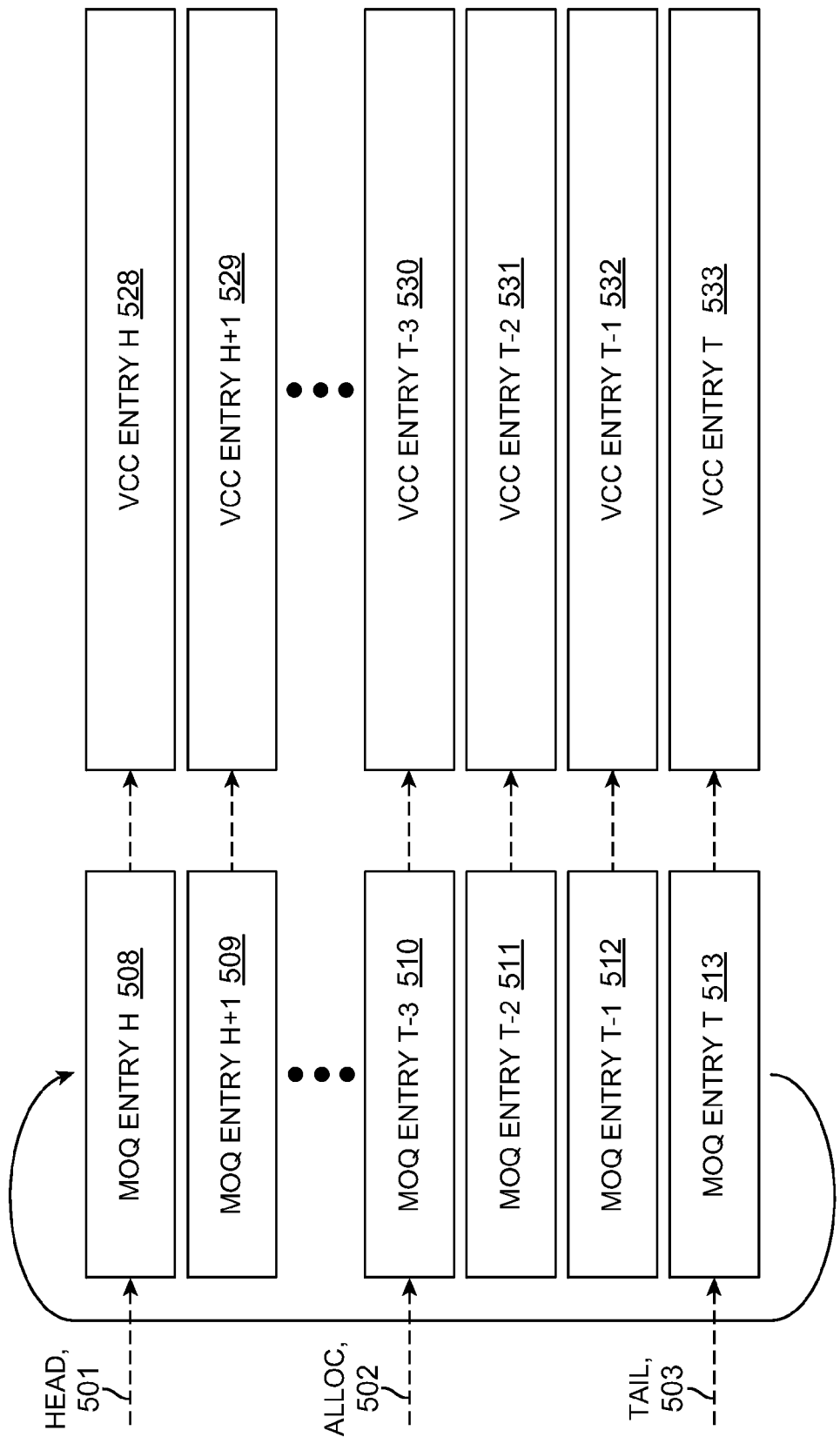

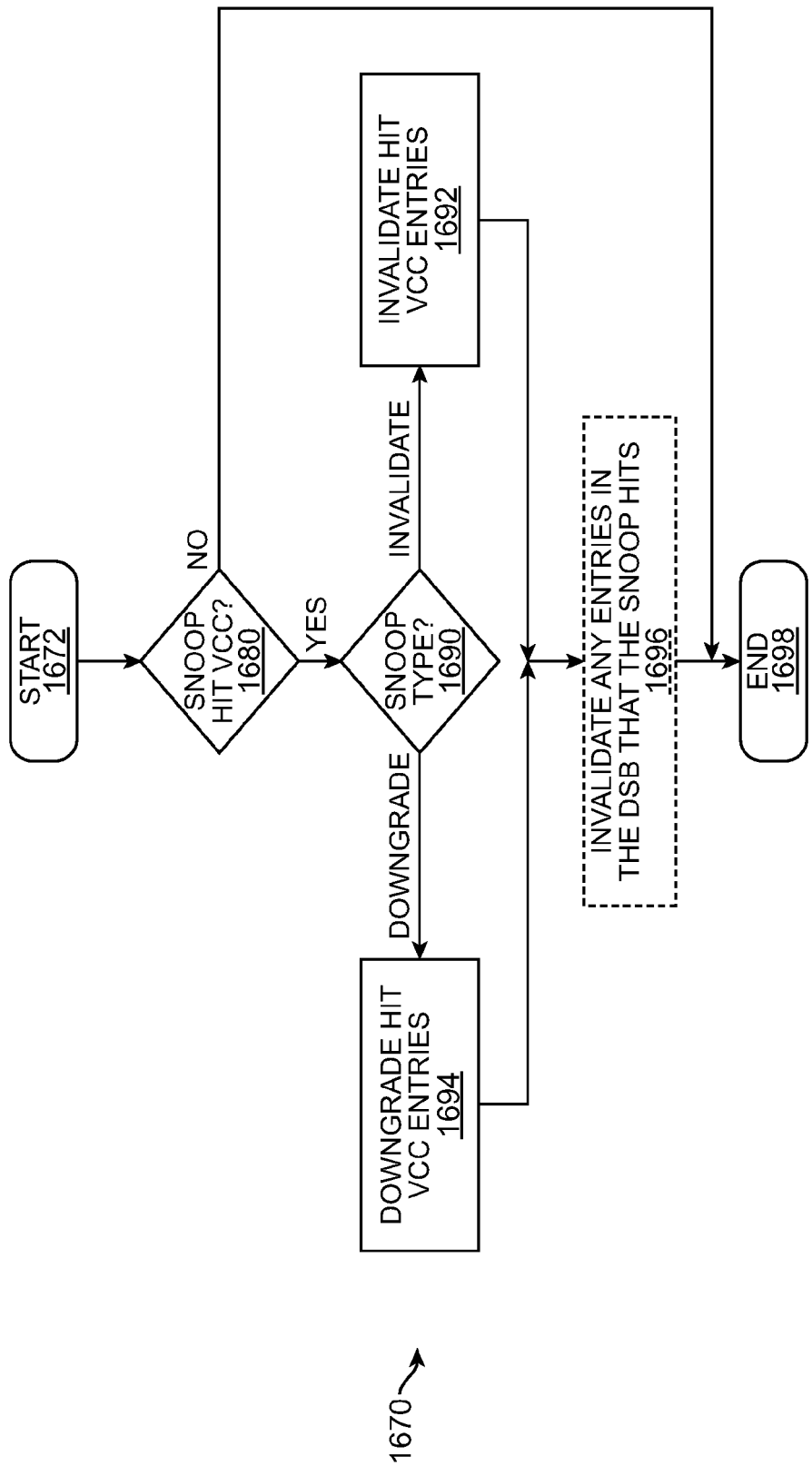

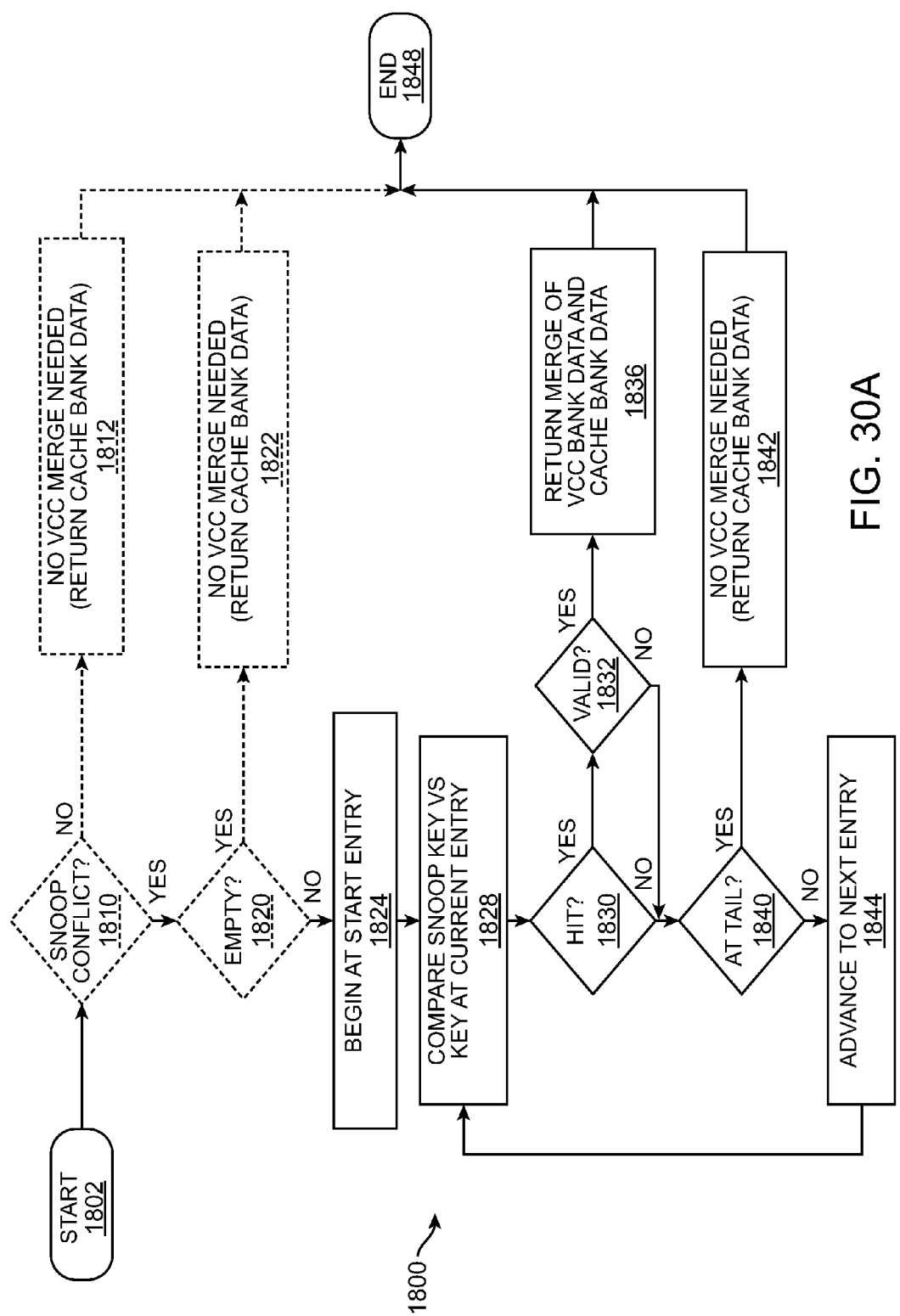

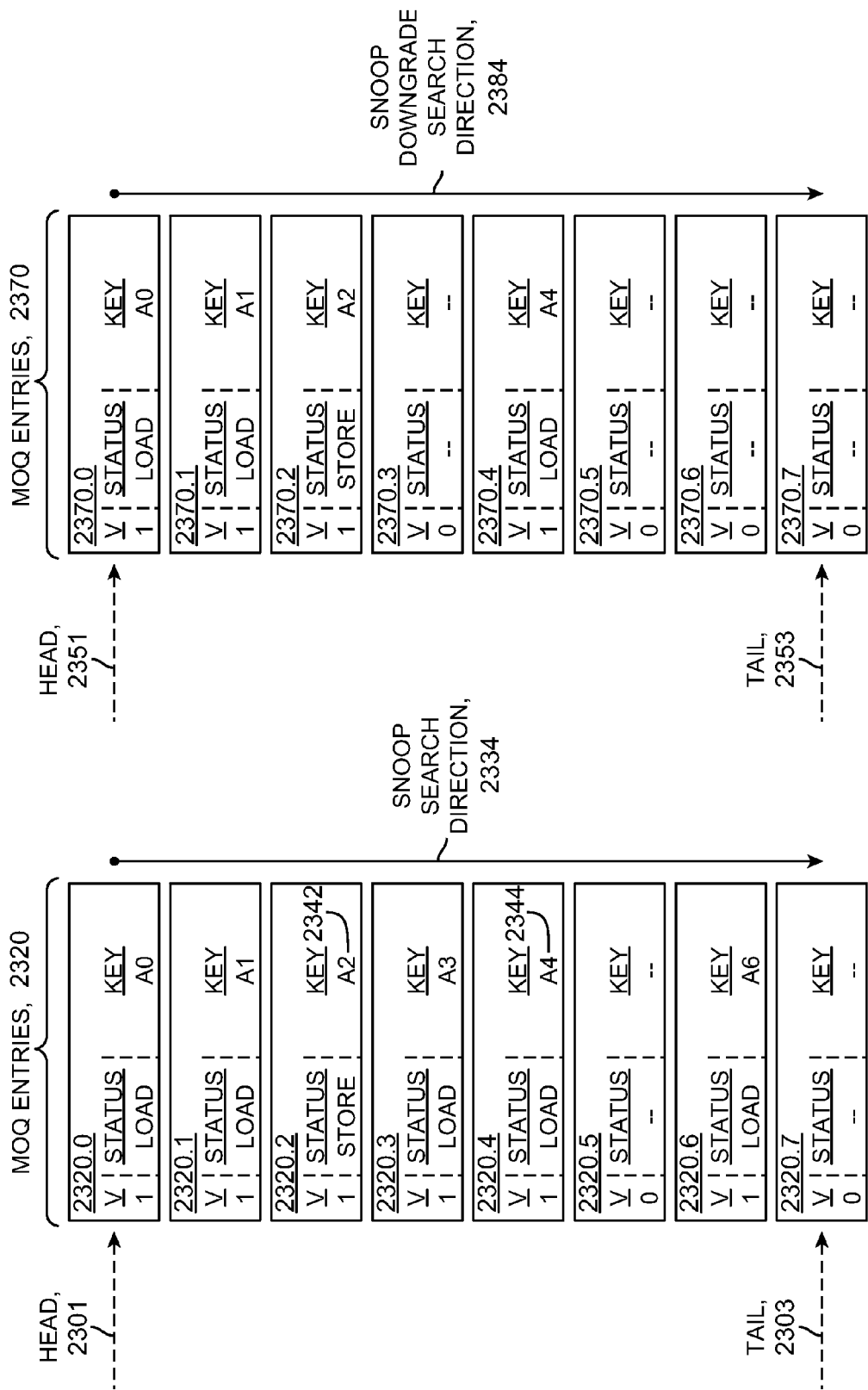

TRACE BASED DEALLOCATION OF ENTRIES IN A VERSIONING CACHE CIRCUIT

CROSS REFERENCE TO RELATED APPLICATIONS

This application claims the benefit of priority document U.S. Provisional Application No. 60/889,547, filed on Feb. 13, 2007 and entitled "Instruction Sub-Type Tracking Unit" and further claims the benefit of U.S. Provisional Application No. 60/889,547, entitled "Instruction Sub-Type Tracking Unit," filed on Feb. 13, 2007 and further claims the benefit of priority document U.S. Provisional Application No. 60/862,609, entitled "Exception Handling for Atomic Traces," filed on Oct. 24, 2006, and further claims the benefit of priority document U.S. Provisional Application No. 60/721,385, filed on Sep. 28, 2005, entitled "Efficient Trace Cache Management During Self-Modifying Code Processing," by Leonard Shar et al., and further claims the benefit of priority document U.S. Provisional Application No. 60/730,550, filed on Oct. 26, 2005, entitled "Checkpointing Status Flags for Atomic Traces," by John Gregory Favor et al., and further claims the benefit of priority document U.S. Provisional Application No. 60/730,810, filed on Oct. 27, 2005, entitled "Allocation and Deallocation of Shadow Registers used by Atomic Traces," by John Gregory Favor et al., and further claims the benefit of priority document U.S. Provisional Application No. 60/731,962, filed on Oct. 31, 2005, entitled "Determining the Highest Priority Abort Trigger in an Atomic Trace," by John Gregory Favor et al., and further claims the benefit of priority document U.S. Provisional Application No. 60/731,785, filed on Oct. 31, 2005, entitled "Maintaining Memory Coherency within a Trace Cache," by Richard W. Thaik, and further claims the benefit of priority document U.S. Provisional Application No. 60/732,438, filed Nov. 1, 2005, entitled "Zero-Cycle Execution of Clear Operation and Automatic Register Free," by John Gregory Favor et al., and further claims the benefit of priority document U.S. Provisional Application No. 60/832,848, filed on Jul. 23, 2006, entitled "Microprocessor with Caches for Instructions, Basic Blocks, and Traces," by Don Alpert et al., and further claims the benefit of priority document U.S. Provisional Application No. 60/832,822, filed on Jul. 23, 2006, entitled "Microprocessor with Coherent Caches for Basic Blocks and Traces," by Don Alpert et al., and further claims the benefit of priority document U.S. Provisional Application No. 60/862,609, filed Oct. 24, 2006, entitled "Exception Handling for Atomic Traces," by Christopher P. Nelson, and further claims the benefit of priority document U.S. Provisional Application No. 60/866,205, filed Nov. 16, 2006, entitled "Processor with Optimized Operation Sequences for Basic Block and Multi-Block Trace Caches," by John Gregory Favor, and further claims the benefit of priority document U.S. Provisional Application No. 60/866,203, filed Nov. 16, 2006, entitled "Processor with Basic Block and Multi-Block Trace Caches," by Matt Ashcraft et al. John Gregory Favor is also known as John Favor or as Greg Favor. Each of the above named priority documents is hereby incorporated by reference.

This application is a continuation-in-part of U.S. patent application Ser. No. 11/781,937, now abandoned, filed on Jul. 23, 2007 and entitled "A Trace Unit with a Decoder, A Basic Block Builder, and A Multi-Block Builder," which is a continuation-in-part of U.S. patent application Ser. No. 11/535,971, now U.S. Pat. No. 7,546,420 filed Sep. 27, 2006, entitled "Efficient Trace Cache Management During Self-Modifying Code Processing," by Leonard Eric Shar et al., and is a continuation-in-part of U.S. patent application Ser. No. 11/535,972, now U.S. Pat. No. 7,676,634, filed Sep. 27, 2006, entitled "Selective Trace Cache Invalidation for Self-Modifying Code Via Memory Aging," by Leonard Eric Shar et al., is a continuation-in-part of U.S. patent application Ser. No. 11/535,977, now U.S. Pat. No. 7,606,975 filed Sep. 27, 2006, entitled "Trace Cache for Efficient Self-Modifying Code Processing," by Leonard Eric Shar, is a continuation-in-part of U.S. patent application Ser. No. 11/553,453, now U.S. Pat. No. 7,587,585 filed Oct. 26, 2006, entitled "Checkpointing Trace unit 12s Flags for Atomic Traces," by Greg Favor et al., and is a continuation-in-part of U.S. patent application Ser. No. 11/553,455, now U.S. Pat. No. 7,568,088 filed Oct. 26, 2006, entitled "Checkpointing Flags On-Demand for Atomic Traces," by John Gregory et al., and is a continuation-in-part of U.S. patent application Ser. No. 11/553,458, now U.S. Pat. No. 7,568,089 filed Oct. 26, 2006, entitled "Flag Restoration from Checkpoints for Aborts of Atomic Traces," by John Gregory Favor et al., and is a continuation-in-part of U.S. patent application Ser. No. 11/591,024, now U.S. Pat. No. 7,747,822 filed Oct. 31, 2006, entitled "Maintaining Memory Coherency within a Trace Cache," by John Gregory Favor and is a continuation-in-part of U.S. patent application Ser. No. 11/923,638, now U.S. Pat. No. 7,783,863 filed on Oct. 24, 2007 by Matthew William Ashcraft and entitled "Graceful Degradation In A Trace-Based Processor" and is a continuation-in-part of U.S. patent application Ser. No. 11/923,640, now U.S. Pat. No. 7,870,369 filed on Oct. 24, 2007 by Matthew William Ashcraft and entitled "Abort Prioritization In A Trace-Based Processor" and is a continuation-in-part of U.S. patent application Ser. No. 11/941,900, filed on Nov. 16, 2007 by Matthew William Ashcraft and entitled "Flag Optimization Of A Trace" and is a continuation-in-part of U.S. patent application Ser. No. 11/941,908, now U.S. Pat. No. 7,849,292 filed on Nov. 16, 2007 by Matthew William Ashcraft and entitled "Emit Vector Optimization Of A Trace" and is a continuation-in-part of U.S. patent application Ser. No. 11/941,912, now U.S. Pat. No. 7,937,564 filed on Nov. 16, 2007 by Matthew William Ashcraft and entitled "Symbolic Renaming Optimization Of A Trace". John Gregory Favor is also known as John Greg Favor. Each of the above named applications for which this application is a continuation in part is hereby incorporated by reference.

BACKGROUND OF THE INVENTION

Processors have evolved throughout recent decades by becoming smaller in size, more sophisticated in design and exhibiting faster performance. Such an evolution has resulted for various reasons, one of which is portability of systems incorporating processors. Portability introduces demands on processors such as smaller size, reduced power and efficient performance.

Applications of processors are, for example, in personal computers (PCs), workstations, networking equipment and portable devices. Examples of portable devices include laptops, which are portable PCs, and hand-held devices.

A processor (such as a microprocessor) processes instructions according to an instruction set architecture. Processing comprises fetching, decoding, and executing instructions. Some instruction set architectures define a programming model where fetching, decoding, executing, and any other functions for processing an instruction are apparently performed in strict order, beginning after the functions for all prior instructions have completed, and completing before any functions of a successor instruction has begun. Such an instruction set architecture provides a programming model where instructions are executed in program order.

Due to the wide use of code based on the x86 instruction set, particularly by software programmers who have become well accustomed to this instruction set and are not likely to readily adapt to another instruction set, backward compatibility of code is key in the architecture of a new processor. That is, the user of a newly-designed processor must enjoy the ability to use the same code utilized in a previous processor design without experiencing any problems.

In trace-based processor architectures, different trace types are used to significantly optimize execution by the back end, or execution unit, of the processor. Traces are generally built by the front end or trace unit (or instruction processing unit) of a processor, the instruction processing unit or trace unit performing certain function to build traces of operations, such as decoding.

Different types of traces might include a basic block trace, a multi-block trace or a microcode trace. A multi-block trace is made of one or more basic block traces, one or more multi-block traces or a combination thereof. A microcode trace is used when, for example, a sequence of instructions is either complex or rare. U.S. patent application Ser. No. 11/781,937, now abandoned entitled "A Trace Unit with a Decoder, A Basic Block Builder, and A Multi-Block Builder" and filed on Jul. 23, 2007, the disclosure of which is incorporated herein by reference as though set forth in full, presents further details of such traces.

A trace, in some trace-based architecture, includes operations that do not correspond to instructions in the instructions' original program order. That is, knowledge of the original program order of the instructions is lost in a trace. Moreover, an instruction may result in multiple operations. Additionally, there are no instruction boundaries in a trace and the operations of a trace do not have clear relative age or order between each other (corresponding to the original instruction program order).

Some processors process instructions in various combinations of overlapped (or non-overlapped), parallel (or serial), and speculative (or non-speculative) manners, for example using pipelined functional units, superscalar issue, and out-of-order execution. Thus, some processors are enabled to execute instructions and access memory in an order that differs from the program order of the programming model. Nevertheless, the processors are constrained to produce results consistent with results that would be produced by processing instructions entirely in program order.

In some cases, executing instructions out-of-order is complex for memory-accessing instructions, such as load instructions and store instructions, because data dependencies due to dynamically computed addresses (such as register indirect accesses) require at least issue and partial execution of the memory-accessing instructions to evaluate the data dependencies.

In some cases, executing memory-accessing instructions out-of-order is expensive and/or complex due to mechanisms to maintain uncommitted results (of, for example, store instructions) in ways that enable forwarding (to, for example, load instructions). Some processors allow for a large number of outstanding out-of-order instructions, however, they have large, expensive, and slow associative data structures. Other processors use complicated techniques to enable forwarding of uncommitted results.

In some instruction set architectures, instructions are characterized as being either sequential or non-sequential, i.e. specifying a change in control flow (such as a branch). Processing after a sequential instruction implicitly continues with a next instruction that is contiguous with the sequential instruction, while processing after a change in control flow instruction optionally occurs with either the contiguous next instruction or with another next instruction (frequently non-contiguous) as specified by the control flow instruction.

As the size of such PCs decrease yet their speed increases, they require higher performance designs. Speculative execution of traces is then well suited however, it is desirable to further increase the performance of processors by more efficiently executing memory operations.

In light of the foregoing, there is a need for a processor to efficiently and speculatively execute traces and to efficiently execute memory operations to improve system performance and to do so using reduced hardware and operate using reduced power.

SUMMARY OF THE INVENTION

To overcome the limitations in the prior art described above, and to overcome other limitations that will become apparent upon reading and understanding the present specification, the present invention discloses a method and corresponding structures for a graceful degradation protocol.

Briefly, an embodiment of the present invention includes a circuit for tracking memory operations that works with a trace unit and an execution unit. The trace unit sequences traces for execution thereby forming a trace sequence order. Each trace includes a sequence of operations that includes zero or more of the memory operations. The execution unit executes the operations and has an architectural state.

The circuit includes a first memory that caches at least some of the data accessed by the memory operations. The memory operations being executed form a set of active memory operations that have a predefined program order among them. The program order imposes a set of ordering constraints. At least some of the active memory operations access the memory in an execution order that is different from the program order.

The circuit also includes a second memory that receives and holds a set of checkpoint entries. Each checkpoint entry is associated with one of the traces and refers to a checkpoint location in the first memory. Each checkpoint entry also includes checkpoint data indicating a state of the checkpoint location within the first memory prior to updating the checkpoint location. The update results from executing one of the active memory operations.

During the operation of the circuit, none of the operations of a given trace has any effect on the architectural state prior to committing that trace. Each trace becomes eligible for commitment after all operations in the trace complete executing. After the trace is committed, all of the checkpoint entries associated with the trace are invalidated.

Various embodiments of the invention include apparatuses that embody this invention, methods for practicing this invention, and computer readable media describing this invention.

The circuit also includes a sub-circuit that holds memory operation ordering information corresponding to the active memory operations. The sub-circuit detects violations of the ordering constraints. After each trace is committed, the sub-circuit invalidates all of the memory operation ordering information associated with the trace.

Various embodiments of the invention include apparatuses that embody this invention, methods for practicing this invention, and computer readable media describing this invention.

These and other objects and advantages of the present invention will no doubt become apparent to those skilled in the art after having read the following detailed description of the preferred embodiments illustrated in the several figures of the drawing.

IN THE DRAWINGS

FIG. 1 shows a processor 1 is shown to include two core complexes 2 and 4, an L3 cache 3 and a dynamic random access memory 5, in accordance with an embodiment of the present invention.

FIG. 2 shows further details of the core complex 2 to include a trace unit (TU) 13, cores 6 and 19 and an L2 cache 18.

Figure 9:
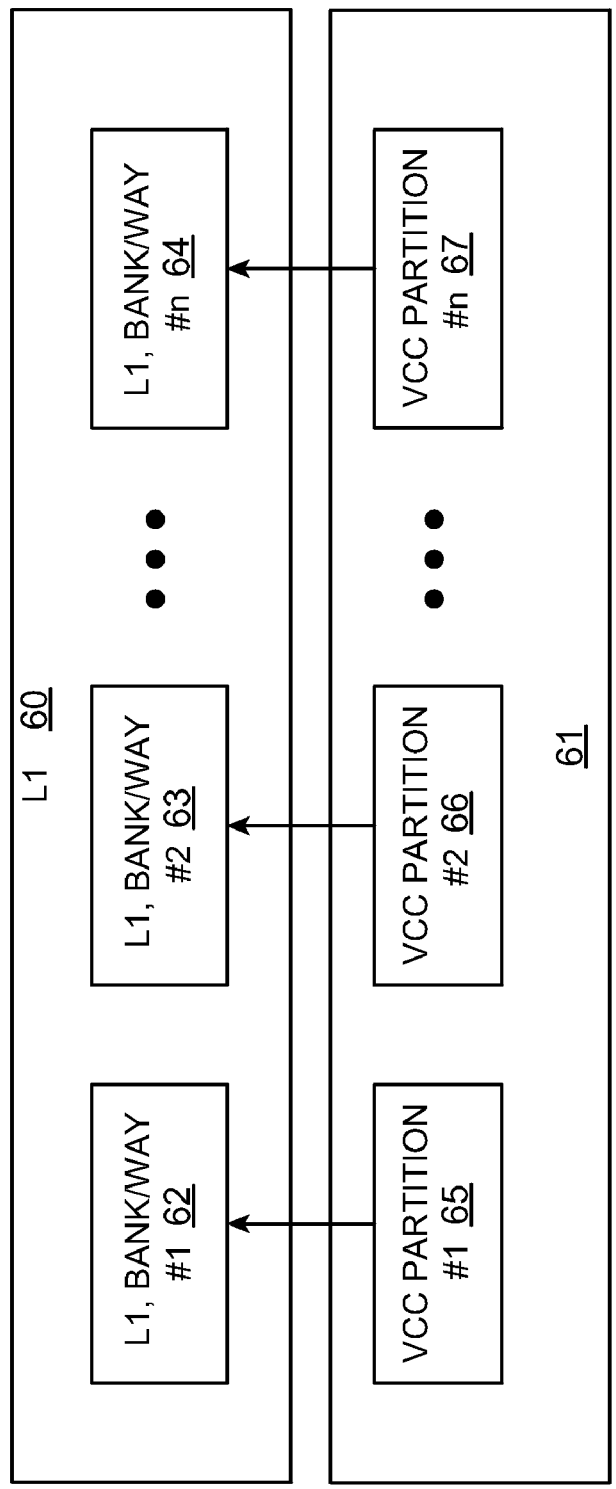

FIG. 9 shows the VCC memory 23 divided into multiple partitions 61 and the L1 cache 17 similarly divided into multiple banks (or ways) 60, in accordance with another embodiment of the present invention.

Figure 10:
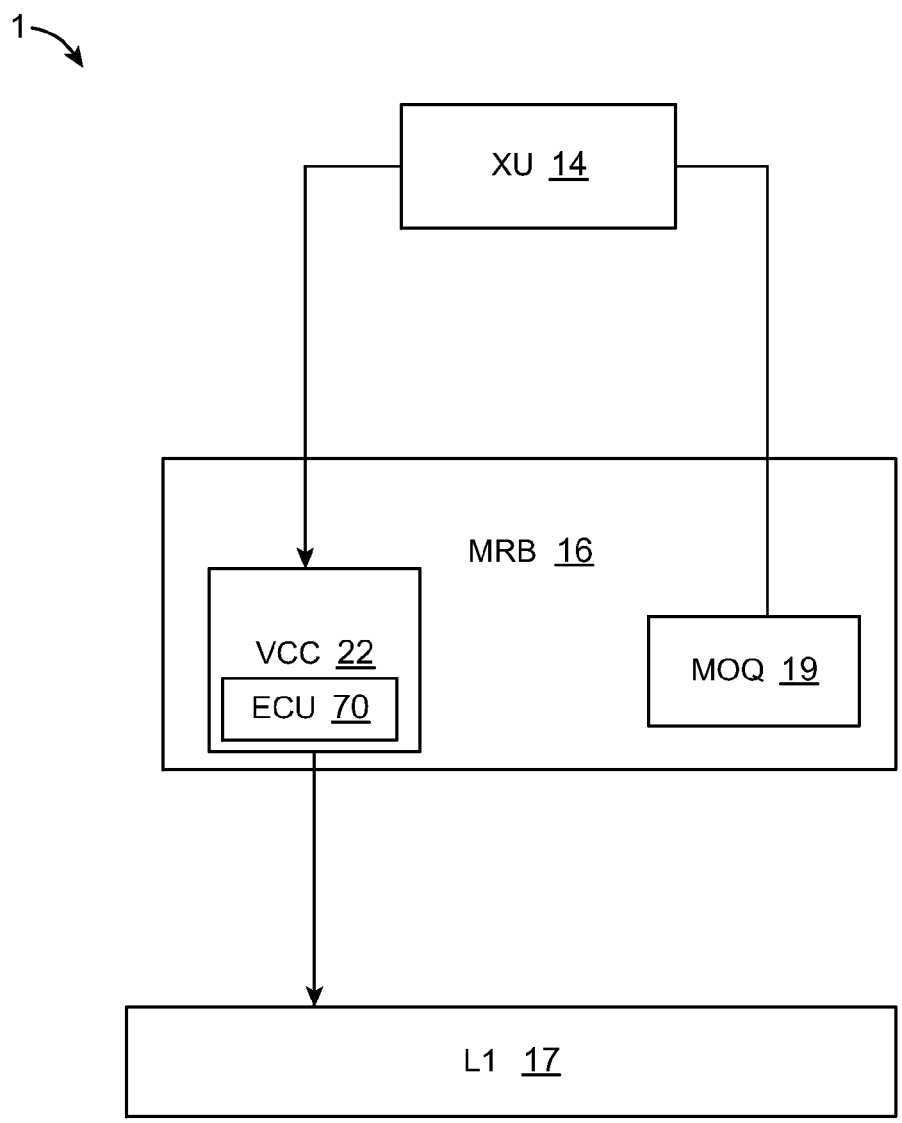

FIG. 10 shows further details of the processor 1 to include an eviction control unit (ECU), in accordance with an embodiment of the present invention.

Figure 11:
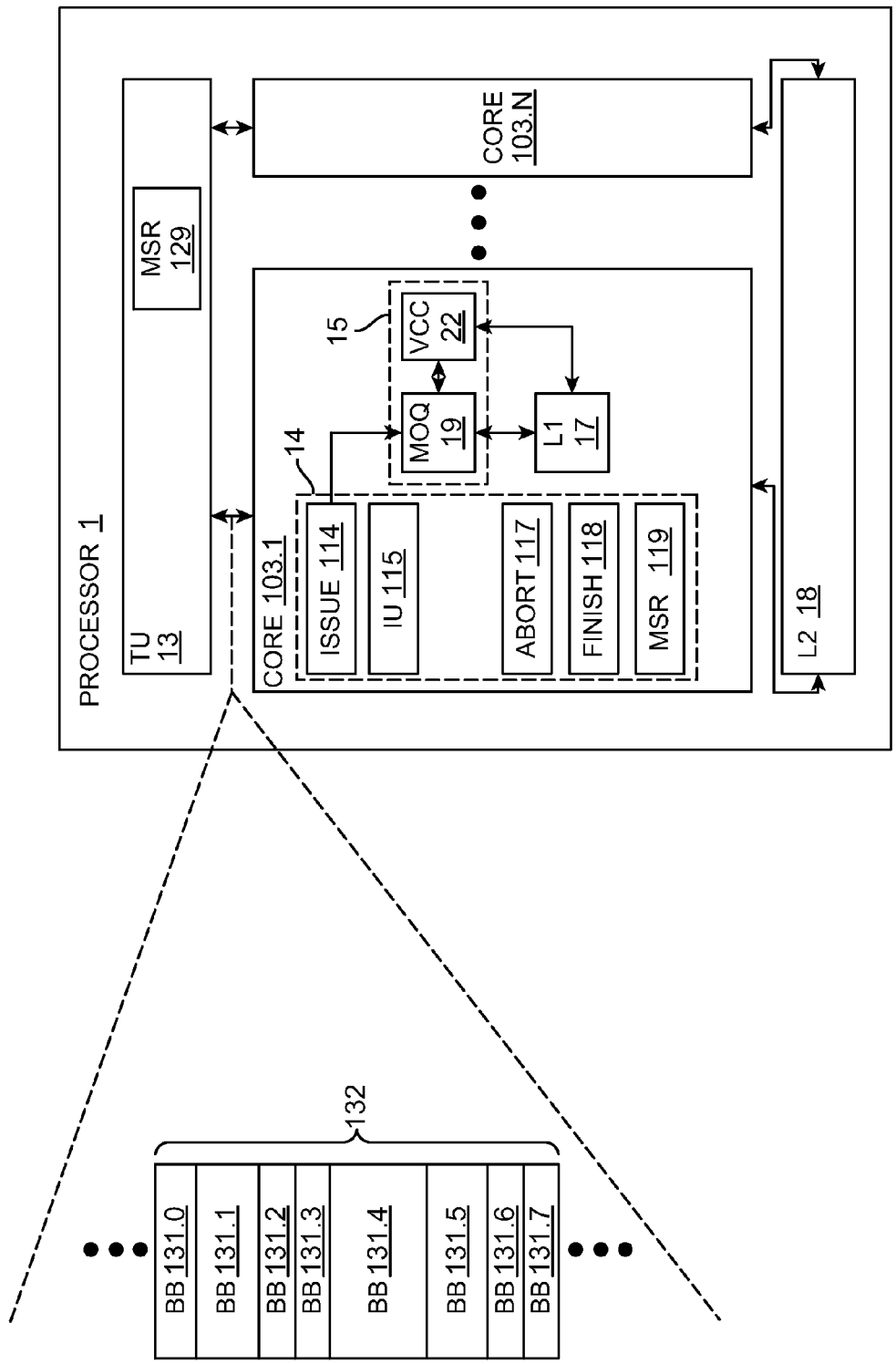

FIG. 11 shows selected details of an embodiment of the processor 1, in accordance with an embodiment of the present invention.

Figure 12:
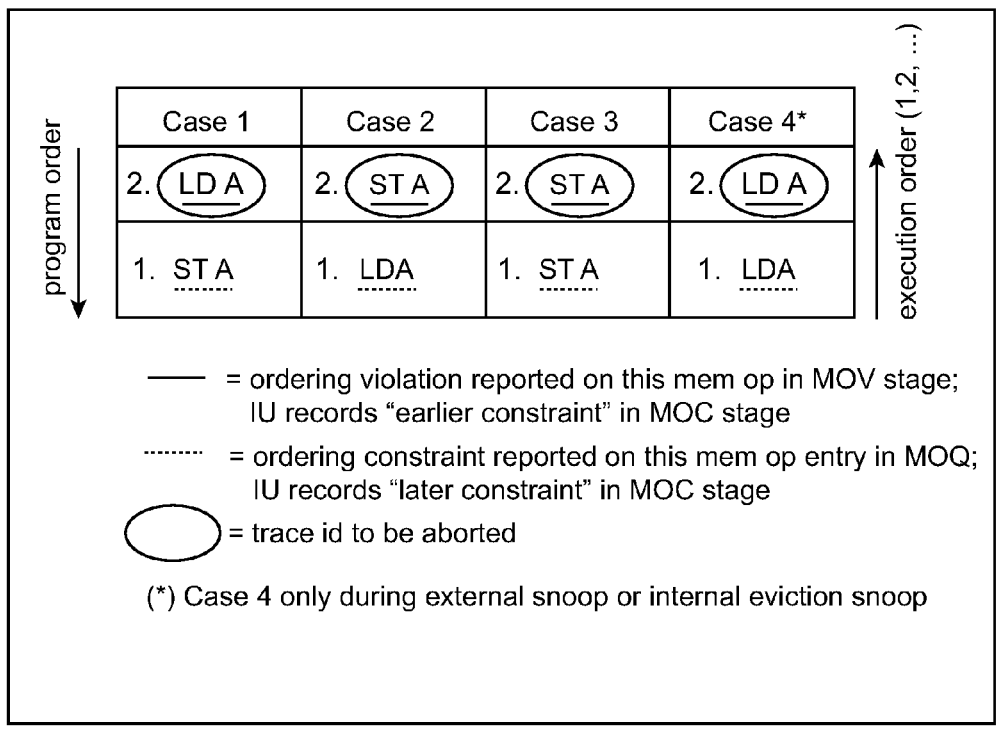

FIG. 12 shows some examples of cases where an intra-processor ordering violations occur.

Figure 13:
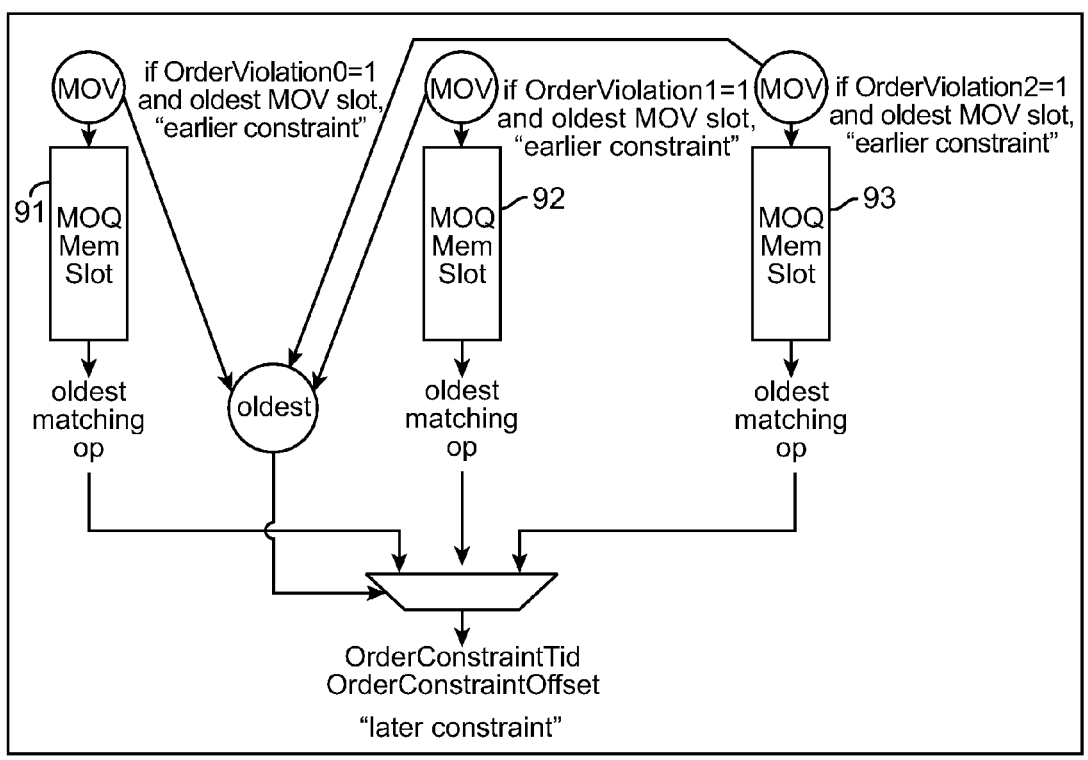

FIG. 13 shows a conceptual flow diagram of a case where multiple ordering violations occur simultaneously.

Figure 1:
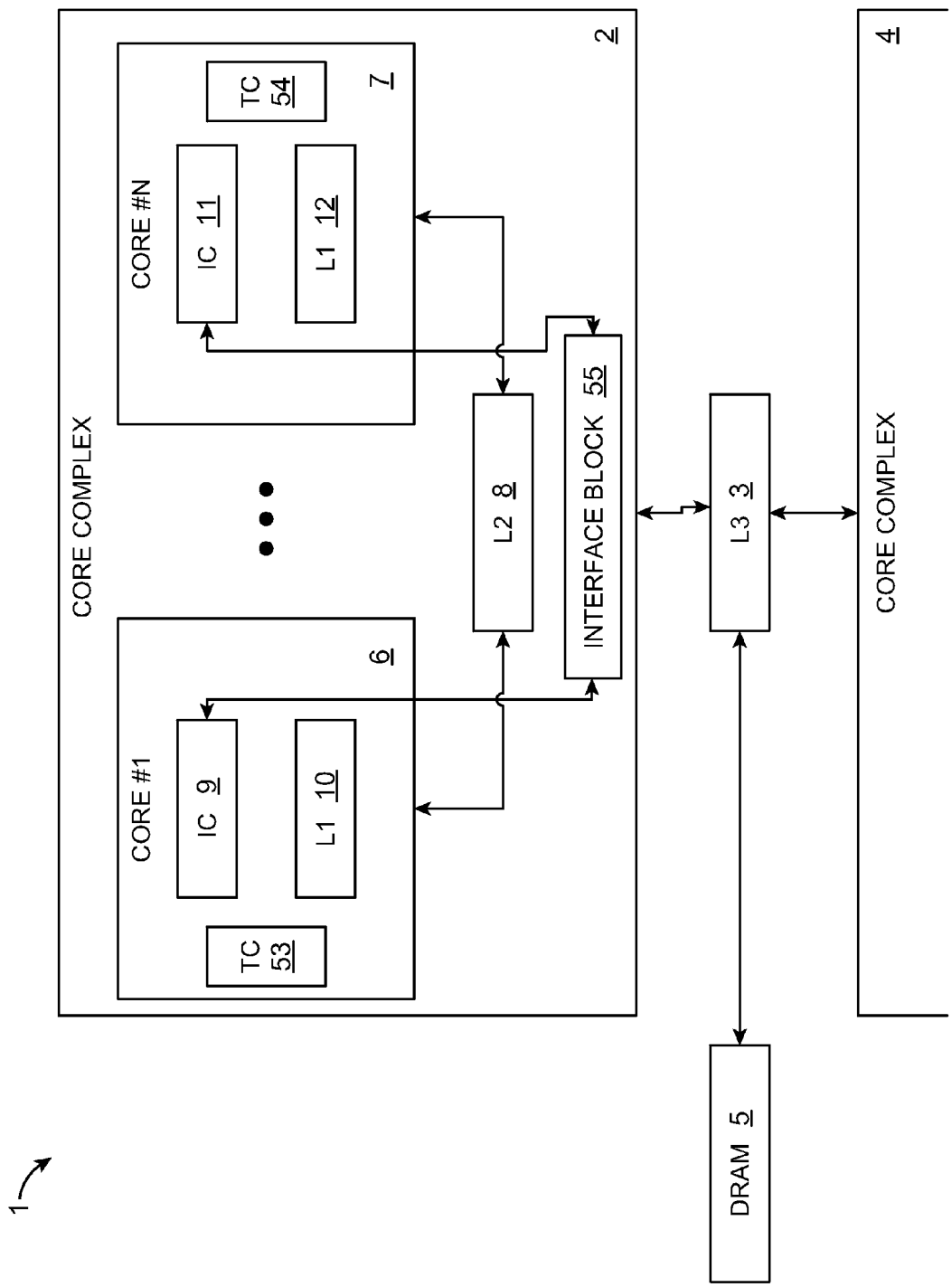
Figure 14:
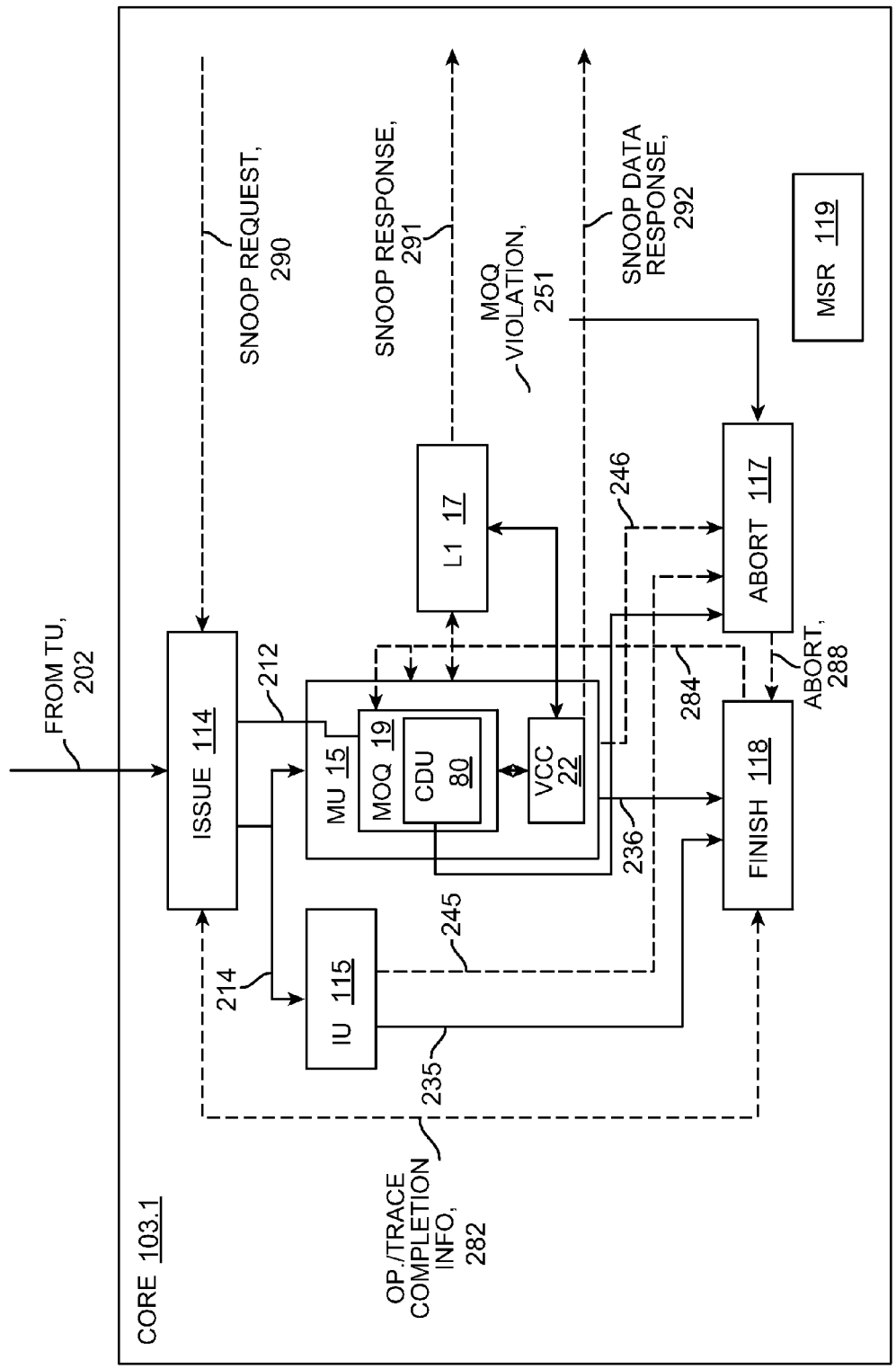

FIG. 14 illustrates selected details of an embodiment of one of the cores of the computer processing system of FIG. 1.

Figure 15:
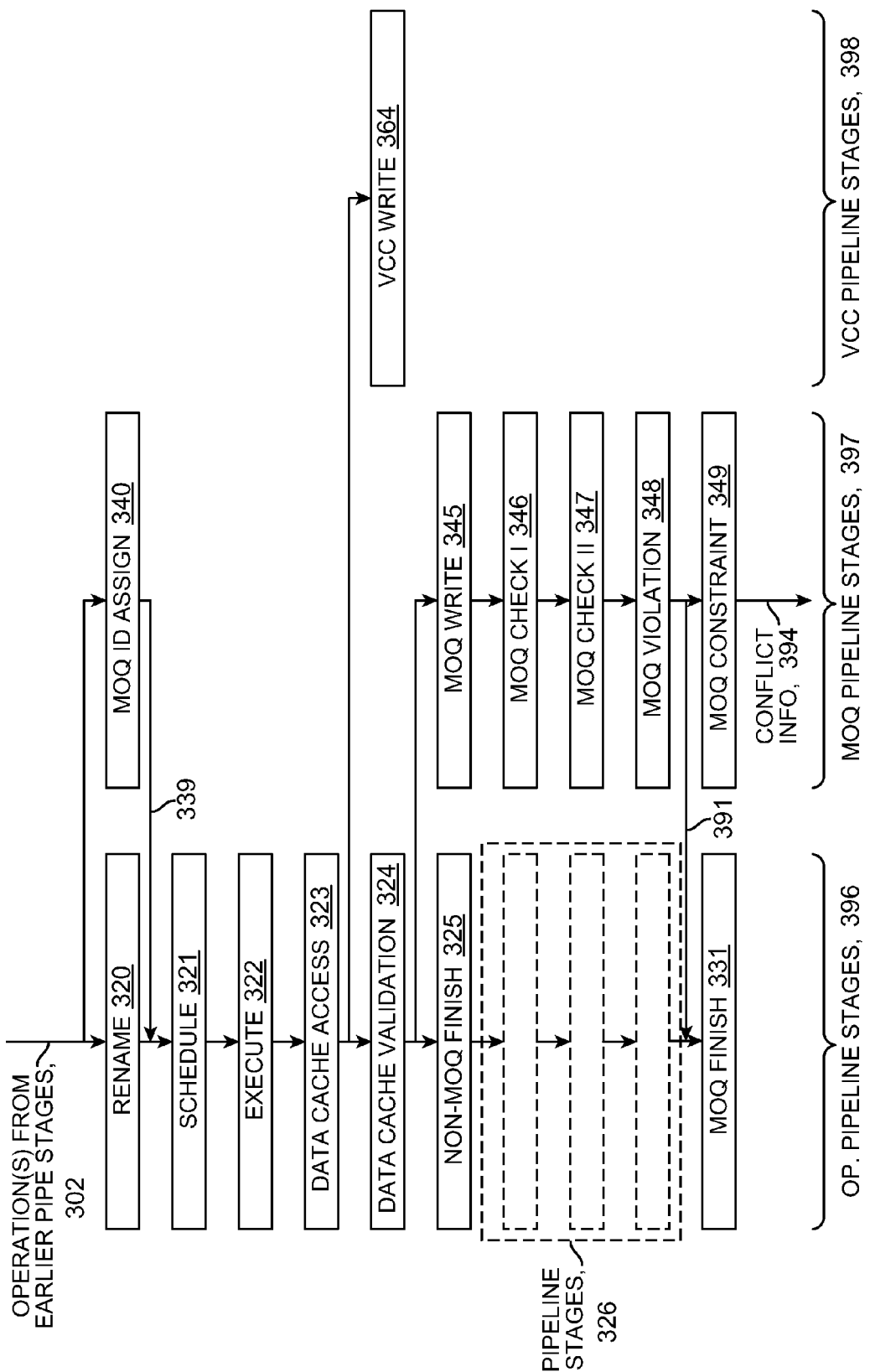

FIG. 15 illustrates selected details of an embodiment of pipeline processing of one of the cores of the computer processing system of FIG. 1, including stages relating to MOQ and VCC functions.

FIGS. 16A-16H illustrate selected details of embodiments of data structures used in one of the cores of the computer processing system of FIG. 1.

Figure 17B:
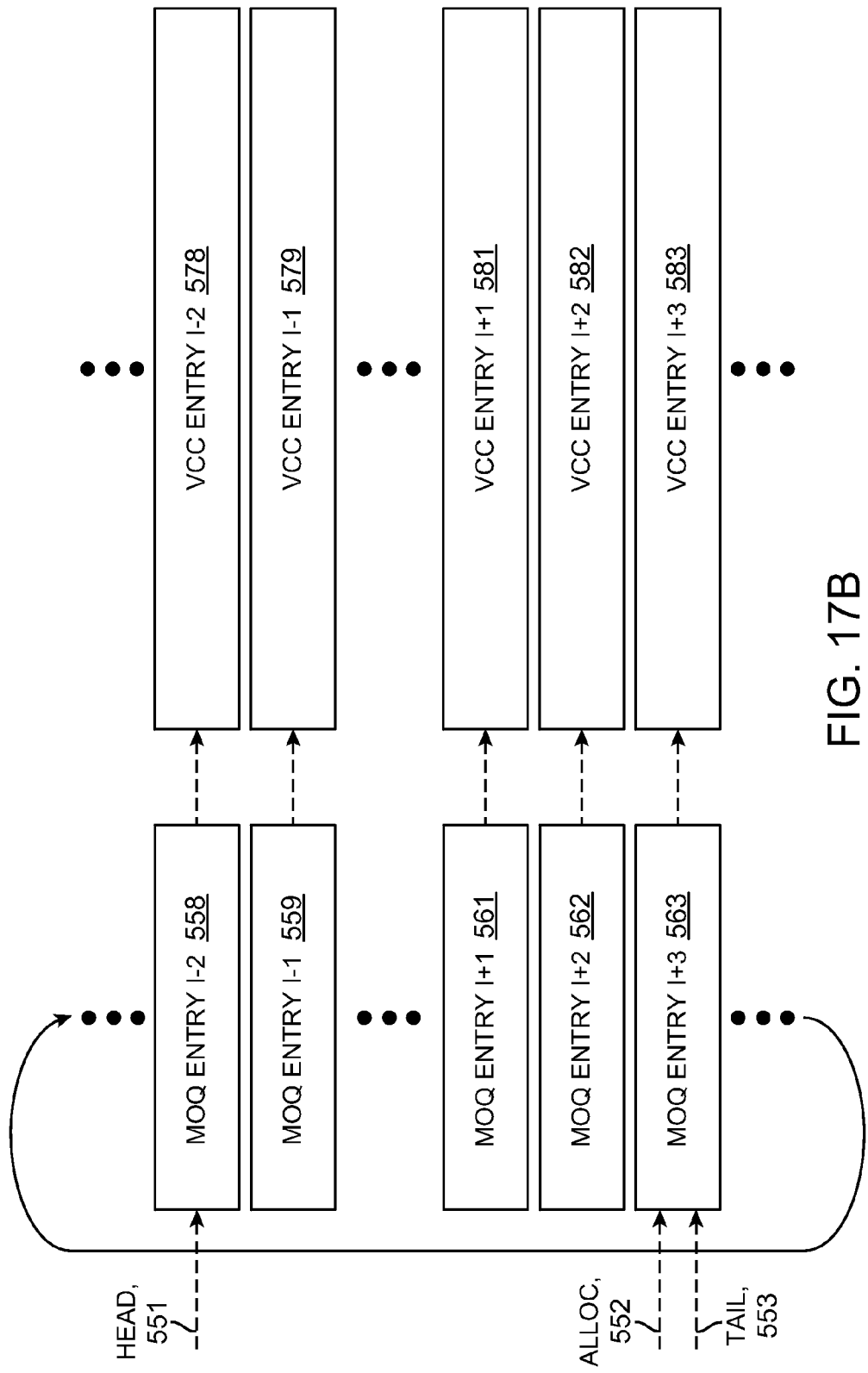

FIGS. 17A and 17B illustrate selected details of embodiments of an MOQ with entries each optionally corresponding to a respective VCC entry.

Figure 18:
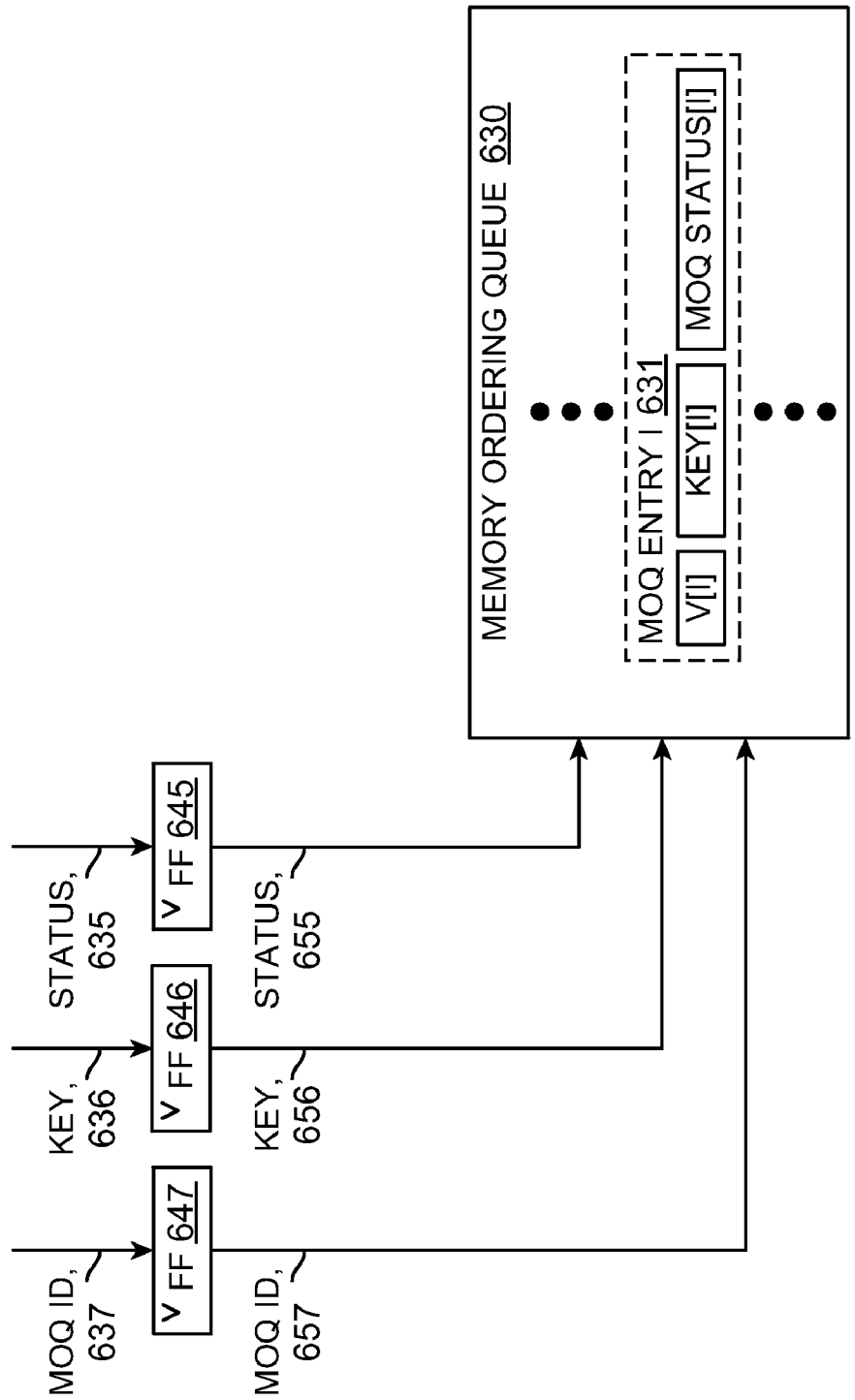

FIG. 18 illustrates selected details of an embodiment of a structure for writing an MOQ entry.

Figure 19:
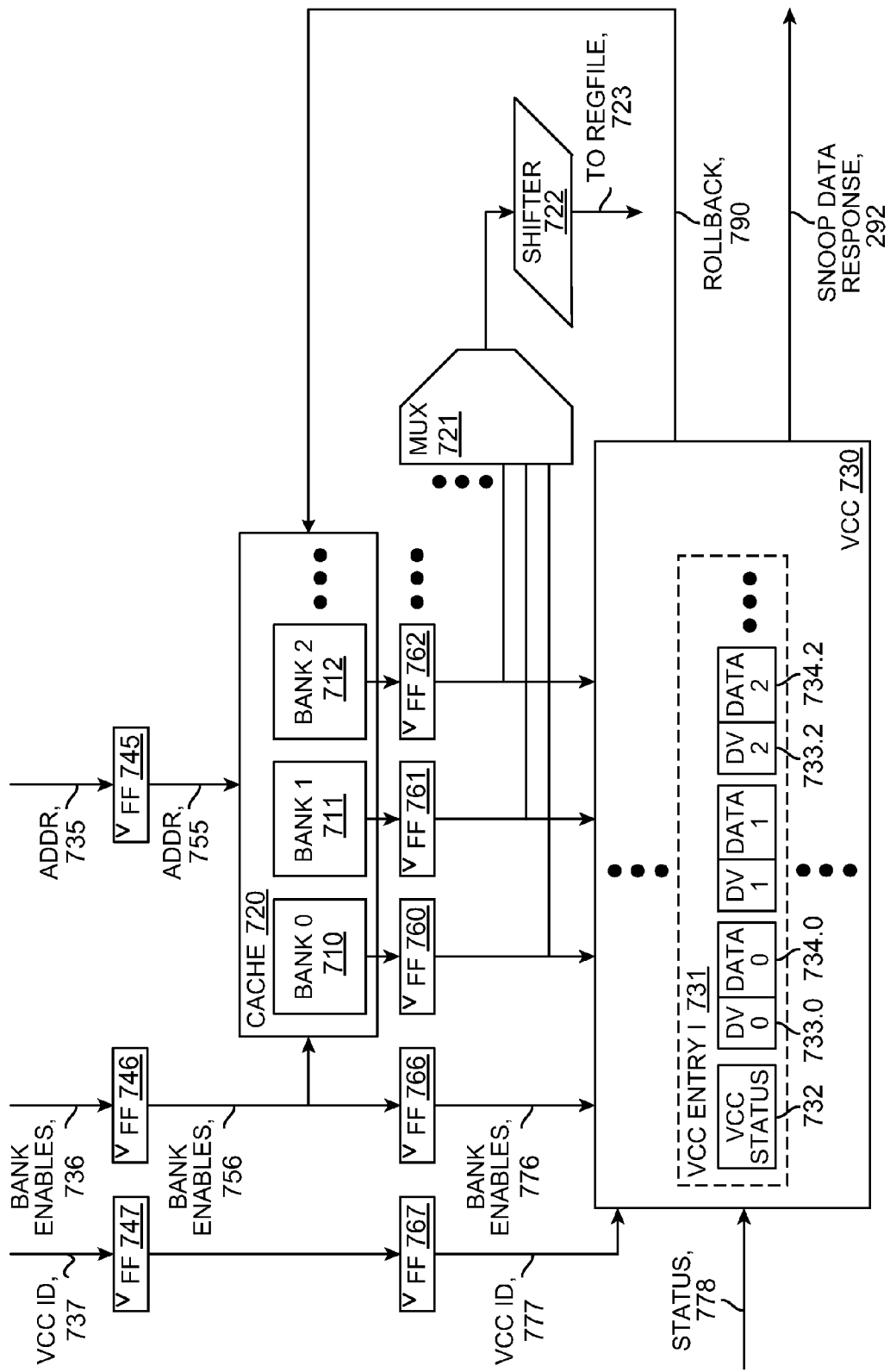

FIG. 19 illustrates selected details of an embodiment of a structure for writing a VCC entry.

Figure 20:
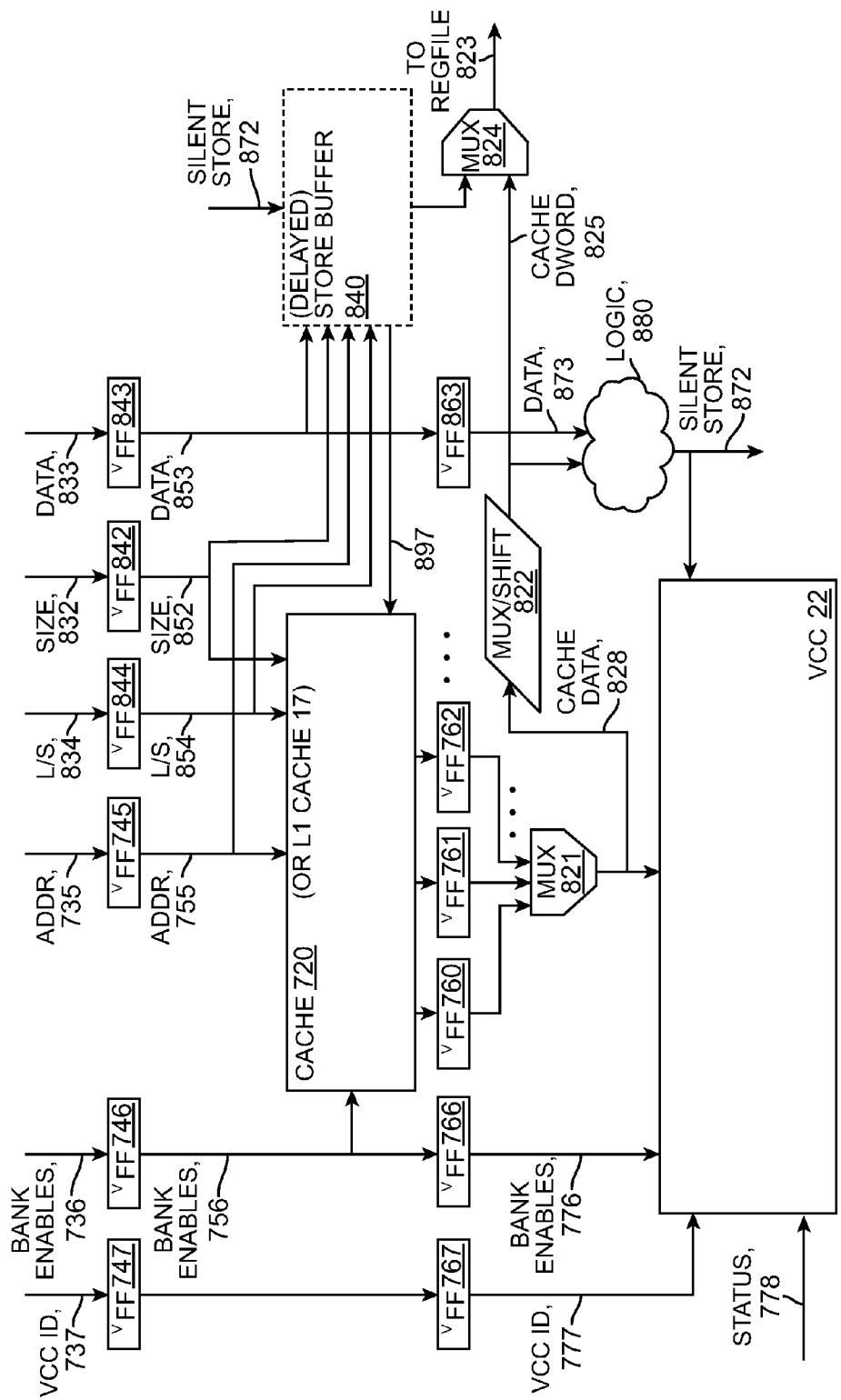

FIG. 20 illustrates selected details of an embodiment of a structure to operate a delayed store buffer (DSB) in conjunction with a VC.

Figure 21A:
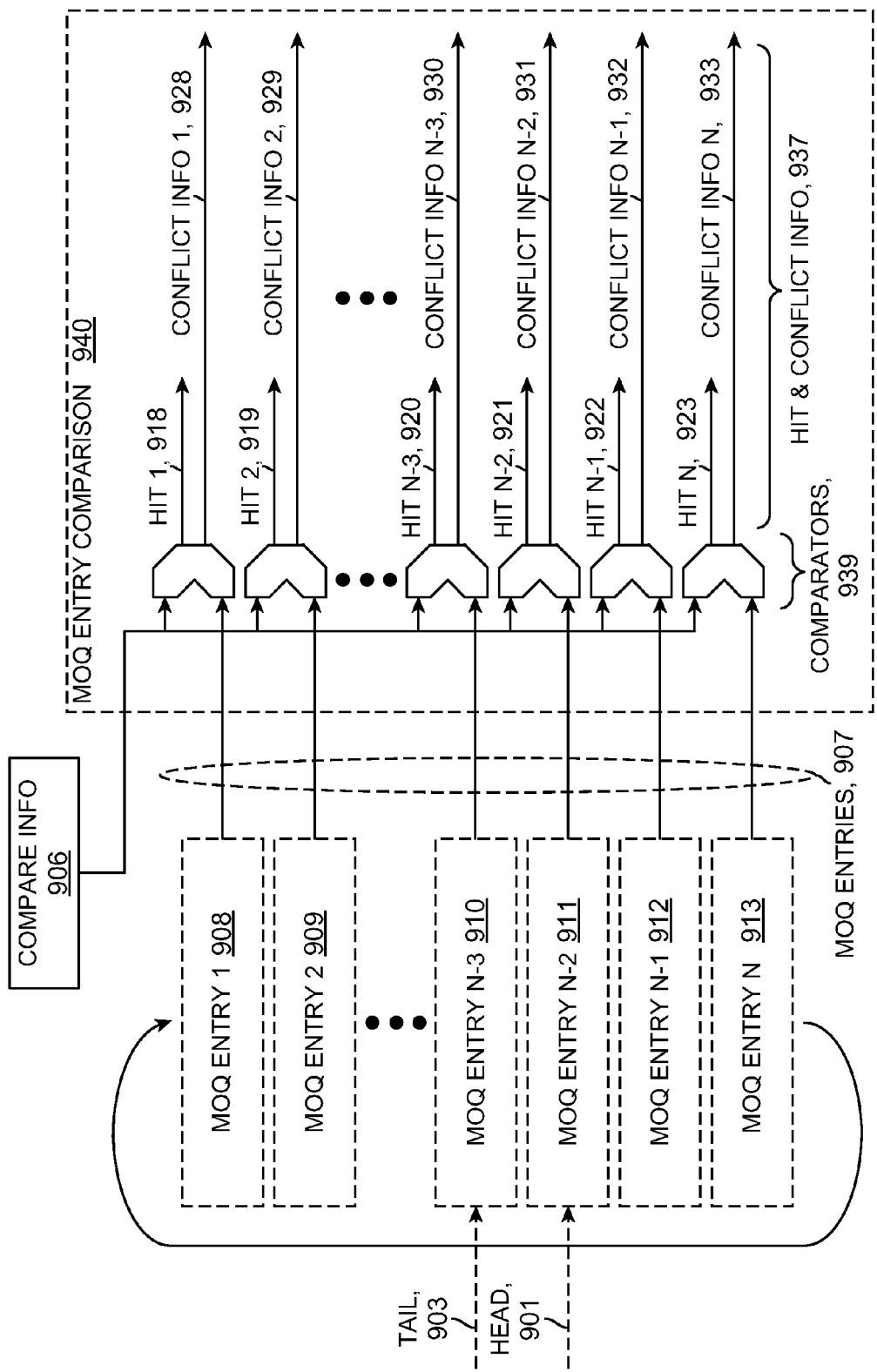

FIG. 21A illustrates selected details of an embodiment of a structure for comparing information (such as in the form of a lookup key) against an MOQ to detect conflicts.

Figure 21B:
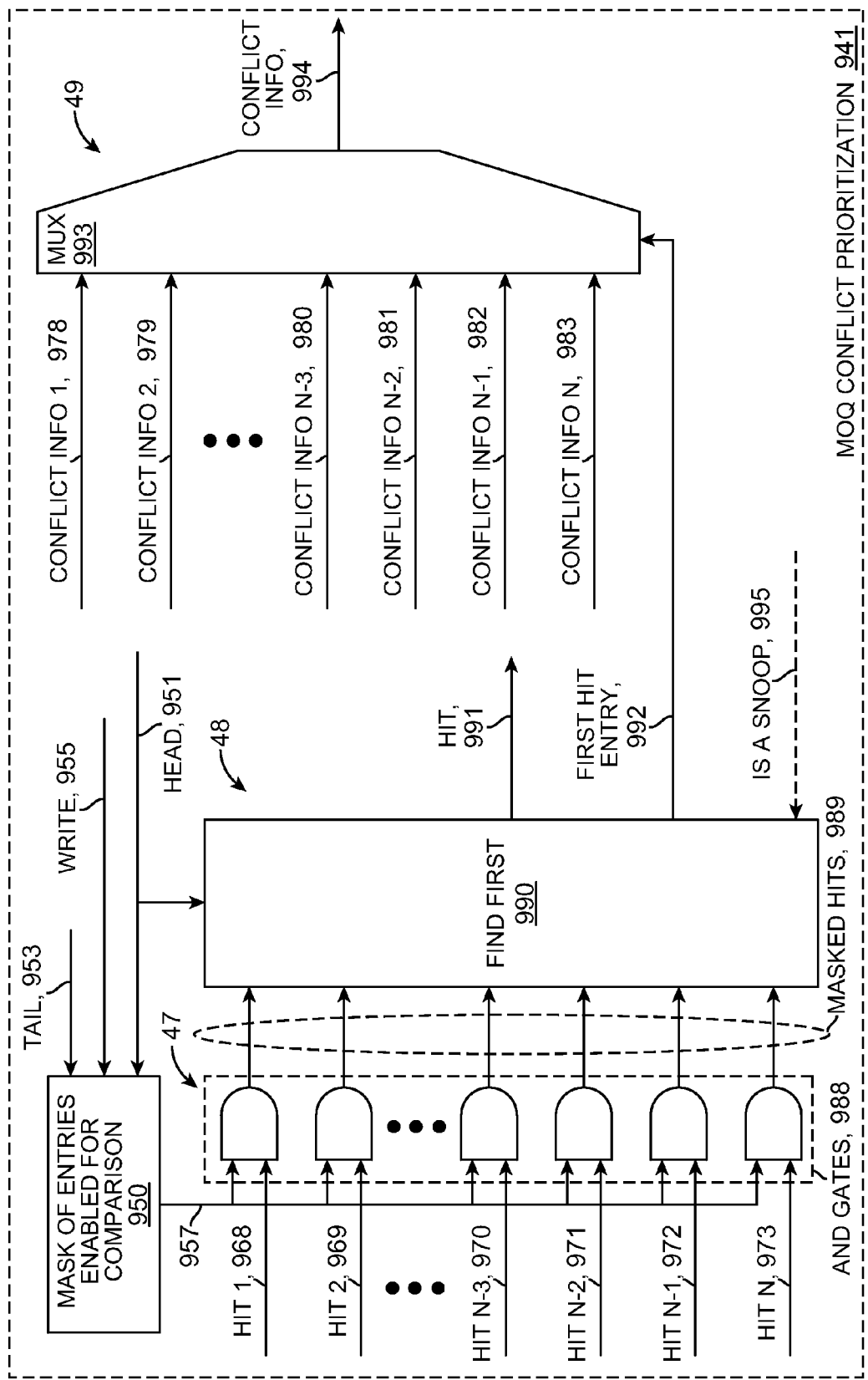

FIG. 21B illustrates selected details of an embodiment of a structure for processing results of an MOQ comparison to detect conflicts.

Figure 21C:
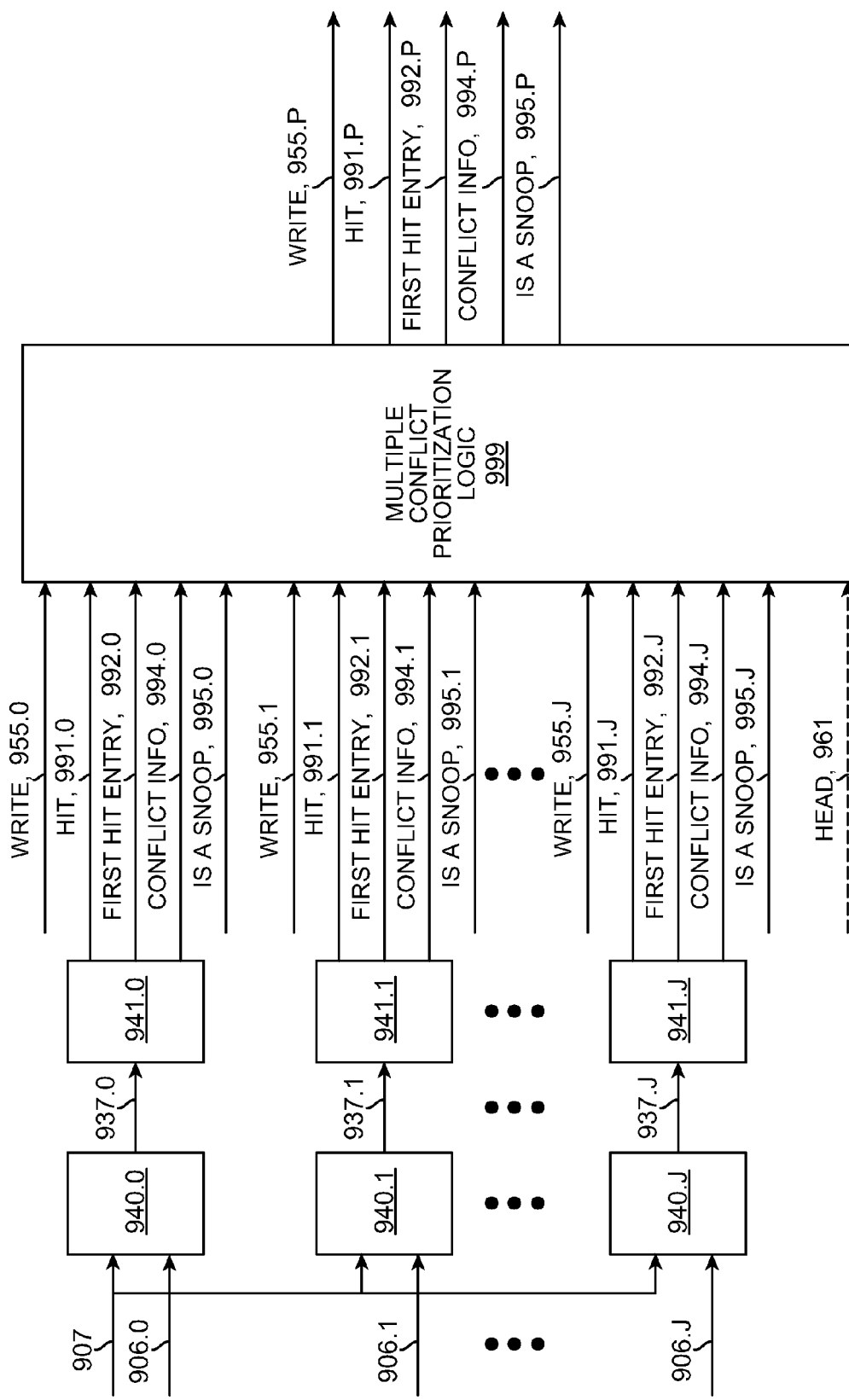

FIG. 21C illustrates selected details of an embodiment of a structure for prioritizing results of multiple MOQ comparisons.

Figure 22B:
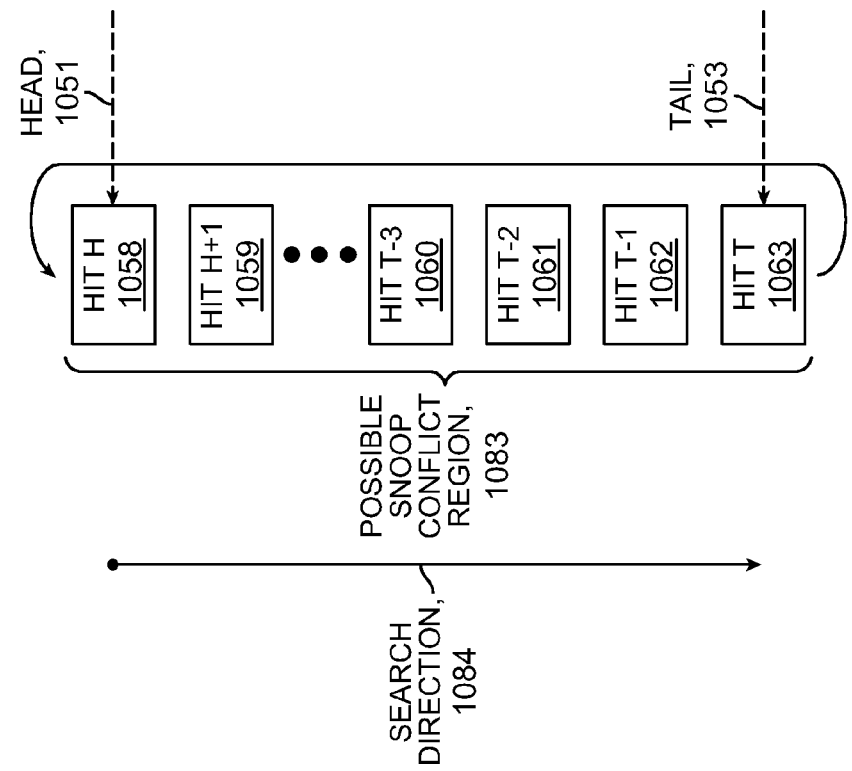
Figure 22A:
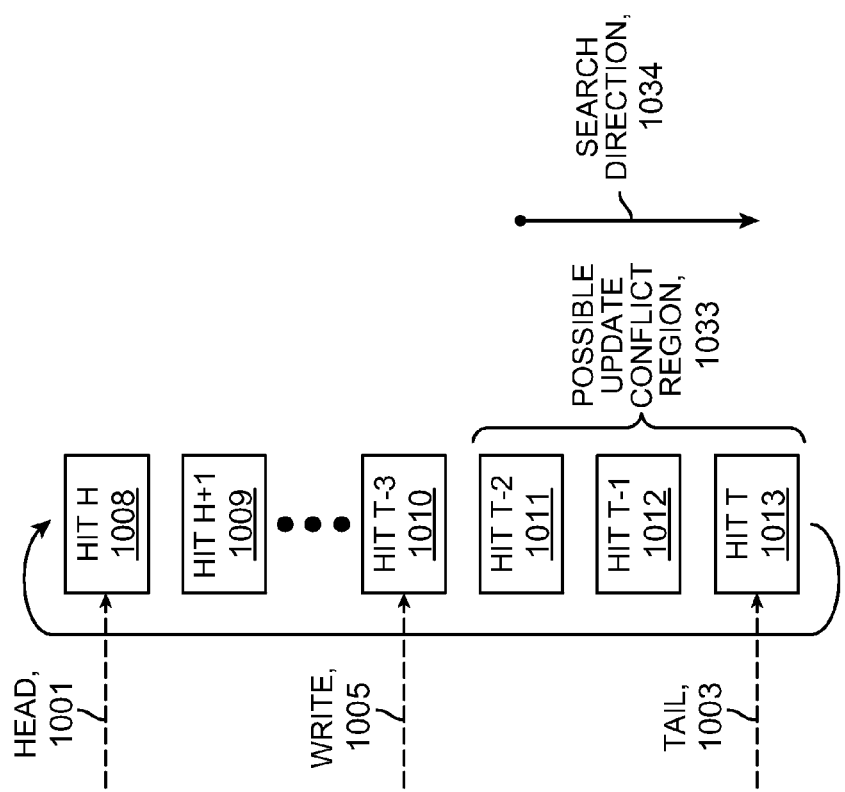

FIGS. 22A and 22B illustrate example operations of logic of FIGS. 21A and 219B, illustrating a portion of MOQ entries that are searched for different types of conflict checks, and an effective search order to find a first conflicting entry.

Figure 23:
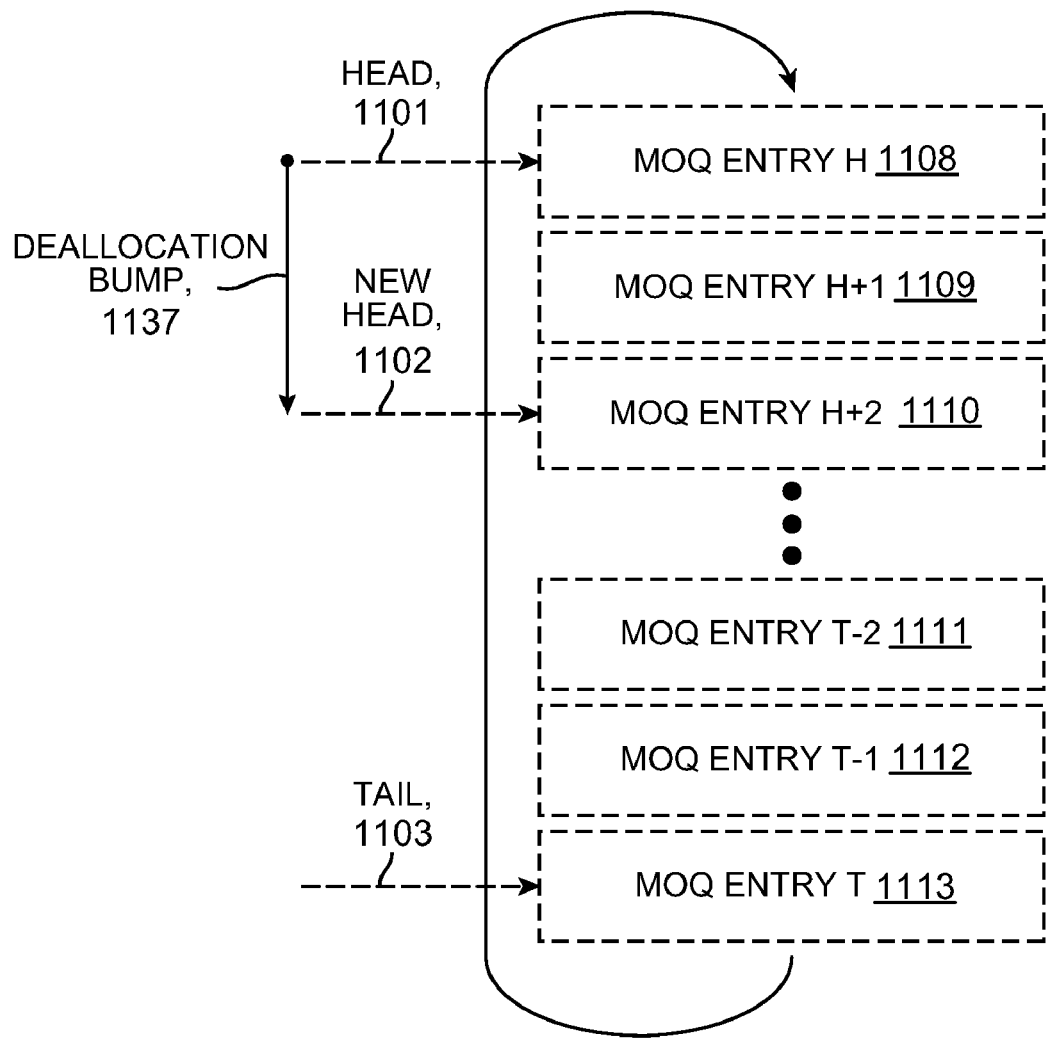

FIG. 23 illustrates example operations relating to an MOQ during atomic commit as part of trace completion.

Figure 24:
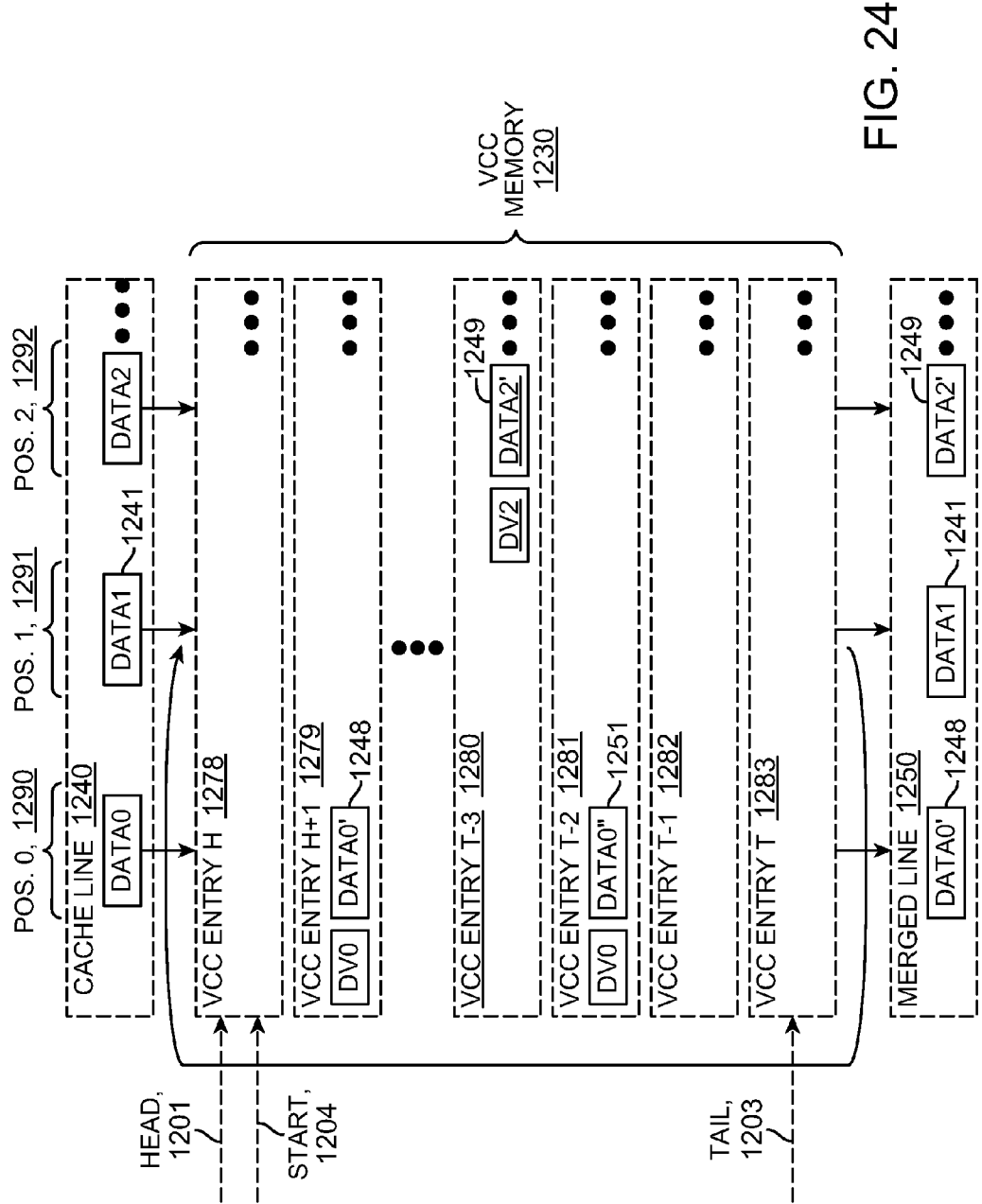

FIG. 24 illustrates example operations, in response to a snoop request, relating to merging data read from a cache with data provided from a VCC.

Figure 25:
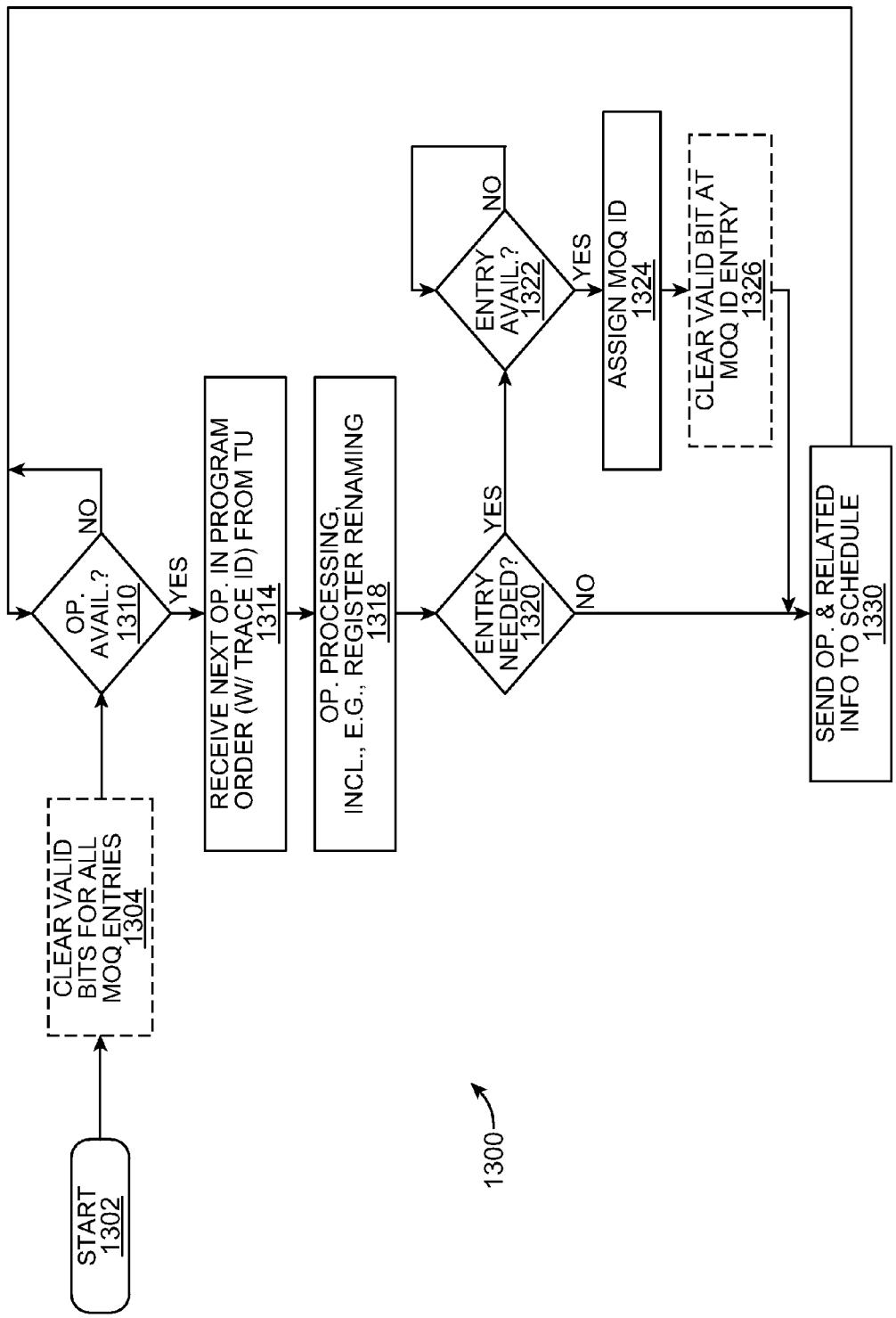

FIG. 25 illustrates selected details of an embodiment of a process for initial processing of operations from a Trace Unit (TU), including assigning an MOQ identifier (MOQ ID).

Figure 26:
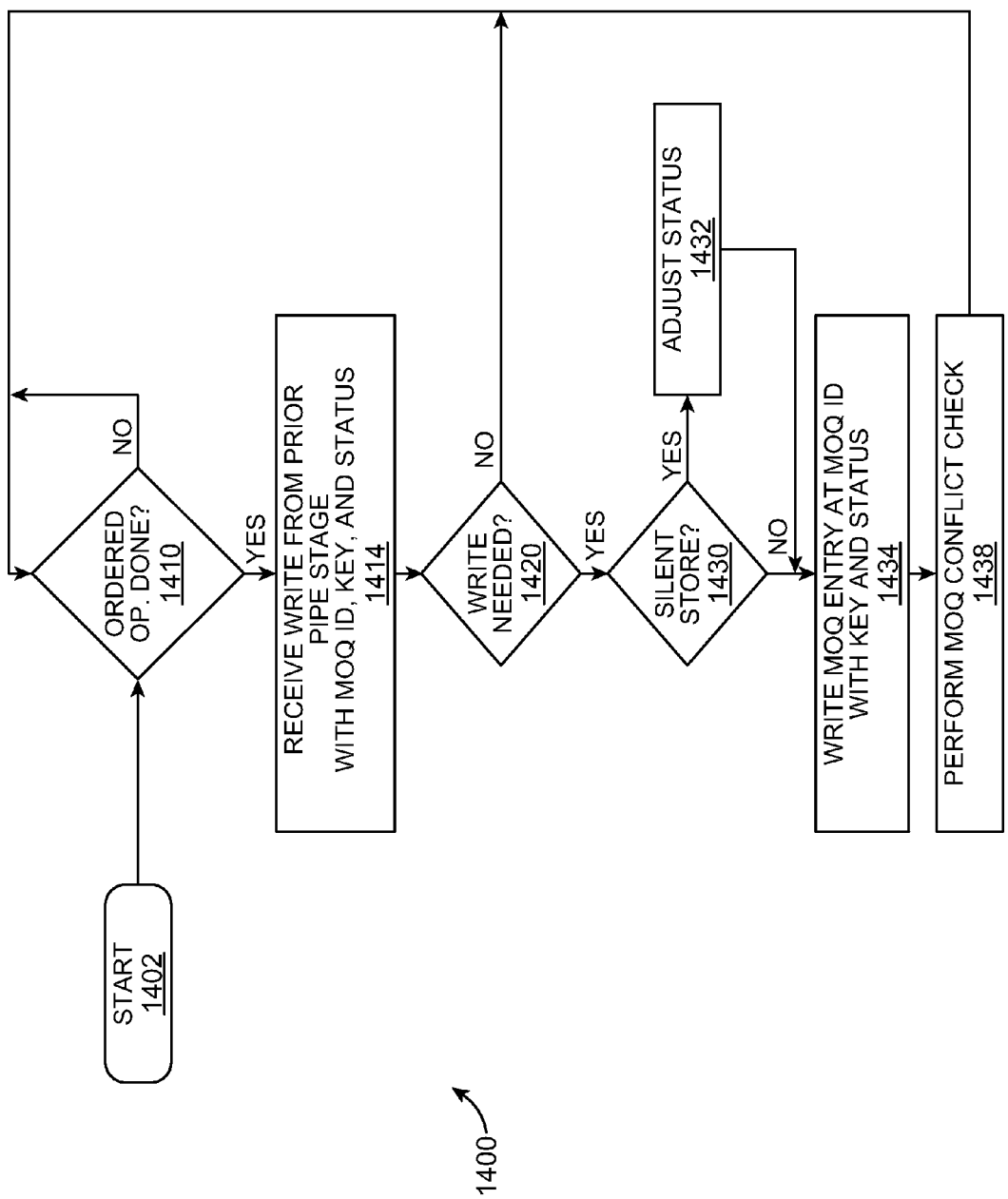

FIG. 26 illustrates selected details of an embodiment of a process for writing (or updating) an MOQ entry.

Figure 27:
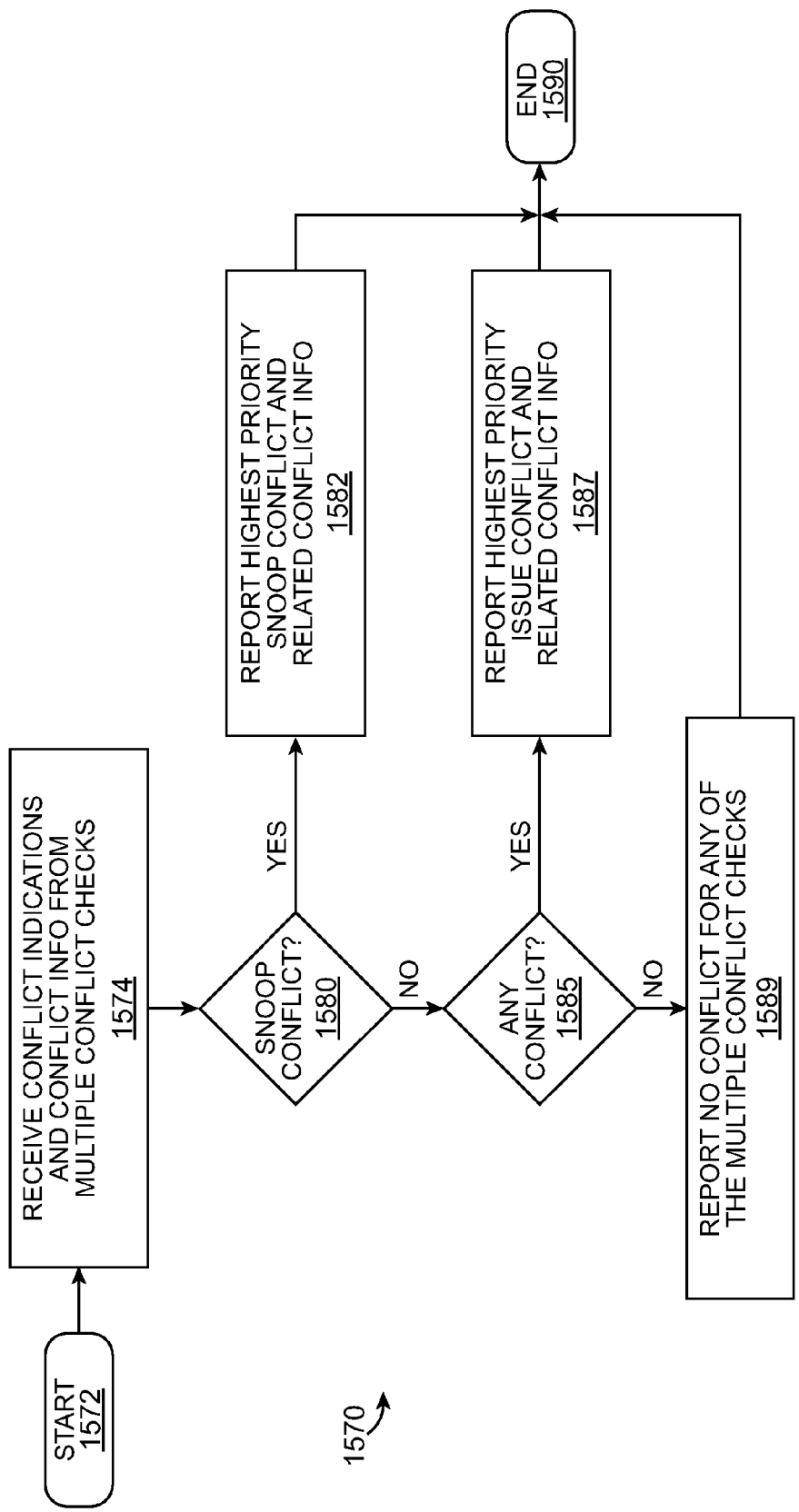

FIG. 27 illustrates selected details of an embodiment of a process for prioritizing results of multiple MOQ conflict checks.

Figure 28A:
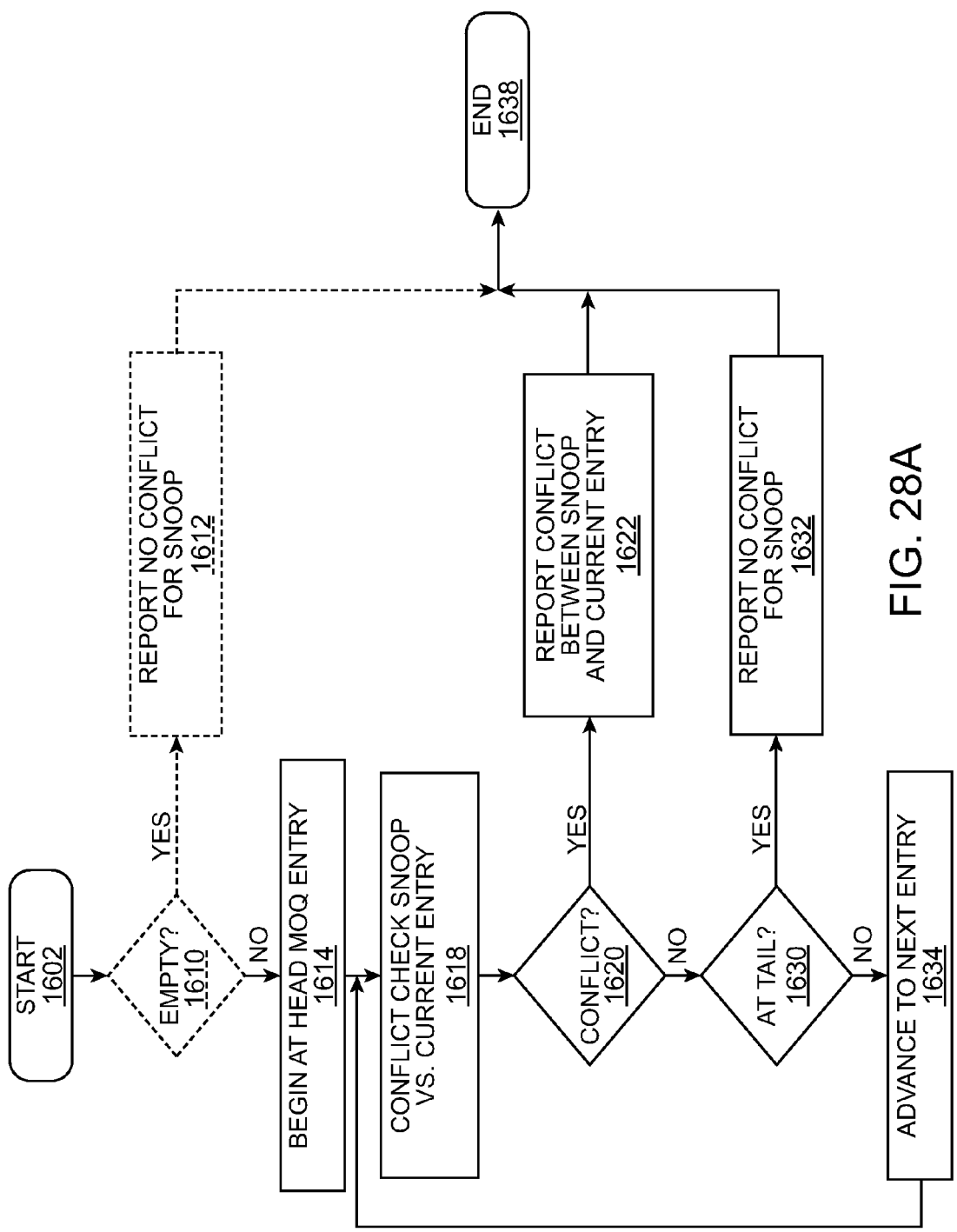
Figure 28B:
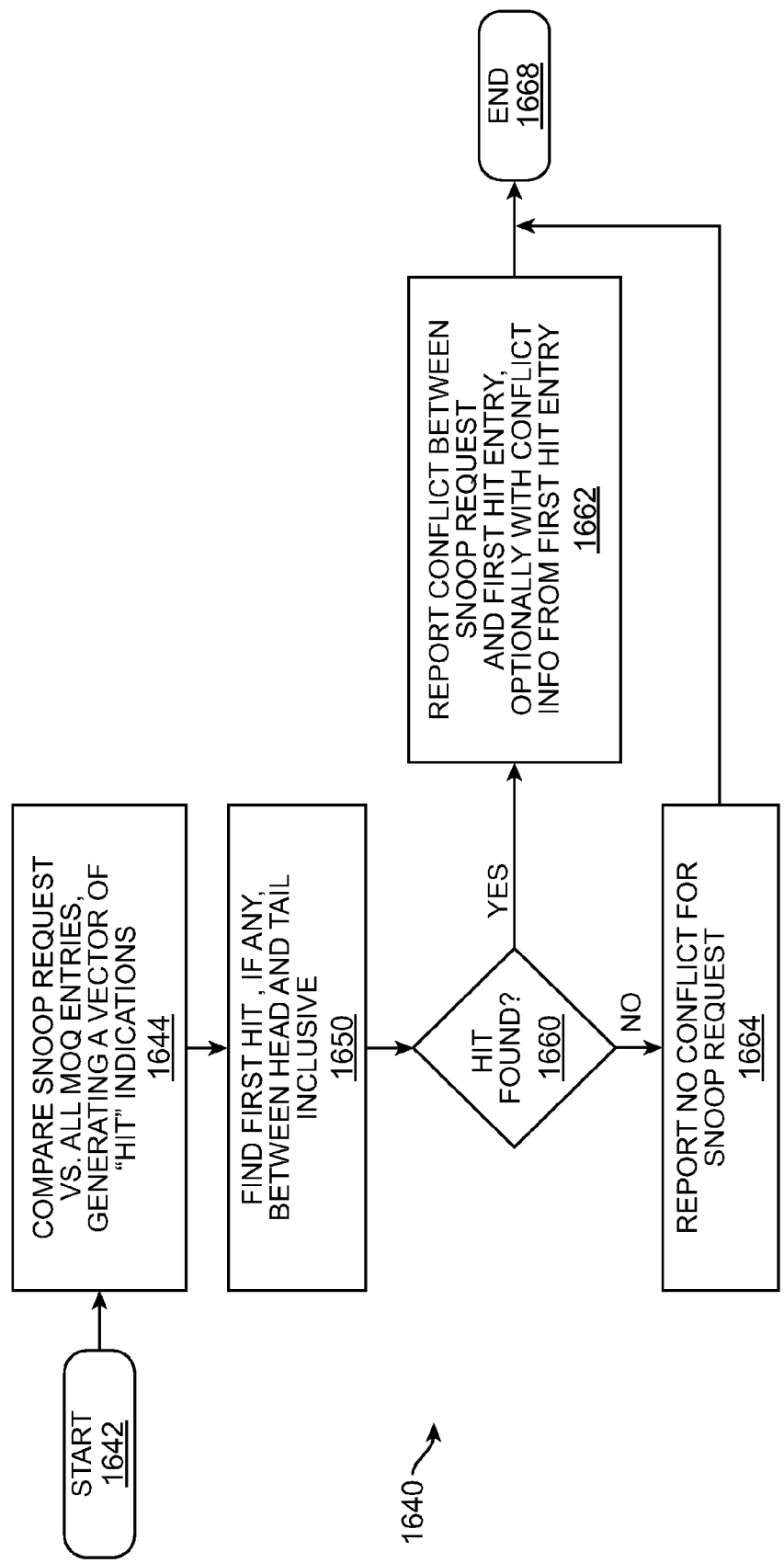

FIGS. 28A and 28B illustrate selected details of serial and parallel embodiments, respectively, of processes for checking for MOQ conflicts in response to a snoop request.

FIG. 28C illustrates selected details of an embodiment of a process for further processing of a snoop request.

Figure 29A:
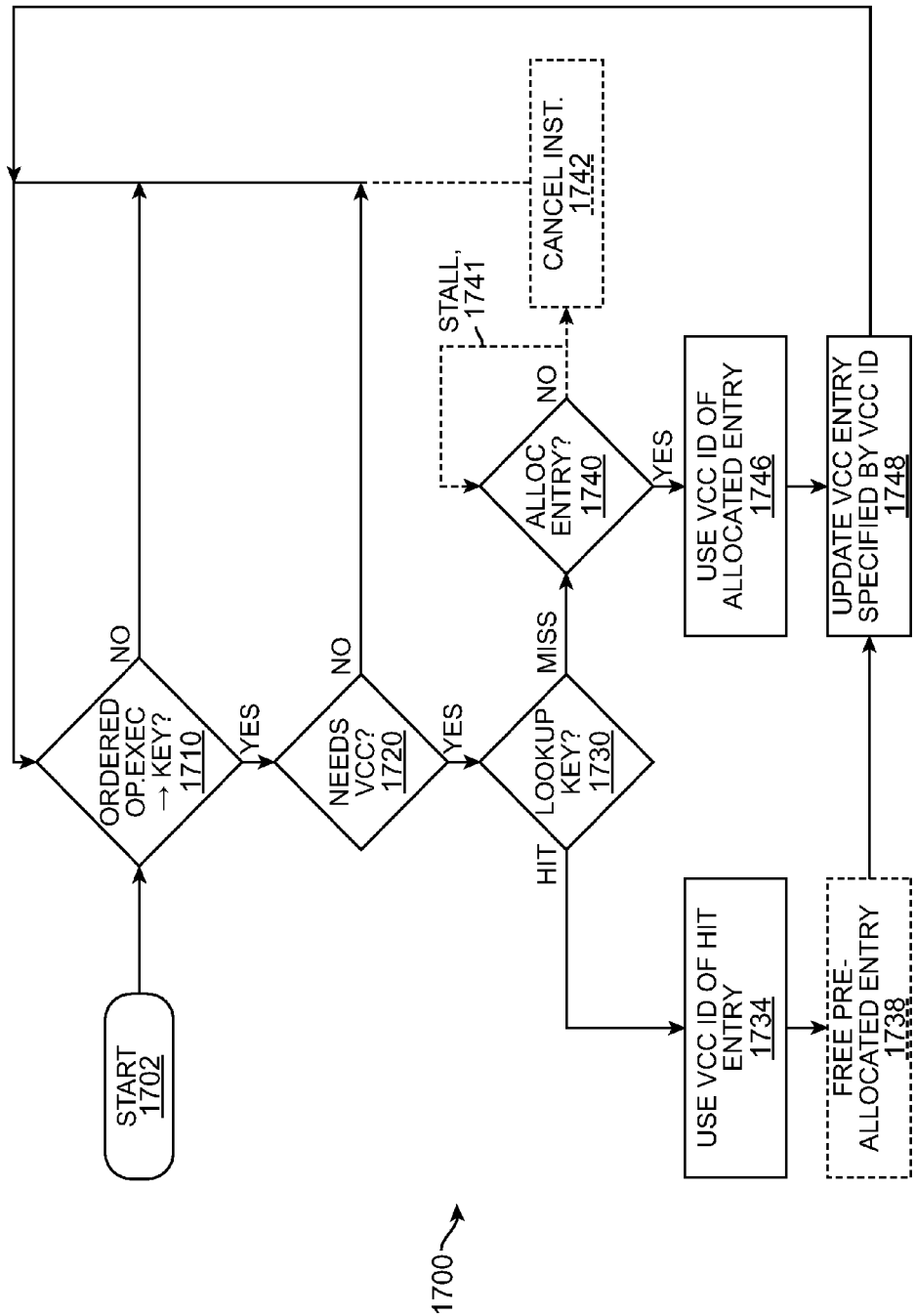

FIG. 29A illustrates selected details of an embodiment of a process for determining a VCC ID for use in updating a VCC entry.

Figure 29B:
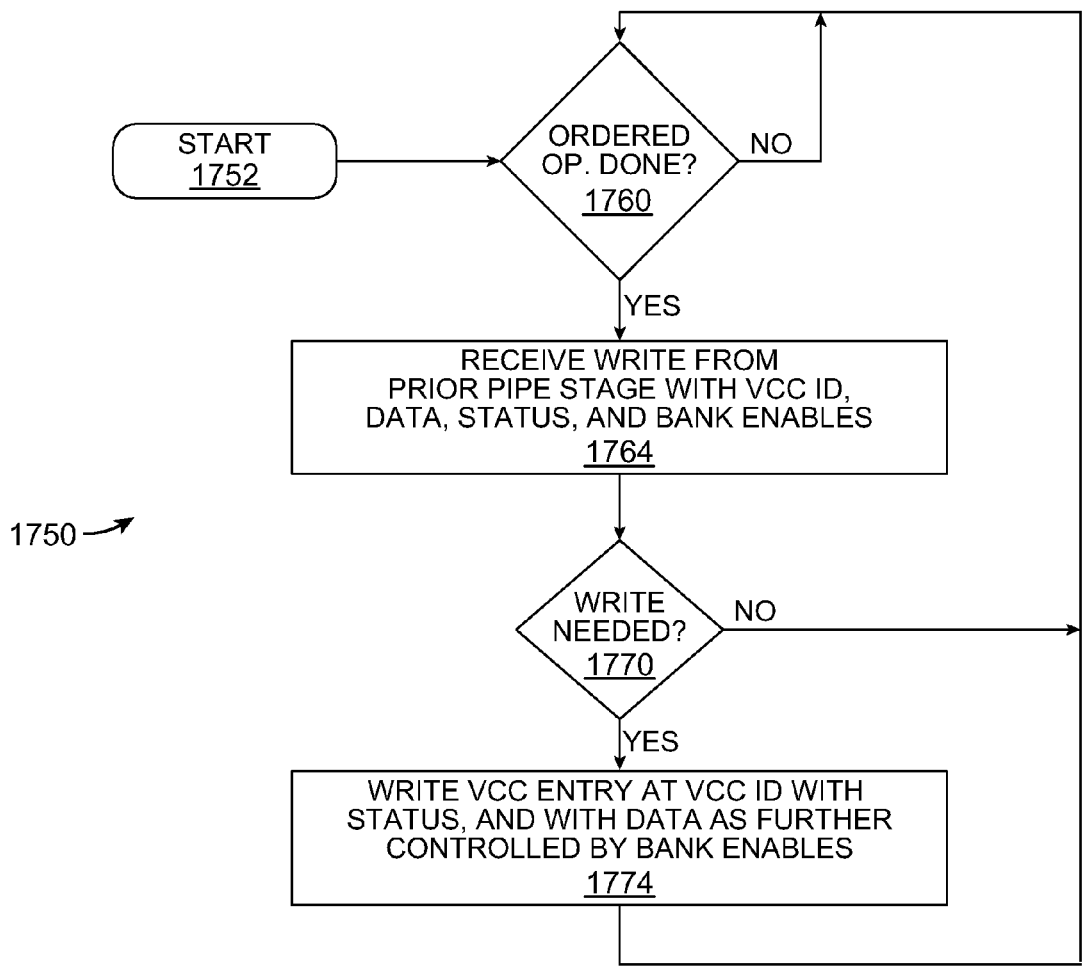

FIG. 29B illustrates selected details of an embodiment of a process for updating a VCC entry.

Figure 30B:
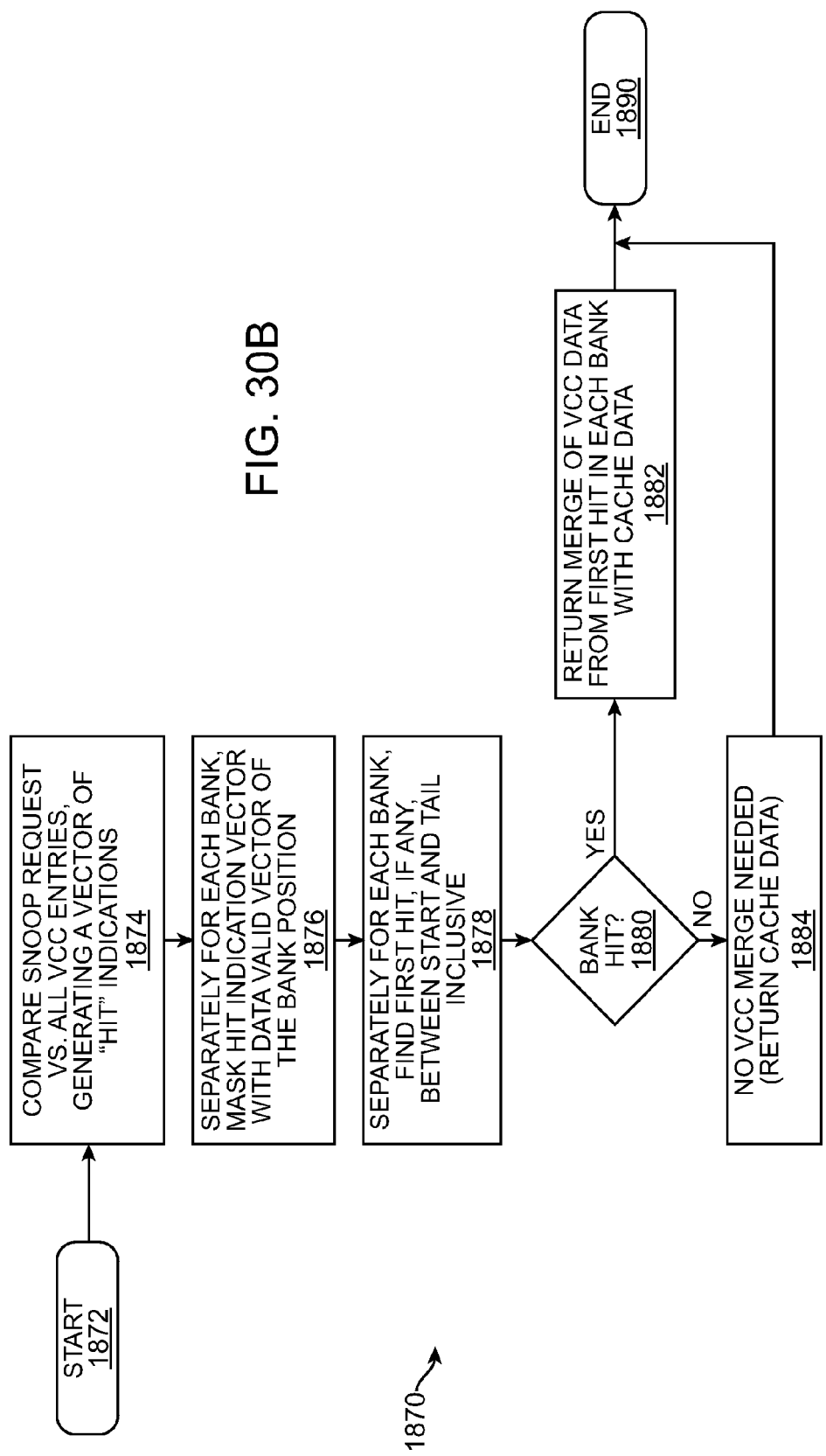

FIGS. 30A and 30B illustrate selected details of serial and parallel embodiments, respectively, of processes for returning cache data selectively merged with data from a VCC in response to a snoop request.

Figure 31A:
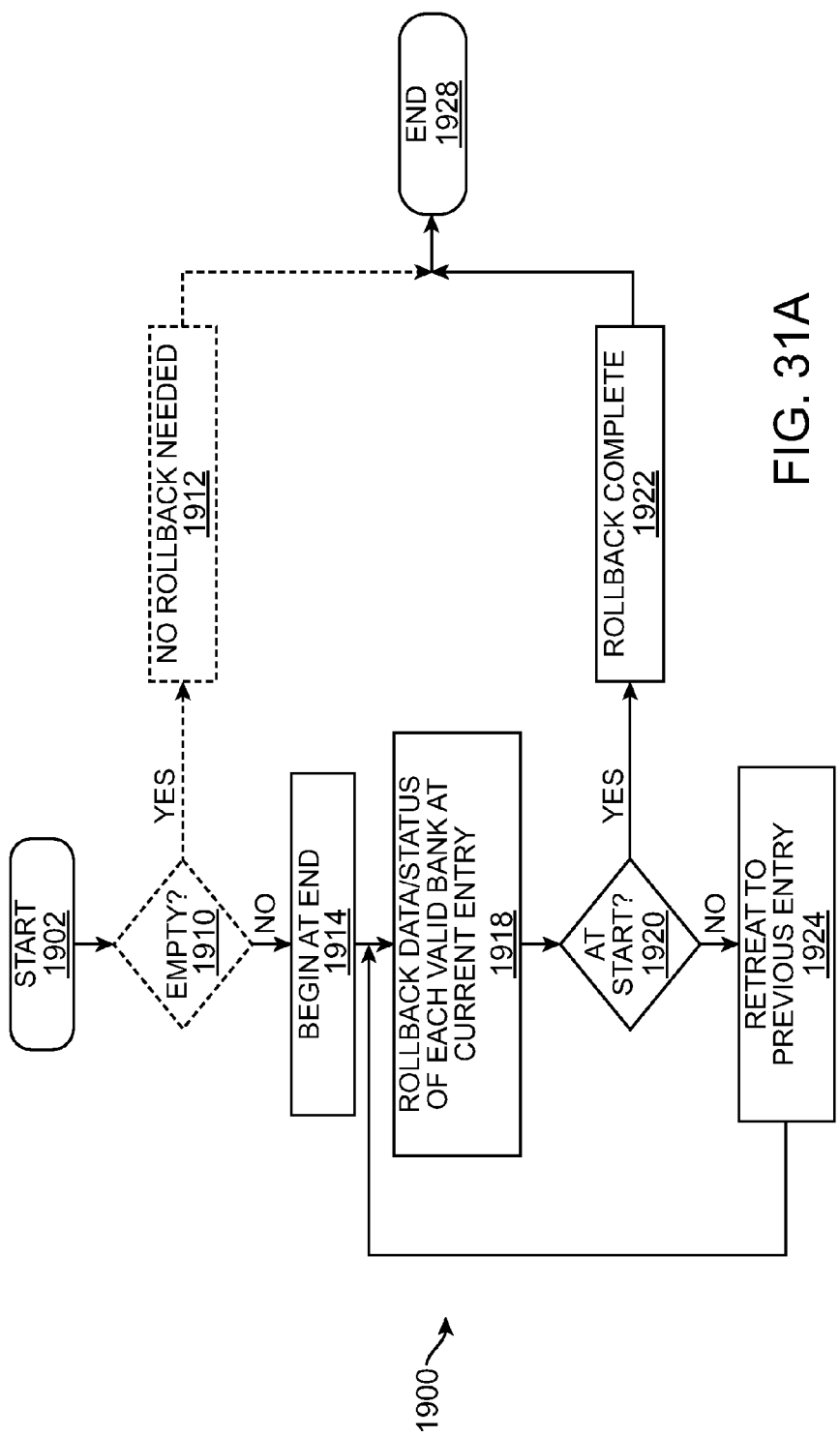
Figure 31B:
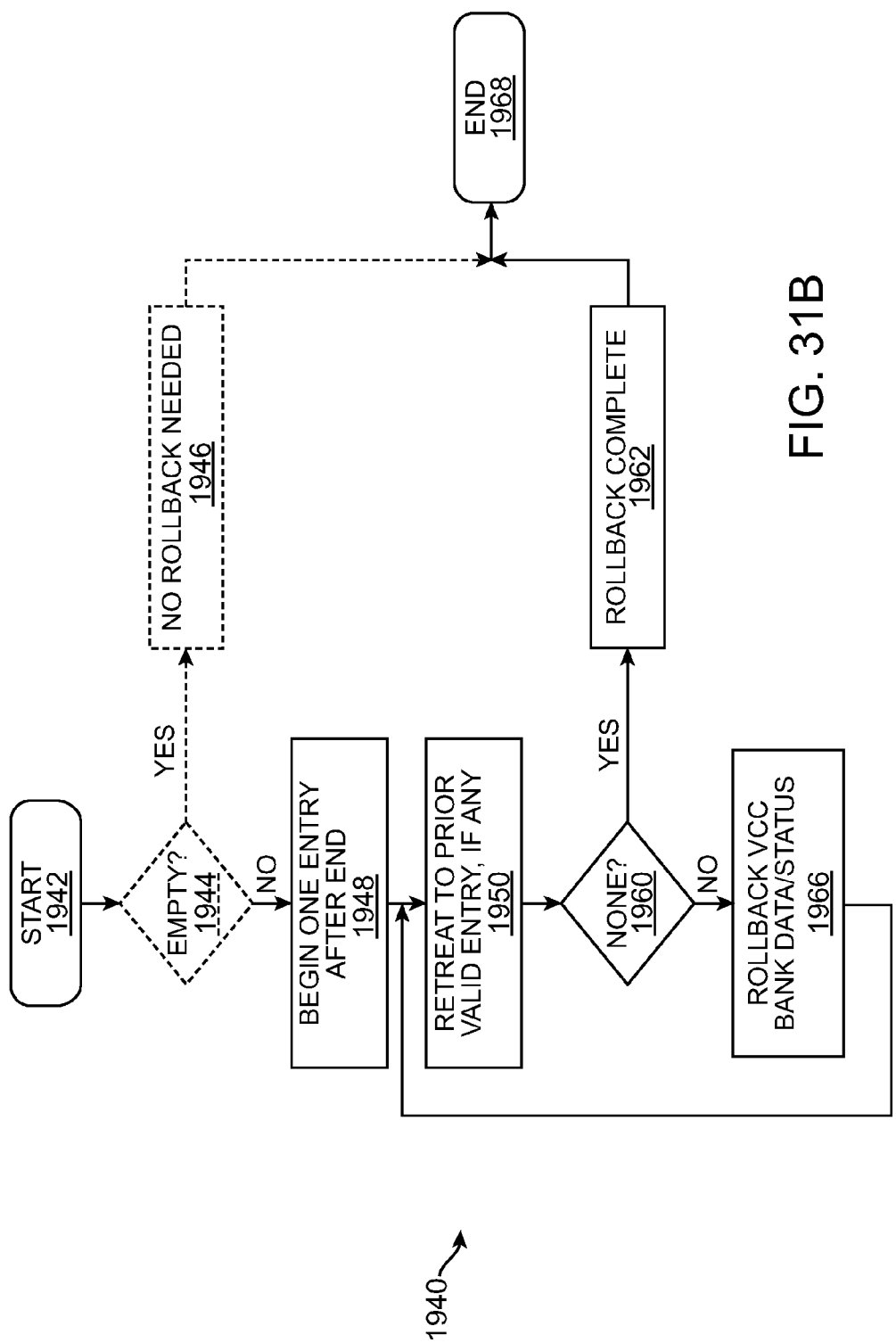

FIGS. 31A and 31B illustrate selected details of an embodiment of a process for updating a delayed store buffer entry.

Figure 32A:
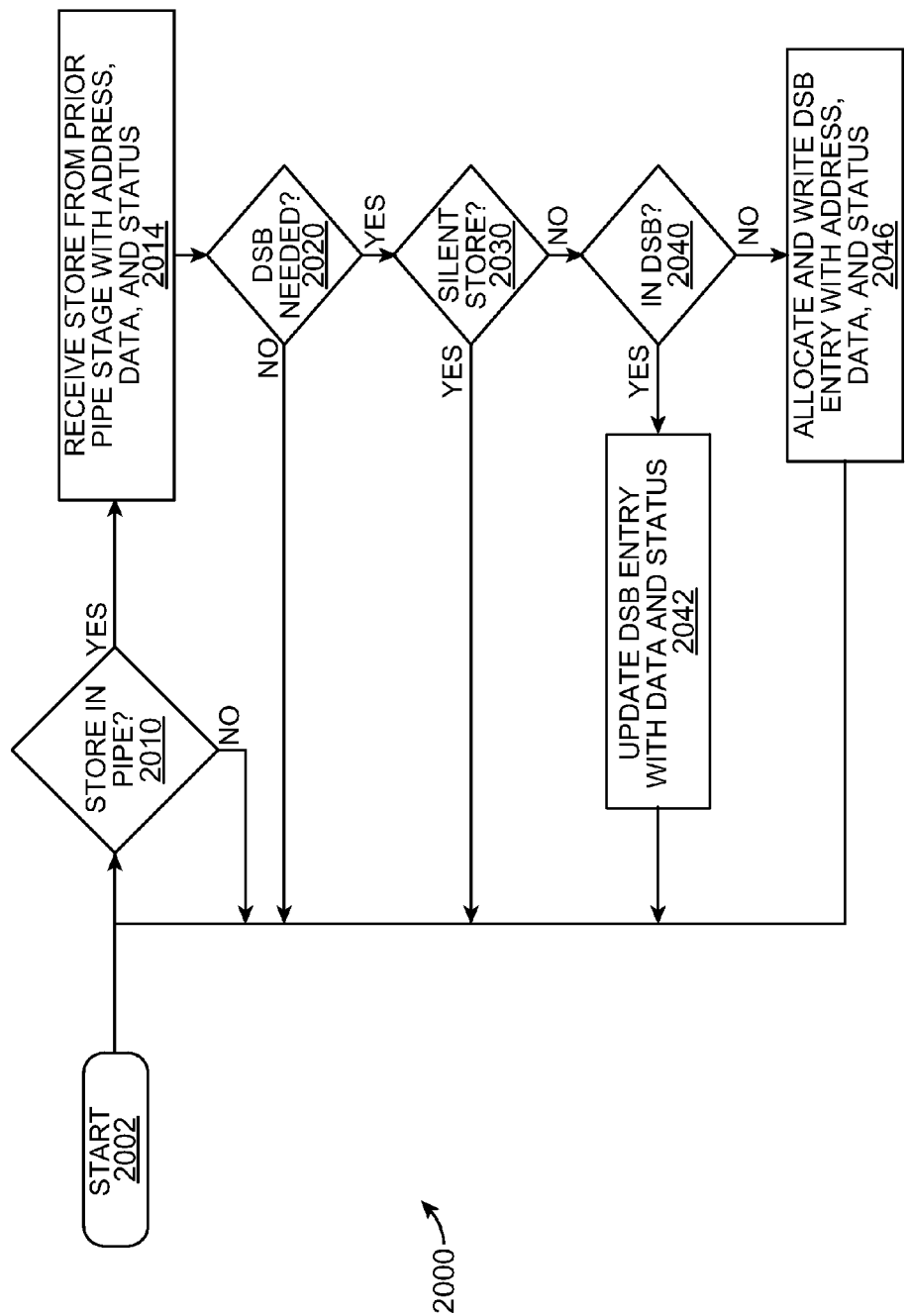

FIG. 32A illustrates selected details of an embodiment of a process for updating a delayed store buffer entry.

Figure 32B:
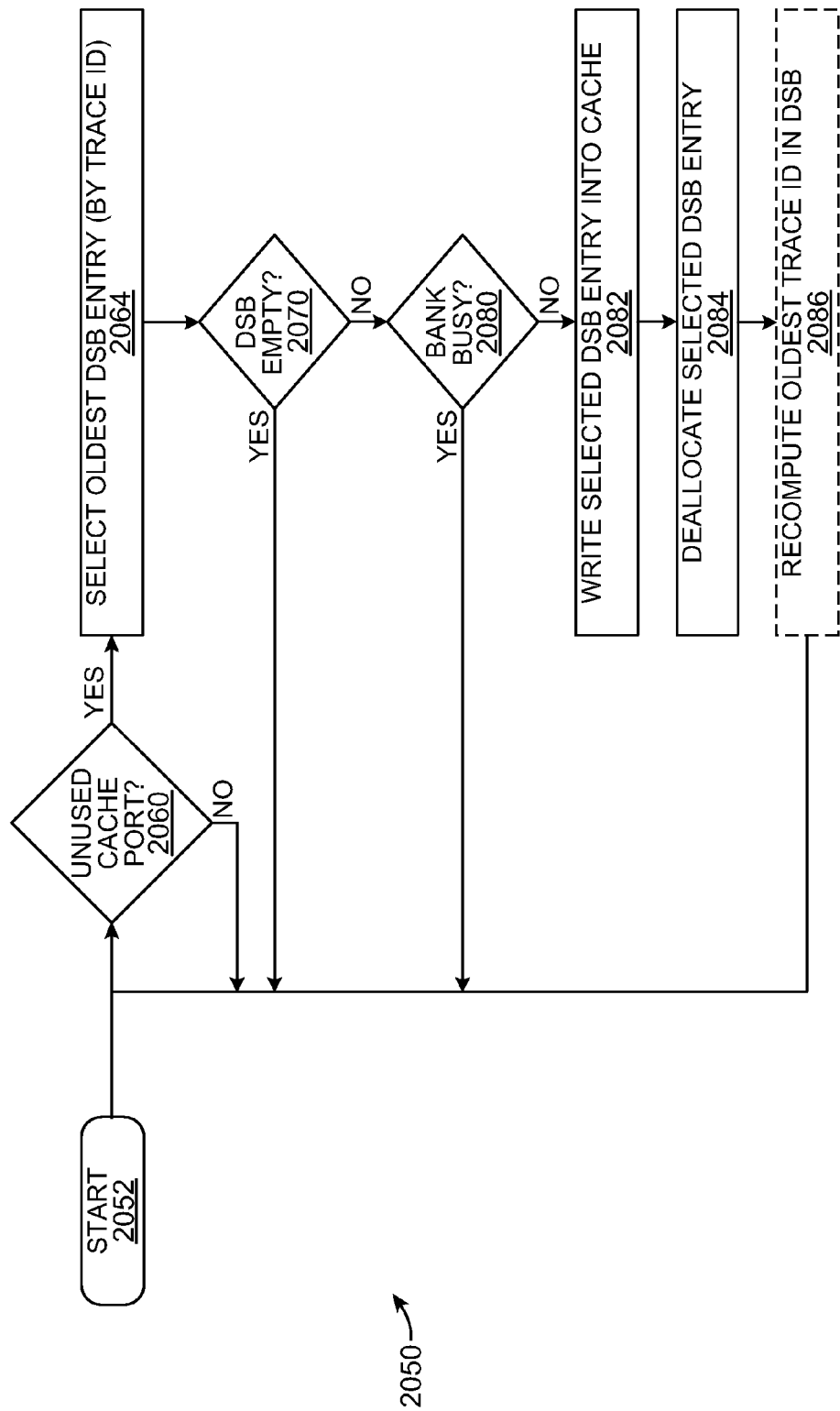

FIG. 32B illustrates selected details of an embodiment of a process for flushing delayed store buffer entries into a cache.

Figure 33A:
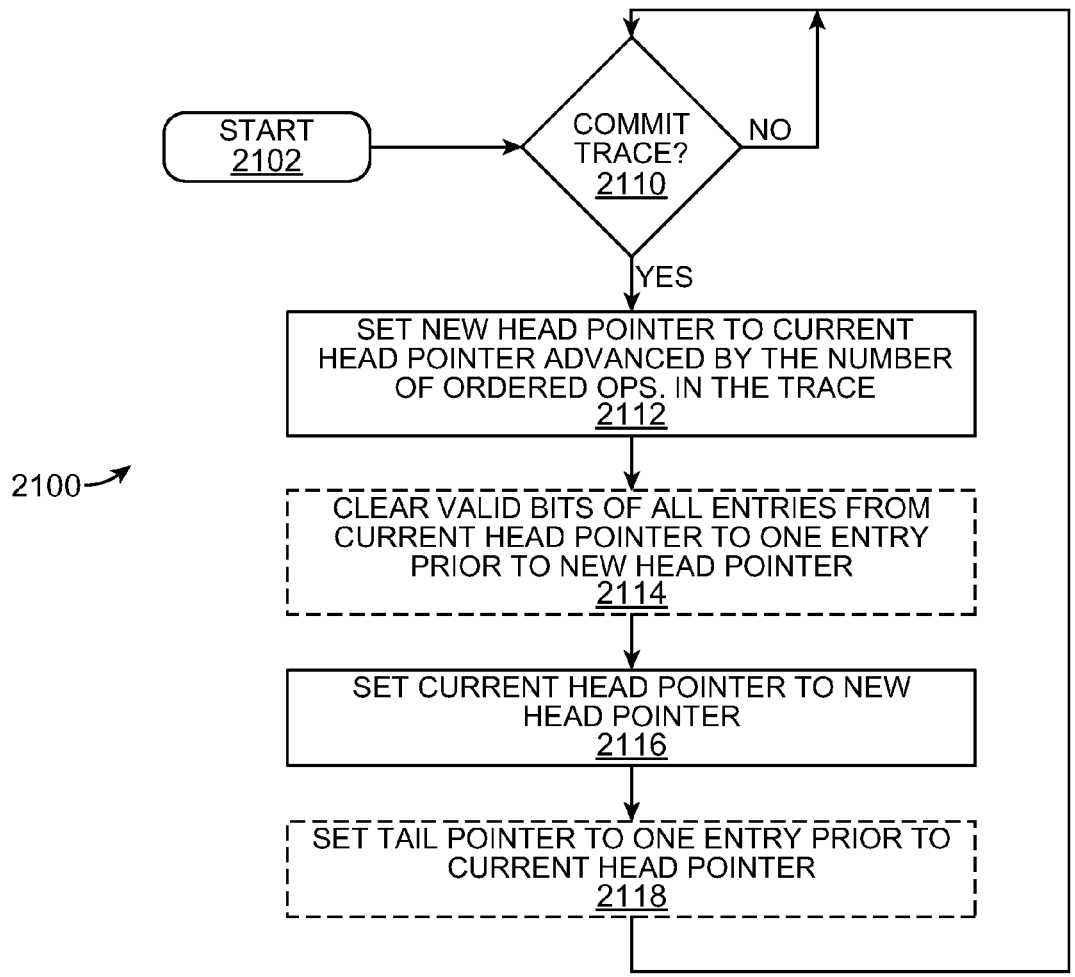

FIG. 33A illustrates selected details of an embodiment of trace commit processing.

Figure 33B:
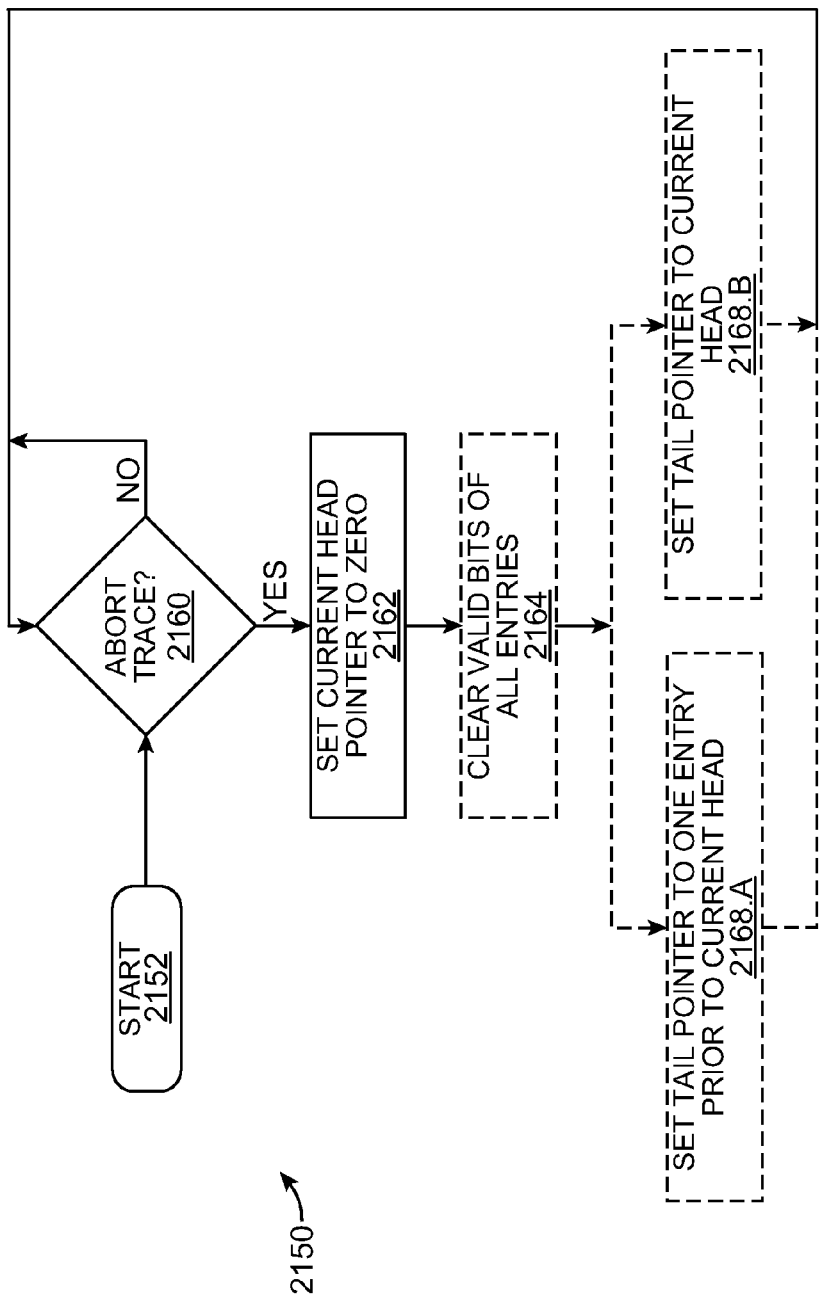

FIG. 33B illustrates selected details of an embodiment of trace abort processing.

Figure 34:
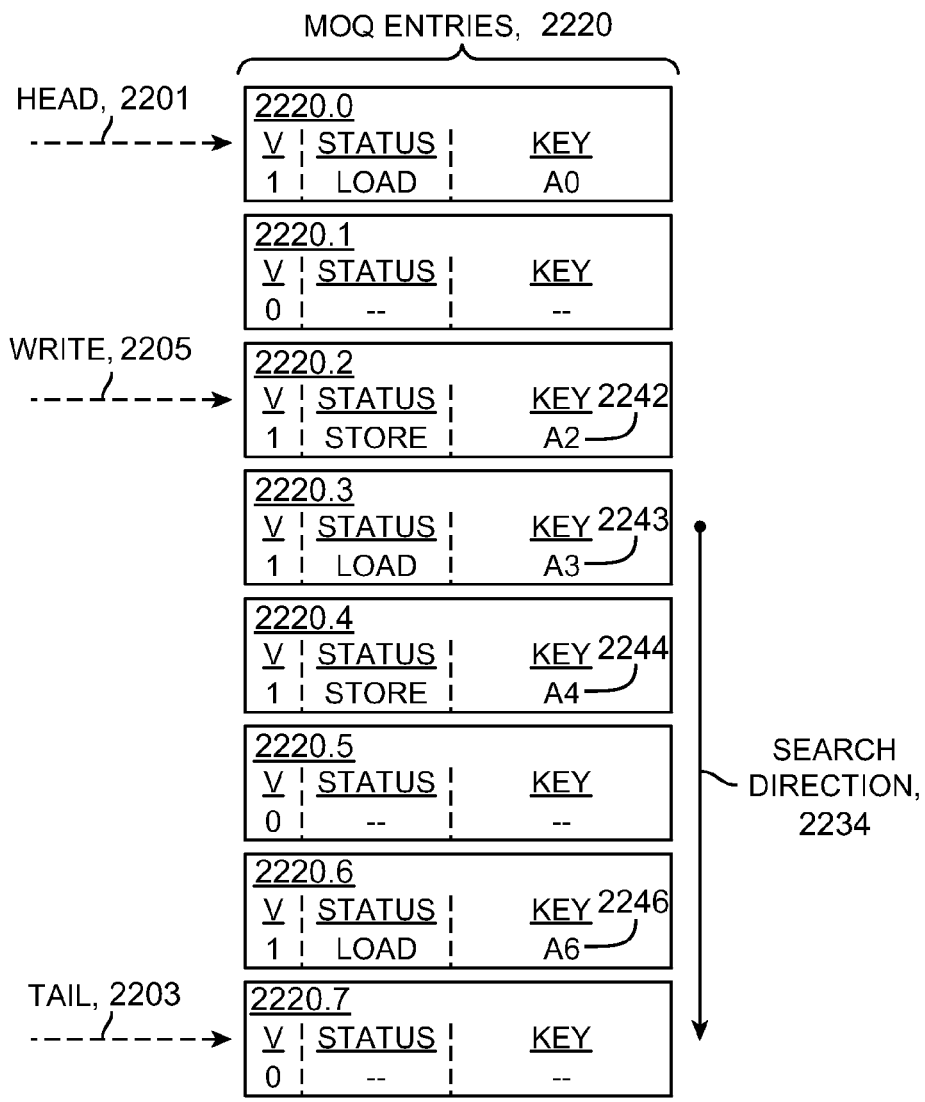

FIG. 34 illustrates selected details of an example of MOQ conflict detection and reporting.

FIGS. 35A and 35B illustrate selected details of examples of detecting snoop conflicts in an MOQ.

DETAILED DESCRIPTION OF THE PREFERRED EMBODIMENT

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention.

Referring now to FIG. 1, a processor (also known as 'computer processing system' or 'processor unit' or 'processor circuit') 1 is shown to include multiple core complexes 1 and 2, an L3 cache 3 and a dynamic random access memory 5, in accordance with an embodiment of the present invention. While the processor 1 is shown to include two core complexes, any number of core complexes may be employed. The core complex 2 is shown to include N number of cores, such as core 6 through core 11, N being an integer value. Any of the core complexes may include one or more cores.

The core complex 2 is further shown to include an L2 cache 8, which is shown coupled to the cores 6 through 11. The core complex 2 is further shown to be include an interface block 55, which is shown coupled to the ICs 11 and 9 and to the L3 cache 3. The L3 cache 3 is shown coupled between the core complex 2 and the core complex 4 and is further shown coupled to the DRAM 5. The DRAM 5 may be any type of dynamic memory or non-volatile memory In FIG. 1, the hierarchy associated with the various caches, L1, L2 and L3 that is generally used in processor designs is shown. By way of brief background, the L1 caches of each core are generally used to store copies of data from the most frequently used main memory locations and therefore need be most readily accessible while the L2 cache 8 is used to store information that does not need to be as readily accessible as that of the L1 cache data and the L3 cache 3 stores data that is even less readily needed to be accessible. Finally, the DRAM 5 is used as main memory and access to it is intentionally designed to be as minimal as possible. In this manner, when the processor 1 wishes to read or write a location in main memory, it first checks whether that memory location is in the cache starting from the L1 cache and onto to subsequent L2 and L3, when there is a cache miss, and finally to the main memory.

A Cache that is being updated refers to the moment that the cache RAM data of the cache is being changed.

Generally, information, in the form of data, is received by the interface block 55 from the L2 cache 8 and information, in the form of instructions, are provided from the interface block 55 to the IC 9 or IC 11 in response to instruction fetch requests from the IC 9 or IC 11 to the interface block 55.

Each of the cores 6 and 11 is shown to include an instruction cache (IC) 6 and 11, respectively. Each of the ICs 9 and 11 stores copies of instructions to be executed by an execution unit. Each of the cores 6 and 11 additionally includes a trace cache 53 and 54, respectively. The trace caches store traces built by a trace unit.

Figure 2:
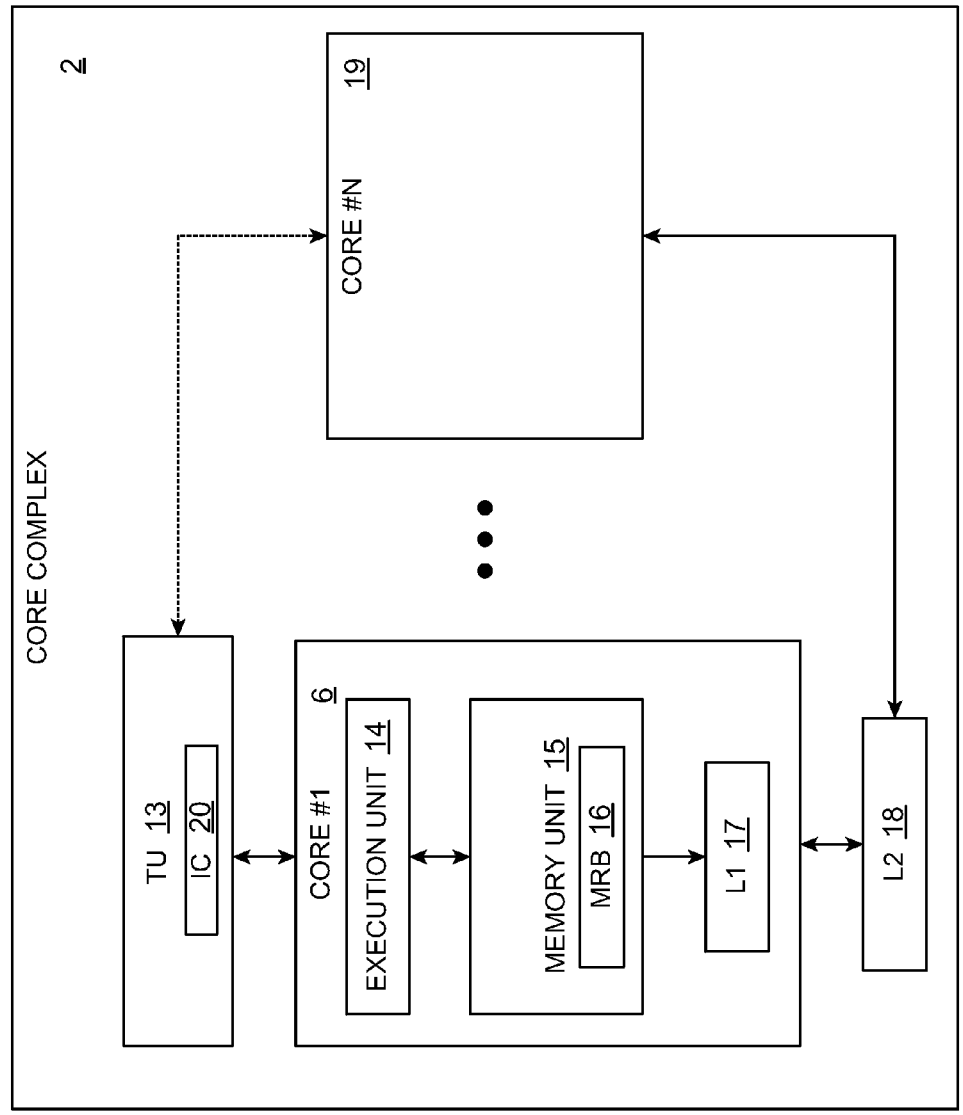

FIG. 2 shows further details of the core complex 2 to include a trace unit (TU) 13, cores 6 and 19 and an L2 cache 18. The core 6 is shown to include an execution unit 14, a memory unit 15 and an L1 cache 17, in accordance with an embodiment of the present invention. The TU 13 is shown to include an instruction cache (IC) 20. In some embodiments, each core includes a dedicated TU. In the embodiment of FIG. 2, the TU 13 is shared by the cores 6 through 19. The TU 13 is shown to include an IC 20 and is further shown coupled to the core 6 and to the cores through the core 19. The core 6 is shown coupled to the L2 cache 18, which is shown, coupled to the core 19. The core 6 is shown to include an execution unit 14, a memory unit 15 and an L1 cache 17. The memory unit 15 is shown to include a memory reconciliation block (MRB) 16, in accordance with an embodiment of the present invention. It is understood that all cores include the blocks/units or circuits shown included in the core 6. MRB (also known as "Instruction Sub-Type Tracking Unit (STTU)" or the "MOQ") 16 generally verifies, or not, the legitimacy of memory operations, which is necessitated by the out-of-order nature of the operations within the trace and by certain re-ordering of operations resulting from performance improvements. Further details of the MRB 16 are offered below.

The execution unit 14 generally executes traces, a trace typically includes at least one sequence of operations. Operations, as used herein, are generated from instructions, such as, but not limited to, the instructions of the x86 instruction set. That is, a group of instructions ultimately are represented by a group of operations. Translation of instructions to operations, in some embodiments, results in an instruction being represented by more than one operations. In some embodiments, operations of a trace are optimized and therefore may result in the number of instructions of a group of instructions including more instructions than the operations included in the group of operations that represents the group of instructions.

In some embodiments, for design reasons, operations are packed into triplets and transported accordingly from the trace unit to the execution unit.

In some embodiments, using a Superscalar architecture of the processor 1, the execution unit 14 executes operations in parallel. Operations are pipelined to increase system performance. In one embodiment, three operations or triplets are executed in simultaneously. The triplets are advantageously packed into slots for efficient execution thereof.

The TU 13 is shown to be optionally shared by the core 19. The L2 cache 18 is shown to be shared by the cores 6 through 19.

A "trace unit", as used herein, is synonymously referred to as an "instruction processing circuit" or a "front end". An "execution unit", as used herein, is synonymously referred to as a "back end". A "sequence of operations", as used herein, is synonymously referred to as a "trace". In some embodiments of the present invention, the processor 1 (also referred to as a "processor core") is a part of a processor that includes multiple processor cores and in other embodiments, the processor 1 is itself a processor. To this end, the term "processor" is used synonymously with the terms "processor core".

An instruction is a command in a format proscribed by an instruction set architecture of a processor for performing a processing act or a portion of a computation, such as adding or subtracting, or setting or checking a status flag, or modifying processor state, or branching to a different location in a sequence of instructions, or other processing or computing actions. As earlier noted, in some embodiments, instructions in a user-visible instruction set architecture are translated into operations as part of the performing of the processing act. In further embodiments, operations are more directly machine-executable than instructions. For example, in some embodiments, a CISC instruction is translated into one or more RISC operations which are then executed to perform the CISC instruction.

In some embodiments, some instructions are performed (executed) on one or more execution units of a processor. In some embodiments, certain types of instructions, such as branch instructions, are performed by a different portion of a processor, such as a fetch unit or an issue unit. Nothing prohibits any embodiment from having types of instructions that are not performed at least in part, on execution units, but the operation of such types of instructions is not critical to the techniques herein, other than, for example, due to factors such as the role such types of instructions have in the operation of traces, architectural semantics, and related behaviors. Accordingly, without loss of generality, instructions as referred to herein are assumed to be performed, at least in part, on execution units.

Various embodiments of a processor (or complex core) advantageously enable efficient out-of-order issue and execution of memory-accessing instructions (such as load and store instructions). Execution of the memory-accessing operations is monitored to detect violations of dynamic dependencies, such as execution-based ordering dependencies. For example, consider a load operation in relation to a store operation, the store operation being older, in an architectural program order than the load operation. Consider a usage scenario where the load operation is issued (out-of-order) and executed before the store operation. If the load operation accesses a same address as the store operation, and accesses incorrect data in memory, then the processor aborts and re-issues some number of operation prior to committing any state changes, including changes to memory state, due to the load operation (or any later, in architectural program order, operations, or in some embodiments, later operations, in architectural program order, that depend on the load operation). This is a complex problem, particularly for multiple-issue, pipelined machines that in some cases have tens of out-of-order operations in process at any one point in time.

For example, a store operation issued and executed out-of-order accesses a memory location, and a subsequent (both in issue/execution order and in architectural program order) load operation accessing the memory location must observe any modification of the memory location due to the store operation. In some usage scenarios, at the time the load operation accesses the memory location, the store operation is not committed yet, or alternatively is eventually to be aborted. For instance, lack of completion of execution of an operation older (in the execution order) than the store operation prevents a commit of the store operation. For another instance, an exception or dynamic dependency violation detected on the store operation (or another operation, older in the execution order than the store operation but younger in program order than the store operation) results in the store operation being aborted. In some embodiments, the store operation speculatively modifies a cache, enabling the load operation to observe results of the store operation in a similar fashion to a non-speculative (or committed) modification.

With respect to those prior art approaches that use a store queue (also known as a store forwarding buffer or load bypass buffer or delayed store buffer, speculative cache modification can be highly advantageous. Properly designed, a speculatively updated cache can provide one or more of: higher processor performance; a simplified design complexity of the processor; a smaller processor integrated circuit area; and/or reduced level of power consumption.

To mange speculative modifications of a cache, in some embodiments, a versioning cache circuit is used. The versioning cache circuit is enabled, in response to the store operation being aborted, to rollback (restore) a cache line (speculatively) modified by the store operation.

'Commit' as used herein with reference to a trace or operation refers to that trace or operation that causes its execution to become irreversibly (or permanently) architecturally visible and the architectural state can never be reversed.

In some embodiments, addresses and/or other memory-location identifiers generated during execution of memory-accessing instructions are compared against previously generated addresses and/or other memory-location identifiers from execution of other memory-accessing operations to detect violations of dynamic dependencies. The dependency of a load operation on an earlier store operation is due to the dependency not being detected until execution time and no earlier and/or the load and store operations lack of permanent (or static) dependency. That is, at a later time, the same load and store operations may not necessarily have the same dependency.

In various embodiments, the previously generated addresses are stored in a memory ordering queue. Matching addresses—those in-coming addresses that match against addresses in the memory ordering queue—signify conflicts (or potential conflicts) between memory-accessing operations. In response, younger (in an architectural program order) ones of the memory accessing instructions (and optionally other instructions) are aborted and re-issued. In some embodiments, instructions are aborted in groups, such as traces. Accordingly, the memory ordering queue is used to track addresses generated during execution of memory-accessing operations According to various embodiments, an address generated during execution of an instruction is a physical address and/or a virtual address. In some embodiments, a physical address is determined based, at least in part, on a virtual address. In some embodiments (such as various embodiments compatible with the x86 architecture), a virtual address is formulated from a linear address that is based on a logical address. The logical address comprises a segment and an offset into the segment.

In some embodiments, detection of violations of dynamic dependencies with respect to particular instructions (such as store to load dynamic execution-based ordering dependencies) is performed in part by a memory reconciliation block (MRB) (also known as "Instruction Sub-Type Tracking Unit (ISTTU)") that comprises a plurality of entries, the entries enabled to be allocated and to hold keys (such as addresses) generated during execution of the particular instructions. In further embodiments, the detection of violations is performed in part by a conflict detection unit that is enabled, in response to execution of one of the particular instructions, to compare a key (such as an address) generated during execution of the one instruction against previously generated keys (such as addresses) held in the MRB. In various embodiments, the MRB further comprises the conflict detection unit. A key is sometimes referred to as an "event key" or "execution-derived key".

In various embodiments, an MRB, MOQ memory, VCC memory, and/or DSB entry comprises one or more keys to enable comparisons between execution of previous operations and execution of current operations. For example, all (or a portion) of a load address is saved as a key for comparison to all (or a portion) of a store address generated after the load address, enabling detection of a dynamic dependency violation. A store address is a location within memory that is identified by the store instruction to which data is to be written. A load address is a location within memory that is identified by the load operation from which data is to be retrieved. According to various embodiments, an execution-derived key is generated during execution of an operation, and specifies, at least in part, a memory location accessed by the operation. For example, in some embodiments, an execution-derived key is an address, or a portion of an address, generated during execution of a memory-accessing instruction. In another example, in some embodiments, an execution-derived key is an identifier of a location in a cache, such as a cache way number and an index within the given way, generated during execution of a memory-accessing instruction.

Execution of a particular operation(s) produces an execution-derived key that is stored in one of the entries associated with the operation, and performs a conflict detection between the execution-derived key and execution-derived keys of previously-executed ones of the operations stored in the entries of the MOQ 19.

In some embodiments, snoop requests have a key and conflict detection is performed between the snoop request key and execution-derived keys of previously-executed ones of the operations stored in the entries of the MOQ 19. In some embodiments, internal evictions have a key and conflict detection is performed between the internal eviction key and execution-derived keys of previously-executed ones of the operations stored in the entries of the MOQ 19. In some embodiments, a detected conflict causes a VCC to perform a rollback, wherein prior cache states saved in the VCC memory are replayed (restored) into a cache, undoing effects of some speculative modifications of the cache. In further embodiments, the rollback restores a state of the cache as of a trace boundary. In some embodiments, a snoop response for a snoop request is constructed by selectively merging at least some portions of some prior cache states stored in VCC 22 with data read from a cache in response to the snoop request.

In one embodiment, the state of a cache line is changed from 'M' (or modified) to 'S' (or shared) or to invalid. Also, a flag or bit set in the VCC 22 or the MOQ 19 to indicate the changed state.

Implementing a versioning cache circuit typically requires that a substantial portion, or all, of the information that it holds be implemented in registers in order to support the comparison functions that occur when finding all entries that match certain criteria, such as address within the cache. In contrast, because of the 1:1 correspondence between MOQ and VC entries, these comparisons can instead be done against the information within the corresponding entries within the MOQ. This has two advantages: 1) the same information need not be stored in two places; and 2) the VC information can be held in a random access memory (RAM). In contrast to registers and comparison logic, using RAM improves performance, reduces design complexity, reduces integrated circuit area, and/or reduces power consumption.

In some embodiments, each entry of the MOQ 19 is configured to be associated with a region of memory, such as by the each entry holding a key specifying the region of memory. For example, in some embodiments, the key is a portion of an address; in other embodiments, the key is an execution-derived key. In some embodiments, the region of memory has a fixed size, such as a size of a cache line, or a size of a double-word. In various embodiments, the key has a granularity corresponding to a size of the region of memory. In some embodiments, additional information specifies validity of portions of the region of memory. For example, in some embodiments the region of memory is a size of a cache line, and a plurality of valid bits specify the validity of each double-word of the cache line. In another example, the region of memory is a size of a double-word, and a plurality of valid bits specify the validity of each byte of the double-word. In some embodiments, the key comprises the additional information. In some usage scenarios, a first key and a second key match if the keys specify a same region of memory. In some usage scenarios, a first key and a second key match if the keys specify a same region of memory, and if first additional information of the first key and second additional information of the second key specify overlapping valid portions within the same region of memory.

Traces and their related abort information are correlated using trace identification (trace ID). Further discussion of trace ID is presented later.

The trace unit 12, upon receiving abort information (which may include abort status) from the execution unit 14, through the link 42, uses the received information to commit or abort the triggering trace. A triggering trace is a trace to which one or more aborts apply.

If committed, an atomic trace is sure to be executed, however, if aborted, none of the operations (or memory operations) within the atomic trace have any effect on the architectural state of the processor 1. Atomic traces do not maintain the original program order and must maintain order dependency whereas non-atomic traces must maintain the original program order but can abort in-part. That is a part of a non-atomic trace may be aborted while the remaining part is not aborted whereas, atomic traces are aborted in whole. In one embodiment, trace execution is atomic in that the trace's effects are either committed in their entirety to the architectural state, or prevented in their entirety from having any impact on the architectural state. A trace that is atomic commits, or not, and its operations complete, or not.

Active (or working) memory operations, as used herein, refer to memory operations that are being executed and are part of a trace that has not yet committed.

One of several advantages of atomic traces is that they can be more highly optimized than non-atomic traces, non-trace groupings of operations, or individual operations. This is because the process of building and optimizing a trace can build and optimize a longer sequence of operations. That is, compared to other approaches, operations within a particular atomic trace can be more highly optimized, by techniques that include, but are not limited to, one or more of: removing unnecessary operations, combining operations, and/or reordering operations.

Another advantage of atomic traces is that, for some of the blocks in the execution unit of a processor, they improve performance, reduce design complexity, reduce integrated circuit area, and/or reduce power consumption.

Embodiments of the invention that use both atomic traces and a versioning cache circuit, are synergistically particularly advantageous. That is, these two techniques combine to help each other, in that, this combination allows even further increases in performance, further reductions in design complexity, further reductions in area, and/or further reductions in power consumption.

A first basis of this synergy is that, when not combined with a versioning cache, memory operations substantially complicate implementing atomicity. Memory operations are architecturally visible to other devices, to other software threads executing on a uni-processor, as well as to subsequently sequenced traces of the same thread. Here, 'devices' means multiple processors within the same integrated circuit, a system containing multiple integrated circuits each containing one or more processors, as well as to a system containing one or more processors and one or more IO devices.

As a first example of this synergy, stores to memory cannot become visible to another device, thread, or trace until after the store operation has committed. In designs that use a store queue/store forwarding buffer, then both cache snoops and local processor loads must be delayed while that queue/buffer is searched for all matches to the address being loaded or snooped. This may be done in a manner similar to that of a content addressable memory (CAM), which can be very expensive in terms of performance, design complexity, integrated circuit area, and/or power consumption. In contrast, in designs that use a versioning cache circuit only cache snoops, and not local processor loads, must be delayed for a similar CAM-like search of the versioning cache circuit. Considering that local processor loads occur much more often than cache snoops, this is a substantial advantage.

As a second example of this synergy, whenever an atomic trace of operations commits then all of the store memory operation within the atomic trace must be visible to all other processors. In designs that use a store queue/store forwarding buffer and atomic traces, then snoops normally access the cached data. Thus during the period when the queue/buffer is emptied of all stores associated with the atomic trace being committed, responding to snoops must be suspended, which is detrimental to performance, design complexity, and/or integrated circuit area. Alternatively, the queue/buffer must have another input port to search the queue/buffer for matches to snoops that occur during this period, which is detrimental to performance, design complexity, integrated circuit area, and/or power consumption. In contrast, in designs that use a versioning cache circuit, committing an atomic trace is the much simpler process of invalidating (also referred to as deallocating) all versioning cache circuit entries that correspond to the atomic trace.

As a third example of this synergy, when a versioning cache circuit is used but not combined with an atomic trace then the process of invalidating X number of memory operations concurrently requires that the versioning cache support X times Y concurrent comparisons between the X identifiers of the memory operations to be invalidated and the identifiers stored in the Y entries held in the versioning cache circuit. 'Concurrent' refers to activities that occur at the same time, simultaneously, in parallel, out of order, or interleaved with each other to use the same hardware resources.

The product of X and Y can get large, which is detrimental to performance, design complexity, integrated circuit area, and/or power consumption. In contrast, a versioning cache circuit with atomic traces stores in each of its entries an identifier of the atomic trace that corresponds with the entry, not the memory operation that corresponds with the entry. A similar X times Z consideration would apply if it is needed to concurrently invalidate Z atomic traces, but a single atomic trace can contain several tens of operations. Thus, the advantage of implementing a versioning cache circuit with atomic traces can be quite large.

In some embodiments of the invention Z is one, that is sufficient performance is achieved by only committing one atomic trace at a time, and thus only needing to compare the X stored trace identifiers against a single identifier of the trace being committed. In other embodiments of the invention, Z is larger that one.

A similar advantageous synergy applies in embodiments of the invention that use both atomic traces and a memory ordering queue. That is, entries held within the memory ordering queue can be When a trace is aborted, all traces younger than it that have not yet been committed are also aborted. When used to describe traces, "younger" and "older" are defined with respect to the order in which the traces are sequenced for execution.

In some embodiments of the invention, the trace unit both builds traces from instructions and sequences traces for execution, that is, determines the order in which the traces are to be executed. When sequencing traces, the trace unit may use speculative techniques, including but not limited to branch prediction. Any mis-prediction of the direction a branch will take is one of the triggers that may cause one or more traces to be aborted.

If a trace is aborted, the architectural state, and possibly the micro-architectural state, of the various components of the trace unit 13 and the execution unit 14 are returned to their states as they were prior to the start of the trace. Architectural state is commonly understood as the part of the processor core which holds the software-visible state of a process, such as the state of control registers or general purpose registers.

In some embodiments, an atomic trace combines effects of multiple instructions from an original sequential program or sequence of instructions. In some embodiments, operations within an atomic trace are optimized (such as by splitting, combining, reorganizing, and so forth) in such a way that it may be difficult to map each operation in the trace to an instruction in the original program. Operations may also appear in a different order in the trace than their corresponding instructions in the original program, and operations may execute in the processor in a different order than they appear in the trace.

In some embodiments, operations in a trace are tentatively (or speculatively) executed based on one or more assumptions. If one or more of the assumptions are incorrect, then the trace is aborted, i.e. the effects of the operations in the trace are undone.

While reference is made to traces, all discussions, examples and figures provided herein equally apply to atomic traces.

Traces are provided by the TU 13. The source of traces may be one or more sources. In one embodiment, the sources are basic block cache, multi-block cache, microcode cache or an instruction decoder. It is understood however, that traces can be generated from any source.

Figure 3:
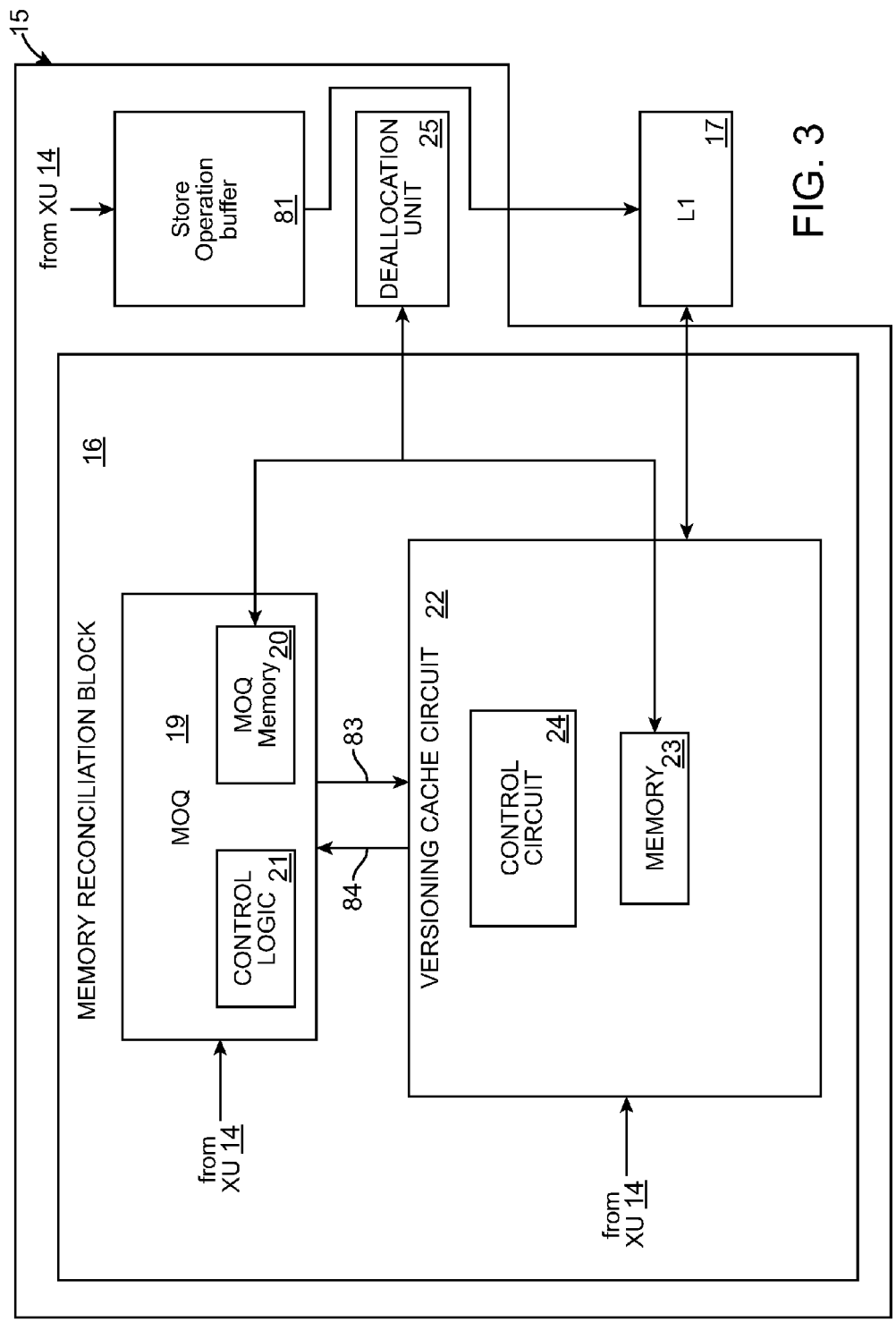
FIG. 3 shows further details of the memory unit (MU) 15, which is shown coupled to the L1 cache 17, in accordance with an embodiment of the present invention.

FIG. 3 shows further details of the memory unit (MU) 15, in accordance with an embodiment of the present invention. The MU 15 is shown coupled to the L1 cache (or data cache) 17, in accordance with an embodiment of the present invention. The MU 15 is shown to include a memory order queuing (MOQ) 19, a versioning cache circuit 22, a deallocation unit 25, and a store operation buffer 81, in accordance with an embodiment of the present invention. The store operation buffer 81, in some embodiments, is a delayed store buffer (DSB) and in other embodiments, it is a load-bypass (or store-forwarding) buffer (LBB)). The terms store operation buffer and DSB and LBB are used synonymously herein. In some embodiments, the store operation buffer 81 is complicated because it must know of the store operation whose store address is the same as the address being accessed by a subsequent load operation so that it enables the address in the DSB to be used in place of the address in the L1 cache. In some embodiments, however, the DSB is advantageously an uncomplicated structure because it need only track the store operations in a pipeline whose number of stages are insubstantial, such as 2 or 3.

The MOQ 19 and the VCC 22 transfer information therebetween. Among the information (or signals) being transferred is the memory ordering violation signal 83 from the MOQ 19 to the VCC 22 to report memory ordering violations. A rollback request 14 is transferred between the VCC 22 and the MOQ 19 requesting a rollback of the L1 cache 17.

The MU 15 is shown to transfer data to and from the L1 cache 17. The MOQ 19, the VCC 22 and store operation buffer 81 are each shown to receive input from the XU 14. The MOQ 19 is shown in communication with the VCC 22. The MOQ 19 is shown to include MOQ control logic 21 and an MOQ memory 20. The VCC 22 is shown to include a VCC control circuit 24 and a VCC memory 23. The MOQ memory 20 and the VCC memory 23 are both shown coupled to the deallocation unit 25.

The L1 cache 17 and the VCC 22 are sometimes collectively referred to as 'versioning cache (VC)'. The VCC 22 is also referred to as 'versioning cache register (VCR)'.

The MU 15 uses the MOQ 19 to hold speculative loads and stores that are waiting for a trace to commit. When the execution of a memory operation is completed, an integer unit (IU), which is a part of the XU 14 informs the MU 15 of which MOQ entry corresponds to the memory operation just completed. Since execution by the IU may be out of order, the MU 15 provides the MOQ with out-of-order memory operation information, such as addresses. Out-of-order memory operation completion is with respect to the order in which operations were allocated by the IU. That is, the MOQ is provided with information regarding operations that are in a different order than the order in which they were allocated by the IU. The IU allocates entries ahead of execution and in some embodiments, based on a logical order of memory operations with respect to the order of the operations as they appear in their trace.

In some embodiments or in some operating modes of some embodiments, memory operations may complete out of order with respect other memory operations in the same trace. Or, memory operations may complete out of order with respect to memory operations of other traces. Or both.

In other embodiments, the IU allocates entries based on a physical order of memory operations.

The MOQ 19, within the MU 15, enforces memory consistency and ordering requirements. The MU 15 receives load and store operations from an integer unit (IU) pipeline, and returns or provides load data to either the integer register file, MMX or SSE registers files. The MU 15 resolves ordering violations between loads and stores to the same address using the MOQ 19.

The L1 cache 17, in an exemplary embodiment, is organized into 32 Kilo Bytes (KB), 2 way set-associative and virtually indexed and physically tagged. Each 64-byte cache line of data is physically organized as 16 individually double-word (DWORD) (4 byte) wide data static random access memory (SRAM) arrays. The L1 cache 17 is organized into 8 logical banks with 2 physical DWORD wide data arrays falling within each bank.

In the event of a miss in L1 cache 17, the MU 15 sends a request to the L2 cache 18. The L2 cache 18 includes a superset or is inclusive of the information stored in the L1 cache 17.

The MOQ 19 holds information from execution of uncommitted load and store memory operations. Traces generally commit in program order (also referred to as "in order"). Program order refers to any sequential ordering of operations that produces results consistent with x86 order.

The VCC 22 manages speculative store operations and rolls back (or restores) the L1 cache 17 appropriately when memory operations need to be aborted. Further details of the VCC 22 are presented below.

The MOQ memory 20 is configured to receive and hold a set of checkpoint entries, where each checkpoint entry is of a checkpoint location within the L1 cache 17, where each checkpoint entry is made prior to the checkpoint location being updated according to an execution of one of the memory operations of a trace. Each checkpoint entry includes checkpoint data indicating a state of the checkpoint location prior to the update, and each checkpoint entry is associated with one of the traces.

In this respect, the MOQ memory 20 includes checkpoint entries (or simply entries) allocated for memory operations that are in flight (also known as 'active'). In some embodiments, there is a one-to-one correspondence between the checkpoint entries and memory operations. In some embodiments, there is no such one-to-one correspondence; rather, a single checkpoint entry may correspond to more than one memory operation.

When all operations of a particular trace complete, the particular trace is eligible to be committed. However, other conditions may delay the particular trace from being committed, such as an older trace that has not yet been committee. After the particular trace has been committed, the deallocation unit (or circuit) 25 advantageously deallocates all of the checkpoint entries of the MOQ memory 20 that are associated with that particular trace. That is, deallocation is performed after a trace is committed. A trace cannot be committed until all of its operations have completed execution. 'Completing' as used herein with reference to a trace or operation refers to that trace or operation's result being ready for use by later operations. For example, a load operation is complete when its (possibly speculative) data is ready and a store operation is complete once the cache status of its address has been checked and its store data obtained. In some embodiments, 'completing' includes writing to the L1 cache 17. In some embodiments, 'completing' does not include writing to the L1 cache 17 and in such embodiments, in addition to the trace completing, the L1 cache 17 is written.

Similarly, when all operations of a particular trace complete, the deallocation unit 25 advantageously deallocates all of the entries of the VCC memory 23 that are associated with that particular trace.

In some embodiments, checkpointing, committing, deallocating and other associated functions are advantageously performed based on a trace granularity rather than an operation granularity thereby reducing hardware complexity. For example, reduced structures are needed to keep track of information, such as store operations. Entries of the MOQ memory and VCC memory are based on a trace as opposed to an individual operations, which are typically far greater in number than traces in flight. Traces in flight are typically far less in number than operations being processed. As an example, there may typically be between 5-8 traces in flight, whereas, the number of operations is approximately 50.

The VCC 22 holds a checkpoint of the affected locations within the L1 cache 17 that is taken just before each speculatively executed store operation is written into that cache, it is easy to rollback the L1 cache 17 whenever any such operations are aborted. This advantageously allows out of order and speculative store execution and updating of cache contents. Rollback occurs after an abort, which results in trace execution restarting at a different or an earlier operation pointer. The XU 14 (or more specifically an integer unit within the XU 14) restores the current execution state to an earlier checkpoint. The MU 15 retrieves any store data from the L1 cache 17 which resulted from store operation(s) in the aborted traces. A speculative load is a load operation that has retrieved a value from memory that has not yet been confirmed to be correct for program order.

In some embodiments, silent stores are detected. Silent stores are particular ones of store operations that are enabled to write memory but do not modify memory, such as by overwriting a memory location with a same value already held in the memory location. According to various embodiments, silent store detection is used to enable or disable various functions. For example, in some embodiments, detection of a silent store suppresses recording of a prior cache state in VCC memory 23. In another example, detection of a silent store suppresses writing and/or indicating as valid an entry in a delayed store buffer. In some embodiments, determining that a store operation is a silent store deallocates entries (or registers), such as a delayed store buffer entry and/or a versioning cache register, that were allocated for the store operation.

In some embodiment, there is a one-to-one correspondence between MOQ memory (or entries) 20 and the VCC memory (or entries) 23. In this case, the MOQ control logic 21 controls rollback from VCC information going into the L1 cache 17, which eliminates redundancy between information held in the MOQ 19 and in the VCC 22.

The MOQ 19 checks for a memory ordering violation with respect to each memory operation. In some embodiments, this is done in parallel with speculatively writing the results of that memory operation to the L1 cache 17. In some embodiments, this is done after speculatively writing the results of that memory operation to the L1 cache 17. In either of the foregoing embodiments, the manner in which this is advantageously accomplished is by the VCC control circuit 24 using the information in the VC memory 23 to roll back the cache state if a violation did occur. This has the effect of avoiding having to check for a memory ordering violation, which can take a few clock cycles.

More specifically, the embodiments of the present invention having a rollback capability allow for speculative store operations to be stored in the L1 cache 17, which a subsequent load operation to the same memory location can look up thereby avoiding the need for store-forwarding, which is time consuming and complex in design.

When operation are processed out-of-order (with respect to an architectural program order), in some cases, two operations are processed such that one or more execution-based ordering dependencies between the two operations are violated. The two operations are examples of conflicting operations. The term conflicting operation refers to either one of the two operations. An example of an execution-based ordering dependency is a memory-ordering dependency which requires, in part, that a load operation and a store operation accessing the same memory location are executed (or at least produce same results as if they were executed) in an architectural program order.

Predicted execution order refers to a prediction of the architectural program order based on predictions of directions taken by branch instructions, and, in some cases and/or embodiments, a predicted lack of exceptions. Predicted execution order is used both to refer to an order of basic blocks in a predicted architectural program order, and to refer to an order of operations among multiple basic blocks, the basic blocks in a predicted architectural program order, and the operations in each of the basic blocks in a sequential order. In some embodiments, a speculative execution order, referring to an order in which operations are scheduled and/or issued in a processor pipeline, differs from a predicted execution order due, for example, to out-of-order issue of operations.

Required order refers to an order that at least a portion of execution on a processor enforces. For example, in some embodiments and with respect to execution-based ordering dependencies, a required order is a predicted execution order. In some embodiments, determining whether a predicted execution order matches an architectural program order is an independent function from determining whether execution-based ordering dependencies are satisfied based on the predicted execution order. Herein, unless otherwise stated, required order is used to refer to a predicted execution order.

In some embodiments, detection of violations of dynamic dependencies with respect to particular memory-accessing operations (such as memory-ordering dependencies) is performed in part by the MOQ 19 that comprises a plurality of entries (or MOQ memory 20), the entries enabled to hold addresses generated during execution of the particular memory-accessing operations. In some embodiments, the MOQ 19 is enabled to detect memory-ordering dependency violations between an operation at a particular point in a processor pipeline and a plurality of operations at or past the particular point. In some embodiments, the MOQ 19 is enabled to detect memory-ordering dependency violations between a snoop request (such as from an agent external to a processor and/or a core comprising the MOQ) and a plurality of operations that have already begun execution (or have completed execution but have not yet been committed).

According to various embodiments, the VCC 22 records a prior state of at least a part of a line of a cache (a prior cache state) in one or more VCC memory 23 entries in response to a speculative and/or out-of-order memory-accessing operation (such as a store operations) modifying the line (a speculative modification). Letting the memory-accessing operation modify the cache advantageously enables subsequently issued/executed operations to observe effect(s) of the memory-accessing operation without requiring additional hardware structures to supply the store data to following, in program order, dependent load operations. Sometimes, the VCC 22 and L1 cache 17 are collectively referred to as (or Versioning Cache Registers (VCR)).

In some embodiments, in response to certain events (such as the memory-accessing operation being aborted), the VCC 22 is enabled to perform a "rollback", using the control circuit 24, to restore the prior cache state from one or more of the VCC memory 23 entries to the cache. In some embodiments, if the memory-accessing operation is committed or aborted, one or more VCC memory 23 entries associated with the memory-accessing operation are invalidated and are then reusable for a subsequent memory-accessing operation. In various embodiments, in response to a snoop request, data from a cache line is selectively merged with prior cache states stored in one or more VCC memory 23 entries to return a version of the cache line corresponding to the currently-committed state of the cache line. This is because the snoop needs to see the committed state of the cache line versus the speculative state of the line. Speculative state of the cache line results from speculative-executed store operations that are not yet committed.

In various embodiments, modification of the L1 cache 17 (either speculatively or non-speculatively), in response to a cacheable store operation, is postponed until a convenient time via a Delayed Store Buffer (DSB) (or a load-bypass buffer) that comprises a plurality of entries, each entry enabled to hold respective store information and respective store data of a respective store operation. Store information and store data of a cacheable store operation is written into a respective entry of the delayed store buffer (instead of directly into the cache). The delayed store buffer is enabled to flush (write) valid entries to the cache at a convenient time (such as when a write port of the cache is otherwise unused). In various embodiments, the cache (and hence the DSB) is modified speculatively (e.g. before the store operation is committed). Load operations resulting in an access to the cache also result in an access to the DSB, and respective store data of one or more matching entries is selectively merged with data read from the cache.

In various embodiments, MRB 16, MOQ memory 20, VCC memory 23, and/or DSB entries are associated with operations. In some embodiments, the association is formed, at least in part, by allocating a respective entry when an operation is issued. In some embodiments, the association is formed, at least in part, by allocating a respective entry during execution of the operation. In various embodiments, entries are associated with operations via an ID of the entry, such as index into an array of entries. In further embodiments, control information used by a processor during execution of an operation comprises an ID of an associated entry of the operation.

In some embodiments, MRB 16 entries (such as MOQ memory 20 or VCC memory 23 entries) are used, at least in part, in performing conflict detection. In various embodiments, conflict information of an operation (or of a snoop request) is compared against similar information stored in the entries of the MRB 16, and an occurrence of matching (conflicting) entries is reported. According to various embodiments, matching entries are determined by various criteria, such as entries having matching keys and/or entries having particular type information.

In some embodiments, information returned in response to a snoop request hitting a line in a cache is formed by selectively merging the cache line with prior cache states as saved in zero or more VCC memory entries, thus advantageously enabling effects of speculative modification of the cache to be hidden from the snoop request.

In some embodiments, an internal eviction is a result of cache operation, such as due to a cache miss. For example, a cache line must be removed (evicted) from the cache to make room for a replacement cache line satisfying the cache miss. In some embodiments, an internal eviction is treated similarly to a snoop request. According to various embodiments, conflict detection is performed in response to a snoop request and/or an internal eviction. In some embodiments, a detected conflict due to a snoop request (or an internal eviction) aborts one or more traces.

In various embodiments, a data structure element (such as an entry of an MRB, MOQ, VCR, or DSB) is variously enabled to represent valid and invalid states, indicating, respectively, validity and invalidity of some or all of the data structure element. In various embodiments, the data structure element is variously enabled to represent the valid and invalid states for the entire data structure element as a unit. In some embodiments the valid and invalid states are implemented by a 'valid' bit. (See, for example, 423.0 of FIG. 16C as an MOQ embodiment). In other various embodiments, the data structure element is enabled to represent the valid and invalid states individually for sub-elements of the data structure element, implemented, in some embodiments, by individual valid bits. (See, for example, 465.0, 465.1, 465.2, . . . , of FIG. 16D as a VCC memory embodiment, and 495.0, 495.1, 495.2, 495.3, . . . , of FIG. 16H as a DSB embodiment.) In further embodiments, the sub-elements are data items, such as bytes or double-words of data, stored in the data structure element. In still other various embodiments, the data structure element is enabled to represent aggregate valid and invalid states for some or the entire data structure element as a unit, and is further enabled to represent individual valid and invalid states for sub-elements of the data structure element. (See, for example, 433.0 and 475.00, 475.01, . . . , of FIG. 16E as an MOQ embodiment.) In some usage scenarios, the aggregate valid state is indicated when the data structure element is allocated, and one or more of the individual sub-element valid states are indicated after one or more respective data items associated with the sub-elements are available.

In some embodiments, a memory ordering queue is a type of instruction sub-type tracking unit. In some embodiments, at least a portion of the VCC 22 is a type of MRB.

In some embodiments, load and store operations, when executed, generate (compute) respective addresses, the addresses being used to access memory of the processor 1. In some embodiments, the memory is organized as a hierarchy including one or more levels of cache, such as the L1, L2, . . . cache heirarchy. In some embodiments, at least the lowest level of cache is used by the VCC 22. In some embodiments, such caches are used at more than one level of a memory hierarchy. In various embodiments, store operations executed out-of-order are allowed to speculatively update one or more levels of cache.

In various embodiments, store operations read a cache, such as the L1 cache 17, (prior to storing into the cache), and save a respective prior cache state read from the cache in one or more respective VCC memory 23. In some embodiments, load operations are allowed to observe (and to have results affected by) speculative updates made to the L1 cache 17 by store operations that have been executed out-of-order. In some embodiments, the MOQ 19 detects conflicts caused by out-of-order execution of load and/or store operations. In various embodiments, in response to a conflict being detected, some executed operations are not committed and may be subsequently re-executed. In some embodiments, operations are re-executed in a different execution order that avoids previous conflicts. In various embodiments, in response to a conflict being detected, the VCC control circuit performs a rollback of the L1 cache 17 to restore the L1 cache 17 to a prior, pre-conflict state by copying at least a portion of zero or more VCC memory 23 into the L1 cache 17.

In some embodiments, VCC 22 is used in conjunction with the MOQ 19, the latter being used to detect conflicts, and the former being used to store and to operate on prior cache states. In some embodiments, the VCC 22 is used independent of the MOQ 18, and the VCC memory 23 comprises sufficient information to enable conflict detection. In various embodiments, the VCC 22 detects conflicts caused by out-of-order execution of load and/or store operations.

In some embodiments, each entry of the MOQ memory 20 is enabled to be associated with one or more respective VCC memory 23. In some embodiments, the MOQ memory 20 comprises the VCC memory 23, and each of a plurality of entries of the MOQ memory 20 comprises a respective one of the VCC memory 23. In some usage scenarios, an operation is associated with an entry of the MOQ memory 20, and accordingly, the operation is associated with the respective VCC memory 23.

In some embodiments, the VCC memory 23 records prior cache states of a cache in a plurality of VCC memory 23 locations. The VCC memory 23 may be made of any storage devices, such as any kind of memory, registers and flip flops. In some embodiments, the VCC 20 is enabled in response to a conflict detection, to perform a rollback to restore at least some portion of some of the prior cache states (stored in the VCC memory 23) to the L1 cache 17. In some embodiments, the VCC 20 is enabled, in response to a snoop request conflict detection, to perform a snoop merge to selectively provide some of the prior cache states (stored in the VCC memory 23) as part of a snoop response. In various embodiments, a snoop response to a snoop request is constructed by selectively merging at least some portion of some of the VCC memory 23 (containing the prior cache states) with data read from the L1 cache 17 in response to the snoop request.

In some embodiments, a memory operation, such as a load or store operation that misses in the L1 cache 17 is canceled, returned to an earlier pipeline stage, and subsequently re-issued after a cache line on which the operation missed is fetched. In some embodiments, a store operation that misses in the L1 cache 17 is not canceled, and is enabled to create and/or update an entry in the store operation buffer 81, and then to complete execution. In some embodiments where a store operation that misses in the L1 cache 17 creates and/or updates an entry in the store operation buffer 81, the following are also done:

An MOQ 19 entry is written for the store operation, as with selected other load and/or store operations that are executed, in order to detect any ordering violations from optional speculative and/or out-of-order execution of the store operation.

In some embodiments, a VCC entry allocated for the store operation is reserved until data in response to the L1 cache 17 miss is available. In some embodiments, a VCC entry is allocated for the store operation when data in response to the L1 cache 17 miss is available. When data in response to the L1 cache 17 miss is available, the data is stored in the VCC entry as a checkpoint of prior (pre-store) contents of the cache line. In some embodiments, data fetched for the L1 cache 17 miss is merged with one or more entries of the store operation buffer 81 for the same cache line before being written into the L1 cache 17. In some embodiments, data fetched for the L1 cache 17 miss is written directly into the L1 cache 17, and normal flushing of entries in the store operation buffer 81 serves to modify the cache line in response to the store operation.

In some embodiments, load operations that miss on the cache line are canceled and subsequently re-issued. In some embodiments, a load operation that misses on the cache line but that hits in the store operation buffer 81 and is satisfied from the store operation buffer 81 (without using any other data) is enabled to complete execution.

In some embodiments, a snoop request that hits the store operation causes an abort event.

In some embodiments, a subsequent, according to a required order, store operation that misses on the same cache line prior to data for the L1 cache 17 miss being fetched and that is not able to share the same VCC entry (for example because the subsequent store operation is not associated with a same trace as the first store operation) is canceled and subsequently re-issued after the cache line is fetched. In some embodiments, a subsequent, according to a required order, store operation that misses on the same cache line prior to data for the L1 cache miss being fetched, and that is not able to share the same VCC entry, creates a situation where the VCC must receive data forwarded/merged from the store operation buffer 81. For example, data for the L1 cache 17 miss is written into a first VCC memory 23 entry for the first store operation, and then is merged with data of the first store operation from the store operation buffer 81 to produce modified data used to write a second VCC memory 23 entry for the subsequent store operation.

In some embodiments, a store operation to a cache line in the L1 cache 17 that is not in a modifiable state is canceled, returned to an earlier pipeline stage, and subsequently re-issued when the cache line state is changed to one that is modifiable. In some embodiments, a store operation to a cache line in the L1 cache 17 that is not in a modifiable state is not canceled, and is enabled to create and/or update an entry in the store operation buffer 81, and then to complete execution. In some embodiments, in response to a store operation to a cache line in the L1 cache 17 that is not in a modifiable state, one or more entries in the store operation buffer 81 are created and/or updated, and the following are also performed:

An MOQ 19 entry is written for the store operation, as with selected other load and/or store operations that are executed, in order to detect any ordering violations from optional speculative and/or out-of-order execution of the store operation.

A checkpoint of prior contents of the cache line is made in the VCC memory 23 entry as if the store operation had not found the cache line to be in an un-modifiable state. In some embodiments, the checkpoint comprises an original Modified, Exclusive, Shared and Invalid (MESI) state of the cache line. In some embodiments, the checkpoint comprises a clean/dirty bit indicating that the cache line was clean. In some embodiments where the checkpoint in the VCC entry comprises a MESI state, when the cache line is changed to a modifiable state, the MESI state in the VCC entry is changed to an exclusive state.

MESI references the states that a cache line can take on. For example, a cache is line may be marked with a state that is modified or dirty because it has been modified from the value in the main memory. The cache is then required to write the data back to main memory at some time in the future before permitting any other read of the (no longer valid) main memory state. Exclusive state refers to the cache line being present only in the current cache but is clean or matches main memory. Shared state refers to the cache line being stored in other caches of the processor. Invalid state indicates that the cache line is invalid.

In non-MESI embodiments, a MESI "shared" cache line is non-modifiable and a modifiable line in non-MESI embodiments, is the MESI "modified" or "shared" states.

In some usage scenarios, the cache line is updated in response to the store operation prior to the cache line state changing to a modifiable state.

In some embodiments, load operations that hit the cache line are enabled to complete execution, including optionally merging data from the store operation buffer 81 entry associated with the store operation into data read from the cache line.

In some embodiments, additional state in an MOQ entry and/or store operation buffer entry associated with the store operation indicates that a trace associated with the store operation is not enabled to be committed until the cache line is changed to a modifiable state. If the cache line state update arrives prior to all operations of the trace completing execution (a condition that, without the additional state, enables the trace to be committed), then the additional state in the MOQ and/or store operation buffer entry is cleared. If all operations of the trace complete execution prior to the cache line state update arriving, then the trace commit is delayed until the cache line state update arrives. In some embodiments where the additional state is added to the store operation buffer 81, a mechanism associated with the store operation buffer 81 that delays a trace commit until store operation buffer 81 entries associated with the trace have been flushed to the cache is used, at least in part, to delay the trace commit until the cache line state update arrives.

A snoop request that hits the store operation causes an abort event, in which case rollback from the VCC 22 will restore proper cache line data and tag state.

Figure 4:
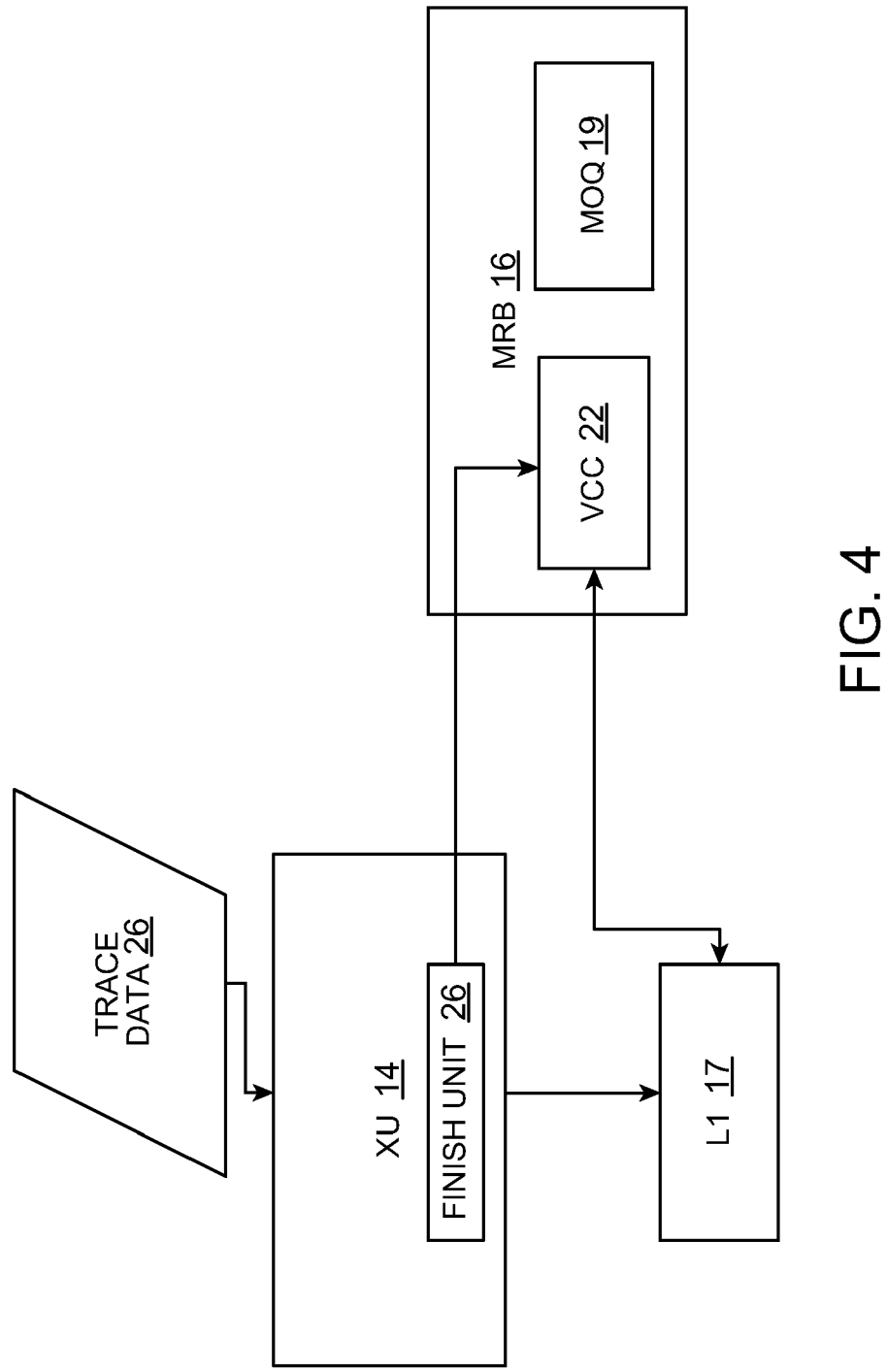
FIG. 4 shows the XU 14 to include a finish circuit 26 for receiving information from a buffer (such as a delayed store buffer, a load by-pass buffer (LBB) or a very large DSB).

FIG. 4 shows the XU 14 to include a finish circuit 26 for receiving information from a buffer (such as a delayed store buffer (DSB), a load by-pass buffer (LBB) or a store queue or a store forwarding buffer). Then, when the finish circuit 26 is ready to commit each trace, and has received information from the buffer, it checks that information to see if the buffer contains any pending stores for that trace. If so, the finish circuit 26 holds up committing that trace until the writes of those stores into the L1 cache 17 occur. The finish circuit 26 is shown coupled to the VCC 22 to cause committing of a trace therein.

Figure 5A:
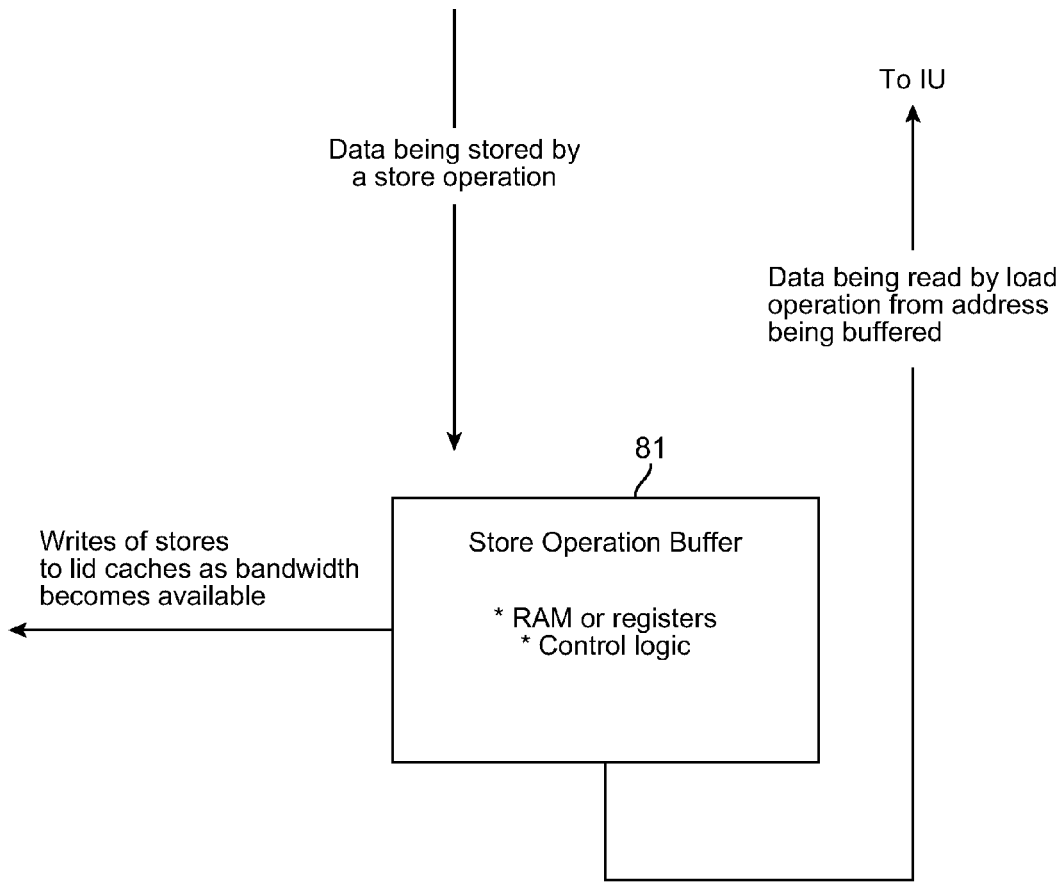
FIGS. 5A and 5B show various embodiments of a store operation buffer.
Figure 5B:
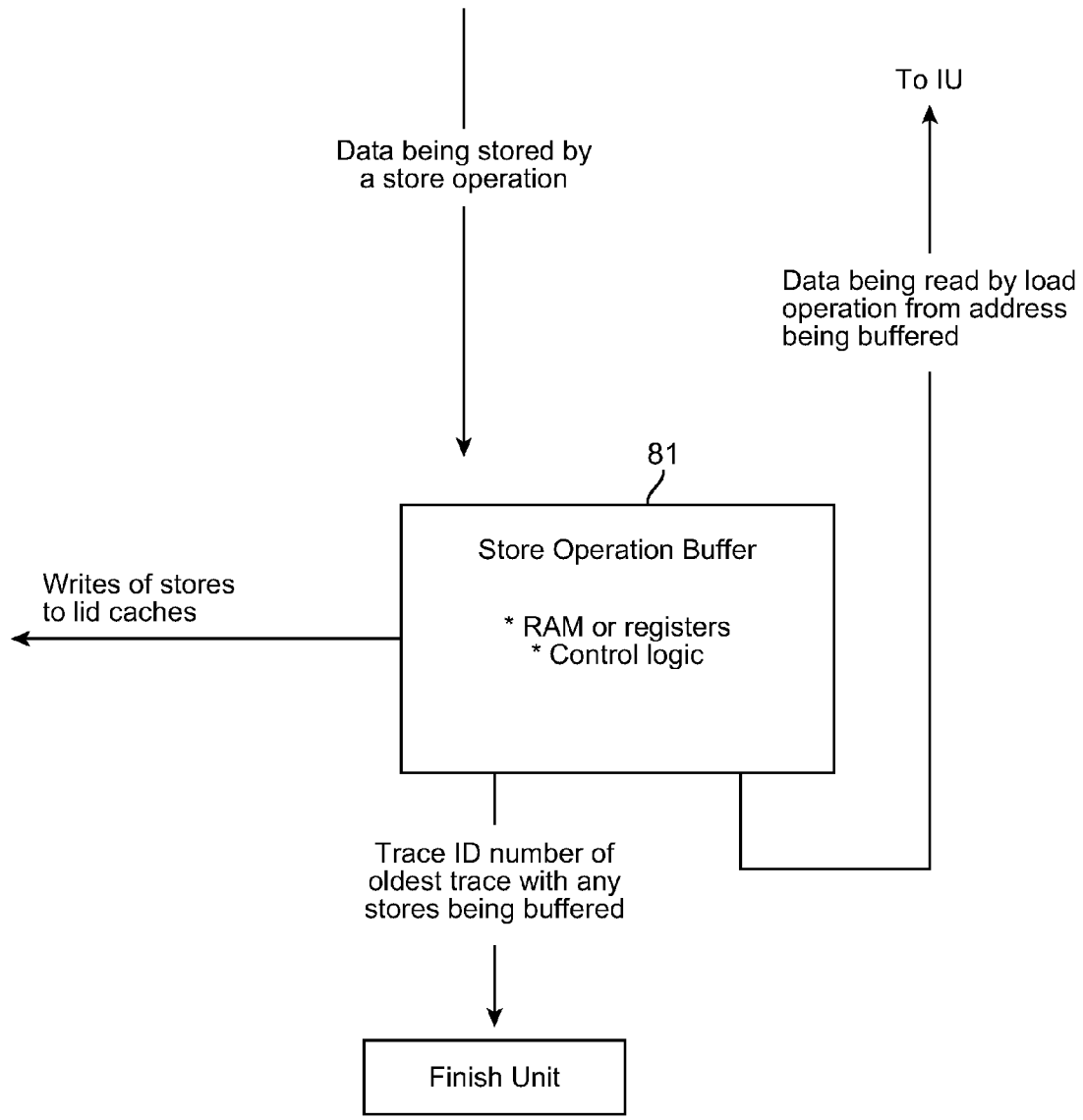

FIGS. 5A and 5B show various embodiments of a store operation buffer 81. FIG. 5A uses the store operation buffer 81 to save store operation data, or data that is being stored, as dictated by code. Store operations are transferred from the store operation buffer 81 to the L1 cache 17 as bandwidth becomes available and data that is being read by a load operation following the store operation to the same address, after being buffered (or saved) by the store operation buffer 81 is transferred to the IU.

In the embodiment of FIG. 5B, the data being stored by a store operation are stored in the buffer 81, however, store operations are transferred to the L1 cache and the trace ID number of the oldest trace with any stores being buffered is stored in a finish unit (used to commit traces) of an execution unit. Data being read by a subsequent load operation to the same address that are to the same address as the store operation being buffered.

Figure 6:
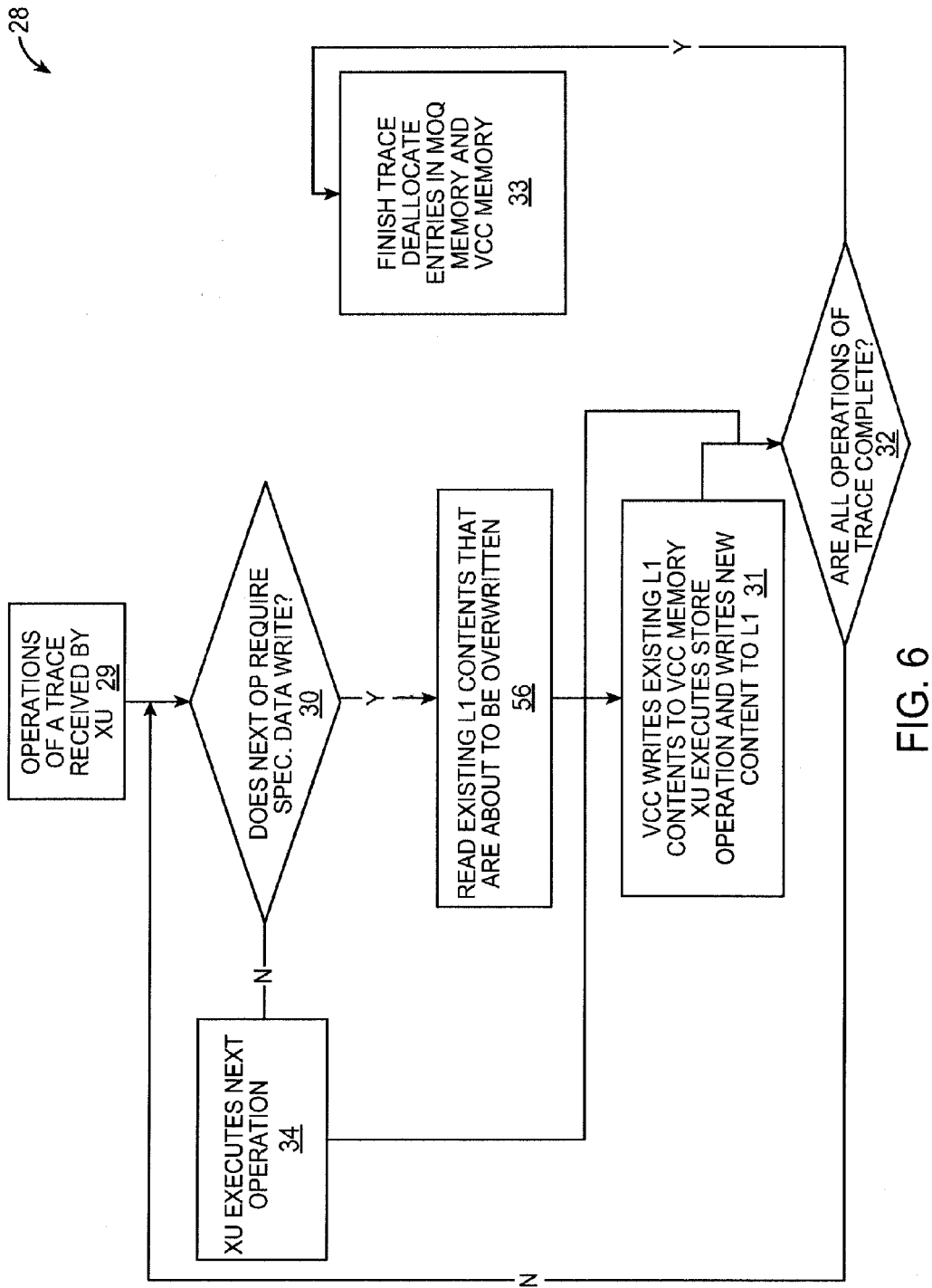
FIG. 6 shows a flow chart 28 of the steps performed for committing operations of a trace, in accordance with a method of the present invention.

FIG. 6 shows a flow chart 28 of the steps performed for committing operations of a trace, in accordance with a method of the present invention. In FIG. 6, at step 29, operations of a trace are received by the XU 14. Next, at 30, a determination is made as to whether or not the next operation of the trace requires speculative data write to memory (such as L1 cache 17), which is performed by the XU 14, in one embodiment of the present invention. If at 30, it is determined that the next operation requires speculative write, the process proceeds to step 56. At step 56, the VCC 22 reads the existing L1 cache contents that are about to be overwritten. Next, at step 31, the VCC 22, namely the VCC control circuit 24, writes the existing contents of the L1 cache 17, to the VCC memory 23. Additionally, the XU 14 executes the store operation and writes the new contents, resulting from the store operation's execution, to the L1 cache 17 and to the DSB. After the step 31, the process proceeds to 32.

If however, at 30, it is determined that next operation does not require one or more speculative data write operations to memory, the process proceeds to step 34 wherein the XU 14 simply executes the next operation. After step 34, the process to 32.

After the step 31, at 32, a determination is made as to whether all of the operations of the trace have completed. If it is determined that all of the operations of the trace have completed, the finish circuit 26 commits the trace after some delay and/or not until other conditions are also satisfied and the deallocation unit 25 deallocates the entries of the VCC memory 23 and the MOQ memory 20 that hosted the operations of the trace. It is noted that traces other than the one discussed in relation to the flow chart of FIG. 6 are in flight.

If at 32, it is determined that that not all of the operations of the trace have completed, the process proceeds to 30 and continues according to the foregoing.

In some embodiments, there is no one-to-one correspondence between the VCC memory 23 and the MOQ memory 20; the deallocation unit 25 deallocates the relevant entries of each memory.

Figure 7:
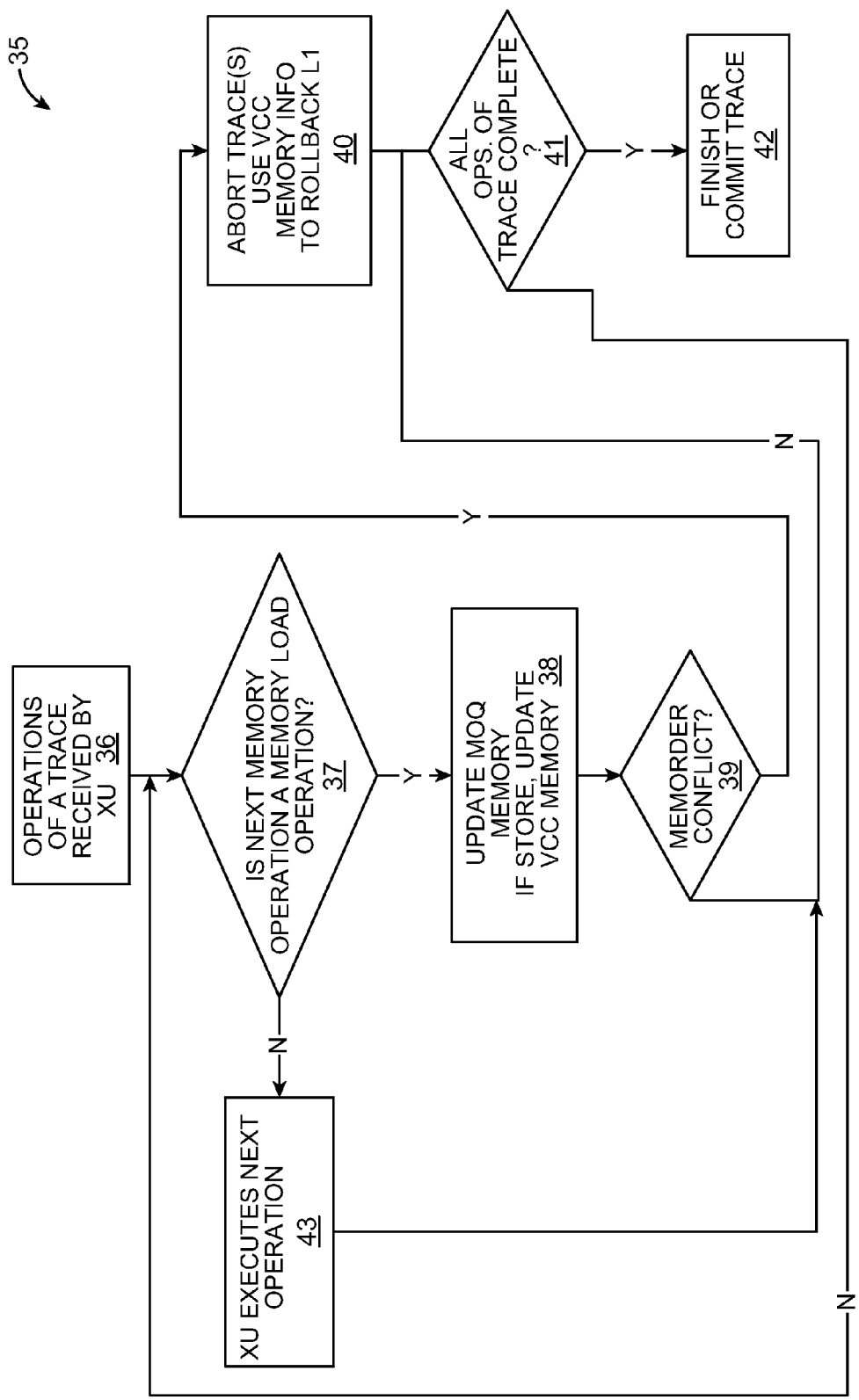
FIG. 7 shows a flow chart 35 for performing steps when a memory order conflict is detected, in accordance with a method of the present invention.

FIG. 7 shows a flow chart 35 for performing steps when a memory order conflict is detected, in accordance with a method of the present invention. At step 36, operations of a trace are received by the XU 14. Next at 37, a determination is made as to whether or not the next operation is a memory operation and if so, the process proceeds to step 38 wherein the MOQ memory 20 is updated accordingly, as will be further explain, and the VCC memory 23 is also accordingly updated, otherwise, the process proceeds to step 43 wherein the XU 14 executes the next operation and the process then continues to 41.

After step 38, at 39, a determination is made as to whether or not there is a memory order conflict, and if so, the process proceeds to step 40 and if not, the process continues to 41. Details of detection of memory order conflicts are provided later.

At step 40, the trace is aborted and the VCC memory (or entries) 23 is used to rollback the information in the L1 cache 17 to the architectural state prior to the speculative execution of the trace and the process ends.

At 41, a determination is made as to whether or not all of the operations of the trace are complete and if so, the process proceeds to step 42 where the finish circuit 26 commits the trace and the process ends. If at 41, it is determined that not all of the operations of the trace have completed, the process proceeds to 37 and continues as discussed above.

It is noted that flow charts 28 and 35 describe operations of a trace that is in flight. A trace is in-flight when it is being processed by a processor but is not yet committed. It is understood that numerous traces are typically in flight simultaneously.

Figure 8:
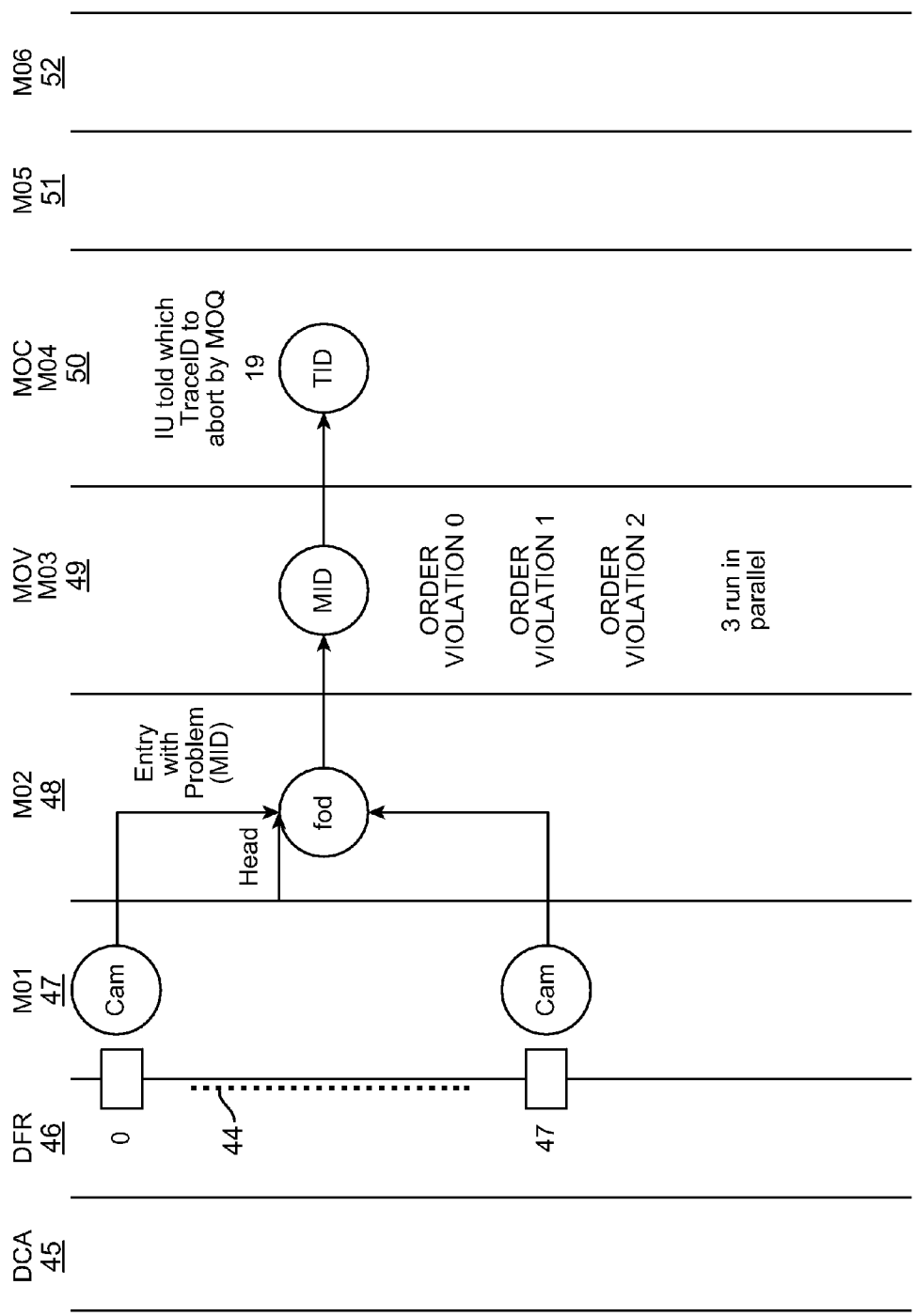
FIG. 8 shows various pipeline stages associated with the MOQ 19, in accordance with an embodiment of the present invention.

FIG. 8 shows various pipeline stages associated with the MOQ 19, in accordance with an embodiment of the present invention. The MOQ 19 is shown to include 6 stages (or pipelines), memory ordering stages 1 (MO1) 47 through MO6 52, three of which determine and report a conflict. MO3 49 and MOV are used synonymously herein. During the first stage, or MO1 47, a content array memory (or CAM) array is used to compare address and other information associated with a memory operation against a predetermined number of MOQ entries. In one embodiment, a memory operation results in two sets of 48 comparisons. The entries of the MOQ memory 20 are held information from execution of completed but yet uncommitted memory operations. The MOQ memory 20 is written at the end of DFR stage 46, when the physical address of the memory operation is known and the memory operation is known to be completed. Completed operations can be aborted while they are in the MOQ 19. In one embodiment of the present invention, an abort, caused by a memory order violation, is signaled from the IU, and can be due to many causes, two of which include:

1) an exception taken on an operation within the same or older trace, or 2) a memory order violation detected by MOQ between:
   a) two operations executed by a core between an operation completing/being executed and an operation in MOQ (termed an "intra-processor ordering violation"), or
   b) an operation in the MOQ and an internal replacement of the same cache line (internal eviction and self-snoop), or external snoop to the same line. Both of these are snoop-induced ordering violations.

In some embodiments where the MOQ memory 20 is a circular buffer, no entry is discarded, rather, older entries are overwritten. In all embodiments, deallocated entries are marked invalid/empty and await to be reallocated and then over-written.

During MO1, MO2, MO3 and MO4, a four-clock pipelined search is performed, one clock per stage. A new search can start every clock cycle. The first two stages, MO1 and MO2, possibly more if necessary to meet timing requirements, are needed to search in physical order (in cases where storing in program order is done, there can be a search in physical order) from the MOQ 19 position of the newly-written entry to the youngest entry in the queue. The MO2 stage completes the search of the MOQ 19. During the MO3, the MOQ 19 reports an ordering violation, if found, to the IU.

During MO4 50, which is also known as the memory ordering constraint stage (MOC), the MOQ 19 reports ordering constraints to the IU for intra-processor ordering violations.

Data cache access (DCA) 45 stage occurs prior to the MO1 stage by the MU 15 and is used to determine whether there is a cache hit or miss and Data format and return (DFR) 46 is used to return or provide the data from the cache when there is a cache hit. The MOQ memory 20 is written at the end of DFR 46, when the physical address of the memory operation is known and the memory operation is known to be completed.

More specifically, the DCA 45 is a stage during which several actions occur or are performed by the IU. In some embodiments, there actions occur in parallel and other embodiments, these actions occur sequentially. Among such actions are linear address (LA) to physical address (PA) translation, and various cache verifications.

For a store-hit operation, the VCC 22 is updated at the end of the DFR 46 stage to save a checkpoint of all bytes of the cache line which will be updated by the store data. For a store-hit operation, the L1 cache 17 is updated during either the MO1 or the MO2 stage, however, the latter causes resolution of timing violations.

For a load or store miss, the MU 15 cancels the memory operation and replays it from a scheduler (within the XU 14) at a later time. At the time of the miss in DFR 46 stage, the MU 15 informs the IU that the operation is a miss and therefore canceled. The operation, which is still in the scheduler, is marked again as "un-issued" and the MU 15 needs to remember to make the operation eligible for issue (in the scheduler), later in order to complete the operation.

FIG. 9 shows the VCC memory 23 divided into multiple partitions 61 and the L1 cache 17 similarly divided into multiple banks (or ways) 60, in accordance with another embodiment of the present invention. This is an example of an embodiment where there is no one-to-one correspondence between the MOQ memory 20 and the VCC memory 23. In this embodiments, the VCC memory 23 comprises a plurality of partitions 61, which includes partitions 65-67, an 'n' number of partitions. The L1 cache 17 is shown to comprise a plurality of banks 60, which includes 62-64, an 'n' number of banks The number of partitions of each of the VCC memory 23 may be the same as or different than the number of banks of the L1 cache 17. Typically, one of the number of banks of the L1 cache 17 and the number of VCC partitions is a multiple integer of the other. In the embodiment of FIG. 3, the VCC 22 is advantageously enabled to perform certain operations, such as rollbacks or snoop merges, independently and/or concurrently in each of a plurality of banks. However, the complexity of circuitry increases.

In embodiments where there is a one-to-one correspondence between the MOQ memory and the VCC memory entries, the MOQ 19 and VCC 22 overflow can never occur while a memory operation is in flight, that is, a MOQ or VCC entry pair is always available for each memory operation in flight. There is a 1:1 correspondence between memory operations in flight and a MOQ/VCC entry pair, because such pairs are allocated at the rename pipeline stage in the IU, which stalls if the next operation to rename is a memory operation and a MOQ/VCC entry pair is not available. While in general stalling slows processor performance, stalling under these circumstances is appropriate and even advantageous. This is because if the entry pairs are all allocated then it is highly likely that the pipeline stages and the circuits behind the rename pipeline stage have plenty of work to do.

It is noted that in some embodiments, each way of a multi-way, set-associative cache comprises a plurality of banks. In further embodiments, reading a data item from the multi-way, set-associative cache accesses one or more banks in each of the ways, and selects the data item from a desired one of the ways.

In some embodiments, each bank of the banks 60 is the width of a double-word. In some embodiments, the number of banks of VCC or the number of partitions in the partitions 61 is half a number of banks included in the banks 60, so that each VCC partition is associated with two L1 banks. In some embodiments where a number of banks of the VCC is half a number of banks of the cache, and where numerically adjacent banks of the cache correspond to adjacent locations in memory, each bank of the VCC is associated with a first bank of the L1 cache and a second bank of the L1 cache, the first bank and the second bank separated by a number of cache banks equal to the number of banks of the VCC.

In various embodiments, for purposes of rollback and snoop merging, each of a plurality of banks of the VCC (or partitions 61) operates independently. For example, in some embodiments, the plurality of banks or partitions 61 of the VCC are used to perform a rollback, parallel searches are performed in each bank position starting from the youngest to the oldest. In each bank position, the search finds a VCC memory entry having valid data, the valid data is restored to a corresponding location in the L1 cache, the corresponding location determined by a respective key of the next VCC memory entry, and the search proceeds to a subsequent next VCC memory entry having valid data, if any.

FIG. 10 shows further details of the processor 1 to include an eviction control unit (ECU), in accordance with an embodiment of the present invention. The MRB 16 is shown to receive memory operations from the XU 14 for reconciling or tracking the received memory operations with respect to any memory ordering violations. The VCC 22 is shown to include an ECU 70 for evicting a cache line to the L1 cache 17 as a result of a cache operation by the L1 cache 17, such as due to a cache miss. In this cache, a cache line must be removed (evicted) from the L1 cache 17 to make room for a replacement cache line satisfying the cache miss. Alternatively, the ECU 70 is located outside of the VCC 22.

FIG. 11 shows selected details of an embodiment of the processor 1, in accordance with an embodiment of the present invention. In FIG. 11, the processor 1 is shown to comprise a Trace Unit (TU) 102, Cores 103.1 to 103.N, and Level 2 Cache (L2) 104. Trace Unit 13 supplies traces to the cores. In some embodiments, TU 13 fetches a sequence of instructions for the cores, translates the sequence of instructions into at least a sequence of operations, and provides the sequence of operations as traces to the cores. In some embodiments, TU 13 comprises one or more trace caches, such as the TC 53 and the TC 54 of FIG. 1, for storing pre-translated versions of operations. In some embodiments, TU 102 provides traces to the cores as a sequence of operations, each operation tagged with a trace ID. In some embodiments, TU 102 is enabled to provide more than one operation to a single core in a single clock cycle or single pipeline stage or one operation to each core in one clock cycle or multiple operations to a single core.

The processor 1 includes a circuit for tracking memory operations, the circuit being made of various structures, such as a combination of the MOQ 19 (or parts thereof) and the L1 cache 17 or a combination of the VCC 22 (or parts thereof) and the L1 cache 17 or any combination thereof. The MOQ 19 includes sub-circuits, such as control logic 21 (shown in previous figures) to hold memory operation ordering information corresponding to active memory operations and configured to detect a violation of the ordering constraints.

The VCC memory 23 is configured to receive and hold a set of checkpoint entries, where each checkpoint entry is associated with one of the traces, where each checkpoint entry is of a checkpoint location within the first memory, where each checkpoint entry includes checkpoint data indicating a state of the checkpoint location within the first memory prior to an update of the checkpoint location, and where the update results from executing one of the active memory operations.

The VCC control circuit 24, which is a sub-circuit of the VCC 22, is configured to receive a rollback request (among the signals transferred between the MOQ 19 and the VCC 22), from the MOQ 19, and, in response thereto, to overwrite in the L1 cache 17 a set of the checkpoint locations based on the particular trace, where the set of checkpoint locations includes all checkpoint locations of all checkpoint entries associated with the particular trace, and where the set of checkpoint locations further includes all checkpoint locations of all checkpoint entries associated with any traces that are younger than the particular trace in the trace sequence order.

The VCC control circuit 24 is also configured to receive the memory ordering violation signal 83, and, in response thereto, to overwrite in the L1 cache 17 a set of the checkpoint locations based on a selected one of the at least one of the one or more traces, where the set of checkpoint locations includes all checkpoint locations of all checkpoint entries associated with the selected trace, and where the set of checkpoint locations further includes all checkpoint locations of all checkpoint entries associated with any traces that are younger than the selected trace.

Each of Cores 103.1 to 103.N comprises respective execution and memory units. In the embodiment of FIG. 11, the processor 1 is shown to include the XU 14 and MU 15 as well as the Core 103.1. XU 14 includes one or more processing units, such as an integer unit 115.

The XU 14 is shown to include an issue unit 114, the integer unit 115, an abort unit 117, a finish unit 118 and a number of Machine-State Registers (MSRs) 119, in accordance with an embodiment of the present invention. The MU 15 is shown to include the MOQ 19 and the VCC 22 and coupled to the L1 cache 17. The MOQ 19 is for detecting ordering violations and/or assisting in processing snoop requests, and the VCC 22 is for recording "old" cache contents to enable speculative updating of the L1 cache 17 (and subsequent rollback when necessary). In some embodiments, the MOQ 19 is coupled to VCC 22 and to the XU 14. In some embodiments, VCC 22 is coupled to L1 cache 17.

The TU 13 processes a sequence of instructions (also known as "instruction stream"), and generates and provides a sequence of operations, based thereon, to be executed as one or more traces. A trace has associated therewith a trace identification (ID), and therefore, each operation of a trace has have associated therewith a respective trace ID of the trace. The TU 13 provides the operations and the respective trace IDs to the issue unit 114 in a predicted execution order, and the issue unit 114 issues the operations, in an optionally different order, for execution. In various embodiments, the finish unit 118 allocates entries in the MRB 16 and/or an MOQ 19 for particular ones of the processed operations, such as memory-accessing ones of the processed operations.

In various embodiments, a trace is committed and/or aborted as a unit, such as by an atomic operation. In various embodiments, committing or aborting a trace operates to atomically deallocate entries associated with operations of the trace in one or more of: an MOQ, and a VCC. In some embodiments, the atomic deallocation is via deallocation of all entries having trace IDs matching a trace ID of a completing trace. In some embodiments, completion of a trace is contingent, at least in part, on a DSB not having any valid (e.g., not already written to a cache) entries associated with operations of the trace. In various embodiments, subsequent to execution but prior to commitment of a memory-accessing operation, a conflict detection is performed between the memory-accessing operation and entries in an MRB (such as in an MOQ). In response to a detected conflict, cache state saved in zero or more VCC memory 23 entries is rolled back, restoring cache state as of a preceding trace boundary.

The finish unit 118 controls completion processing and retiring of operations (or committing operations or traces). The finish unit 118 is analogous to the finish unit 26 of FIG. 4. In some embodiments, finish unit 118 retires operations individually or in groups. In some embodiments, finish unit 118 retires operations of a trace, one at a time. In some embodiments, finish unit 118 retires traces atomically. One or more of the cores also comprise abort processing logic, as illustrated by the abort unit 117. For example, in some embodiments, an ordering violation detected by MOQ 19 is reported to abort unit 117. In various embodiments, in response to the detection of the ordering violation one or more speculatively executed operations are aborted, and at least some of the aborted operations are re-issued. In further embodiments, in response to the detection of the ordering violation, one or more traces are aborted. In some embodiments, the abort unit 117 is coupled to the finish unit 118 to report an abort event. In some embodiments, information on aborts, such as whether a trace was aborted and where (on which operation) the trace was aborted, is communicated from one or more of the cores to TU 13 and/or to software being executed by the processor 1. In some embodiments, information on aborts communicated from a core to TU 13 and/or to software being executed by the processor 1 causes a re-evaluation of traces, optionally changing trace boundaries and/or the caching of traces in the TU 13.

Processor 1 comprises one or more MSRs for controlling operation of the processor 1 and reporting status of the processor 1, such as performed by MSR 119 and MSR 129. According to various embodiments, the MSRs are located in, and are responsive to, various portions of the processor 1, and are shown in one of the cores and in the TU 13 for purposes of illustration.

The cores 103.1 through 103.N are shown coupled to the TU 13 and to the L2 cache 18. In some embodiments, the cores 103.1 through 103.N are identical, while in other embodiments some of the cores 103.1 through 103.N are of one type (having, for example, relatively high operation processing bandwidth and capable of operating at a relatively high frequency), and some of the cores are of another type (having relatively low processing bandwidth and frequency and reduced power). In some embodiments, not all of the cores are equipped with an MOQ and/or a VCC. In some embodiments, all or portions of the abort unit 117 are implemented in the XU 14, the MU 15, or both. The number and processing capabilities of the cores varies, according to various embodiments, without restriction.

In some embodiments, programs for execution by the processor 1 are stored externally thereto and optionally data is stored externally. A group of traces 132 (also known as "instruction image") is provided to the XU 14 by the TU 13. In some embodiments, the group of traces 132 is treated as a sequence of basic blocks ( . . . , 131.0, 131.1, . . . , 131.7, . . . ) by the TU 13.

In some embodiments, the group of traces 132 comprises a sequence of basic block traces. In other embodiments, multi-block traces are included in the group. In still other embodiments, microcode traces or decoder traces are included in the group. In still other embodiments, any combination of the foregoing traces is included in the group. In some embodiments, basic block traces comprise a sequence of operations, optionally ending with a branch instruction, and with no internal branch instructions. In some embodiments, a group of traces is a sequence of operations in program order, the program order differing from a sequential order of instructions in the group of traces due to branch instructions. In some embodiments, a group of traces is a sequence of basic block traces, multi-block traces, microcode traces, decoder traces or any combination thereof that is in program order, the program order differing from a sequential order of traces due to branch instructions.

In some embodiments, instructions of an instruction stream are translated into operations, and a trace is a sequence of one or more translated group of operations (basic blocks or multi-blocks) of the instruction stream. In various embodiments, operations (translated instructions) of a trace are optimized. A multi-block trace may be built from operations of one or more basic block traces or operations of a combination of a multi-block trace and basic block trace.

In some embodiments, grouping of operations into one or more traces is dynamic; a number of operations in a trace and boundaries of the trace are changed in response to certain events as an instruction stream executes. In some embodiments, a grouping of operation into one or more traces is, at least in part, controlled by information in the group of traces 132 containing the group of operations. In some embodiments, the grouping of operations into one or more traces is, at least in part, determined by software.

In some embodiments, grouping of operations of multi-block traces into one or more traces is dynamic; a number of operations in a trace and boundaries of the trace are changed in response to certain events as an sequence of operations executes. In some embodiments, a grouping of operations of multi-block traces into one or more traces is, at least in part, controlled by information in the group of traces 132 containing the multi-block traces. In some embodiments, a grouping of operations of multi-block traces into one or more traces is, at least in part, determined by software.

In some embodiments, a load operation is represented in a basic block trace or a multi-block trace. In some embodiments, a store operation is represented in a basic block trace or a multi-block trace in a trace. In some embodiments, load and store operations in a trace are in a same order as corresponding load and store instructions in one or more basic block traces or one or more multi-block traces from which the trace was generated. In some embodiments, load and store operations in a trace are optimized and optionally appear in a different order than corresponding load and store instructions in one or more basic block traces that were translated to generate the trace. In some embodiments, load and store operations in a trace are optimized and some load or store instructions in one or more basic blocks that were translated to generate the trace do not have corresponding load or store operations in the trace. In some embodiments, a single memory operation, such as a store or load operation, originates from multiple instructions.

Still referring to FIG. 11, the finish unit 118 is responsive to eligibility for committing of a trace. The finish unit 118 is configured to perform an deallocation of all of the entries of the MRB 16 that are associated with any of the operations of the trace.

As an operation is issued, by the issue unit 114, a respective entry in MOQ memory 20 and the VCC memory 23 is allocated for the operation. In some usage scenarios, an identifier of the respective entry among a plurality of entries, such as an index in to an array of the entries, is passed down a processor pipeline along with control signals for the operation, thus associating the respective entry with the operation. In some usage scenarios, an identifier passed down a processor pipeline along with control signals for the operation is used to identify and to update the respective entry. In some embodiments, a respective entry in the MOQ memory 20 and the VCC memory 23 is allocated before issuing and before execution of a particular operation of a certain trace. In various embodiments, when a particular type is committed or aborted, the respective entry in the MOQ memory 20 and the VCC memory 23 is deallocated. This is the case of a trace granularity, however, if other granularities are employed, such as based on an operation or a group of operations, deallocation is performed when the operation or the group of operations, respectively, is committed or aborted. In some embodiments, the particular type (or sub-type) of operation is load and/or store operations. In some embodiments, the particular type is cacheable load and/or store operations. In some embodiments, the particular type is cacheable or write-combining load and/or store operations. In some embodiments, the particular type is memory-accessing operations, except for uncacheable load and/or store operations and prefetch operations. In some embodiments, the particular type is memory-accessing operations, except for uncacheable load and/or store operations, operations that access memory-mapped spaces, such as I/O space, and prefetch instructions. In various embodiments, the determination that a particular operation is of the particular type is an estimate based on factors such as, but not limited to, previous execution(s) of the particular operation, software hints, and the behavior of similar, related, or nearby operations.

In various embodiments, memory-accessing operations, such as load/store operation, are issued to a plurality of pipeline stages of the processor 1, and a particular one or more pipeline stages are enabled to access the L1 cache 17 for load operations to produce a respective load result. In further embodiments, the particular pipeline stages are further enabled to access the L1 cache 17 for store operations to produce respective prior cache states, and the plurality of pipeline stages is enabled to allocate respective VCC memory 23 entries for store operations and to store the respective prior cache states in the respective VCC memory 23. In some embodiments, for each of at least some of the store operations, the respective prior cache state includes some or all of a respective cache line of the L1 cache 17, the respective cache line accessed by the each store operation. In further embodiments, the respective prior cache state includes some or all of a cache tag state of the respective cache line of the L1 cache 17. In some embodiments, the respective prior cache state includes a MESI cache tag state of the respective cache line of the cache. In some embodiments, the respective prior cache state includes a clean/dirty portion of a MESI cache tag state of the respective cache line of the cache.

As earlier noted, the VCC control circuit 24 within the VCC 22 is configured to perform a rollback at times. (An example showing a VCC rollback process is shown in FIG. 31A.) In some embodiments, in response to execution of a store operation, a prior cache state is read from the cache and is stored in a respective register of the VCC memory 23. In some embodiments, the prior cache state comprises at least a portion of a cache line specified during execution of the store operation. In some embodiments, the prior cache state comprises some or all of a tag state of the cache line. In various embodiments, when enabled, such as in response to conflict detection, the VCC 22 reads prior cache states from at least some of the VCC memory 23, and restores the prior cache states to the L1 cache 17. In some embodiments, the at least some of the VCC memory 23 corresponds to an oldest, conflicting operation, and all, valid VCC memory 23 entries correspond to younger (in a predicted execution order) operations. In some embodiments, the at least some of the VCC memory 23 entries is all, valid VCC memory 23 entries associated with operations of either an oldest conflicting trace (such as by having a respective trace ID the same as a trace ID of the oldest conflicting trace), or any younger (in a predicted execution order) trace.

In some embodiments where the VCC 22 is configured to perform a rollback, prior cache states stored in VCC memory 23 comprise a data portion and a tag portion, and the rollback restores both the data portion and the tag portion to the L1 cache 17. In some embodiments, the tag portion is a MESI state. In other embodiments, the tag portion is a clean/dirty indication. In various embodiments, MESI state is encoded such that the MESI state comprises a clean/dirty bit, and a second bit, and the tag portion comprises the clean/dirty bit but not the second bit.

In some embodiments where store operations are allocated VCC memory 23 entries in a predicted execution order, where store operations of a trace are issued out-of-order, and where a first (earlier in a predicted execution order) store operation of the trace and a second (later in a predicted execution order) store operation of the trace both access the same portion of data in a same cache line, an order of issuing the first store operation and the second store operation affects data valid bits of a VCC 22. For example, in an in-order case, the first store operation and the second store operation are issued in-order. The first store operation is allocated a first VCC memory 23 entry in which a first prior cache state is recorded, and the second store operation is subsequently allocated a second VCC memory 23 entry in which a second prior cache state (reflecting results of the first store operation) is recorded. Because the first store operation is allocated an earlier (in a predicted execution order) VCC memory 23 entry, if the trace is aborted and the VCC 22 performs a rollback, the oldest recorded prior cache state of the cache line (associated with the earlier versioning cache register) is correctly restored. In an out-of-order case, the first store operation and the second store operation are issued out-of-order. The second store operation is allocated a second VCC memory 23 entry in which a second prior cache state is recorded, and the first store operation is previously allocated a first VCC memory 23 entry in which a first prior cache state (reflecting results of the second store operation) is recorded. Because the first store operation is allocated an earlier (in a predicted execution order) VCC memory 23 entry but saves a prior cache state subsequent to execution of the second store operation, if the trace is aborted and the VCC 22 performs a rollback, the oldest recorded prior cache state of the cache line (associated, in this case, with the later VCC memory entry) is not correctly restored. In some embodiments, to achieve correct rollback operation in the out-of-order case, note that the first store operation (executing second) detects a conflict with the second store operation. In this scenario, data valid bits of the first VCC memory 23 that correspond to set data valid bits of the conflicting (second) VCC memory 23 entries (containing earlier prior cache state) are cleared, so that the prior cache state stored in the second VCC memory 23 entries is correctly restored in those positions. (Some data valid bits may remain set in the first VCC memory 23 entries, if those positions are not valid in the second, or any other conflicting, VCC memory 23 entries.)

In some embodiments where the MRB 16 comprises the MOQ 19, each of a plurality of entries of the MOQ 19 comprises a respective entry of the MOQ memory 20. In some usage scenarios, an operation is associated with an entry of the MRB 16, and accordingly, the operation is associated with the respective entry of the MOQ 19.

In some embodiments where the MRB 16 comprises the VCC 22, each of a plurality of entries of the VCC 22 comprises a respective one of the VCC memory 23. In some usage scenarios, an operation is associated with an entry of the MRB 16, and accordingly, the operation is associated with the respective VCC memory 23.

As earlier noted, the MU 15 uses the MOQ 16 to hold speculative loads and store operations that are waiting for their trace to commit. In embodiments where the MOQ 16 is physically located in the MU 15, the IU 115 keeps track of allocation and deallocation. In some embodiment, the MOQ 16 is organized as a circular buffer. The IU 115 allocates entries as memory operations are renamed, but in some embodiment, the IU 115 advantageously does not communicate this allocation to the MU 15, which serves to reduce traffic between the MU 15 and the IU 115, among other advantages. When a memory operation is executed, the IU 115 informs the MU 15 of which MOQ entry it should use. Since execution may be out of order, the MU 15 can write, into an appropriate and allocated MOQ entry, out of order.

As the MU 15 puts information about a completed memory operation into the MOQ 16 at the location indicated by the IU 115, the MU 15 also checks its physical address against memory operations stored in following younger in program order MOQ memory 23 entries. MU 15 writes to the MOQ memory 23 at the end of the DFR stage 46, when the physical address of the memory operation is known. The MOQ memory 23 entry is validated at the end of DFR stage 46, when the memory operation is know to have completed successfully.

Memory operations in following entries, if valid in the MOQ 16, represent operations that are later in program order but were executed earlier. If the completed memory operation is found to have executed out of order, and the memory operation accesses some or all the same bytes in memory as the earlier executed memory operation, the MU 15 signals an order violation for the just-completed operation in MOV 49 stage. IU 115 tracks the memory operation all the way down to MOC 50 stage, so it knows which memory operation caused an ordering violation. The MU 15 selects the trace it wishes to abort, depending on the type of ordering violation. When simultaneous ordering violations are reported in multiple memory slots due to execution of multiple memory operations simultaneously, the MU 15 aborts the trace associated with the oldest memory operation in the MOV (or MO3) 49 stage.

It is noted that the MOQ 19 does not store memory operations, rather, it stores information, such as address and other types of identifying information, associated with memory operations. Thus, wherever there is mention of a memory operation being stored in the MOQ 19, it is intended that information regarding the memory operation is saved and not the actual memory operation.

To compensate for the size (or depth) of the MOQ 19, the search of the MOQ 19 is fully pipelined across, for example, 4 cycles. This corresponds to MU 19 stages MO1 47, MO2 48, MOV 49 and MOC 50. In some embodiments, a load operation that executes out of order with respect to another load operation is not considered an order violation.

The MU 15 also checks the order of snooped addresses against the MOQ 19. Since snoop accesses are handled relative to the currently committed state (not the speculative state), a snoop is treated as being earlier in "program order" than any operation currently valid in the MOQ 19. If a conflict is detected, the MU 15 signals an order violation on the trace ID for the oldest matching operation in the MOQ 19.

Since a snoop uses a bubble (an empty slot) to borrow the logic in one of the memory execution slots, a snoop order violation is signaled in that slot. The IU 115 recognizes the order violation as occurring in a bubble, so the violation must stem from a snoop. It is useful for the IU 115 to distinguish snoop-caused order violations from intra-processor order violations because intra-processor order violations cause the IU 115 to add ordering constraints to the offending operations to avoid a repeat of the violation. Therefore, the MU 15 sets certain bits (or flags) indicative of order constraints only for regular program order violations and not for snoops.

When the MU 15 detects an intra-processor ordering violation between two memory operations, it asserts certain bits or flags indicative of the same and reflective of the memory slot in which the violation occurred. The operation in MOC 50 stage is in earlier program order, but arrived at the MU 15 and was executed incorrectly later in time. This operation is marked and remembered by the IU 115 as the "earlier" constraint, since it occurs earlier in program order. The IU 115 is aware of which memory operation is in the MOC 50 stage, so no trace ID needs to be sent by the MU 15. The MU 15 then searches through the MOQ 19 and finds the other memory operation which executed earlier in time, in the incorrect order. This operation is marked and remembered by the IU 115 as the "later" constraint, since it occurs later in program order. The MU 19 identifies the "later" constraint op by sending its trace ID on and the MOQ ID of the memory operation in the trace. In some embodiments, then entire MOQ ID is not sent, rather, a portion thereof is sent and used by the IU 115. The MU 19 also selects which memory operation it wishes to abort, and sends the trace ID of that memory operation to the IU 115. After aborting the trace indicated by MU 19, IU 115 reissues the two memory operations and applies the two ordering constraints such that the pair of memory operations will not execute in incorrect order again.

Some examples of cases where an intra-processor ordering violations occur are now presented. In some embodiments, there are three such cases, which are shown in FIG. 12.

In FIG. 12, Case 1), a load operation from address A is followed by a store operation to address A in program order. This action loads a value from memory location A, then stores either the same or different value to the same memory location A. Due to the program ordering, the load operation from location A should not see the effects of the store operation to location A. However, since the execution ordering was reversed, due to out-of-order issue, the load operation saw the effects of the store operation and received the incorrect value. The trace containing the load operation must be aborted, since the load operation data was incorrect. The IU 115 records the "earlier" constraint on the load in MOC 50 stage. "Records" as used herein also refers to "stores" or "saves". The trace containing the store operation is flushed (or discarded) since it is younger than the trace undergoing abort. The MU 15 informs the IU 115 of which memory operation incorrectly "raced-ahead" and executed too early. In this case, it was the store operation that executed prematurely, thus, the MU 15 reports an ordering constraint on the store operation to the IU 115. The IU 115 records the "later" constraint on this store memory operation. The next time the two operations issue, the IU 115 will guarantee that the execution ordering between these two operations is correct.

During Case 2), in FIG. 12, a store operation to address A is followed by a load operation to address A in program order. This action stores a value to memory location A, then loads it right back again. Due to the way the program operations are ordered, the load operation is expected to see the same value which was just stored out to memory location A. If the load operation executes too early, the load operation will not see the effects of the store operation. The load returns incorrect data from memory location A, and subsequent operations may use this wrong data. For this reason, at least the trace containing the load operation must be aborted. Note that there was nothing wrong with the store operation to address A, and its access completed correctly. However, if there is another store operation to address A in program order following the load operation (not shown), then Case 2 actually becomes Case 3. Such as shown relative to Case 3, the oldest of multiple store operations to the same address needs to be aborted. To prevent the additional complexity of verifying there is not a second store operation to A, in some embodiments, the trace containing the store to address A is aborted. The MU 15 signals an order violation, and the IU 115 records the "earlier" constraint on the memory operation in the MOC 50 stage, which is the store memory operation. The MU 15 identifies the load memory operation thereby, enabling IU 115 to record the "later" constraint on the load memory operation. The next time the load operation is issued, the IU 115 will guarantee that it will issue after the store operation has issued.

During Case 3), a store operation to address A is followed by another store operation to address A in program order. This action overwrites a memory location with another value. Due to the way the program is ordered, further operations in the same thread (core) should only see the effects of the store operation in later program order. If the store operations incorrectly execute in reverse order, the load memory operations downstream will return the incorrect value from location A. For this reason, and others, an ordering violation must be reported. At a minimum, the trace that includes the store in later program order needs to be aborted and reissued to correct the value in memory. However, because this greatly complicates the implementation of the VCC 22, forcing it to remember execution order across multiple stores (in different traces) to the same address, the trace including the store operation in earlier program order is aborted, and the trace that includes the store operation which follows in program order is also flushed from the pipeline. The trace with the store operation in later program order is reported as the "later" constraint, so the next time the pair of trace issues, the IU 115 executes it in the correct (program) order. Alternatively the VCC 22 may be forced to remember execution order across multiple store operations in which case, the trace with the store operation in earlier program order is not aborted, however, the VCC 22 is rendered complicated in design.

The MU 15 can detect intra-processor ordering violations in one or more memory slots. In the case where there are ordering violations detected in multiple memory slots, the IU 115 records the "earlier" constraint for only the oldest memory operation in the MOC 50 stages. The IU 115 only records one "later" constraint for the operations found in the MOQ memory 20 entries.

FIG. 13 shows a conceptual flow diagram of a case where multiple ordering violations occur simultaneously. The embodiment of FIG. 13 presumes that the IU 115 can only apply a single pair of constraints at any given time. Therefore, the MOQ 19 provides information regarding the remaining constraints. A search is performed of the MOQ 19, for each memory (pipeline) slot, for the oldest (earliest program order) but younger matching memory operation. If there is at least one match found in multiple memory slots, then the match corresponding to the slot which had the oldest memory operation in MOV 49 stage (shown in FIG. 8), of the MOQ 19 pipeline, is returned to the IU 115.

More specifically, three ordering violations are received from the MOV stage of the MOQ pipeline by the memory slots 91-93. If there is at least one match found in multiple memory slots, then the match corresponding to the memory slot which had the oldest memory operation in MOV 49 stage (shown in FIG. 8), of the MOQ 19 pipeline, is returned to the IU 115. Snoop-induced violations are due to contention between processors/cores for a cache line which is in use by any cacheable memory operation completed in the MOQ 19, and either another memory operation which desires to evict the cache line, or another processor which desires to own (i.e. store to), or at least remove ownership, the same cache line. In all cases, the memory operation in the MOQ 19 which had previously hit in the cache line when it entered the MOQ 19 during completion, now "loses" the cache line. Effectively, the hit condition that the memory operation experienced during execution is no longer true. In some embodiments, there are two possible sources of the snoop-induced ordering violations:
1) An eviction (or self-snoop or internal snoop) of data in the L1 cache 17 due to a cache line replacement, referred to as an "internal eviction ordering violation" or "intra-processor ordering violation".
2) A store operation and external snoop from another processor which causes an invalidation in the L1 cache 17 with a writeback (if the cache line is modified) or no writeback (if the cache line is shared clean), which is referred to as an "inter-processor ordering violation".

Both cases are detected in the same manner by the MOQ 19. If the index and way of the snoop matches any entry in the MOQ memory 20, the trace ID of that matching entry is reported to IU 115 as experiencing an ordering violation. No ordering constraint is provided to or recorded by IU 115 for any snoop-induced ordering violation. If there is more than one matching entry in the MOQ memory 20, the trace ID of the oldest trace with a matching entry is reported to the IU 115. This is illustrated as Case 4) in FIG. 12, with the matching entry in the MOQ memory 20 being the older of the two load operations.

In one embodiment of the present invention, the IU 115 distinguishes a snoop-induced ordering violation from an intra-processor ordering violation by the existence of a bubble in the MOC 50 stage. This bubble is scheduled into all memory slots by the snoop intervention so that the MU 15 resources can be used to process the snoop. MOQ 19 is one of the resources needed for the snoop.

If the oldest matching entry in the MOQ memory 20 is a load operation and all memory operations in earlier program order (older) are completed, then an ordering violation on the load memory operation is not reported, in an exemplary embodiment, which advantageously improves bandwidth. However, this does not work if the matching entry in the MOQ memory 20 is a store memory operation, or there are one or more older memory operations which are incomplete. It is however helpful when one core is polling (reading) a flag in cache while waiting for another core to change the flag (also known as a busy-wait loop.) Without reporting such a violation, the polling core would experience an abort in addition to a cache miss when the flag is finally set by the other core. With such reporting, the best case is that the polling core just experiences a cache miss due to the external snoop-invalidate of the cache line containing the flag.

For an internal eviction ordering violation, the MOQ 19 performs an age comparison of the trace ID of the memory operation causing the eviction with the trace ID of the MOQ memory 20 entry to the same cache line. If the snoop search mode is due to an inter-processor kill, flush or downgrade command, there is no age comparison performed because the trace ID of the other processor is irrelevant. The result of the age comparison is returned to the IU 115. This information is used by the IU 115 to determine the protocol used to re-execute the trace that is experiencing the order violation.

In some embodiments, some memory operations are executed speculatively. If a problem is later detected in the memory operation or in any other operation in the trace, the L1 cache 17 state is rolled back, as necessary, by the VCC control circuit 24. In most cases, however, all operations complete without problems, and the finish unit 118 commits the trace. Before committing a trace, the IU 115 waits to determine if any memory operations signal an order violation in the MOC 50 stage of the MOQ 16. In some embodiments, if there are no other order violations and all other commit conditions are met, the finish unit 118 commits the trace. The IU 115 also waits to determine if any memory operations for that trace is still in the DSB waiting to write into the L1 cache 17.

The snoop triggers an ordering violation in a trace for which at least one memory operations had previously completed successfully. The IU 115 determines any such case and acts appropriately.

The MU 15, in some embodiment, causes the finish unit 118 to inhibit committing while the XU 14 is processing a snoop or eviction. In cases of internal snoop, the finish unit 118 holds off committing traces until the MU 15 can verify that they were not disturbed by the snoop.

When the IU 115 commits a trace, it signals this to the MU 15 to allow the MU 15 to free its checkpoint resources for that trace (checkpoints will be discussed in further detail below.). In embodiments where the cache state is current with the speculative execution, committing a trace requires only one cycle to be handled in the MU 15. Thus, advantageously, the finish unit 118 is able to commit the trace in one clock cycle and does so even through the trace may include many memory operations. Furthermore, advantageously, the finish unit 118 may commit traces in back-to-back cycles.

In some embodiments, the MU 15 maintains its own copy of the oldest trace ID that is not yet committed. The MU 15 increments a count each time a trace is committed. The MU 15 uses the oldest trace ID not yet committed to know which cache line checkpoints to invalidate during the commit process. Further, the MU 15 uses the trace ID, of those traces not yet committed, to determine the oldest trace ID in the DSB.

For a non-speculative memory-operation to the MU 15, in some embodiments, there can be neither an intra-processor nor an inter-processor order violation. This is because the memory operation is committed as it is completed. Therefore, writing the non-speculative operation into the MOQ 19 is avoided. The IU 115 is sent an MOQ ID for identifying a trace in the MOQ 19 and an invalid MOQ ID is indicated in cases where the trace is not to be committed, in some embodiments.

In some embodiments, non-speculative memory operations are written to the MOQ memory 23. In this case, and in accordance with an exemplary embodiment, a predetermined location in the MOQ memory 23 is written with non-speculative and non-misaligned store memory operations. Alternatively, only speculative memory operations are written in the MOQ memory 23. A mis-aligned memory operation refers to a memory operation having a location that spans across two cache lines.

In exemplary embodiments, in the case of cacheable memory operations which are not misaligned, the cache index (or "index"), way, and double-word (Dword) marks fields describe which Dwords are referenced by the memory operation. While in some cases, granularity is based on Dwords, in other embodiments, it may be based on byte marks or word marks. In the case of a mis-aligned memory operation, the MU 15 retries the operation when it is first detected, and reports it as being mis-aligned to the IU 115. When the IU 115 reissues the mis-aligned memory operation a second time, it splits it into two memory operations. These are referred to as the mis-aligned first and mis-aligned second memory operations. The mis-aligned first looks identical to the memory operation which was issued the first time, except that it is marked as mis-aligned across a boundary, such as but not limited to a 64 byte boundary. In the next clock cycle, the IU 115 re-issues the same memory operation but increments its linear address so that it points to the beginning of the next boundary. This is the mis-aligned second memory operation.

The MU 15 translates and checks the L1 cache 17 for both memory operations in the mis-aligned pair. If the mis-aligned first memory operation completes, it is written into the MOQ 19, and the entry is validated. If the misaligned second memory operation completes, it is written into the same MOQ entry. The mis-aligned second memory operation will not be allowed to complete unless the mis-aligned first memory operation is already complete. Both mis-aligned first and second memory operation participate in ordering checks.

If either or both of the memory references in the mis-aligned pair are to write combining (WC) type memory, the physical address is used to identify the Dwords affected. For cachable type memory, index and way are used and when there is a combination of WC and cachable type memory, the two independent sets of structures in the MOQ allow for both the physical address and the index, way to be used, respectively.

Allocation of MOQ memory 20 and VCC memory 23 will now be discussed. In some embodiments, MOQ memory 20 entries (such as for store operations) are allocated before issue (such as during renaming). In some embodiments, MOQ memory 20 entries (such as for store operations) are allocated no later than when the operations are issued for execution. In some embodiments, entries for particular operations are allocated by the issue unit 114. In some embodiments, entries for particular operations are allocated dynamically during execution of the particular operations.

In some embodiments, VCC memory 23 entries (such as for store operations) are allocated before issue (such as during renaming). In some embodiments, VCC memory 23 entries for particular operations are allocated no later than when the operations are issued and execution is validated. In some embodiments, VCC memory 23 entries are allocated by the issue unit 114. In some embodiments, VCC memory 23 entries for particular operations are allocated dynamically during execution of the operations.

In some embodiments with both a VCC 22 and an MOQ 19, entries of the latter are associated with VCC memory 23 entry. In various embodiments, the association is one-to-one; each MOQ memory 20 entry is implicitly associated with a corresponding VCC memory 20, and vice versa. In other embodiments, there are a different number of MOQ memory 20 entries in the MOQ 19 from a number of VCC memory 23, and the association is dynamic, such as via an entry of the MOQ 19 comprising a pointer to or an index of a VCC memory 20. In some embodiments, a conflict detection or other look-up operation is performed on entries of the MOQ memory 20, producing a set of "hit" (e.g., conflicting) entries, and the associated VCC memory 23 of the hit entries are then operated on, such as to perform a rollback or a snoop merge.

In some embodiments, VCC memory 23 entries for operations are allocated no later than when the operations are issued for execution. In various embodiments where VCC memory 23 entries are associated one-to-one with MOQ memory 20 entries, allocating an MOQ memory 20 entry implicitly allocates the associated VCC memory 23. In some embodiments, particular ones of load and/or store operations are allocated a respective MOQ memory 20 entry prior to the particular operations being issued. Store operations are allocated a respective VCC memory 23 entry prior to the store operations being issued. The respective MOQ memory 20 entry of the store operations being associated with the respective VCC memory 20 entry of the store operation via a pointer to or an index of the respective VCC memory 23. In some embodiments, VCC memory 23 for operations are allocated dynamically during execution of the operations. In some embodiments, only cacheable store operations are allocated VCC memory 23. In some embodiments that allocate VCC memory 23 dynamically, a store operation is allocated a VCC memory 23 entry after the store operation has generated an execution-derived key and has used the execution-derived key to search through the VCC memory 23. If a valid and matching VCC memory 23 entry already exists (from a prior operation), the store operation shares the valid and matching VCC memory 23 entry, else a VCC memory 23 entry is allocated. In some embodiments, the store operation matches a VCC memory 23 entry if an execution-derived key generated by the store operation matches an execution-derived key (or key or entry key) stored in the VCC memory 23 (due to a prior operation). In some embodiments, the store operation matches a VCC memory 23 entry if an execution-derived key generated by the store operation matches an execution-derived key stored in the VCC memory 23, and a trace ID of the store operation matches a trace ID stored in the VCC memory 23.

In some embodiments, the MOQ control logic 21 comprises a conflict detection unit (CDU), such as the CDU 80. In various embodiments, as memory operations (e.g. load and/or store operations) of a sequence (or stream) of operations are executed, the memory operations generate a respective execution-derived key (e.g. a memory address in addition to other identifying information) that is compared against entries of the MOQ memory 20 to detect a conflict. (An example structure performing a parallel version of the comparison against entries, such as discussed relative to FIG. 24.) In further embodiments, the respective execution-derived key of each of the particular operations is stored in a respective entry of the MOQ memory 20 (where it may participate in conflict detections with subsequent ones of the memory operations). In some embodiments, a conflict detection unit compares a respective execution-derived key against entries of the MOQ memory 20 to produce a set of matching ("hit") entries that have a conflict. The matching entries are then searched to find an oldest (among youngest conflicting entries), conflicting entry, and information associated with the oldest, conflicting entry is produced as conflict information of the conflict detection. In further embodiments, the entries are arranged in order from oldest to youngest, such as by being allocated sequentially in a predicted execution order, and the searching is a sequential search to find a first, in a direction of younger to older, conflicting entry. In some embodiments, the search starts at (or after) the respective entry of a one of the memory operations that generated the respective execution-derived key, and thus skips older entries (as it is searching in a direction of younger to older) prior (the older entries corresponding to operations older than the one operation). (An example of the searching is illustrated in FIG. 22A.)

In some embodiments, the processor 1 comprises a plurality of pipeline stages. In some embodiments, operations of a sequence of operations complete execution in a particular pipeline stage. In further embodiments, certain operations undergo conflict detection in one or more conflict detection pipeline subsequent to the particular pipeline stage. In various embodiments, particular ones of the operations generate information used for conflict detection prior to respective completion of execution, and the conflict detection is performed prior to the respective completion of execution, or alternatively subsequent to the respective completion of execution. (An example of some relevant pipeline stages of a processor is shown in FIG. 15.) In some embodiments, committing each of the certain operations is contingent, at least in part, on performing a respective conflict detection (with no conflict being found). In some embodiments, committing a trace is contingent, at least in part, on each of the particular operations of the trace by having performed the respective conflict detection. In some embodiments, a portion of the pipeline stages prior to the particular pipeline stage is optimized for high performance, and a portion of the pipeline stages subsequent to the particular pipeline stage is optimized for low power.

In some embodiments, each of the entries of the MOQ memory 20 comprises a respective type indication, the respective type indication specifying information about an operation associated with the each entry. For example, in some embodiments, the respective type indication specifies whether the associated operation is a memory-reading (load) or a memory-writing (store) operation. In some embodiments, the respective type is modified based on execution of the associated operation. For example, in some embodiments, execution of a store operation writes a respective entry of the MOQ memory 20 with respective type information indicating that the respective entry is associated with a memory-writing operation.

In embodiments where a 'silent store' may occur, if the store operation is a 'silent store', then the execution of the store operation writes the respective entry of the MOQ memory 20 with respective type information indicating that the respective entry is associated with a memory-reading operation. In various embodiments, the type indications enable the MOQ 19 to detect conflicts only among certain types of operations. For example, in some embodiments, the MOQ 19 is enabled to detect write-read, read-write, and write-write conflicts, but is not enabled to detect read-read conflicts.

In some embodiments, the CDU 80 detects conflicts in response to events, the conflict detection for an event producing a respective conflict result. In various embodiments, the events comprise one or more of: execution of particular ones of memory-accessing operations; (external) snoop requests; and internal evictions. In some embodiments, an event is associated with a respective event key (or key), and the respective event key is compared against zero or more entries of MOQ 19 to determine if a respective conflict is detected, and to produce a respective conflict result. In various embodiments, the respective conflict result comprises one or more of: an indication of whether a conflict was detected; information associated with the event; and information stored in any of the zero or more entries of the MOQ memory 20 that had a conflict detected.

In some embodiments, the CDU 19 is located in the MOQ control logic 21.

In some embodiments, the issue unit 114 is configured to issue a plurality of operations in parallel, each operation issued to a respective set of execution units. In some embodiments, (pipelined) operations issued in parallel proceed in parallel down a processor pipeline, and reach one or more conflict-checking pipeline stages in parallel. In various embodiments, the CDU 80 is enabled to perform multiple conflict detections in parallel, such as for a plurality of operations arriving at one or more conflict-checking pipeline stages at a same time. In some embodiments, multiple conflict detections performed in parallel result in zero, one, or more detected conflicts, and a conflict prioritization unit selects an oldest one among the detected conflicts, if any. In various embodiments, the CDU 80 comprises a conflict prioritization unit, which may be included in the MOQ control logic 21, in some embodiments. In some embodiments, the oldest one among one or more detected conflicts is one that is first in an implicit order among the multiple, parallel conflict detections that caused the one or more detected conflicts. In some embodiments, the oldest one among one or more detected conflicts is a one of the conflicts having a corresponding operation that is first in a predicted execution order among corresponding operations associated with the multiple, parallel conflict detections that caused the one or more detected conflicts. In some embodiments, the oldest one among one or more detected conflicts is a one of the conflicts having a respective entry in the MOQ memory 20 that is first in a sequential order among the respective entries associated with the multiple, parallel conflict detections that caused the one or more detected conflicts. Another embodiment is based on program order.

In some embodiments, one of multiple conflict detections performed in parallel is for an external snoop request or an internal eviction. In some embodiments, a conflict prioritization unit always selects a conflict detected for a snoop request among multiple, parallel conflict detections; if the snoop request does not detect a conflict, the conflict prioritization unit selects an oldest one among other detected conflicts, if any. In some embodiments, a conflict prioritization unit always selects a conflict detected for a snoop request or for an internal eviction among multiple, parallel conflict detections.

In some embodiments, the TU 13 provides operations in a predicted execution order, each operation associated with a trace ID. In various embodiments, each one of particular operations, such as some load and/or store operations, is allocated a respective entry in the MOQ memory 20, and the associated trace ID of each operation is stored in the respective entry. Storing trace IDs in entries of the MOQ memory 20 enables conflict detection to advantageously report a trace ID of an oldest conflicting entry, corresponding to an oldest trace with a conflict.

In some embodiments, the TU 13 provides operations in a predicted execution order, and particular load and/or store ones of the provided operations are allocated sequential entries in the MOQ memory 20 in the predicted execution order, thus ensuring that all of the particular load and/or store operations from a particular trace are adjacent (or wrapped around) in the MOQ memory 20. In some embodiments, when the particular trace is committed, all entries associated with the particular load and/or store operations of the particular trace are deallocated from the MOQ memory 20. In various embodiments, the deallocation operates by advancing a pointer past the group of sequential entries of the MOQ memory 20 associated with the particular load and/or store operations of the particular trace. In various embodiments, the atomic deallocation operates by clearing a valid bit of all of the entries of the MOQ memory 20 associated with the particular load and/or store operations of the particular trace. In some embodiments, the atomic deallocation operates by clearing a valid bit of all of the entries of the MOQ memory 20 storing a respective trace ID the same as a trace ID of the particular trace.

In some embodiments, the TU 13 provides operations of a trace to the issue unit 114 in a required order, such as a predicted execution order. In further embodiments, the issue unit 114 issues selected ones of the operations to one or more execution units in an execution order. In various embodiments, the execution order is out-of-order with respect to the required order. In some embodiments, all load and store operations of a trace are issued in the required order. In some embodiments, load operations of a trace are enabled to be issued out-of-order, but store operations of the trace are issued in the required order. In some embodiments, all load and store operations of a trace are enabled to be issued out-of-order. In some embodiments, store operations of a trace are issued out of order, while store operations of different traces are enabled to be issued in order. In some embodiments, load and store operations of a trace are issued out or order while load and store operations of different traces are enabled to be issued in order.

In some embodiments, a conflict detected for a particular operation aborts the particular operation. In further embodiments, using atomic traces, aborting the particular operation also aborts some older operations because the architectural state is restored to that which it was at the beginning of the trace. In various embodiments, a conflicting operation is the respective operation associated with a conflicting entry of the MOQ memory 20, the conflict detected by the CDU 80. In some embodiments, a conflict detected for a particular operation reports information related to the particular operation, and to an oldest (in a predicted execution order) operation among all conflicting operations. In an exemplary embodiment, the information reported on detecting a conflict between a particular operation and an oldest (in a predicted execution order) operation among all conflicting operations comprises one or more of: a respective trace ID of the particular operation; a respective trace ID of the entry of the MOQ memory 20 associated with the oldest conflicting operation; respective entry index in the MOQ memory 20 of the entry associated with the particular operation and the oldest conflicting operation; and a distance in entries between the entry associated with the particular operation and the entry associated with the oldest conflicting operation. In some embodiments, the information reported on detecting a conflict for a particular operation includes an indication of all of the conflicting operations, such as a bit-vector indicating which entries, if any, among all entries of the MOQ memory 20 are associated with conflicting operations. Conflicting entries are matching entries that are younger.

In some embodiments, a conflict detected for a particular operation aborts a particular trace containing the particular operation. In some embodiments, aborting the particular trace also aborts all younger (in predicted execution order) traces. In some embodiments, in response to a particular trace being aborted, the TU 13 reparations or otherwise re-arranges operations of one or more traces, including the particular trace. In various embodiments, the repartitioning and/or rearranging comprises one or more of: fetching the particular trace as basic block traces or multi-block traces, fetching the particular trace by decoding single operations, fetching the particular trace as basic block traces up to a mispredicted branch and then not fetching the remainder of that trace, instead fetching another trace corresponding to a correct branch destination. In various embodiments, in response to a particular trace being aborted, the TU 13 updates side information associated with the particular trace, or with one or more operations of the particular trace, so that at least some behavior of the trace is changed when it is re-issued.

In some embodiments, the issue unit 114 issues operations to one or more execution units in a first execution order, and in response to a conflict detected for a particular operation, re-issues at least some of the operations in a different execution order. In various embodiments, side information provided by the TU 13 enables the issue unit 114 to re-issue the at least some of the operations in the different execution order. In some embodiments, an intervening abort may occur. In some embodiments, a conflict detected for a particular instruction reports information related to the operation that caused the conflict, and to an oldest (in a predicted execution order) operation among all conflicting operations; the conflict information enables the issue unit 114 to re-issue the oldest conflicting operation after the particular operation. The conflict information enables the issue unit 114 to re-issue all conflicting operations after the particular operation. In various embodiments, when a particular operation is first issued, the particular operation is associated with a particular entry of the MOQ memory 20; when the particular operation is subsequently re-issued in response to a detected conflict, the particular operation is not necessarily associated with the particular entry of the MOQ memory 20, rather, a different MOQ entry may be allocated.

In some embodiments, the issue unit 114 issues operations to one or more execution units in an execution order that is different from a predicted execution order in which the issue unit 114 received the operations. In some embodiments, a memory-accessing operation that misses in the L1 cache 17 is cancelled, a trace containing the memory-accessing operation is not aborted due to the cache miss, and the memory-accessing operation is re-issued once the cache miss is resolved. Resolving a cache miss may require an internal eviction of a cache line to make room for a replacement cache line. In various embodiments, in response to an internal eviction of a cache line, conflict detection is performed.

In some embodiments, a delayed store buffer (DSB) or load-bypass buffer (LBB) comprises a plurality of entries, and each entry is caused to hold (or save) data and address and a respective trace ID. While not shown in FIG. 11, the store operation buffer 81 is located in the MU 15. Alternatively, the store operation buffer 81 is located externally to the MU 15. The store operation buffer 81 may be a DSB or a LBB (also known as store-forwarding buffer). The store operation buffer 81, may be referred to herein as a DSB, however, used in either manner, the store operation buffer 81 may be other types of buffer, as previously discussed.

In some embodiments, each one of a plurality of particular store operations is allocated a respective entry in the store operation buffer 81, and a respective trace ID of the each particular store operation is stored in the respective entry of the store operation buffer 81. In various embodiments, committing a particular trace is contingent, at least in part, on any and all valid entry of the store operation buffer 81 having a respective trace ID the same as a trace ID of the particular trace being flushed to a cache. In various embodiments, committing or aborting a particular trace is contingent, at least in part, on any valid entry of the store operation buffer 81 having a respective trace ID the same as a trace ID of the particular trace being flushed to a cache or invalidated. In some embodiments where a particular trace is aborted in response to a conflict detection, a versioning cache circuit rollback in response to the conflict detection is contingent and with DSB entries matching any of the (younger) traces being aborted.

In various embodiments, (external) snoop requests enter a processor (and/or a core of a processor) from a source external to the processor (and/or to the core). Returning data in response to a snoop request is via selective merging of current cache state with prior cache states of zero or more VCC memory 23 entries enables the effects of speculative modification of the L1 cache 17 to be hidden from the snoop request.

In some embodiments, (external) snoop requests are looked up in a cache of the processor (and/or of the core). Snoop requests, as used hereon, refer to external snoop requests. If the snoop request hits a line in the cache, tag state of the line is optionally changed (based on a type of the snoop request). In further embodiments, in response to a snoop request hitting a line in the cache, a response is returned including an indication of a tag state of the line, and optionally data of the line. In some embodiments, in response to a snoop request, a conflict detection is performed, and in response to a detected conflict, one or more traces (or operations) are aborted.

In various embodiments where speculative modification of the cache is performed, a snoop request hitting a line in the cache also results in a look-up to determine if one or more VCC memory entries of the VCC 22 contain prior cache states of the line. To return data of the line, data read from the line in the cache is selectively merged with the prior cache states read from the one or more VCC memory entries hit by the snoop request.

In some embodiments, an internal eviction is a result of cache operation, such as due to a cache miss. For example, a cache line must be removed (evicted) from the L1 cache 17 to make room for a replacement cache line satisfying the cache miss. In various embodiments, an internal eviction is treated similarly to a snoop request. According to various embodiments, a conflict detection is performed in response to a snoop request and/or an internal eviction. In some embodiments, a detected conflict due to a snoop request (or an internal eviction) aborts one or more traces. In various embodiments, a type of conflict information reported for a snoop request conflict differs from a type of conflict information reported for an internal eviction.

In some embodiments, conflict detection is performed in response to a snoop request. In some embodiments and/or usage scenarios, a snoop request accesses a cache, and a conflict detection is performed only if the snoop request hits in the cache (e.g. the conflict detection is omitted if the snoop request misses in the cache). In various embodiments, a snoop request is treated as being older (in a predicted execution order) than any outstanding (i.e., issued but not committed, aborted, or cancelled) operation, so that the snoop request detects a conflict if any outstanding operation has an execution-derived key matching a key of the snoop request. In some embodiments, a key of a snoop request comprises a portion of an address of the snoop request. In some embodiments, a key of a snoop request comprises a cache way number and an index into the given cache way, the key specifying a cache location accessible by an address of the snoop request. In some embodiments, conflict information produced by a snoop request conflict detection comprises one or more of: an indication that the detected conflict was due to a snoop request; and a respective trace ID of an oldest conflicting entry.

In various embodiments, an internal eviction is processed similarly to a snoop request, optionally with contents of conflict information customized for internal evictions. In some embodiments, conflict information produced by an internal eviction conflict detection comprises an indication that the detected conflict was due to an internal eviction. In some embodiments, conflict information for an internal eviction is reported similarly to conflict information for an instruction conflict, since the internal eviction is caused by a first operation (that caused the internal eviction) conflicting with a second operation, and is thus a two-operation conflict. In some embodiments, conflict information for an internal eviction reports respective trace IDs of an operation causing the internal eviction, and of an operation conflicting with the operation causing the internal eviction. In some embodiments, conflict information for an internal eviction reports whether a respective trace ID of an operation causing the internal eviction is older, the same, or younger than a respective trace ID of an operation conflicting with the operation causing the internal eviction. In some embodiments, depending on the relative ages of the two conflicting instructions, the issue unit 114 is enabled to re-issue the two operations in a different order.

In various embodiments, the CDU 80 has a dedicated port for snoop requests (or internal evictions), enabling conflict detection for snoop request events (or internal eviction events) in parallel with other conflict detection events. In some embodiments, the CDU 80 has a dedicated port shared for both snoop requests and internal evictions, enabling conflict detection for a snoop request event or an internal eviction event in parallel with other conflict detection events. In further embodiments, a snoop request is higher priority than an internal eviction, so that if both a snoop request and an internal eviction arrive at a same time, the snoop request is granted the dedicated port.

In various embodiments enabled for execution of multiple operations in parallel, one or more operation execution slots are used to access the MOQ 19 to perform conflict detection for any combination of snoop requests and internal evictions, fully or partially in parallel, or fully or partially in series. In embodiments where multiple slots are employed, there may be no need to prioritize snoop requests and internal evictions because even these arrive at the same time, they are handled in parallel. However, in embodiments where a single slot or less slots than for which arriving snoop request and internal evictions can be handled, and a snoop request is higher priority than an internal eviction, the snoop request is granted the operation execution slot. In some embodiments, a specific one of a plurality of operation execution slots is reserved for a snoop request or an internal eviction. If a snoop request or an internal eviction is not present, then an operation is granted use of the specific operation execution slot.

In some embodiments, the VCC 22 returns data as part of a snoop response in a technique called a snoop merge. (An example of a snoop merge is shown in FIG. 24.) In some embodiments, a snoop request accesses the L1 cache 17, and if the snoop request hits in the cache, a cache line is read out and is used, in conjunction with data selectively merged from one or more VCC memory 23 entries, as a data portion of a snoop response. In some embodiments, a snoop request accesses the L1 cache 17, and if the snoop request hits in the cache, an identifier of the accessed cache location, such as a cache way number and an index within the given cache way, is used as at least a portion of a key of a snoop request event for a conflict detection. In some embodiments, a conflict detection is performed for a snoop request, producing a set of "hit" (conflicting) entries; each entry associated with a store operation is also associated with a respective one of the versioning cache registers, and the set of hit entries associated with store instructions is thus associated with a set of respective versioning cache registers.

In some embodiments, valid data in the VCC memory 23 is selectively merged with a cache line read from the L1 cache 17 in response to the snoop request to produce a snoop response. In some embodiments, the cache line read from the L1 cache 17 is further selectively merged with data from one or more entries of a delayed store buffer (or LBB), the selective merging is in accordance with highest priority for the valid data in a set of entries of the VCC memory 23, in accordance with middle priority for data of the delayed store buffer (or LBB), and in accordance with lowest priority for the cache line read from the L1 cache 17. In further embodiments, only oldest valid data in the set of entries of the VCC memory 23 is selectively merged with the cache line to produce the snoop response. For example, if the set of entries of the VCC memory 23 comprises more than one entry, then a particular entry contains a first-written prior cache state of the cache line, and the particular entry is selectively merged with the cache line, others of the set of entries of the VCC memory 23 having later-written prior cache states and thus not representing a pre-conflict state of the cache line. In various embodiments where the VCC 22 is divided into a plurality of partitions, a determination of the oldest valid data is made separately in each of the partitions. For example, only a first entry of the set of entries of the VCC memory 23 has valid data in a first partition position and is an oldest among the set of respective entries having valid data in the first partition position, and a second entry of the set of entries of the VCC memory 23 has valid data in a second partition position and is an oldest among the set of entries of the VCC memory 23 having valid data in the second partition position. Valid data of the first entry in the first partition position and valid data of the second entry in the second partition position are selectively merged with the cache line to produce the snoop response.

In some embodiments, the VCC 22 is enabled to perform a snoop merge and to record prior cache states associated with one or more operations in parallel. In some embodiments, recording of prior cache states associated with an operation is contingent on conflict detection for the operation being completed, thus enabling the conflict detection to affect data valid bits associated with the prior cache state.

In alternative embodiments, a snoop request performs a conflict detection against entries of the VCC memory 23 (or VCC entries), producing a set of conflicting associated VCC memory entries. In some embodiments, conflict detection is performed for a snoop request with respect to a group of VCC memory 23 entries, determining a set of conflicting VCC memory entries. In some embodiments, a snoop request that conflicts with a VCC memory entry, is enabled to invalidate the VCC memory entry (by, for example, clearing a valid bit of the VCC memory 23). In some embodiments where a respective prior cache state of a VCC memory entry includes a respective tag state, a snoop request that conflicts with the VCC entry is enabled to update the respective tag state. In various embodiments, a snoop invalidate request that conflicts with a VCC entry is enabled to invalidate the VCC entry. In various embodiments, a snoop downgrade request that conflicts with a VCC entry is enabled to downgrade the VCC entry (by, for example, changing the respective tag state). In some embodiments where a VCC entry comprises a MESI state, a snoop downgrade request that conflicts with the VCC entry is enabled to change the MESI state to shared. In some embodiments where a VCC entry comprises a clean/dirty bit, a snoop downgrade request that conflicts with the VCC entry is enabled to change the clean/dirty bit to indicate clean.

In some embodiments, a snoop request searches entries of the store operation buffer 81. In various embodiments, a read of a cache, such as the L1 cache 17, by a snoop request is accompanied by a search of the store operation buffer to determine if any of the entries of the store operation buffer have the same key as a key of the snoop request. In some embodiments, respective store data of an entry of the store operation buffer with a matching key is selectively merged into data read from the cache in response to the snoop request to, at least in part, produce a snoop data result. In various embodiments, selective merging of store data of the store operation buffer into data read from the cache occurs prior to selective merging of prior cache states of VCC memory 23 entries. In some embodiments, selective merging of data of the store operation buffer, data read from the cache, and data from prior cache states of VCC memory 23 entries to, at least in part, produce a snoop data result is in accordance with highest priority for data from prior cache states of VCC memory 23 entries, in accordance with middle priority for data of the store operation buffer, and in accordance with lowest priority for data read from the cache. In some embodiments, a store operation buffer contains only store data of speculative store operations, and data read from the cache without any merging from the store operation buffer is used to produce a snoop data result. In some embodiments, if the snoop request is an invalidation, entries of the store operation buffer with matching keys are invalidated.

In some embodiments, a conflict is not detected for a snoop request even if a key of the snoop request matches a key of an entry of the MOQ 19, depending on a type of the snoop request (e.g., invalidate or downgrade), and on types of one or more entries of the MRB 16. In some embodiments, if a key of a snoop request matches a respective key of one or more entries of the MRB 16, but all of the conflicting entries are of a load type, and all of the entries older than a youngest (in a predicted execution order) conflicting entry are valid (meaning that corresponding operations associated with the entries have written the entries), then the snoop request is reported to not conflict. In some embodiments, if a key of a snoop downgrade request matches a respective key of one or more entries of the MRB 16, but all of the conflicting entries are of a load type, and all of the entries older than a youngest (in a predicted execution order) conflicting entry are either valid (meaning that corresponding instructions associated with the entries have written the entries) or are associated with load instructions, then the snoop request is reported to not conflict.

In various embodiments, memory-accessing operations are issued to a plurality of pipeline stages of the processor 1, and a particular one or more pipeline stages are enabled for load operations to access the L1 cache 17 to produce a respective load result, and for store operations to produce a respective prior cache state for storing into respective VCC memory 23 entries. In some embodiments, store data of a store operation (that hits in the L1 cache 17) is compared with at least a portion of the respective prior cache state to determine if the store operation changes data in the L1 cache 17, or overwrites data in the L1 cache 17 with a same value. A store operation that overwrites data in the L1 cache 17 with the same value is termed a "silent store". In some embodiments, the respective prior cache state includes effects of selective merging of store data from a DSB (or LBB).

In some embodiments, a silent store is treated as a no-op that produces no side effects. In some embodiments where store operations are allocated respective VCC memory 23 entries subsequent to silent store detection, detection of a silent store suppresses allocation of a VCC memory entry. In some embodiments where store operations are allocated respective VCC memory 23 entries prior to silent store detection, detection of a silent store deallocates the respective VCC memory entry. In some embodiments where respective VCC memory 23 entries are associated with MOQ memory 20, detection of a silent store suppresses setting data valid bits of the respective VCC memory entries of the store operation.

In some embodiments, detection of a silent store suppresses writing of a respective entry in the MOQ memory 20. In some embodiments, detection of a silent store modifies status written into an entry in MOQ memory 20. In some embodiments, silent stores are recorded as load operations, not as store operations, and a type of operation in a status field of a respective MOQ memory 20 entry is changed from a store (or write) type to a load (or read) type for a silent store.

In some embodiments, detection of a silent store suppresses allocation and/or writing of an entry in the store operation buffer 81. In some embodiments, a store operation is allocated a respective store operation buffer entry prior to a pipeline stage where silent store detection occurs, and detection of a silent store deallocates the respective store operation buffer 81 entry. In some embodiments, a store operation is allocated a respective store operation buffer 81 entry prior to a pipeline stage where silent store detection occurs, the respective store operation buffer entry is updated by the store operation prior to a determination of silent store detection, and detection of a silent store invalidates and/or deallocates the respective store operation buffer entry. In some embodiments, the silent store detection suppresses setting data valid bits of the respective store operation buffer entry.

In some embodiments, a snoop response comprises a data portion and a tag portion. In some embodiments, a tag portion of a snoop response is provided by tag state stored in cache tags of the L1 cache 17. In various embodiments, a speculative store operation updates MESI state of a particular cache line to modified, and a snoop request hitting the particular cache line returns a MESI state of modified in a snoop response, even if a VCC rollback in response to the snoop request restores the particular cache line to a clean state. In various embodiments, VCC memory 23 do not comprise cache tag states (and all data represented in VCC memory 23 is assumed to be modified), a speculative store operation updates MESI state of a particular cache line to modified, and a snoop request hitting the particular cache line returns a MESI state of modified in a snoop response.

In some embodiments, a tag portion of a snoop response to a snoop request specifies a modified state if any VCC memory 23 data that is selectively merged into data read from the L1 cache 17 to form a data portion of the snoop response is specified as modified in a respective VCC memory entry storing the VCC data. In some embodiments, a tag portion of a snoop response to a snoop request specifies an unmodified state if data read from the L1 cache 17 in response to the snoop request is unmodified, or if all VCC memory data that is selectively merged into the data read from the cache is specified as unmodified in respective VCC memory entries storing the VCC data.

In an exemplary case, a store operation associated with a trace has created and/or updated a store operation buffer entry, and is about to, or has already, modified a line in the L1 cache 17, when a snoop downgrade is received for the cache line. In some embodiments, an abort event is generated because the snoop downgrade hits an uncommitted store. In some embodiments, an abort event is not generated even though the snoop downgrade hits an uncommitted store, and a snoop response is returned, including selectively merging data from a VCC if a snoop data response is required.

If the snoop downgrade hits one or more entries in the VCC, saved tag state associated with the entries is changed to shared (so that in the event of a VCC rollback, the cache line is restored to a correct tag state considering the snoop downgrade). In some embodiments where VCC entries have a clean/dirty bit, an additional state bit in each VCC entry is used to track a "hit by a snoop downgrade" condition. In some embodiments, tag state of the cache line in the cache is not affected by the snoop downgrade, and is set to modified (if not already in that state) when the store operation buffer entry associated with the store operation is flushed to the cache.

If the snoop downgrade hits one or more entries in store operation buffer, the entries are not invalidated.

Generally, a cache coherency request is generated to obtain the cache line in an exclusive state.

In some embodiments, additional state in an MOQ entry and/or a store operation buffer entry associated with the store operation indicates that a trace associated with the store operation is not enabled to be committed until the cache line is obtained in an exclusive state. If the cache line state update arrives prior to all operations of the trace completing execution (a condition that, without the additional state, enables the trace to be committed), then the additional state in the MOQ and/or store operation buffer entry is cleared. If all operations of the trace complete execution prior to the cache line state update arriving, then the trace commit is delayed until the cache line state update arrives. In some embodiments where additional state is added to the store operation buffer, a mechanism associated with the store operation buffer that delays a trace commit until store operation buffer entries associated with the trace have been flushed so the cache is used, at least in part, to delay the trace commit until the cache line state update arrives.

A non-downgrade snoop request (e.g., a snoop invalidate) that hits the store operation causes an abort event, and rollback from the VCC 22 restores proper cache line data and tag state.

In some embodiments, if the cache coherency request is satisfied without an intervening non-downgrade snoop request, the trace associated with the store operation is no longer delayed from committing by the store operation.

FIG. 14 illustrates selected details of an embodiment of one of the cores of the processor 1 of FIG. 11. In FIG. 14, paths illustrated with solid lines represent operation flow down a pipeline of the core; paths illustrated in dashed lines represent other information in the core such as control signals. Instructions enter core 103.1 via path 202 from the TU 13. In some embodiments, operations are provided to issue unit 114 of the core in the form of traces or portions thereof, each operation having an associated trace ID. In some embodiments, individual operations are provided serially, and each operation is accompanied by a trace ID. In some embodiments, operations are provided in groups of one or more operations, and each group has a trace ID. In some embodiments, one trace ID is used per trace. In various embodiments and usage scenarios, operations of the group are provided one at a time (e.g. serially) or alternatively several at a time (e.g. in parallel). In some embodiments, the operations are substantially unchanged from a form the operations had in an operation image, such as traces 132, as illustrated in FIG. 11. In other embodiments, a TU 13 processes the operations into an internal format, and processed operations are delivered to the core. In some embodiments, single operations in an operation stream become multiple, processed operations as provided by the TU 13. For example, a particular complex CISC operation is translated into multiple RISC operations. In some embodiments, multiple operations in an operation stream become single, processed operations as provided by the TU 13. For example, a sequence of simple operations becomes a single, complex operation. In some embodiments, the TU 13 provides auxiliary information with at least some of the operations, such as whether a memory access performed by a particular operation is predicted to be cacheable or non-cacheable. In some embodiments, the auxiliary information for a particular operation is determined from previous execution(s) of the particular operation. In some embodiments, the auxiliary information for a particular operation is determined from some higher-level mechanism, such as via software used to create a trace for a portion of an operation stream.

In some embodiments, issue unit 114 receives operations from TU 13 in a required order. In some embodiments, issue unit 114 receives at least a subset of operations with execution-based ordering constraints from the TU 13 in a required order. In some embodiments, the required order is the same as an architectural program order. In some embodiments, the required order is the same as a predicted execution order. In some embodiments, execution-based ordering constraints include architectural memory-accessing operation ordering constraints. In some embodiments, a first operation is older than a second operation if the first operation occurs earlier in a required order than the second operation. In some embodiments, each operation is associated with a trace ID, and a first trace is older than a second trace if operations in the first trace occur earlier in a required order than operations in the second trace.

In some embodiments, a dynamic operation flow, such as due to branch operations, defines a required order of executing basic block or multi-block traces, but does not change a required order within a basic block or multi-block trace. In some embodiments, some operations in basic block traces are issued speculatively based upon expectations as to a dynamic required order of basic block traces. If there is a mis-speculation due to an incorrect order of basic block traces being used, then any operations issued speculatively beyond the mis-speculation are aborted, and then operation issue resumes at a correct basic block trace in the dynamic required order.

Issue unit 114 determines a type of each received operation, and determines which of the execution and/or memory units will process the operation. In some embodiments, issue unit 114 executes certain operations, such as branch operations, and hence acts as an execution unit 14. In some embodiments, all operations of a type executed by the MU 15, are allocated an entry in the MOQ 19 and more particularly, the MOQ memory 20 in the MOQ 19. In other embodiments, not all operations of a type executed by the MU 15 are allocated an entry in MOQ 19. For example, in some embodiments, ordering constraints relating to non-cacheable memory-accessing operations are managed in other ways, such as by temporarily using in-order issuing of operations. In some embodiments, issue unit 114 communicates information, such as a current value of an MOQ allocation pointer, to the MOQ 19 via path 212. In some embodiments, MOQ 19 communicates information to issue unit 114, such as a current value of the MOQ 19 head pointer 44.

In the embodiment of FIG. 14, the MOQ 19 is shown to include the CDU 80, discussed hereinabove.

Issue unit 114 issues operations to one or more execution and/or memory units, such as the XU 14 and MU 15, via path 214. In some embodiments issue unit 114 performs out-of-order issue, where operations are issued based, at least in part, upon one or more of dependencies and availability of resources. In some embodiments, out-of-order issue, by default, ignores architectural, address-based, memory-ordering dependencies, and sometimes results in ordering violations. In some embodiments, operations are issued one per clock cycle.

In some embodiments, issue unit 114 is enabled to issue multiple operations in parallel to one or more execution and/or memory units. In some embodiments, issue unit 114 sends additional information, such as a trace ID, to execution and/or memory units along with each operation. In some embodiments, issue unit 114 does not preserve an in order of load and store operations within a trace, and enables a load or store operation from a trace to be issued prior to a load or store operation from the same trace. However, the order across traces is preserved. For example, load and store operations of a first trace are issued out of order with respect to each other. Further in the example, load and store operations of a second trace are issued out of order with respect to each other. Continuing the example, the load and store operations of the first trace are, under some conditions, issued in order with respect to the load and store operations of the second trace.

In some embodiments, additional information provided from TU 13 to issue unit 114 for a trace indicates if the trace is constructed to enable speculative and/or out-of-order issue of load and/or store operations within the trace. In some embodiments, additional information provided from TU 13 to issue unit 114 with an operation indicates if speculative and/or out-of-order issue of the operation is enabled. In some embodiments, speculative execution and out-of-order execution are independently enabled by respective machine-state registers.

In some embodiments, a load or store operation that is issued and subsequently misses in the L1 cache 17 is canceled and returned to issue unit 114 to be subsequently re-issued when the L1 cache 17 has been updated to contain a cache line on which the load or store operation missed. In some embodiments, an internal eviction due to a miss in the L1 cache 17 is processed similarly to a snoop request. In some embodiments, a store operation is issued and subsequently finds that a cache line the store operation is enabled to modify is not in a modifiable state in the L1 cache 17; the store operation is canceled and returned to issue unit 114 to be subsequently re-issued when the L1 cache 17 has been updated to have the cache line in a modifiable state.

As illustrated in FIG. 14, IU 115 and MU 15 are coupled to finish unit 118 via operation paths 235 and 236 respectively, enabling the finish unit 118 to record completion of execution of operations. In some embodiments, IU 115 and MU 15 are coupled to abort unit 117 via control paths 245 and 246, respectively, to report exceptional events that conditionally occur during execution of an operation. In some embodiments, IU 115 and MU 15 are coupled to finish unit 118 by control paths (not illustrated in FIG. 14) to report exceptional events that conditionally occur during execution of an operation. In various embodiments, MOQ 19 is coupled to abort unit 117 via path 251 to trigger an abort event upon detection of an ordering violation.

In the embodiment of FIG. 14, abort unit 117 is coupled to finish unit 118 via path 288 to communicate abort events and/or other exceptional events. In alternative embodiments, the abort unit 117 and the finish unit 118 are combined into a single unit. In still alternative embodiments, either or both of the abort unit 117 and the finish unit 118 are merged in whole or in part with one or more of the IU 115 and/or MU 15. In further alternative embodiments, the abort unit 117 is combined in whole or in part with the Memory Ordering Queue.

In the embodiment of FIG. 14, finish unit 118 is coupled to issue unit 114 via path 282 in order to exchange information about issuing and completing/aborting of operations. In some embodiments, the finish unit 118 communicates an abort event to the issue unit 114 as a trace ID. In response, zero or more traces are aborted, including the trace identified by the trace ID (if not yet committed) and all younger traces. Subsequently, operation issuing and executing resumes. In some embodiments, information communicated to issue unit 114 due to an abort event enables the issue unit to re-issue operations in a different fashion that avoids repeating a cause of the abort event. For example, an abort event identifying two conflicting operations enables a subsequent re-issue of the two conflicting operations in a non-conflicting order.

In some embodiments, an abort event reports an oldest conflicting operation, and a distance in the number of MOQ entries (which are MOQ memory 20 entries) between an MOQ entry associated with the oldest conflicting operation and an MOQ entry associated with a younger conflicting operation. The younger conflicting operation is prevented from re-issuing until the older conflicting operation has re-issued by clearing a dependency for the younger conflicting operation in response to re-issue of the oldest conflicting operation. The dependency is computed, at least in part, based on the distance in the number of MOQ entries. In some embodiments, in response to the re-issue of the oldest conflicting operation, dependencies for a list of younger conflicting operations are cleared, based on distances in MOQ entries between an MOQ entry associated with the oldest conflicting operation and MOQ entries associated with the younger conflicting operations. In some embodiments the list of younger conflicting operations is represented as a bit-vector, with one bit for each MOQ entry after an MOQ entry associated with the oldest conflicting operation. In some embodiments, execution of an operation results in an internal eviction, and the internal eviction results in a conflict with another operation. The conflict is reported as a trace ID corresponding to the executed operation and a trace ID corresponding to the other operation. A relative age of the respective trace IDs enables issue unit 114 to re-issue operations in the traces in order to avoid a repeat of the conflict.

Still referring to FIG. 14, MU 15 is coupled to L1 cache 17, to VCC 22, and to MOQ 19. Operations executing in MU 15 are enabled to access L1 cache 17. In some embodiments, a combination of L1 cache 17 and VCC 22, are included in a versioning cache circuit that enables an out-of-order and/or speculative execution processor to roll back prior cache states when an ordering violation and/or a mis-speculation is reported. In some embodiments, MOQ 19 detects conflicts arising from improper out-of-order execution.

Circuit or sub-circuits, as used herein, refer to the structures or any combination thereof of the processor 1. For example, a circuit (or sub-circuit) may comprise the MOQ 19 (or any components thereof) and the L1 cache 17 or the VCC 22 (or any components thereof) and the L1 cache 17.

It is noted that execution of a memory operation is performed by the XU 14 and the MU 15 collectively. In particular, the IU 115 starts the execution of a memory operation by generating a linear address. The MU 15 then performs the DCA and DFR stages, as previously discussed, and sends the load data to the IU 115, which finishes the execution.

In some embodiments, upon substantial or at least partial completion of execution of a memory-accessing operation that has been allocated an entry in MOQ 19, the entry in the MOQ 19 is written with status information for the operation. In various embodiments, the status information comprises one or more of: a trace ID corresponding to the operation; type information for the operation, such as whether the operation is a load or a store; byte/Dword marks; and a key generated by execution of the operation, such as an execution-derived key. In some embodiments, the key comprises at least a portion of a memory address accessed by the operation. In some embodiments, the key comprises a unique identifier of a location in the L1 cache 17 accessed by the operation.

Core 103.1 is adapted to receive cache coherency snoop requests, illustrated as snoop request 290 in FIG. 14. In various embodiments, the snoop requests are of various types, such as but not limited to, a snoop invalidate request, a snoop downgrade request, or both. In some embodiments, snoop request 290 is provided to issue unit 114. In other embodiments not described by FIG. 14, the snoop request is provided to MOQ 19. The snoop request 290 is typically issued by issue unit 114 to MU 15 as a special type of operation. The MOQ 19 receives the snoop request from MU 15. In response to snoop request 290, an operation pipeline is optionally stalled to provide a later clock cycle and/or a pipeline slot to access MOQ 19. The snoop request 290 accesses MOQ 19 to determine if there are any conflicts between the snoop request and any uncommitted memory-accessing operations. The snoop request 290 causes an access to L1 cache 17 to determine if the snoop request hits in the L1 cache 17, and if so, to retrieve a cache line used to construct a response to the snoop request.

A hit/miss (and associated cache state) result of the snoop request accessing the L1 cache 17 is returned as at least a portion of snoop response 291. The L1 cache 17 is generally the source of snoop response 291. In other embodiments not described by FIG. 14, MU 15 or other related control logic is the source of snoop response 291.

In some embodiments, a cache line read from the L1 cache 17 is selectively merged with data from VCC 22 prior to being returned as snoop data response 292. In some embodiments, information obtained from a conflict check between the snoop request and contents of the MOQ 19 is used at least in part to selectively control merging of data from VCC 22 with a cache line read from L1 cache 17. In some embodiments, information obtained from a conflict check between the snoop request and contents of the VCC memory 23 is used at least in part to selectively control merging of data from the VCC 22 with a cache line read from the L1 cache 17.

FIG. 15 illustrates selected details of an embodiment of pipeline processing of one of the cores of the processor 1 of FIG. 11, including stages relating to MOQ 19 and VCC 22 functions. Stages that are illustrated at a same horizontal position are, in some embodiments, contemporaneous and occur in a same clock cycle. Stages illustrated as connected by arrows occur, in some embodiments, on sequential clock cycles. In the following description associated with FIG. 15, a conceptual descriptive style is used. A stage is conceptually described as performing one or more actions, meaning logic operating in accordance with the stage performs the actions.

The pipeline is illustrated as three groups of stages relating to operation flow in the core (operation pipeline stages 396), to operation of a MOQ 19 (MOQ 19 pipeline stages 397), and to operation of a VCC 22 (VCC pipeline stages 398). Some groups of pipeline stages do not have activity on a given clock cycle. For example, during schedule pipeline stage 321, the MOQ 19 and VCC 22 do not perform functions related to an operation in the schedule pipeline stage. During data cache validation pipeline stage 324, however, the VCC 22 is written (VCC write 364) corresponding to an operation in the data cache validation pipeline stage, and following data cache validation pipeline stage 324, the MOQ 19 is written (MOQ 19 write 345) corresponding to an operation in a pipeline stage following the data cache validation pipeline stage.

Operations from earlier pipeline stages, provided in some embodiments by a TU 13, as illustrated in FIG. 11, enter one or more of the groups of pipeline stages. As illustrated in FIG. 15, operations from earlier pipeline stages 302 enter the operation pipeline stages (as input to rename pipeline stage 320) and the MOQ 19 pipeline stages (as input to MOQ ID assign pipeline stage 340).

Operations pipeline stages 396 relate to issuing and executing operations. In some embodiments, the operation pipeline stages comprise rename pipeline stage 320, operation scheduling pipeline stage 321, execute pipeline stage 322, data cache access pipeline stage 323, and data cache validation pipeline stage 324. Of course, many pipeline arrangements are possible, and FIG. 15 illustrates one of many possible operation pipelines.

In some embodiments, an issue unit 114, as illustrated in FIG. 14, is associated with both rename pipeline stage 320 and operation scheduling pipeline stage 321. In some embodiments, one or more execution units, such as execution unit 14 and memory unit 15, as illustrated in FIG. 14, are associated with execute pipeline stage 322. In some embodiments, a memory unit and a cache, such as memory unit 15 and L1 cache 17, as illustrated in FIG. 14, are associated with both data cache access pipeline stage 323 and data cache validation pipeline stage 324. In some embodiments, a finish unit 118 as illustrated in FIG. 14, is associated with both non-MOQ 19 finish pipeline stage 325 and MOQ 19 finish pipeline stage 331.

In some embodiments, multiple operations are issued down an operation pipeline in a single clock cycle, and pipeline stages such as rename 320, schedule 321, and execute 322 are enabled to process multiple operations in a single clock cycle. In some embodiments, multiple operations issued in a single clock cycle all go to different execution units 14. In other embodiments, one or more execution units 14 are enabled to process multiple operations in a single clock cycle or in a single pipeline stage. Multiple operations are executed (by MU 15) in a single clock cycle. In some embodiments, multiple memory-accessing operations executing in a single clock cycle each generate an address during execute pipeline stage 322, and addresses generated by the multiple memory-accessing operations are checked to determine if there is a bank collision between any of the addresses. In an event of one or more bank collisions, all but one of the memory-accessing operations associated with each of the bank collision are returned to schedule pipeline stage 321, so that no more than one memory-accessing operation accesses each bank of the cache in a given clock cycle or pipeline stage. In some embodiments, virtual addresses are generated, and the virtual addresses are then translated to physical addresses, such as by an address translation mechanism. In various embodiments, later pipeline stages use virtual and/or physical addresses.

MOQ 19 pipeline stages 397 determine whether an ordering violation resulting from an architecturally invalid out-of-order execution of one or more operations occurs during execution of operations in operation pipeline stages 396. In some embodiments, results of the MOQ 19 pipeline stage comprise an indication of an ordering violation 391, and conflict information 394 providing details on a cause of the ordering violation so that the ordering violation is avoided on a subsequent re-execution. Of course, many pipeline arrangements are possible, and FIG. 15 illustrates one of many possible arrangements of MOQ 19 pipeline stages.

An initial stage in the MOQ 19 pipeline stages, MOQ ID assign pipeline stage 340, operates, in some embodiments, prior to operation issue, such as in parallel with rename pipeline stage 320. MOQ ID assign pipeline stage 340 assigns MOQ 19 IDs to operations requiring entries in the MOQ 19. In some embodiments, unavailability of MOQ memory 20 entries delays operations from issuing, as indicated by path 339. In some embodiments, after MOQ ID assign pipeline stage 340, the MOQ 19 pipeline stages have no activity corresponding to operations in the operation pipeline stages until after completion of data cache validation pipeline stage 324.

The MOQ 19 pipeline stages continue past a completion of execution point in the operation pipeline stages (data cache validation pipeline stage 324). In some embodiments, operations that do not use the MOQ 19, such as non-memory-accessing operations, complete processing and are committed in non-MOQ 19 finish pipeline stage 325. In some embodiments, operations that do use the MOQ 19 complete processing and are committed in MOQ 19 finish pipeline stage 331. For example, for an out-of-order, memory-accessing operation, MOQ 19 finish pipeline stage 331 of the operation pipeline stages is not enabled to complete (and the operation is not committed) until after conflict detection for the operation is completed by the MOQ 19 pipeline stages, subsequent to MOQ 19 violation pipeline stage 348.

It is noted that the pipeline stage 346 is analogous to the MO1 47 stage and the pipeline stage 347 is analogous to the MO2 48 stage and the pipeline stage 348 is analogous to the MO3 49 stage and the pipeline stage 349 is analogous to the MO4 50 stage.

In some embodiments, the operation pipeline stages comprise "empty" pipeline stages 326 between non-MOQ 19 finish pipeline stage 325 and MOQ 19 finish pipeline stage 331 so that MOQ 19 finish pipeline stage 331 occurs subsequent to MOQ 19 violation pipeline stage 348. In other embodiments, operation state saved during earlier stages of the operation pipeline is accessed subsequent to MOQ 19 violation pipeline stage 348 via corresponding state traveling down the MOQ 19 pipeline stages. In some embodiments, MOQ 19 constraint pipeline stage 349 completes the MOQ 19 pipeline stages by further processing a detected ordering violation to produce conflict information that is used to identify a cause of the ordering violation.

In some embodiments, a trace of operations is committed contingent on all of the operations of the trace having completed execution. In some embodiments, a trace of operations is, at least in part, eligible to be committed when all of the operations of the trace have completed execution and conflict detection without any conflicts (such as due to an ordering violation) being detected. In some embodiments, operations that use the MOQ 19 complete after operations that do not use the MOQ 19, to enable performing MOQ 19 conflict detection prior to completion. For example, as illustrated in FIG. 15, an operation that does not use the MOQ 19 completes in non-MOQ 19 finish pipeline stage 325, whereas an operation that uses the MOQ 19 completes four pipeline stages later in MOQ 19 finish pipeline stage 331. In various embodiments completion of issued operations is delayed by a number of pipeline stages to perform conflict detection in the MOQ 19 pipeline stages on at least some of the issued operations.

In some embodiments, the operation pipeline stages are optimized for high performance. In some embodiments, the MOQ 19 pipeline stages are optimized for low power. In some embodiments, the MOQ 19 pipeline stages extend many stages past a completion of execution point in the operation pipeline stages, since in some usage scenarios a performance impact due to a length of MOQ 19 pipeline stages is of lower importance than power savings.

VCC pipeline stages 398 as illustrated in FIG. 15 write a VCC 22. In some embodiments, subsequent to data cache access pipeline stage 323, some or all of a cache line read from the cache is written into one or more entries in the VCC 22 during VCC write pipeline stage 364. In some embodiments, a rollback function of the VCC 22 is performed after operation execution is interrupted, such as due to an ordering violation being detected, and occurs outside a scope of pipeline processing illustrated in FIG. 15. In some embodiments, a snoop-merging function of the VCC 22 occurs during pipeline processing illustrated in FIG. 15, but is an orthogonal function with respect to pipeline processing of operations, and does not occur in any particular pipeline stage with respect to a given operation.

The data cache access pipeline stage 323 is analogous to the DCA 45 stage and the data cache validation pipeline stage 324 is analogous to the DFR 46 stage.

Figure 16G:
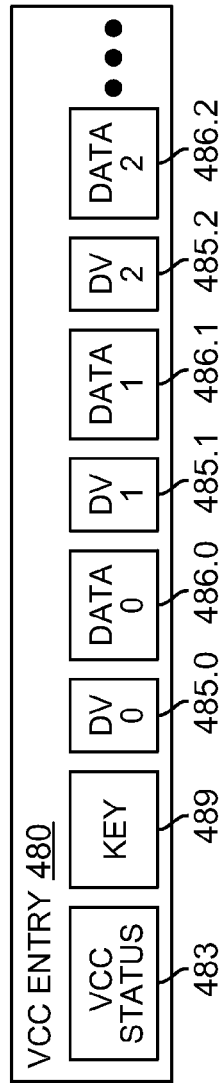
Figure 16H:
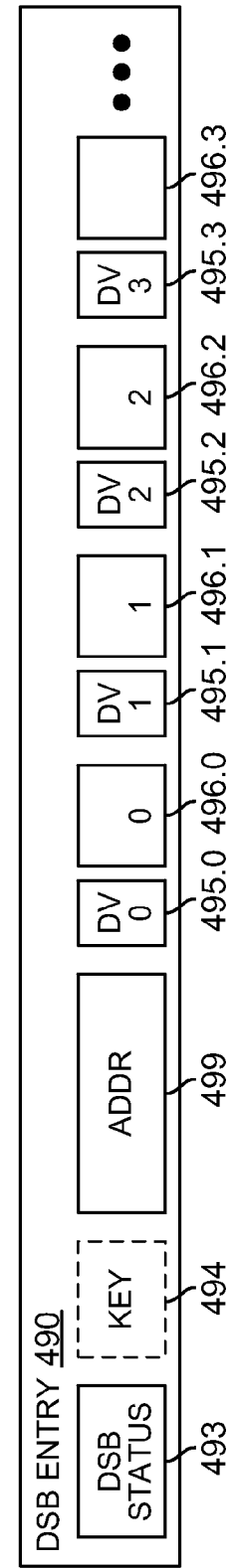

FIGS. 16A-16H illustrate selected details of embodiments of data structures used in one of the cores of the computer processing system of FIG. 11. FIGS. 16A, 16C, and 16E illustrate embodiments of MOQ 19 entries. FIGS. 16B, 16D, 16F, and 16G illustrate embodiments of VCC 19 entries. FIG. 16H illustrates an embodiment of a DSB entry. In some embodiments of processors with both an MOQ 19 and a VCC 22, FIG. 16A represents an MOQ memory 20 entry and FIG. 16B represents a related VCC memory 23 entry. In some embodiments of processors with both an MOQ 19 and a VCC 22, FIG. 16C represents an MOQ memory 20 entry and FIG. 16D represents a related VCC memory 23 entry. In some embodiments of processors with both an MOQ 19 and a VCC 22, FIG. 16E represents an MOQ memory 20 entry and FIG. 16F represents a related VCC memory 23 entry. FIG. 16G represents an embodiment of a VCC memory 23 entry for usage without an associated MOQ memory 20 entry. In some embodiments with an MOQ 19 but without a VCC 22, either of FIG. 16A or 16C represents an MOQ memory 20 entry.

In some embodiments, MOQ memory 20 entries and/or VCC memory 23 entries comprise one or more data valid bits, such as data valid bits 475.00, 475.01, . . . as illustrated in FIG. 16E. In some embodiments, VCC memory 23 entries comprise one or more data fields, such as data fields 456.0, 456.1, 456.2, . . ., as illustrated in FIG. 16B. In some embodiments, such as illustrated in FIGS. 16B, 16D and 16H, VCC memory 23 entries and/or DSB entries comprise one or more pairs of data valid bits and associated data fields. Use of ellipsis in FIGS. 16A-16H represents variability of a number of data valid bits and/or data fields in various embodiments.

MOQ memory 20 entries are associated with a MOQ memory 20, and VCC memory 23 entries are associated with a VCC memory 23 processor 1. A size of a MOQ memory 20 and a VCC memory 23 varies with different embodiments. In some embodiments, a size of a MOQ memory 20 used by MOQ memory 20 entries is not the same as a size of a VCC memory 23 used by VCC memory 23 entries in a same processor 1 and/or a same core of a processor 1. In some embodiments, MOQ 19 or VCC memory 23 entries comprise a key, such as an execution-derived key, associated with a memory. The key serves as a unique identifier of the MOQ memory 20/VCC memory 23 ("a memory"). In some embodiments, a key identifies a MOQ memory 20/VCC memory 23 while the memory is mirrored in a location of a cache, and the key no longer identifies the memory when the memory is no longer mirrored in the location of the cache. For example, an identifier of a location in a cache is a unique identifier of a region of memory currently stored in the cache, but does not remain unique once the location in the cache is invalidated, or once a different region of memory is mirrored in the location in the cache. In some embodiments where the key is an identifier of a location in a cache, MOQ 19 and/or VCC memory 23 entries with the key, or the entire MOQ 19 and/or VCC, are invalidated if the location in the cache becomes associated with a different MOQ memory 20/VCC memory 23.

In some embodiments, the MOQ memory 20 associated with an MOQ memory 20 entry and a VCC memory 23 associated with a VCC memory 23 entry is aligned according to size. For example, a MOQ memory 20 associated with an MOQ memory 20 entry is a cache line (properly aligned on a cache-line boundary), and a VCC memory 23 associated with a VCC memory 23 entry is a double-word (properly aligned on a double-word boundary). In some embodiments, load and/or store operations access a memory operand that spans (crosses) boundaries of a MOQ memory 20 and/or a VCC memory 23, thus accessing two adjacent memories. In some embodiments, MOQ 19 and/or VCC memory 23 entries comprise two keys so that load and/or store operations having memory accesses spanning a region boundary are associated with a single MOQ 19 and/or VCC memory 23 entry. In some embodiments, having a single entry (of an MOQ 19 or a VCC 22) with two keys provides the ability for the single entry to track memory accessible by an associated load and/or store operation. Similarly, in some embodiments, VCC memory 23 entries provide storage for data spanning a memory boundary.

In some embodiments, a size of a MOQ memory 20 and/or a VCC memory 23 is a double-word. In some embodiments, a size of a MOQ memory 20 and/or a VCC memory 23 is a cache line. In some embodiments, a size of a MOQ memory 20 and/or a VCC memory 23 is a largest size of memory accessible by a load and/or store operation.

In some embodiments, a MOQ memory 20 and/or a VCC memory 23 is a multiple of a largest size of memory accessible by a load and/or store operation, and the MOQ 19 and/or VCC memory 23 entry independently tracks, using valid bits, a portion of the respective memory accessed by the load and/or store operation. For example, in some embodiments, a MOQ memory 20 and/or a VCC memory 23 is a cache line, and a load and/or store operation is enabled to access, at most, a double-word. If there are eight double-words in a cache line, then the MOQ 19 and/or VCC memory 23 entry has eight valid bits to track the double-words in the cache-line that have been accessed. Continuing the example, a load and/or store operation accessing memory spanning a region boundary sets two valid bits in an associated entry. Multiple load and/or store operations associated with a single entry (because, in part, the load and/or store operations access a same region of memory) each set one or two valid bits, and different load and/or store operations selectively set same or different valid bits.

Without loss of generality, parts of the description below refer to MOQ memory 20 entries and VCC memory 23 entries associated with a MOQ memory 20 or a VCC memory 23 respectively the size of a cache line. From the above description, different embodiments have different sizes of MOQ memory 20 and/or a VCC memory 23, and no limitations should be interpreted from specific examples below.

As illustrated in FIGS. 16A, 16C, and 16E, in some embodiments an MOQ memory 20 entry has one or more valid bits (413; 423.0, 423.1; and 433.0, 433.1, respectively) to indicate when some or all of the MOQ memory 20 entry contains valid information. MOQ memory 20 entries in FIGS. 16C and 16E have two valid bits to support two independent keys, thus enabling use of one entry for data that spans a memory region boundary, such as a cache line boundary.

As illustrated in FIGS. 16A, 16C, and 16E, in some embodiments MOQ memory 20 entries have one or more keys (415; 425.0, 425.1; and 435.0, 435.1, respectively). A key in an MOQ memory 20 entry is an identifier (such as an address) of a data item in memory of a processor. For example, in some embodiments, the key is used when determining whether a snoop request conflicts with an MOQ memory 20 entry. The MOQ memory 20 entries in FIGS. 16C and 16E have two keys so that one MOQ memory 20 entry contains an identifier for each of two memory regions, such as two cache lines, thus enabling one entry to specify data that spans a memory region boundary. In some embodiments, a single key (as illustrated in FIG. 16A) is used to specify data that spans a cache line boundary, with additional logic (not illustrated in FIG. 16A) to enable the single key to specify a first and a subsequent cache line.

In some embodiments, the key comprises information specifying a size of a data item associated with the MOQ memory 20 entry. In some embodiments, other fields in the MOQ memory 20 entry comprise information specifying directly or indirectly a size of a data item associated with the entry. For example, in some embodiments, a number of set data valid bits implies a size of a data item associated with the MOQ memory 20 entry. In some embodiments, the key, or other information in the MOQ memory 20 entry, comprises information specifying that a data item associated with the MOQ memory 20 entry spans a memory region boundary. In some embodiments, the key comprises some or all of a memory address of a data item. In some embodiments, the key comprises a cache way number and an index within the given way as an identifier of a cache line in a cache memory holding a data item. In various embodiments, the index is a subset of an address. In some embodiments, the key comprises a cache way number and an index within the given way to identify a cache line in a cache, and further comprises one or more lower-order address bits as an identifier of a portion of the cache line holding a data item, such as a double-word. In some embodiments, the lower-order address bits are represented in a decoded form as data valid bits. In some embodiments, the size of the data item is used at least in part to control a number of the data valid bits that are set. In some embodiments (not illustrated in FIGS. 16A, 16C, and 16E), the size of the data item is stored in the MOQ memory 20 entry. In some embodiments in which an MOQ memory 20 entry has two keys, such as illustrated in FIG. 16C, a first key represents a lower address and a second key represents an upper address. In some embodiments in which an MOQ memory 20 entry has two keys and when both keys are valid, incrementing a cache index of the first key produces a cache index of the second key, while a cache way of the first key and a cache way of the second key are independent.

As illustrated in FIGS. 16A, 16C, and 16E, in some embodiments MOQ memory 20 entries have one or more status fields (417; 427.0, 427.1; and 437.0, 437.1, respectively). The status in an MOQ memory 20 entry provides information relating to an operation associated with the entry, and/or with a key stored in the entry. In some embodiments, a key, rather than being treated as a separate field, is considered to be a sub-field of a status field.

As illustrated in FIG. 16E, in some embodiments MOQ memory 20 entries have data valid bits (475.00, 475.01, ..., 475.10, 475.11, ...). Data valid bits illustrated in the MOQ memory 20 entry in FIG. 16E are similar to data valid bits described in relation to VCC memory 23 entries in FIGS. 16B, 16D, and 16G. In embodiments that have both an MOQ 19 and a VCC, various fields, such as the data valid bits, are in either or both of an MOQ memory 20 entry and a related VCC memory 23 entry. A choice of which field is in which structure is dependent upon implementation details, such as how values of fields are generated, in what pipeline stage fields are first or most-easily available, in what pipeline stage or stages fields are used, etc. In some embodiments, data valid bits in an MOQ memory 20 entry are written at a same clock cycle or in a same pipeline stage as other data in the MOQ memory 20 entry. In some embodiments, data valid bits in an MOQ memory 20 entry are enabled to act as additional comparison information, providing a finer granularity than a key field. For example, in some embodiments, a key field in an MOQ memory 20 entry identifies a cache line, and one or more data valid bits identify one or more data items within the cache line.

As illustrated in FIGS. 16B, 16D, 16F, and 16G, in some embodiments VCC memory 23 entries have a status field (453, 463, 473, and 483, respectively). In some embodiments that have both an MOQ 19 and a VCC 22, a VCC memory 23 entry does not have a separate status field. Whether to include a status field in a VCC memory 23 entry in some embodiments depends on factors such as how and when a VCC memory 23 entry is accessed in relation to an associated MOQ memory 20 entry. In some embodiments, the status in a VCC memory 23 entry provides additional information regarding an interpretation of the VCC memory 23 entry, similar to status in an MOQ memory 20 entry. In some embodiments, status in a VCC memory 23 entry comprises an indication of a saved cache tag state corresponding to saved cache data in the VCC memory 23 entry. In some embodiments, saved cache tag state in a VCC memory 23 entry is a single bit indicating if corresponding saved cache data is clean or is dirty. In some embodiments, saved cache tag state in a VCC memory 23 entry is a complete MESI state of corresponding saved cache data. In some embodiments where VCC memory 23 entries correspond to more than one cache line of data, a VCC memory 23 entry has more than one status field, or a status field is capable of holding more than one saved cache tag state. In some embodiments, saved cache tag state, corresponding to saved cache data in a VCC memory 23 entry, is stored in an MOQ 19 status field in an MOQ memory 20 entry associated with the VCC memory 23 entry.

As illustrated in FIGS. 16B, 16D, 16F, and 16G, VCC memory 23 entries have one or more data fields (456.0, 456.1, 456.2, ...; 466.0, 466.1, 466.2, ...; 476.0, 476.1, 476.2, ...; and 486.0, 486.1, 486.2, ..., respectively). A number and size of data fields in a VCC memory 23 entry is different in different embodiments. For example, in some embodiments, there is one data field the size of a cache line. In other embodiments, there are multiple data fields that together are the size of a cache line. In some embodiments, the combined data field(s) in an entry are the size of a double-word. In some embodiments, each individual data field is a single byte. In some embodiments, each individual data field is a single word. In some embodiments, each individual data field is a double-word. In some embodiments, data fields represent data saved from a cache at a location specified at least in part by a corresponding key, such as key 415 (FIG. 16A) in a related MOQ memory 20 entry, or such as key 489 (FIG. 16G) stored in a same VCC memory 23 entry as the data fields.

As illustrated in FIGS. 16B, 16D, and 16G, in some embodiments, VCC memory 23 entries have one or more data valid bits (455.0, 455.1, 455.2, ...; 465.0, 465.1, 465.2, ...; and 485.0, 485.1, 485.2, ..., respectively). In some embodiments, data valid bits are in a corresponding MOQ memory 20 entry (such as in the MOQ memory 20 entry of FIG. 16E). In some embodiments, number of data valid bits corresponds to a number of data fields, with each data valid bit indicating validity of a corresponding data field.

In various embodiments, a VCC memory 23 entry has storage for one or more data items, the storage enabled to hold data written by a store operation. In various embodiments the data items are a size of a bank of a cache, a size of a cache line, a size of a memory region, or a size of a double-word.

In various embodiments, a particular type of store operation, such as a store operation resulting in an access spanning cache lines, is associated with one or more VCC memory 23 entries. In some embodiments, the particular type store operation is associated with two VCC memory 23 entries, a first VCC memory 23 entry for a first one of the spanned cache lines at a lower address, and a second VCC memory 23 entry for a second one of the spanned cache lines at a higher address. In some embodiments where the particular type store operation is associated with a single VCC memory 23 entry, a portion of a first one of the spanned cache lines is saved in a first portion of the VCC memory 23 entry, and a portion of a second one of the spanned cache lines is saved in a second portion of the VCC memory 23 entry. For example, if the first one of the spanned cache lines is at a lower address, then the first portion of the VCC memory 23 entry corresponds to a rightmost portion of a cache line save area of the VCC memory 23 entry. Further with the example, if the second one of the spanned cache lines is at a higher address, then the second portion of the VCC memory 23 entry corresponds to a leftmost portion of the cache line save area.

In some embodiments and/or usage scenarios, processing a store operation results in modifications to one or more data items held in a cache. Before the modifications are made, the data items to be modified are read from the cache and saved in one or more corresponding VCC memory 23 entries.

In some embodiments, logic external to a VCC memory 23 entry aligns one or more data items of a VCC memory 23 entry for proper rollback to a cache.

In some embodiments such as illustrated in FIG. 16G, a VCC memory 23 entry contains a key field (489). In some embodiments, the key field, rather than being treated as a separate field, is considered to be a sub-field of a status field. In some embodiments where a VCC memory 23 entry is accessed associatively without accessing a corresponding MOQ memory 20 entry, the key field in a VCC memory 23 entry has similar contents and serves a similar function as a key field in an MOQ memory 20 entry.

FIG. 16H illustrates selected details of an embodiment of a delayed store buffer (DSB) entry. In some embodiments, store information of a store operation is written into a respective DSB entry. In various embodiments, the store information comprises one or more of: a type of the operation; a size of data in memory accessed by the operation; a portion of an address of the data; a key, such as an execution-derived key, that identifies the data; memory-type information of the data (such as whether memory holding the data is cacheable and/or is write-combining); and a respective trace ID of the operation.

In the example of FIG. 16H, DSB entry 490 comprises address 499 as an associative key enabling address-based lookups to be performed on the DSB. In some embodiments, address 499 is some or all of a memory address of a data item stored in the DSB entry. In some embodiments, address 499 is a key, such as a cache way number and an index within the given way. In various embodiments, DSB entry 490 comprises a key 494 in addition to or instead of address 499. In various embodiments, key 494 is an execution-derived key. In some embodiments, key 494 comprises a cache way number and an index within the given way, used to identify a cache line within a cache. In some embodiments, key 494 comprises a cache way number, an index within the given way, and one or more lower-order address bits indicating a portion of a cache line, used to identify a portion of a cache line within a cache. In some embodiments, the lower-order address bits are represented in a decoded form as data valid bits. In some embodiments, a size of the portion of a cache line is used at least in part to control a number of the data valid bits that are set. In some embodiments (not illustrated by FIG. 16H), the size of the portion of a cache line is stored in the DSB entry. DSB entry 490 further comprises DSB status 493. Status in a DSB entry provides additional information relating to data stored in the DSB entry. In various embodiments, status in a DSB entry is similar to status in an MOQ 19 or a VCC memory 23 entry. In some embodiments, DSB status comprises an indication of a type of data stored in the DSB entry, such as cacheable or write-combining In some embodiments, DSB status comprises other attributes of data stored in the DSB entry, such as a trace ID of an operation that generated the data.

In some embodiments, address 499 in a DSB entry is a complete memory address at a granularity of a size of a data item in the DSB entry. For example, DSB entries hold data items a size of a double-word, and an address in a DSB entry comprises all high-order bits of a complete memory address, down to double-word granularity.

In some embodiments, address 499 in a DSB entry is a portion of a complete memory address at a granularity of a size of a data item in the DSB entry. For example, DSB entries hold data items a size of a double-word, and an address in a DSB entry comprises a middle portion of a complete memory address, having resolution down to double-word granularity, but leaving off one or more high-order bits of the complete memory address. In some embodiments where address 499 is a portion of a complete memory address, a DSB entry comprises an identifier of a unique cache location, such as a cache way number and an index within the given way. In some embodiments, the index within the given way is a portion of address 499.

DSB entry 490 also comprises data items (496.0, 496.1, 496.2, 496.3, ... ) and corresponding data valid bits (495.0, 495.1, 495.2, 495.3, ... ), similar to a VCC memory 23 entry, such as the VCC memory 23 entry illustrated in FIG. 16G. A size and number of data items stored in a DSB entry varies according to various embodiments. For example, in some embodiments, each DSB entry holds one double-word with an individual valid bit for each byte of data in the double-word. In some embodiments with both a VCC 22 and a DSB 840, a size and number of data items stored in a DSB entry is different from a size and/or number of data items stored in a VCC memory 23 entry.

In some embodiments, a DSB entry has data valid bits at a granularity at least as fine as a granularity of data writable by a store operation. For example, if the smallest data size writable by a store operation is a byte, in some embodiments, a DSB entry provides byte granularity of data valid bits. In some embodiments, the size of a data item in a DSB entry is at least as large as a size of a data item writable by a store operation. For example, in some embodiments, if the largest data size writable by a store operation is a double-word, a DSB entry provides storage for a data item at least as large as a double-word. In some embodiments, a DSB entry provides storage for two data items, each at least as large as a size of a data item writable by a store operation, in order to keep data items aligned on natural boundaries even in cases where data written by a store operation spans a natural boundary. For example, in some embodiments, data written by a store operation is a double-word that is not aligned on a double-word boundary; a DSB entry storing the write data of the store operation comprises a first double-word containing one portion of the write data of the store operation, and a second double-word containing a remainder of the write data of the store operation.

FIG. 17A illustrates selected details of an embodiment of an MOQ 19 with entries each optionally corresponding to a respective VCC memory 23 entry. In FIG. 17A, head pointer 501 indicates a first (oldest) entry in the MOQ 19, illustrated as MOQ memory 20 entry H 508. Allocation pointer 502 indicates a last-allocated (youngest) entry in the MOQ 19, illustrated as MOQ memory 20 entry T–3 510. In the embodiment of FIG. 17A, tail pointer 503 is always adjacent to (at an entry immediately prior to) head pointer 501. In this embodiment, all entries of the MOQ 19 are searched (from head pointer 501 to tail pointer 503 inclusive). Entries between the allocation pointer 502 and the tail pointer 503 are marked as invalid (such as by having a valid bit in the entry cleared), and thus are ignored with respect to the search.

FIG. 17B illustrates selected details of an embodiment of an MOQ 19 with entries each optionally corresponding to a respective VCC memory 23 entry. Head pointer 551 indicates a first (oldest) entry in the MOQ 19, illustrated as MOQ memory 20 entry I–2 558. Allocation pointer 552 indicates a last-allocated (youngest) entry in the MOQ 19, illustrated as MOQ memory 20 entry I+3 563. In the embodiment of FIG. 17B, tail pointer 553 is always the same as allocation pointer 552, and there are, at some points in time, additional unallocated entries in the MOQ 19 after tail pointer 553 and prior to head pointer 551. In some embodiments, an MOQ 19 search examines entries from the head pointer 551 to the tail pointer 553 inclusive. Entries after the tail pointer 553 and prior to the head pointer 551 are ignored (such as by being suppressed, or masked off) during a search, regardless of contents of the entries in the MOQ 19.

In some embodiments of an MOQ 19, VCC memory 23 entries correspond one-to-one with MOQ memory 20 entries, so that same pointers are used to access both. For example, updating a head pointer 551 (or a tail pointer 553) for the MOQ 19 also updates the head pointer 551 (or the tail pointer 553) for the VCC 22. In other embodiments, there are a different number of VCC memory 23 entries than MOQ memory 20 entries, and MOQ memory 20 entries comprise one or more pointers to one or more currently associated VCC memory 23 entries.

In some embodiments where VCC memory 23 entries are not associated one-to-one with MOQ memory 20 entries, the VCC 22 has independent head and/or tail pointers 551 and 553, and a process of committing or aborting a trace updates the VCC head and/or tail pointers 551 and 553 in a similar fashion to the MOQ 19 head and/or tail pointers 551 and 553. In some embodiments, VCC memory 23 entries are allocated for MOQ memory 20 entries associated with an operation of a type enabled to write a VCC memory 23 entry, and when deallocating an MOQ memory 20 entry, an associated VCC memory 23 entry, if any, is also deallocated.

FIG. 18 illustrates selected details of an embodiment of a structure for writing an MOQ memory 20 entry. Information such as MOQ ID 637, key 636, and status 635 is generated in previous pipeline stages in an operation pipeline, such as in accordance with operation pipeline stages 396, as illustrated in FIG. 15, and is staged and used to write MOQ 19 at an entry such as entry 631, as specified by MOQ ID 657. In some embodiments, MOQ ID 657 is initially assigned in an early pipeline stage, such as in accordance with MOQ ID assign pipeline stage 340 as illustrated in FIG. 15, and is pipelined until a stage where an MOQ 19 write operation is done. In some embodiments, an MOQ 19 write operation occurs during a pipeline stage such as in accordance with MOQ 19 write 345 as illustrated in FIG. 15. In some embodiments, as earlier noted, MOQ 19 write operation occurs at the end of the data cache validation pipeline stage 324 (or DFR stage). In some embodiments, MOQ ID 657 corresponds to a write pointer, such as write pointer 1005, as illustrated in FIG. 22A.

In some embodiments, multiple memory-accessing operations are issued in one clock cycle or pipeline stage, and multiple MOQ memory 20 entries are writable in a single clock cycle or single pipeline stage. In some embodiments, MOQ 19 has multiple write ports, each similar to the single write port described with respect to FIG. 18. In some embodiments of an MOQ 19 with multiple write ports, there are multiple copies of MOQ ID 637, key 636, and status 635 (and corresponding staging flip-flops and pipelined versions), one copy for each write port of the MOQ 19.

In some embodiments of a structure for writing an MOQ memory 20 entry, additional information is provided to write other fields in the MOQ memory 20 entry. For example, in some embodiments, an MOQ memory 20 entry has fields corresponding to those described with respect to FIG. 16E, and in addition to the information illustrated in FIG. 18, data valid information is similarly supplied to write the MOQ memory 20 entry. In some embodiments, some fields are written in an MOQ memory 20 entry on a first clock cycle or in a first pipeline stage, and other fields are written in the MOQ memory 20 entry on a second clock cycle or in a second pipeline stage.

FIG. 19 illustrates selected details of an embodiment of a structure for writing a VCC memory 23 entry. Information such as VCC ID 737, bank enables 736, and address 735 is generated in previous pipeline stages in an operation pipeline, such as in accordance with operation pipeline stages 396, as illustrated in FIG. 15, and is staged and used to write a VCC memory 23 entry in a subsequent pipeline stage. In some embodiments, the VCC ID is the same as an MOQ ID, such as MOQ ID 637 as illustrated in FIG. 18. In some embodiments, the VCC ID is a pipelined version of an MOQ ID. In some embodiments, a VCC ID associated with an operation has a same value as an MOQ ID associated with the operation. In some embodiments, a VCC write operation occurs during a pipeline stage such as in accordance with VCC write 364, as illustrated in FIG. 15. In some embodiments where MOQ memory 20 entries and VCC memory 23 entries are in a one-to-one relationship, VCC ID 777 (a pipelined version of VCC ID 737) corresponds to an MOQ 19 write pointer, such as write pointer 1005 as illustrated in FIG. 22A. In some embodiments, a write of a VCC memory 23 entry does not occur in a same pipeline stage as a write of a corresponding MOQ memory 20 entry.

As illustrated in FIG. 19, cache 720 comprises multiple banks 710, 711, 712, . . . . VCC 22 comprise data fields corresponding to the banks in each of a plurality of entries (as illustrated by entry 731), such as data field 734.0 corresponding to bank 0 710, and data field 734.2 corresponding to bank 2 712. In some embodiments, the cache has one bank. In some embodiments, the cache has more than one bank. In some embodiments, the cache has a plurality of banks, such as 8 or 16. In some embodiments, data fields in the VCC 22 are in a one-to-one correspondence with banks in the cache. In other embodiments, data fields in the VCC 22 are in a one-to-many correspondence with banks in the cache. In yet other embodiments, data fields in the VCC 22 are in a many-to-one-to correspondence with banks in the cache. In some embodiments where VCC memory 23 entries contain a fixed number of data fields, such as one or two, there is no static correspondence between banks in the cache and data fields in entries of the VCC 22.

In some embodiments, a number of banks of the VCC 22 is not the same as a number of data fields in the VCC 22. As one example, a cache has 16 banks and entries of a VCC have 16 data fields corresponding one-to-one with the banks of the cache. Cache lines are striped across the 16 banks of the cache, and across the 16 data fields of entries of the VCC 22, so that all banks of the cache (or all data fields of an entry of the VCC 22) are accessed to read or to write a particular cache line. The data fields of the entries of the VCC 22 are divided into 8 banks, so that pairs of banks of the cache map to a same bank of the VCC 22, even though each entry of the VCC 22 stores a full cache line. In this example, data fields in the VCC 22 are not fully independently accessible on a single port of the VCC 22, since a pair of data fields reside in a same bank of the VCC 22. (And because of this, a cache line stored in a VCC memory 23 entry is not accessible via a single VCC 22 read or VCC 22 write, since each bank must be accessed twice.) A mapping of data fields to VCC 22 banks that maps data fields 0 and 8 to bank 0, data fields 1 and 9 to bank 1, . . . , and data fields 7 and 15 to bank 7 enables adjacent data fields within a cache line to be accessed in parallel, and provided that no store operation (or combination of store operations) results in validation of (a setting of data valid bits for) a region spanning more than eight data fields (half of a cache line), valid data in a VCC memory 23 entry is accessible in parallel from the VCC banks In further embodiments, the example arrangement of VCC data fields and banks of the previous paragraph provides parallel access to a data item stored in a VCC memory 23 entry even if the data item spans a cache line boundary. If the largest single data item writable by a store operation is no larger than the size of a quarter of a cache line, then a cache-line spanning data item must start in one of banks 12-15 of the cache (data fields 12-15 of a VCC memory 23 entry, residing in banks 4-7 of the VCC), and end in banks 0-3 of the cache (data fields 0-3 of a VCC memory 23 entry, residing in banks 0-3 of the VCC). Thus, all of the VCC 22 banks that are modified by any single data item (of a size no larger than a quarter of a cache line) are accessible in parallel, even in the cache-line spanning case. If the banks of the VCC 22 provide independent access for writing, then a data item (of a size no larger than a quarter of a cache line), whether it spans a cache line boundary or not, is storable into a VCC memory 23 entry in parallel. If the banks of the VCC 22 provide independent access for reading, then a rollback from the VCC 22 to the cache of a data item (of a size no larger than a quarter of a cache line), whether it spans a cache line boundary or not, is performable in parallel. Accordingly, in this example, a rollback to the cache from a VCC having 48 entries (and holding a maximum of 48 data items) is performable in a time limited by the maximum number of valid entries in any one VCC bank position, independent of whether any of the data items stored in the VCC 22 span cache line boundaries.

Address 755, a pipelined version of address 735, is used to access cache 720. In some embodiments, address 755 is a virtual address. In some embodiments, address 755 is a physical address. In some embodiments, address 755 has both virtual and physical portions. Data read from the cache is captured in sets of staging flip-flops, such as flip-flops 760, 761, 762, . . . , a set of flip-flops for each bank of the cache 720. In some embodiments, in response to a load operation being executed, staged cache data from flip-flops 760, 761, 762, . . . is selected by MUX 721, and is selectively aligned by shifter 722, to produce a result 723 that is sent to a register file. (Controls for MUX 721 and shifter 722, as well as other control logic, are not illustrated in FIG. 19.) In some embodiments, in response to a store operation being executed, the staged cache data is sent to VCC 22, where some or all of the staged cache data is written into a VCC memory 23 entry. In some embodiments, both a load operation and a store operation read cache 720 during a same pipeline stage, such as in accordance with data cache access pipeline stage 323, as illustrated in FIG. 15.

In some embodiments, bank enables 756 are used at least in part to enable a selected portion of the banks of cache 720 to be accessed. In some embodiments, bank enables 776 are used at least in part to enable a selected portion of data fields in an entry of VCC 22 selected by VCC ID 777 to be written. In various embodiments, when a data field in the VCC is written, a corresponding data valid bit is set. For example, if data field 734.2 is selected at least in part by a combination of VCC ID 777 selecting VCC memory 23 entry 1731 and a bank enable selecting data field 2, then data valid bit 733.2 is set.

Continuing in FIG. 19, cache 720 is responsive to bank enables 756, a pipelined version of bank enables 736, and VCC 22 is responsive to bank enables 776, a pipelined version of bank enables 756. In embodiments where data fields in the VCC 22 correspond one-to-one with banks in the cache, the bank enables 756 are used to enable corresponding banks in the cache 720, and to enable corresponding data fields in the VCC 22. In embodiments where data fields in the VCC 22 are in a one-to-many correspondence with banks in the cache 720, a data field in the VCC 22 is enabled if any of the banks in the cache 720 to which the data field corresponds is enabled. In embodiments where data fields in the VCC 22 correspond many-to-one with banks in the cache 720, a bank in the cache 720 is enabled if any of the data fields in the VCC 22 to which the bank corresponds is enabled.

In some embodiments, VCC 22 is enabled to perform a rollback, where some or all of the data items in some or all entries of the VCC 22 are rolled back (restored) to cache 720, as illustrated by path 790. In various embodiments where VCC 22 comprises multiple banks, the rollback is performed independently in each bank.

In some embodiments, in response to a snoop request, VCC 22 is enabled to perform a snoop merge wherein a cache line read from cache 720 (such as the staged cache data from flip-flops 760, 761, 762, . . . ) is selectively merged with some or all of the data items in some or all entries of the VCC 22 to produce snoop data response 292. In various embodiments where VCC 22 comprises multiple banks, the selective merging is performed independently in each bank.

In some embodiments, not illustrated in FIG. 19, a VCC 22 comprises control logic. According to various embodiments, the control logic: enables the VCC 22 to, at least in part, allocate and deallocate entries; enables the VCC 22 to perform rollbacks; enables the VCC 22 to perform snoop merges; and enables reading and/or writing of entries of the VCC 22.

In some embodiments not illustrated in FIG. 19, a VCC memory 23 entry contains one data field, and the one data field is written with data from the output of MUX 721 (or, in some embodiments, the output of shifter 722) in response to any of the bank enables. In some embodiments not illustrated in FIG. 19, a VCC memory 23 entry contains two data fields. A first data field is written with data from the output of MUX 721 (or, in some embodiments, the output of shifter 722) in response to any of the bank enables combined with a first value of a field select signal; a second data field is written with data from the output of MUX 721 (or, in some embodiments, the output of shifter 722) in response to any of the bank enables combined with a second value of a field select signal. A value of the field select signal is controlled by execution phases of an operation, where a first execution phase uses the first value, and a second execution phase in a cache line spanning case uses the second value.

Not illustrated in FIG. 19 for clarity, are pipelined stages similar to those used for VCC ID 777 or bank enables 776 to generate status input 778 to VCC 22, thus providing write data for VCC status 732. (Also not illustrated in FIG. 19 are other control signals, such as controls signals to enable the VCC 22, to control when writes to the VCC 22 occur, etc.) In some embodiments, status 778 contains an operation type, and processing of certain operation types, such as store operations, is enabled to write the VCC 22. In some embodiments of writing the VCC 22, some or all of the status is pipelined from an earlier stage in an operation pipeline, such as in accordance with operation pipeline 396, as illustrated in FIG. 15. In some embodiments of writing the VCC 22, some or all of the status is obtained from a previous state of cache tags of cache 720 (not illustrated in FIG. 19), similar to how data written into the VCC 22 comes from the cache. In some embodiments, the status of a VCC memory 23 entry is written or updated at a same time as a data field is written. In some embodiments, some or all of the status of a VCC memory 23 entry is written under control of one or more independent status write ports.

In some embodiments, multiple memory-accessing operations are optionally issued in one clock cycle or one pipeline stage, and multiple VCC memory 23 entries are writable in a single clock cycle or single pipeline stage. In such embodiments, VCC 22 has multiple ports, each similar to the single write port illustrated in FIG. 19. There are multiple copies of VCC ID 737 (and optionally status 778), one copy (with corresponding staging flip-flops and pipelined versions) for each write port of the VCC 22. In some embodiments, there is a single copy of bank enables coupled to the VCC 22, with any bank accessed by one of the multiple memory-accessing operations being enabled by the bank enables. In some embodiments, there are multiple copies of bank enables coupled to the VCC 22, as each write port independently controls which data field(s) are written, and which data valid bit(s) are set.

In some embodiments, VCC 22 is combined with cache 720 by reserving, either statically or dynamically, certain portions of the cache, such as certain cache lines, to be used as VCC memory 23 entries. In various embodiments, a portion of each way of a multi-way, set-associative cache is used for VCC memory 23 entry storage. By reserving a different address range in different ways of the cache for VCC memory 23 entry storage, no single address is prevented from using the cache. For example, in an embodiment using a four-way, set-associative cache, reserving the first 1/16 of way 0, the second 1/16 of way 1, the third 1/16 of way 2, and the fourth 1/16 of way 3 is sufficient to provide an amount of storage for VCC memory 23 entries equal in size to one-fourth of a way of the cache, while keeping the cache at least three-way set associative over the full address range. In some embodiments, a portion of a way of a cache is reserved by forcing the cache tags to miss for that cache way for addresses in a certain range, and by forcing that cache way to not be selected for replacement for addresses in the certain range.

In some embodiments, a snoop request selectively merging data stored in a VCC 22 into a cache line, as illustrated in the example of FIG. 24, uses a port of the VCC 22 in parallel with operations executing in an operation pipeline writing the VCC 22. In some embodiments, a snoop request is issued down an operation pipeline as one of multiple memory-accessing operations issued in one clock cycle or one pipeline stage, each memory-accessing operation associated with a respective port of the VCC 22. In other embodiments, a snoop request has priority for use of a VCC 22 port over operations; an operation preempted by the snoop request is cancelled, is returned to an earlier pipeline stage, and is subsequently re-issued. In some embodiments, a snoop request using a port of the VCC 22 reads data from the VCC 22 and selectively merges the data into a cache line, while in parallel operations executing in an operation pipeline are writing and/or updating entries in the VCC 22 using other ports of the VCC 22.

FIG. 20 illustrates selected details of an embodiment of a structure to operate a delayed store buffer (DSB) in conjunction with a VCC 22 (shown in FIG. 20 as VCC 730). FIG. 20 is similar to FIG. 19 with some details related to the VCC 22 and datapaths omitted (for clarity), and with added details of the DSB 840 (or DSB 81). In some embodiments, DSB 840 is accessed in parallel with cache 720. In some embodiments, write data (from store operations) that have not yet been written into the cache are held in the DSB 840 pending an opportunity to write the cache. In some embodiments, the DSB 840 is associatively accessed by operations that access the cache to retrieve pending write data of prior store operations. In some embodiments, an operation generating an access that hits in the DSB 840 merges data read from the cache with some or all of data read from the DSB 840, for example via MUX 824. In some usage scenarios, the DSB 840 serves multiple purposes, such as providing storage for non-cacheable stores and/or for write-through stores. In some embodiments, the DSB 840 has paths to other levels of a memory hierarchy, not illustrated in FIG. 20, for the DSB 840 to write to destinations other than cache 720.

DSB 840 is responsive to address 755, and to load/store operation type 854. In some embodiments, address 755 is a virtual address. In some embodiments, address 755 is a physical address. In some embodiments, address 755 has both virtual and physical portions. In some embodiments, for operations of a load type, DSB 840 determines if data from prior store operations, as yet unwritten to cache 720, is in the DSB 840 via an associative lookup based upon an address. If an address of a load operation hits in the DSB 840, data saved in the DSB 840 is merged into cache data read by the load operation by MUX 824 as part of datapath to return a load result, such as to a register file via output 823.

In some embodiments multiplexing, illustrated as MUX 821, multiplexes the data read from the banks of cache 720 to produce cache data 828. In various embodiments, MUX 821 is controlled, at least in part, by a way select signal derived via cache tag comparison logic (not illustrated in FIG. 20). In various embodiments, MUX 821 is controlled, at least in part, by a portion of address, such as by a pipelined version of a portion of address 755. In some embodiments, cache data 828 is a full cache line. In some embodiments, such as ones that trade off the cost of very wide RAMs in exchange for requiring multiple cycles to access a full cache line, cache data 828 is a fraction of a cache line, such as half of a cache line. In some embodiments where the cache is segregated into multiple individually controllable banks, cache data 828 is the width of a bank of the cache. In some embodiments, cache data 828 is the width of two banks of the cache. In some embodiments, cache data 828 is twice the width of a data item accessible from the cache by a load operation.

For load operations, in some embodiments, cache data 828 is reduced in size and aligned, as illustrated by MUX/shift 822, to produce cache double-word 825, which is then selectively merged with data from the DSB 840 via MUX 824 and returned as a load result on output 823. For store operations, in some embodiments, cache data 828 is provided to VCC 22 to record a prior state of the cache line. In various embodiments, multiplexing similar to that of MUX 824 is included on the path from MUX 821 to VCC 22, so that the latest version of the cache data, including any effects of delayed stores held in DSB 840, is recorded when the state of at least a portion of the cache data is saved in an entry of VCC 22. In some embodiments, some or all of the functionality of MUX 821 and MUX 824, as used by VCC 22, is included in VCC 22. For example, in some embodiments, VCC 22 contains multiplexing similar to MUX 821 and MUX 824 with a different physical arrangement, such as by having the functionality of MUX 824 occur prior to the functionality of MUX 821, one version of MUX 824 for each of the cache ways multiplexed by MUX 821.

In some embodiments, an access size 832 is pipelined along with address 735 and load/store operation type 834. The access size is used by one or more of cache 720, VCC 22, and DSB 840. (The connection of the access size to VCC 22 is not illustrated in FIG. 20 for clarity.) In various embodiments, cache 720 uses access size 852 to determine an amount of data being operated upon. For example, in some embodiments, the access size is used, at least in part, to determine write enables for cache 720, and/or to determine if an access spans bank and/or cache line boundaries. In various embodiments, VCC 22 and/or DSB 840 use access size 852 to determine an amount of data being stored. For example, in some embodiments, DSB 840 uses the access size to determine a number of data valid bits to set, the data valid bits indicating the size of a data item stored in a DSB entry.

In some embodiments, for operations of a store type, DSB 840 is enabled to determine if data from prior store operations, as yet unwritten to cache 720, is in the DSB via an associative lookup based upon an address. If the DSB 840 already has data at the address, store data, such as data 853, is merged with data already in the DSB 840. If the DSB 840 does not have data at the address, a new DSB entry is used to save the store data, and the new DSB entry is associatively tagged with the address for subsequent lookups.

In some embodiments, a granularity of data items in a DSB entry is the same as a granularity of data items in a VCC memory 23 entry. In other embodiments, a granularity of data items in a DSB entry is different from a granularity of data items in a VCC memory 23 entry. For example, in some embodiments, each entry in a VCC stores a cache line as a series of double-words, each double-word with a respective valid bit, and each entry in a DSB stores a double-word, each byte with a respective valid bit. In some embodiments, a size of data written by a store operation is less than a size of data stored in a DSB entry, and some store operations set a subset of valid bits in a DSB entry. In some embodiments, a store operation that hits in an existing DSB entry merges write data into the existing DSB entry, updating some or all of the data items stored in the DSB entry, and setting valid bits in the DSB entry corresponding to any of the data items replaced.

In some embodiments, DSB 840 uses otherwise unused ports of cache 720 to write data stored in the DSB into the cache, as illustrated by DSB output 897 in FIG. 20. In some embodiments, DSB 840 uses write ports of cache 720 on any clock cycle in which the write ports are not used for processing of operations in an operation pipeline. Writing data from a DSB entry into the cache removes modified data from the DSB 840, and frees up the DSB entry, enabling the DSB entry to be deallocated. In some embodiments, in addition to storing an address for an associative lookup, the DSB 840 stores a key, such as a cache way number and an index within the given way, to provide a direct mechanism for a DSB entry to access a desired line in the cache. In some embodiments, the index is a subset of the address. In some embodiments, lower-order address bits, stored as part of the key or as part of the address in a DSB entry, indicate a portion of a cache line, such as a bank, that is written by the DSB entry. In some embodiments, the lower-order address bits are represented in a decoded form as data valid bits. In some embodiments, the size of the data item, such as access size 852, is used at least in part to control a number of the data valid bits that are set.

In some embodiments, not illustrated in FIG. 20, a DSB 840 comprises control logic. According to various embodiments, the control logic: enables the DSB 840 to, at least in part, allocate and deallocate entries; enables the DSB 840 to, at least in part, perform writing of DSB entries to a cache; enables the DSB 840 to perform selection of entries for selective merging with data read from a cache; enables control of the selective merging; and enables reading and/or writing of entries of the DSB 840.

In some embodiments, both a load operation and a store operation read cache 720. A load operation reads cache 720 to access a desired cache line, and to return a portion of the cache line as a result of the load operation. A store operation reads cache 720 to copy prior (pre-store) contents of a desired cache line into VCC 22. In some embodiments, both a load operation and a store operation read cache 720 during a data cache access pipeline stage, such as in accordance with data cache access pipeline stage 323, as illustrated in FIG. 15. In some embodiments, both a load operation and a store operation access a DSB 840 during a data cache access pipeline stage. The load operation accesses the DSB 840 to search for more recent data at an address, such as address 755, for merging with data read from the cache 720, and the store operation accesses the DSB 840 to determine if an address, such as address 755, is already in the DSB 840. If the store operation finds that the address is already in the DSB 840, write data of the store operation is merged into an entry of the DSB 840 already associated with the address; otherwise, a new entry is allocated in the DSB 840 for write data of the store operation, and the new entry is associatively tagged with the address. In some embodiments, a store operation that requires a DSB entry, but is not able to obtain one because the DSB 840 is full, is canceled and returned to an earlier pipeline stage, such as in accordance with schedule pipeline stage 321, as illustrated in FIG. 15.

FIG. 20 also illustrates silent store logic 880, producing silent store detection signal 872. In some embodiments, a silent store is detected when data being stored, for example data 873, is identical to data accessed at a corresponding location in cache 720, such as cache double-word 825 produced by MUX/shift 822. In some embodiments, a silent store is detected when data being stored is identical to a portion of data accessed at a corresponding location in the cache 720. For example, write data of a particular store operation is one byte in size, and a silent store is detected if the write data byte is identical to a corresponding byte in a cache line at a location written by the store operation. In some embodiments, the silent store detection signal 872 is used to suppress writing of an entry in VCC 22. In some embodiments, the silent store detection signal 872 is used to suppress allocation and/or writing of an entry in delayed store buffer 840. In some embodiments, the silent store detection signal is used to suppress writing of an entry in an MOQ 19 (not illustrated in FIG. 20). In some embodiments, the silent store detection signal 872 is used to modify status written into an entry in an MOQ 19.

In some embodiments, a store operation allocates a VCC memory 23 entry prior to a pipeline stage where silent store detection occurs, and detection of a silent store operates to deallocate the VCC memory 23 entry. In some embodiments, a store operation allocates a delayed store buffer entry prior to a pipeline stage where silent store detection occurs, and detection of a silent store operates to deallocate the delayed store buffer entry. In some embodiments, a store operation allocates a delayed store buffer entry prior to a pipeline stage where silent store detection occurs, the delayed store buffer entry is updated by the store operation prior to any effects of silent store detection, and detection of a silent store operates to invalidate the delayed store buffer entry.

FIG. 21A illustrates selected details of an embodiment of a structure for comparing information (such as in the form of a lookup key) against an MOQ 19 to detect conflicts. MOQ memory 20 entry comparison logic 940 performs a parallel comparison of compare information 906 against MOQ memory 20 entry 1 908 through MOQ memory 20 entry N 913, collectively MOQ memory 20 entries 907. The parallel comparison of comparators 939 produces hit & conflict information 937, a hit indication and corresponding conflict information for each entry compared. The parallel comparison is operable, via logic illustrated in FIG. 21B, to effectively compare the entries in a specific order, for example beginning at head pointer 901 and continuing through tail pointer 903, and thus to search for a first entry, according to the specific order, with a hit indication.

In some embodiments, the MOQ 19 is as illustrated in FIG. 17A, and all entries are compared, with unallocated entries being marked as invalid, so that the unallocated entries do not compare successfully. FIG. 21A as illustrated corresponds to a similar embodiment of the MOQ 19, where the tail pointer 903 always points to an entry immediately prior to the head pointer 901.

In other embodiments, the MOQ 19 is as illustrated in FIG. 17B, and entries between the head pointer 901 and the tail pointer 903 inclusive are considered in comparisons, with results from entries after the tail pointer 903 and before the head pointer 901 being masked off so as not to compare successfully. An embodiment of FIG. 21A corresponding to FIG. 17B is similar, with one difference being that the tail pointer 903 is not always adjacent to the head pointer 901—at some points in time, there are unallocated entries after the tail pointer 903 and prior to the head pointer 901 as illustrated in FIG. 17B. In some embodiments, a mechanism for masking off entries after the tail pointer 903 and prior to the head pointer 901 is, as illustrated in FIG. 21B, a combination of mask of entries enabled for comparison 950 and AND gates 988.

In some embodiments, compare information 906 comprises an indication of an "operation" type, such as a load operation, a store operation, or a snoop request. In some embodiments, information stored in each MOQ memory 20 entry comprises an indication of an operation type, such as a load operation, or a store operation. In some embodiments, compare information 906 comprises a trace ID of an operation corresponding to the operation associated with the compare information 906, or an indication that the compare information 906 is from a snoop request. In some embodiments, information stored in each MOQ memory 20 entry comprises a trace ID of an operation corresponding to the MOQ memory 20 entry. In some embodiments, compare information 906 comprises a lookup key, such as an execution-derived key, corresponding to a current operation in an operation pipeline that is checking for conflicts with operations that have been processed sufficiently to result in storage of valid information in one or more MOQ memory 20 entries. In some embodiments, compare information 906 comprises a lookup key corresponding to a snoop request. A comparison of compare information 906 with each MOQ memory 20 entry generates a corresponding result. For example, a comparison of compare information 906 with MOQ memory 20 entry 2 909 generates a result in two parts: hit 2 919 and conflict information 2 929. Hit 2 919 indicates whether the comparison was successful (the compare information matched the MOQ memory 20 entry and thus "hit"). Conflict information 2 929 indicates a type of conflict detected. Continuing this example, if compare information 906 is generated by a store (write) operation, and has a same key as a load (read) operation previously executed and recorded in MOQ memory 20 entry N−3 910, hit and conflict information reported in hit N−3 920 and conflict information N−3 930 indicates, in some embodiments, a load-store conflict.

In some embodiments, compare information 906 comprises a type portion and an address portion, corresponding to a type portion and an address portion of status written into entries of an MOQ 19. In some embodiments, the address portion (of either compare information 906 or of status in an MOQ memory 20 entry) comprises some or all of a memory address. In some embodiments, the address portion (of either compare information 906 or of status in an MOQ memory 20 entry) comprises a unique cache location identifier, such as a combination of a cache way number and an index within the given way. In some embodiments, the type portion (of either compare information 906 or of status in an MOQ memory 20 entry) comprises a type of operation, such as a load operation, a store operation, or a snoop request. In various embodiments, a comparison of compare information 906 against entries of the MOQ 19 considers one or more of MOQ memory 20 entry validity; the address portion of both the compare information and the status in the MOQ memory 20 entries; and some or all of the type portion of both the compare information and the status in the MOQ memory 20 entries. In some embodiments, control signals (not illustrated in FIG. 21A), selectively control a comparison of compare information 906 against entries of the MOQ 19 so that some comparisons consider the type portions in addition to other factors, and other comparisons do not consider the type portions in addition to other factors. FIGS. 22, 23A, and 23B provide examples of comparison of compare information with MOQ memory 20 entries.

In some embodiments, MOQ memory 20 entries corresponding to a trace being committed on a current clock cycle or in a particular pipeline stage are prevented from resulting in a conflict detection, thus enabling, at least in part, an atomic commit of the trace. In some embodiments, a committing trace ID input and a commit trace enable input (not illustrated in FIG. 21A), are used by comparators 939 to disable an MOQ memory 20 entry from matching compare info 906 if the MOQ memory 20 entry has a same trace ID as a the committing trace ID, and the commit trace enable input is active.

FIG. 21B illustrates selected details of an embodiment of a structure for processing results of an MOQ 19 comparison to detect conflicts. MOQ conflict prioritization logic 941 uses results of MOQ memory 20 entry comparison logic 940 (illustrated in FIG. 21A). Hit & conflict information 937, generated by MOQ memory 20 entry comparison logic 940, is processed by MOQ 19 conflict prioritization logic 941 to produce a hit indication 991, an indication of a first hit entry 992, and corresponding conflict information 994 for the first hit entry. Per-entry hit and conflict information, such as hit 1 918 and conflict information 1 928 in FIG. 21A, is provided to MOQ 19 conflict prioritization logic 941 via corresponding inputs, such as hit 1 968 and conflict information 1 978. In some embodiments, the hit information provided by MOQ memory 20 entry comparison logic 940 is pipelined prior to AND gates 988. In some embodiments, the conflict information provided by MOQ memory 20 entry comparison logic 940 is pipelined prior to MUX 993.

In some embodiments, a subset of per-entry hit indications are considered. Mask of entries enabled for comparison 950 generates a bit-vector mask 957 used to suppress hit indications from some or all of the entries. As illustrated, the mask is input to AND gates 988 to optionally suppress selected ones of hit indications 968, 969, . . . , 970, 971, 972, and 973 prior to presenting them to find first logic 990 as masked hits 989. Find first logic 990 determines if any of the masked hit indications are active, producing output hit 991, and determines a first (oldest) hit entry among the masked hits indications, producing output first hit entry 992. In some embodiments, find first logic 990 is implemented as a sequential search; in other embodiments, find first logic 990 is implemented as a parallel search.

In some embodiments of the MOQ 19, such as the one illustrated in FIG. 17B, mask of entries enabled for comparison 950 uses head pointer 951 and tail pointer 953 to suppress hit information from entries that are not between the head pointer and the tail pointer inclusive. In some embodiments, head pointer 951 and tail pointer 953 are the same as head pointer 901 and tail pointer 903 illustrated in FIG. 21A. In some embodiments, head pointer 951 and tail pointer 953 are pipelined versions of head pointer 901 and tail pointer 903.

In some embodiments, mask of entries enabled for comparison 950 uses head pointer 951 and write pointer 955 to suppress hit information from entries that are between the head pointer and the write pointer inclusive. In some embodiments, write pointer 955 is the same as write pointer 1005 in FIG. 22A. In some embodiments, write pointer 955 is a pipelined version of write pointer 1005. In some embodiments, control inputs to mask of entries enabled for comparison 950, not illustrated in FIG. 21B, select a type of mask generated based on a type of conflict detection being checked. For example, in some embodiments, a snoop request generates a different mask than a check for a conflicting operation. In some embodiments, a snoop request does not suppress any entries between a head pointer 951 and a tail pointer 953 inclusive. In some embodiments, a check for a conflicting operation does not suppress any entries after a write pointer 955 and through a tail pointer 953.

In some embodiments, such as where an MOQ 19 is implemented as a circular buffer (or a "circular list"), find first logic 990 uses head pointer 951 to start searching for an oldest entry beginning at an entry at the head pointer. In some embodiments, the structure illustrated in FIG. 21B is at a same pipeline stage as the comparison structure illustrated in FIG. 21A, and head pointer 951 (tail pointer 953) is the same as head pointer 901 (tail pointer 903). In some embodiments, the structure illustrated in FIG. 21B is at a later pipeline stage than the comparison structure illustrated in FIG. 21A, and head pointer 951 (tail pointer 953) is a pipelined version of head pointer 901 (tail pointer 903). In some embodiments, the structure illustrated in FIG. 21B comprises additional pipelining, such as after find first logic 990 and prior to MUX 993.

In some embodiments, an indication of whether conflict detection is being done for a snoop request, snoop indication 995, is an input to find first logic 990. In some embodiments, assertion of snoop indication 995 in response to conflict detection for a snoop request causes find first logic 990 to optimize processing for snoop requests. For example, in some embodiments, if snoop indication 995 is asserted, find first logic 990 ignores hit indications for entries of a load type under certain circumstances, such as when all older operations have written (e.g., have made valid) an MOQ memory 20 entry. In some embodiments, internal evictions of a cache are treated similarly to snoop requests, and internal evictions also check for conflicts and also assert snoop indication 995 when doing so. In some embodiments, a separate internal eviction indication (not illustrated in FIG. 21B) is coupled to find first logic 990, and conflict detections for internal eviction are optimized differently from conflict detections for snoop requests.

FIG. 21C illustrates selected details of an embodiment of a structure for prioritizing results of multiple MOQ 19 comparisons. In some embodiments, multiple memory-accessing operations are optionally issued in one clock cycle or one pipeline stage, multiple MOQ 19 comparisons are optionally performed in a single clock cycle or single pipeline stage, and multiple MOQ 19 comparisons optionally complete in a single clock cycle or single pipeline stage. In some embodiments, an MOQ memory 20 entry is written for each of a plurality of memory-accessing operations issued in parallel (such as in a single clock cycle or a single pipeline stage). In some embodiments, the MOQ memory 20 entries are written prior to checking for conflicts in the MOQ 19, thus enabling conflict detection among each of the memory-accessing operations issued in parallel. In some embodiments, if multiple MOQ 19 comparisons completing in a single clock cycle or single pipeline stage have a conflict in the MOQ 19, a prioritization unit (such as multiple conflict prioritization logic 999) prioritizes among the multiple MOQ 19 comparisons and returns results of an oldest among the multiple MOQ 19 comparisons that conflict. In some embodiments, at least one of multiple MOQ 19 comparisons completing in a single clock cycle or single pipeline stage is optionally due to a snoop request. In some embodiments, no more than one of multiple MOQ 19 comparisons completing in a single clock cycle or single pipeline stage is due to a snoop request.

In some embodiments, multiple memory-accessing operations are optionally issued in one clock cycle or one pipeline stage, and multiple copies of MOQ memory 20 entry comparison logic 940 and MOQ 19 conflict prioritization logic 941 are used, one for each of the multiple memory-accessing operations. Each of the multiple memory-accessing operations produces an independent compare information input (illustrated for one memory-accessing operation as 906 in FIG. 21A, and for a plurality of memory-accessing operations as 906.0, 906.1, . . . , 906.J in FIG. 21C). In some embodiments, each compare information input is coupled to a distinct search port of an MOQ 19. In some embodiments, each search port comprises one copy of MOQ memory 20 entry comparison logic 940 and one copy of MOQ 19 conflict prioritization logic 941. As illustrated in FIG. 21C, each pair of MOQ memory 20 entry comparison logic and MOQ 19 conflict prioritization logic (940.0/941.0, 940.1/941.1, . . . , 940.J/941.J) has a common input for MOQ memory 20 entries 907, and has a respective compare information input (906.0, 906.1, . . . , 906.J). Each pair is connected by a hit & conflict information output (937.0, 937.1, . . . , 937.J) from the MOQ memory 20 entry comparison logic to the MOQ 19 conflict prioritization logic. Not illustrated for clarity are other inputs to MOQ memory 20 entry comparison logic and MOQ 19 conflict prioritization logic, as illustrated in FIGS. 9A and 9B. In some embodiments, head pointer 901 and tail pointer 903 are common across all copies of the MOQ memory 20 entry comparison logic illustrated in FIG. 21C. In some embodiments, write pointer 955, as well as control inputs to mask of entries enabled for comparison 950 and/or find first logic 990 are uniquely coupled for each copy of the MOQ 19 conflict prioritization logic illustrated in FIG. 21C.

Each copy of the MOQ 19 conflict prioritization logic generates respective hit (991.0, 991.1, . . . , 991.J), first hit entry (992.0, 992.1, . . . , 992.J), and conflict information (994.0, 994.1, . . . , 994.J) outputs. Outputs of each copy of the MOQ 19 conflict prioritization logic, along with an indication as to whether conflict detection done by the copy is for a snoop request (995.0, 995.1, . . . , 995.J) and a version of a write pointer (955.0, 955.1, . . . , 955.J) used by the copy, are input to multiple conflict prioritization logic 999. In some embodiments, snoop indications 995.0, 995.1, . . . , 995.J are pipelined versions of corresponding snoop indications 995, delayed through one or more pipeline stages to be properly staged with respect to outputs of the MOQ 19 conflict prioritization logic. In some embodiments, internal evictions of a cache line are treated similarly to snoop requests, including a check for conflicts and assertion of a corresponding snoop indication (995.0, 995.1, . . . , 995.J). In some embodiments, write pointers 955.0, 955.1, . . . , 955.J are pipelined versions of corresponding write pointers 955, delayed through one or more pipeline stages to be properly staged with respect to outputs of the MOQ 19 conflict prioritization logic. In some embodiments, head pointer 961 is an input to multiple conflict prioritization logic 999. In some embodiments, head pointer 961 is a pipelined version of head pointer 951, as illustrated in FIG. 21B, delayed through one or more stages to be properly staged with respect to write pointers 955.0, 955.1, . . . , 955.J.

Multiple conflict prioritization logic 999 generates outputs corresponding to an oldest among conflicts reported on multiple sets of inputs. In some embodiments, there is no more than one snoop request among the multiple sets of inputs, and a conflict due to a snoop request is always given highest priority (assumed to be the oldest conflict). In some embodiments, an oldest conflicting entry is determined, at least in part, from an implicit ordering of the multiple sets of inputs. For example, in some embodiments, information on a first set of inputs (including hit 991.0) is assumed to be older than information on other sets of inputs, and information on a second of inputs (including hit 991.1), is assumed to be older than information on the other sets of inputs except for the information on the first set of inputs. In some embodiments, an oldest conflicting entry is determined, at least in part, from comparisons among write pointers in each of the multiple sets of inputs, with a write pointer closest to a head pointer, such as head pointer 961, indicating the oldest conflict. In some embodiments, an execution ID accompanies each of the multiple conflict check results, and the execution ID indicates an order (such as with respect to a required order) among the multiple conflict checks. For example, in various embodiments, if there are three conflicts being prioritized, the execution ID is a three-bit decoded value indicating which of the three is the oldest, or alternatively the middle, or further alternatively the youngest. In various embodiments, the execution ID is provided by an issue unit for each of a group of operations issued in parallel, and is pipelined along with other information, such as an MOQ 19 write pointer or an MOQ ID.

Multiple conflict prioritization logic 999 generates hit 991.P, first hit entry 992.P, conflict information 994.P, and snoop indication 995.P as a selected oldest conflict among multiple sets of inputs. In some embodiments, multiple conflict prioritization logic 999 generates write pointer 955.P, as selected from a write pointer of the oldest conflict among the multiple sets of inputs. In some embodiments, multiple conflict prioritization logic 999 generates other outputs, such a distance in MOQ memory 20 entries between a write pointer and a first hit entry of the oldest conflict among the multiple sets of inputs. In some embodiments, hit 991.P indicates an ordering violation and causes an abort event. In some embodiments, conflict information 994.P comprises a trace ID, and when hit 991.P indicates an ordering violation, a trace specified by the trace ID and all younger traces are aborted.

FIGS. 22A and 22B illustrate example operations of logic of FIGS. 21A and 22B, illustrating a portion of MOQ memory 20 entries that are searched for different types of conflict checks, and an effective search order to find a first conflicting entry. In some embodiments, the MOQ 19 is organized as illustrated in FIG. 17A, and all entries are searched, with unallocated entries being marked as invalid, so that the unallocated entries do not falsely "hit" and stop the search. FIGS. 10A and 10B as illustrated correspond to an embodiment of the MOQ 19 similar to that illustrated in FIG. 17A where a tail pointer always points to an entry immediately prior to a head pointer.

In other embodiments, the MOQ 19 is organized as illustrated in FIG. 17B, and entries between a head pointer and a tail pointer inclusive are considered in comparisons, with results from entries after the tail pointer and prior to the head pointer ignored. In some embodiments similar to the embodiments represented by FIG. 22A and FIG. 22B but where the MOQ 19 is organized as illustrated in FIG. 17B, the tail pointer is not necessarily adjacent to the head pointer, and at some points in time there are unallocated entries after the tail pointer and prior to the head pointer as illustrated in FIG. 17B.

In FIG. 22A, a search for an operation conflicting with a current operation in the operation pipeline is performed by searching all entries in an MOQ memory 20 after (younger than) an entry associated with the current operation, as illustrated by possible update conflict region 1033. In some embodiments, the entry associated with the current operation is indicated by write pointer 1005, and the search for operations conflicting with the current operation begins in association with, though not necessarily in a same pipeline stage as, a write of status for the current operation into the MOQ 19. All MOQ memory 20 entries starting after the entry associated with the current operation (after write pointer 1005) and through an entry at tail pointer 1003, in that order, are considered as possible conflicting entries, as illustrated by search direction 1034. The search terminates when a first conflicting entry is found, or when tail pointer 1003 is reached without having found a conflicting entry.

In FIG. 22B, a search for an operation conflicting with a snoop request is performed by searching all entries in an MOQ 19 between head pointer 1051 and tail pointer 1053 inclusive, as illustrated by possible snoop conflict region 1083. All MOQ memory 20 entries starting from an entry at head pointer 1051 and through an entry at tail pointer 1053, in that order, are considered as possible conflicts, as illustrated by search direction 1084. The search terminates when a first conflicting entry is found, or when tail pointer 1053 is reached without having found a conflicting entry.

In some embodiments, in both FIGS. 22A and 22B, not all entries of the MOQ 19 between a head pointer and a tail pointer inclusive are valid for searching; entries corresponding to operations that have executed to the point of writing an MOQ memory 20 entry are considered, and entries corresponding to operations that have not yet written an MOQ memory 20 entry are not considered. In some embodiments, a valid bit is set in an entry when the entry is written by an executing operation, and the valid bit enables a search comparison to find the entry (assuming other comparison conditions are met).

FIG. 23 illustrates example operations relating to an MOQ 19 during atomic commit as part of trace completion. FIG. 23 corresponds to an embodiment of the MOQ 19 organized as illustrated in FIG. 17A where a tail pointer always points to an entry immediately prior to a head pointer. In some embodiments similar to the embodiment represented by FIG. 11 but where the MOQ 19 is organized as illustrated in FIG. 17B, the tail pointer is not necessarily adjacent to the head pointer, and at some points in time there are unallocated entries after the tail pointer and prior to the head pointer as illustrated in FIG. 17B.

In some embodiments, MOQ memory 20 entries are allocated sequentially for all ordered operations (such as operations with execution-based ordering constraints) in a trace. Current head pointer 1101 points to an oldest entry in the MOQ 19 that, by definition, corresponds to an operation belonging to an oldest trace in the MOQ 19. In some embodiments, when the oldest trace in the MOQ 19 is eligible to be committed, head pointer 1101 is incremented by an amount equal to a number of ordered operations initially allocated in the MOQ 19 for the oldest trace. For example, as illustrated in FIG. 23, if the oldest trace contained two ordered operations, upon commitment of the oldest trace, head pointer 1101 is incremented by deallocation bump 1137 to become new head pointer 1102, advancing the head pointer from MOQ memory 20 entry H 1108 to MOQ memory 20 entry H+2 1110. In an embodiment such as that illustrated in FIG. 17B, movement of the head pointer does not affect tail pointer 1103. In an embodiment such as that illustrated in FIG. 17A, movement of the head pointer causes a corresponding movement of tail pointer 1103, keeping the tail pointer adjacent to the head pointer. For example, to correspond to movement of head pointer 1101 as illustrated in FIG. 23, tail pointer 1103 is advanced from MOQ memory 20 entry T 1113 to MOQ memory 20 entry H+1 1109, and thus remains at an entry immediately prior to the head pointer. In some embodiments, entries deallocated, such as by movement of the head pointer, are marked as invalid so that the deallocated entries do not contribute to searches of the MOQ 19 (until after the entries are allocated again).

In some embodiments, atomic commit of a trace in an MOQ 19 also commits entries in a VCC 22 corresponding to the trace. In some embodiments, updating a head pointer and/or a tail pointer for an MOQ 19 to perform an atomic commit also serves to update a head pointer and/or a tail pointer of a VCC 22. In some embodiments, an atomic commit on a VCC 22 is performed in parallel with performing an atomic commit on an MOQ 19. In some embodiments, deallocation of one or more MOQ memory 20 entries results in deallocation of one or more related VCC memory 23 entries.

FIG. 24 illustrates example operations, in response to a snoop request, relating to merging data read from a cache with data provided from a VCC 22. In some embodiments, entries of VCC 22 are each associated with a corresponding entry of an MOQ 19. In some embodiments, VCC 22 operates standalone and independently from an MOQ 19. FIG. 24 corresponds to an embodiment of the VCC 22 organized similarly to the MOQ 19 example illustrated in FIG. 17A, where a tail pointer always points to an entry immediately prior to a head pointer. In some embodiments similar to the embodiment represented by FIG. 24 but where the VCC 22 is organized similarly to the MOQ 19 example illustrated in FIG. 17B, the tail pointer is not necessarily adjacent to the head pointer, and at some points in time there are unallocated entries after the tail pointer and prior to the head pointer as illustrated in FIG. 17B.

Assume for the purposes of the example of FIG. 24 that a snoop request hits in a cache, and that cache line 1240 represents data read from the cache as part of processing the snoop request. Cache line 1240 comprises one or more data items, such as words or double-words. In some embodiments, such as that of cache 720, as illustrated in FIG. 19, each data item corresponds to (and is read from) a respective bank of the cache. VCC 22 is accessed, and selected data from it is optionally merged into cache line 1240, producing merged line 1250. Merged line 1250 is then returned as a data response to the snoop request. In some embodiments, entries in VCC 22 are organized into data items in a similar fashion as the cache line. In some embodiments, VCC 22 is banked in a similar fashion as the cache. The data items in a cache line (or in the VCC 22, or in the produced merged line) are, for the purposes of the example of FIG. 24, numbered from left to right starting at zero, the leftmost data item referred to as being in data item position 0 1290, the next data item referred to as being in a data item position 1 1291, and so on.

Continuing the example of FIG. 24, further assume that the snoop request hits several of the VCC memory 23 entries—entries 1279, 1280, and 1281. These entries have some data items valid and some data items invalid; valid data items in the hit entries of the VCC 22 are illustrated in FIG. 24, and invalid data items in the hit entries of the VCC 22 are not illustrated. The presence or absence of valid data items in any non-hit entries does not affect behavior of the example of FIG. 24. In some embodiments, such as embodiments with a VCC memory 23 entry as illustrated in FIG. 16G, status of the snoop request is compared against status in each VCC memory 23 entry to determine which VCC memory 23 entries the snoop request hits. In other embodiments, status of the snoop request is compared against status in an MOQ 19, and hit VCC memory 23 entries correspond to VCC memory 23 entries associated with MOQ memory 20 entries that are hit. In some embodiments, the status comprises an operation type, and whether the snoop request hits an entry or not depends upon a type of the snoop request, and an operation type of one or more of the entries. In some embodiments, a vector of hit information from a comparison of the snoop request with an MOQ 19, such as hit indications 918, 919, ..., 920, 921, 922, and 923 as illustrated in FIG. 21A, is used to determine which entries of the VCC 22 to consider. In some embodiments, a vector of masked hit information, such as masked hits 989 as illustrated in FIG. 21B, is used to determine which entries of the VCC to consider.

Valid data items contained in VCC memory 23 entries between start pointer 1204 and tail pointer 1203 that are hit by (for example, are valid and have a same lookup key as) the snoop request are potential candidates for merging into cache line 1240. In some embodiments, start pointer 1204 is the same as head pointer 1201. In other embodiments, start pointer 1204 is adjusted to skip entries in the VCC 22 that meet certain conditions, such as skipping an initial number of entries that are known to not be hit by the snoop request. Among entries that hit the snoop request, an oldest valid data item, if any, in each data item position is selectively merged into a cache line.

As illustrated in FIG. 24, data item DATA1 1241 in cache line 1240 is passed through to merged line 1250 since there is no valid data in a hit entry in VCC 22 in the data item position of data item DATA1 1241. Data item DATA0' 1248 from hit VCC memory 23 entry 1279 is passed through to merged line 1250. Data item DATA0' 1248 is chosen rather than other data items in a same data item position as data item DATA0' 1248, such as a corresponding data item from cache line 1240 or younger data item DATA0" 1251 from VCC memory 23 entry 1281, because data item DATA0' 1248 is an oldest valid data item in a hit VCC memory 23 entry in the data item position of data item DATA0' 1248. Similarly, data item DATA2' 1249 is an oldest valid data item in a hit VCC memory 23 entry in the data item position of data item DATA2' 1249, and is thus passed through rather than a corresponding data item from cache line 1240. In each data item position, merged line 1250 is thus comprised of an oldest valid data item in the data item position among hit VCC memory 23 entries, or if there are no valid data items in the data item position among hit VCC memory 23 entries, data from cache line 1240 in the data item position.

FIG. 25 illustrates selected details of an embodiment of a process for initial processing of operations from a TU 13, including assigning an MOQ ID. In some embodiments, ordered operations in a trace supplied by a TU 13 are allocated to sequential entries in an MOQ memory 20. In some embodiments, the TU 13 supplies the ordered operations in a required order. In some usage scenarios, an MOQ ID assigned to an operation corresponds to an MOQ memory 20 entry allocated to the operation. For example, in some embodiments, an MOQ ID is an index of a corresponding MOQ memory 20 entry.

Process 1300 of FIG. 25 starts in step 1302. In some embodiments, as illustrated by step 1304, all MOQ memory 20 entries are initially made invalid (for example, by clearing a valid bit), such as at power-on, or at reset, or when the MOQ 19 is emptied, such as due to an abort event. In some embodiments, not illustrated in FIG. 25, MOQ memory 20 entries are invalidated when the MOQ memory 20 entries are deallocated, such as when a trace is committed, as illustrated with regard to FIG. 23.

The process continues to step 1310, where a determination is made as to whether or not there is an operation (or "working operation") available from a TU 13. If it is determined that there are no operations available from the TU 13, the process loops to step 1310. If it is instead determined that there is an operation available from the TU 13, the process continues to step 1314. At step 1314, the IU 115 receives the operation, in program order, and a corresponding trace ID, from the TU 13. The process continues to step 1318, where the working operation is processed by the issue unit 114 as illustrated in FIG. 11. In some embodiments, the step 1318 corresponds in part to a pipeline stage, such as in accordance with rename pipeline stage 320, as illustrated in FIG. 15.

After the working operation has been initially processed in step 1318, the process continues to step 1320. At step 1320, a determination is made as to whether or not a MOQ memory 20 entry for the operations needs to be created for the operation. In some embodiments, types of operations that are executable in an order different from a required order, for example due to out-of-order and/or speculative execution, are enabled to allocate MOQ memory 20 entries. In some embodiments, memory-accessing operations are enabled to allocate MOQ memory 20 entries. In some embodiments, speculatively-issued, memory-accessing operations are enabled to allocate MOQ memory 20 entries. In some embodiments, memory-accessing operations issued out-of-order are enabled to allocate MOQ memory 20 entries. In some embodiments, memory-accessing operations that access uncacheable memory or are prefetches are not enabled to allocate MOQ memory 20 entries. If it is determined at step 1320 that the operation is not of a type for which a MOQ memory 20 entry should be created, the process continues to step 1330. At step 1330, additional processing of the operation prior to the operation being scheduled for execution, such as by schedule pipeline stage 321, as illustrated in FIG. 15, is performed by the IU 115. The process continues to step 1310 following the processing of the operation.

However, if it is determined at step 1320 that the operation is of a type enabled to allocate an MOQ memory 20 entry, the process continues to step 1322. At step 1322, a determination is made as to whether or not the MOQ memory 20 is allocated. The IU 115 determines if the (or MOQ memory 20) entry is already allocated (or taken) by checking the MOQ ID. In some embodiments, if it is determined that the MOQ memory 20 is full, the process stalls until an MOQ memory 20 entry is available. In some embodiments, if the MOQ memory 20 is full, other actions, such as aborting one or more currently executing traces to free up MOQ memory 20 entries, are performed. Once it is determined that a MOQ memory 20 entry is available, processing continues to step 1324.

At step 1324, the MOQ 19 assigns an MOQ ID to the operation. In some embodiments, assigning an MOQ ID is equivalent to allocating an MOQ memory 20 entry. In some embodiments, MOQ IDs are assigned sequentially in the MOQ 19, so that operations provided from the TU in a required order are allocated sequential MOQ memory 20 entries. In some embodiments, assigning an MOQ ID comprises incrementing an allocation pointer module the size of the MOQ 19, and providing the new value of the allocation pointer as the MOQ ID. In some embodiments, MOQ 19 IDs are assigned based on determining a first, free MOQ memory 20 entry, and other techniques, such as pointers, are used to link MOQ memory 20 entries in a required order.

In some embodiments, the process continues to the optional step 1326, where the IU 115 clears a valid bit in an MOQ memory 20 entry corresponding to the MOQ ID assigned to the operation. In some embodiments, as illustrated by optional block 1326, MOQ memory 20 entries are invalidated when the MOQ memory 20 entries are (re)allocated. The process continues then continues to step 1330.

While the description of FIG. 25 is from a perspective of a single operation, in some embodiments, multiple operations are processed at a same time, with each operation using the process illustrated in FIG. 25. In some embodiments, different operations are at different blocks in the process on a same clock cycle. In some embodiments, multiple operations are at a given block in the process on a same clock cycle. For example, in some embodiments, MOQ 19 IDs are optionally assigned to multiple operations in a single clock cycle or single pipeline stage, and multiple operations are optionally scheduled for execution in a single clock cycle or single pipeline stage.

Referring now to FIG. 26, a process for writing (or updating) an MOQ memory entry 1400 is shown in accordance with an embodiment of the invention. In various embodiments, each operation associated with one or more MOQ memory 20 entries is processed in accordance with the process of FIG. 26 one or more times. For example, in some usage scenarios, processing a load (or store) operation with read (or write) data spanning a cache line boundary writes multiple MOQ memory 20 entries, or alternatively writes one MOQ memory 20 entry multiple times. In some embodiments, such as that illustrated in FIG. 16C, an MOQ memory 20 entry provides multiple copies of certain fields, enabling the MOQ memory 20 entry to represent information for two distinct cache lines. In some embodiments, an operation having read (or write) data that spans a cache line boundary is issued down some or all of an operation pipeline multiple times, enabling the operation to access multiple cache lines, and also to write an MOQ 19 multiple times. In other embodiments, an operation having read (or write) data that spans a cache line boundary is issued down an operation pipeline once, and an MOQ 19 is enabled to be written multiple times during execution of the operation.

The process 1400 starts with step 1402 and continues to step 1410. At step 1410, a determination is made as to whether or not an ordered operation that has been assigned an MOQ ID (the "working operation") has been processed sufficiently to enable a write of an associated MOQ memory 20 entry. An "ordered operation" is one that is allocated an MOQ memory 20 entry to ensure, at least in part, that despite out-of-order execution, the operation is processed without violating architectural constraints of a required order. In some embodiments, an operation is processed sufficiently to write an MOQ memory 20 entry before all execution of the operation is complete. If it is determined that an ordered operation has not been processed sufficiently to write a MOQ memory 20 entry, the process stalls at step 1410. However, if it is determined that an ordered operation has been processed sufficiently to write a MOQ memory 20 entry, the process continues to step 1414.

At step 1414, the MOQ 19 obtains inputs for a write to an MOQ memory 20 entry. In some embodiments, the inputs are provided by a pipeline stage, such as in accordance with data cache validation pipeline stage 324, as illustrated in FIG. 15. The inputs comprise an MOQ ID, a key, and, in some embodiments, status for the operation. In some embodiments, the MOQ ID is an MOQ memory 20 entry pointer. After the PART receives the inputs, the process continues to step 1420.

At step 1420, a determination is made as to whether or not the working operation is enabled to write an MOQ memory 20 entry. The PART analyzes the working operation to see if it is a type of operation that can be written to a MOQ memory 20 entry. According to various embodiments, MOQ 19 writes are performed for operations issued speculatively and/or for operations issued out-of-order. According to various embodiments, MOQ 19 writes are performed for one or more of: load and/or store operations accessing cacheable memory; load and/or store operations accessing write-combining memory; and all load and/or store operations. In some embodiments, MOQ 19 writes are omitted for operations accessing uncacheable memory and prefetch operations. In some embodiments, a MOQ 19 write enable bit is staged down an operation pipeline along with the operation to selectively control writing of an MOQ 19 at an appropriate pipeline stage. If it is determined that the working operation is not enabled to write an MOQ memory 20 entry, the process continues to step 1410 to await completion of sufficient processing of a subsequent operation.

However, if it is determined at 1420 that the working operation is enabled to write to a MOQ memory 20 entry, the process continues to step 1430. At step 1430, a determination is made, by the MOQ 19, as to whether or not the operation is a silent store. In some embodiments, silent stores are not detected, and the process continues as though the working operation is not a silent store. If it is determined that the operation is a silent store, the process continues to step 1432. At step 1432, the MOQ control logic 21 adjusts the status of the working operation as provided by a prior pipeline state. In some embodiments, silent stores are treated as loads, not as stores, and a type of operation in the status is changed from a store type to a load type for a silent store. The process then continues to step 1434.

If, however, it is determined at 1430 that the operation is not a silent store, the process continues to step 1434. At step 1434, the MOQ control logic 21 writes an MOQ memory 20 entry at the given MOQ ID with the given key and status. In some embodiments, the actions taken in step 1434 correspond to a pipeline stage, such as in accordance with MOQ 19 write pipeline stage 345, as illustrated in FIG. 15. Following the writing of the MOQ memory 20 entry, the process continues to step 1438.

At step 1438, the working operation is checked by the MOQ 19 to determine if the operation creates an MOQ (or memory ordering) conflict. In some embodiments, the MOQ 19 checks the working operation for a MOQ conflict in a single pipeline stage. In some embodiments, the MOQ 19 part checks the working operation for a MOQ conflict in multiple pipeline stages, such as in accordance with pipeline stages 346, 347, 348, and 349, as illustrated in FIG. 15. The process continues to step 1410 to await completion of sufficient processing of a subsequent operation.

While the description of FIG. 26 is from a perspective of a single operation, in some embodiments multiple operations are processed at a same time, each operation using the process illustrated in FIG. 26. In some embodiments, different operations are at different blocks in the process on a same clock cycle. In some embodiments, multiple operations are at a given block in the process on a same clock cycle. For example, in some embodiments, multiple MOQ memory 20 entries are optionally written in a single clock cycle or single pipeline stage, and multiple MOQ 19 conflict checks are optionally started and/or completed in a single clock cycle or single pipeline stage. In some embodiments where multiple MOQ 19 conflict checks are started in a single clock cycle or single pipeline stage, writing MOQ memory 20 entries (as in block 1434) prior to starting conflict checking (as in block 1438) enables each one of multiple operations performing conflict checks in parallel to detect conflicts with others of the multiple operations.

Referring now to FIG. 27, a process for prioritizing results of multiple MOQ conflict checks 1570 is shown in accordance with an embodiment of the invention. The process of FIG. 27 takes as input the conflict check results of multiple, independent MOQ 19 conflict checks, and determines an oldest conflict from among the multiple conflict checks. In some embodiments, the process 1570 is a process performing operations of the structure illustrated in FIG. 21C. In some embodiments, multiple memory-accessing operations issuing in one clock cycle are each enabled to write a respective MOQ memory 20 entry prior to checking for conflicts in the MOQ 19, thus enabling each of the multiple memory-accessing operations to detect conflicts with any others of the multiple memory-accessing operations, as well as with any prior operations already in the MOQ 19. In some embodiments, one or more of the multiple conflict checks are for snoop requests, such as produced by the processes illustrated in FIGS. 28A and 28B.

The process starts at 1572 and continues to step 1574. At step 1574, the MOQ 19 receives conflict indications (whether there is a "hit" or not) and corresponding conflict information from multiple conflict checks. In some embodiments, one or more of the conflict checks are from snoop requests. In some embodiments, the conflict information comprises an indication of whether the conflict check is from a snoop request, or from another source, such as execution of an operation. In some embodiments, the conflict information for other than snoop requests comprises a write pointer, or some other equivalent indication of an updated MOQ memory 20 entry such as an MOQ ID, indicating an MOQ memory 20 entry for which the conflict check was done.

The process continues to step 1580, where a determination is made as to whether or not one of the multiple conflict checks is from a snoop request that generated a conflict (i.e. the snoop request generated a hit in an MOQ 19). If it is determined that one or more of the multiple conflict checks is from a snoop request that generated a conflict, the process continues to step 1582. At step 1582, the MOQ 19 reports that processing is complete and a snoop conflict has been found among the multiple conflict checks. Optionally, the MOQ 19 returns associated conflict information to the different part Y. In some embodiments, no more than one of the multiple conflict checks is from a snoop request, and the MOQ 19 reports conflict information for the one snoop request, and optionally returns associated conflict information of the one snoop request, to the IU 115. In some embodiments, all conflict information is reported to the IU 115.

In some embodiments, one or more of the conflict checks are from snoop requests, and MOQ 19 reports conflict information from a highest priority snoop request, and optionally returns associated conflict information of the highest priority snoop request, to the IU 115.

In some embodiments, a highest priority snoop request is determined by an implicit order of the multiple conflict checks, with a first of the multiple conflict checks (according to the implicit order) having the highest priority. The process continues and ends at step 1590.

If it is determined, at step 1580, that none of the multiple conflict checks is from a snoop request that generated a conflict, the process continues to step 1585. At step 1585, it is determined whether or not there are any conflicts detected by the MOQ 19 among the multiple conflict checks. If it is determined that the MOQ 19 did not detect conflicts among the multiple conflict checks, the process continues to step 1589. At step 1589, the MOQ 19 reports that processing is complete and no conflict has been found among the multiple conflict checks. The process continues and ends at step 1590.

If it is determined at step 1585 that one or more of the multiple conflict checks detected a conflict, the process continues to step 1587. At step 1587, the MOQ 19 reports that processing is complete and a conflict has been found among the multiple conflict checks, and optionally returns associated conflict information. The MOQ 19 reports conflict information from a highest priority one of the multiple conflict checks that detected a conflict. In some embodiments, a highest priority conflict check is determined by an implicit order of the multiple conflict checks, with a first of the multiple conflict checks (according to the implicit order) having the highest priority. In some embodiments, a highest priority conflict check is determined by an MOQ 19 write pointer or an MOQ ID associated with each conflict check, with older (closer, in a required order, to a head pointer) entries in the MOQ 19 having a higher priority. In some embodiments, an execution ID accompanies each of the multiple conflict check results, and the execution ID indicates an order among the multiple conflict checks. For example, in some embodiments, if there are three conflicts being prioritized, the execution ID is a two-bit encoded value indicating which of the three is the oldest, or alternatively the middle, or further alternatively the youngest. In various embodiments, the execution ID is provided by an issue unit for each of a group of operations issued in parallel, and is pipelined along with other information, such as the MOQ ID. The process continues and ends at step 1590.

FIGS. 28A and 28B illustrate selected details of serial and parallel embodiments, respectively, of processes for checking for MOQ 19 conflicts in response to a snoop request.

Referring now to FIG. 28A, a process 1600 of MOQ snoop conflict checking in which entries are examined one at a time starting from a head entry and continuing through a tail entry, is presented. A first (oldest) conflicting entry, if any, in a selected portion of an MOQ 19 is determined.

The process starts at step 1602 and continues to the optional step 1610. At 1610, it is determined whether or not the MOQ memory 20 is empty. The MOQ 19 reads the contents of the MOQ memory 20 to determine if it is empty. If it is determined that the MOQ memory 20 is empty, the process continues to the optional step 1612. At step 1612, the MOQ 19 reports that processing is complete, and no conflict has been found with the snoop request. The process continues and ends at step 1638.

However, if it is determined at 1610 that the MOQ memory 20 is not empty (or the optional step 1610 is not utilized), the process continues to step 1614. At step 1614, the MOQ 19 initializes conflict checking to begin at a head entry of the MOQ memory 20 by setting a current MOQ memory 20 entry pointer to a head pointer. The process continues to step 1618. At step 1618, the MOQ 19 performs a conflict check between the snoop request and the current entry in the MOQ memory 20. In some embodiments, the conflict check compares, at least in part, a key of the snoop request and a key stored in the current entry. In some embodiments, the conflict check compares, at least in part, a key and additional status information associated with each of the snoop request and the current entry. In some embodiments, the conflict check is further affected by control signals from other logic. For example, certain entries are selectively masked and thus prevented from comparing successfully, or similarly prevented from being found as a conflict even if the entries compare successfully. The resulting information from the snoop in step 1618 is retained by the MOQ 19, and the process continues to step 1620.

At step 1620, the MOQ 19 (more particularly, the MOQ control logic 21) determines whether or not there is a conflict from the snoop data retained from step 1618. In some embodiments, a conflict is detected if the snoop request hits the current entry in the MOQ 19. In some embodiments, a snoop request hits an entry in the MOQ memory 20 if the snoop request has a key and status matching a key and status of the entry. In some embodiments, a conflict is not detected even if the snoop request hits the current entry, when the current entry is associated with a load operation, and all previously checked entries are complete (e.g., already written by an associated operation). In some embodiments, a conflict is not detected even if the snoop request hits the current entry, when the current entry is associated with a load operation, and the snoop request is a downgrade (as opposed to an invalidate). If it is determined that a conflict is detected, the process continues to step 1622.

At step 1622, the MOQ 19 reports that processing is complete and a conflict for the snoop request has been found with the current MOQ memory 20 entry, and optionally returns associated conflict information to the IU 115. In some embodiments, conflict information comprises an indication that the conflict is due to a snoop request. In some embodiments, conflict information comprises a trace ID of an operation associated with the current MOQ memory 20 entry. In some embodiments, conflict information comprises an MOQ ID of the current entry. The process then continues and ends at step 1638.

However, if it is determined that there is no conflict detected, the process continues to step 1630. At step 1630, a determination is made as to whether or not the current MOQ memory 20 entry pointer is the same as a tail pointer. The MOQ control logic 21 compares the current MOQ memory 20 entry pointer to the tail pointer for the same entry to see if they are identical. If it is determined that the MOQ memory 20 entry pointer is the same as the tail pointer, the process continues to step 1632. At step 1632, the MOQ 19 reports to the IU 115 that processing is complete and no conflict has been found with the snoop request. The process then continues and ends at step 1638.

If, however, it is determined that the MOQ memory 20 entry pointer is not the same as the tail pointer, the process continues to step 1634. At step 1634, the current MOQ memory 20 entry pointer is advanced to point at the next entry in the MOQ memory 20 in a required order. In some embodiments, advancing the current entry pointer to the next entry in the required order is accomplished by incrementing the current entry pointer modulo the size of the MOQ 19. In some embodiments, advancing the current entry pointer to the next entry in the required order is accomplished by following a pointer from the current entry to a next entry in the required order. The process continues to step 1618.

Referring now to FIG. 28B, the parallel process for checking for conflicts in response to a MOQ snoop request 1640 is shown in accordance with an embodiment of the invention. A first (oldest) conflicting entry, if any, in a selected portion of an MOQ 19 (starting from a head entry and continuing through a tail entry) is determined.

The process starts at step 1642 and continues to step 1644. At step 1644, the MOQ 19 performs a parallel comparison between the snoop request and all MOQ memory 20 entries, generating a vector of "hit" indications. In some embodiments, the comparison uses at least a key stored in each of the entries. In some embodiments, the comparison uses at least a key and additional status information stored in each of the entries. In some embodiments, the comparison is further affected by control signals from other logic. For example, certain entries are selectively masked and thus prevented from comparing successfully, or similarly prevented from being found as a conflict even if the entries compare successfully.

It is noted that a tail pointer is not needed, rather, the IU 115 maintains track of the head pointer, such as the pointer 44, and the tail pointer is derived from one less than the head pointer in embodiments where the MOQ uses a circular buffer.

The process continues to step 1650, where the MOQ 19 performs a "find first" operation on the vector of hit indications generated in step 1644, starting in a position of a head entry, and stopping when a first hit is found. In some embodiments, logic, such as a priority encoder, implements the find first operation. In some embodiments, sequential entries are in a required order, and the find first operation proceeds sequentially. In some embodiments, entries in a required order are chained together in a linked list, and the find first operation uses an ordering determined by the linked list. In some embodiments, a first hit is not detected for an entry corresponding to a load operation if all entries prior (in a required order) to the entry corresponding to the load operation are complete (e.g., already written by an associated operation). In some embodiments, a first hit is not detected for an entry corresponding to a load operation if the snoop request is a downgrade (as opposed to an invalidate).

The process continues to step 1660, where it is determined whether or not the find first operation encountered a hit anywhere in the vector of hit indications generated in step 1650. If it is determined that there were no hits in the vector of hit indications, the process continues to step 1664. At step 1664, the MOQ 19 reports to the IU 115 that processing is complete and no conflict has been found with the snoop request. The process then continues and ends at step 1668.

However, if it is determined at step 1660 that a hit was in the vector of hit indications generated in step 1650, the process continues to step 1662. At step 1662, the MOQ 19 reports to the IU 115 that processing is complete and a conflict has been found with the snoop request, and optionally returns associated conflict information. In some embodiments, conflict information comprises an indication that the conflict is due to a snoop request. In some embodiments, conflict information comprises a trace ID of an operation associated with a first conflicting entry. In some embodiments, conflict information comprises an MOQ ID of a first conflicting entry. The process then continues and ends at step 1668.

With regard to FIGS. 28A and 28B, in some embodiments, a snoop request hits (conflicts with) an MOQ memory 20 entry if the snoop request has a same key as the MOQ memory 20 entry, and the MOQ memory 20 entry is valid. In some embodiments, a snoop request hits an MOQ memory 20 entry if the snoop request has a same key as the MOQ memory 20 entry, the MOQ memory 20 entry is valid, and certain other conditions based on a type of operation associated with the MOQ memory 20 entry and validity and type of older MOQ memory 20 entries are met.

While the description of FIGS. 28A and 28B is from a perspective of a single snoop request, in some embodiments multiple MOQ 19 conflict checks are processed at a same time. In some embodiments, different MOQ 19 conflict checks are at different blocks in any of the processes on a same clock cycle. In some embodiments, multiple MOQ 19 conflict checks are at a given block in one of the processes on a same clock cycle. For example, in some embodiments and in some usage scenarios, multiple MOQ 19 conflict checks are optionally completed in a single clock cycle or single pipeline stage, and at least one of the conflict checks is optionally due to a snoop request.

In the processes of FIGS. 28A and 28B, a snoop request is checked for conflicts. In some embodiments, an issue unit 114 receives the snoop request and issues the snoop request down an operation pipeline as a special type of operation. The MOQ 19 is accessed in response to the special type of operation similarly to memory-accessing operation types. In some embodiments, a dedicated search port is provided to the MOQ 19 for processing snoop requests. In some embodiments, a shared search port is provided to the MOQ 19, and is shared between processing snoop requests and memory accessing operations. In various embodiments having a shared search port, processing of a memory accessing operation is stalled or alternatively cancelled (for later re-issue) to grant access to the shared search port for a snoop request.

In some embodiments, internal evictions are treated similarly to snoop requests, and the processes of FIGS. 28A and/or 28B are used for internal eviction requests. In some embodiments, an internal eviction is a cache event (orthogonal to operation pipeline functions relating to execution of operations) and is treated in a similar manner to a snoop request. In some embodiments, conflict information for an internal eviction is reported differently than conflict information for a snoop request. In some embodiments, conflict information for an internal eviction is reported similarly to conflict information for an operation conflict, since the internal eviction is caused by a first operation (that caused the internal eviction) conflicting with a second operation, and is thus a two-operation conflict. In some embodiments, conflict information for an internal eviction comprises trace IDs of a trace causing an eviction, and a trace conflicting with the trace causing the eviction. In some embodiments, an issue unit responds to conflict information of an internal eviction in different ways, and subsequently re-issues operations in different ways, depending on whether an evicting trace ID is older, younger, or the same age as a conflicting trace ID.

Referring now to FIG. 28C, a process for additional processing of a snoop request 1670 is shown, in accordance with an embodiment of the present invention. In some embodiments, as illustrated in FIG. 28C, a snoop request has to update a state in other structures, such as a VCC 22 or a DSB 840, independent of whether the snoop request hit or caused a conflict in an MOQ 19.

The process starts at step 1672 and continues to step 1680. At step 1680, a determination is made by the MOQ 19 as to whether or not the snoop request hits any entries in a VCC 22. In some embodiments, VCC memory 23 entries have a key (or an address) that is compared with a corresponding key (or address) of the snoop request to determine, at least in part, if there is a hit. In some embodiments, the VCC 22 makes the determination at 1680. In fact, while in the embodiments herein, the MOQ 19 is stated to oversee at least some of the VCC 22 operations, in alternative embodiments, the VCC 22 manages and performs the same. This results in a more complicated VCC 22.

In some embodiments, MOQ memory 20 entries are associated with VCC memory 23 entries, and a snoop request hits an entry in the VCC memory 23 if the snoop request hits a corresponding entry in the MOQ 19. In some embodiments, MOQ memory 20 entries are associated with VCC memory 23 entries, and a snoop request hits an entry in the VCC memory 23 if the snoop request hits a corresponding entry in the MOQ 19, and if a type of operation associated with the MOQ memory 20 entry is a store type. In some embodiments, a snoop request hits an entry in the VCC memory 23 if the snoop request hits a corresponding entry in the MOQ 19, and if the MOQ memory 20 entry is associated with a valid VCC memory 23 entry. In some embodiments and/or usage scenarios, a snoop request hits an entry in the MOQ 19, but a snoop conflict is not reported. For example, in some embodiments, a snoop conflict is suppressed based upon a type of a snoop request and types of entries in the MOQ 19.

If it is determined at step 1680 that the snoop request did not hit any entry in the VCC memory 23, the process continues to step 1698 because no VCC 22 state update due to the snoop request is required. After step 1694, the process continues to the optional step 1696.

At step 1696, the DSB 840 performs an optional function of invalidating any entries in a DSB 840 that the snoop request hits. In some embodiments, DSB 840 entries have an address that is compared with an address of the snoop request to determine, at least in part, if there is a hit. In some embodiments, DSB 840 entries have a key that is compared with a key of the snoop request to determine, at least in part, if there is a hit. In some embodiments, a DSB 840 entry is not hit by the snoop request if a trace ID of the DSB 840 entry corresponds to an already-committed trace. Any entries in the DSB 840 hit by the snoop request are invalidated.

In some embodiments where an address in a DSB entry is a complete memory address (at a granularity of a size of a data item in the DSB entry), invalidating a DSB entry that is hit by a snoop request is, in some usage scenarios, a power-saving optimization that prevents the hit entry from being needlessly written into a cache, since the snoop request must also have hit an MOQ memory 20 entry corresponding to a store operation that created or updated the DSB entry, resulting in an abort event for a trace containing the store operation.

In some embodiments where an address in a DSB entry is a portion of a complete memory address, such as when the DSB entry does not provide storage for some high-order bits of the complete memory address, a snoop request that hits a cache line and a corresponding DSB entry invalidates and/or de-allocates the DSB entry. The process then continues and ends at step 1698.

However, if it is determined at step 1680 that the snoop request did hit an entry in the VCC 22, the process continues to step 1690. At step 1690, the VCC 22 determines what type of snoop request was sent. If the snoop request is a downgrade type, the process continues to step 1694. At step 1694, the MOQ 19 (or VCC in the case where the VCC is more complicated in design) downgrades any and all entries in the VCC 22 that the snoop request hit. In some embodiments, a VCC memory 23 entry is downgraded by changing a tag state associated with the entry. In some embodiments, a VCC memory 23 entry is downgraded by changing a clean/dirty bit associated with the entry to indicate clean. The process then continues to the optional step 1696.

However, if it is determined at step 1690 that the snoop request is an "invalidate" type, the process continues to step 1692. At step 1692, the MOQ 19 (or VCC in the case where the VCC is more complicated in design) invalidates any and all entries in the VCC 22 that the snoop request hit. In some embodiments, a VCC memory 23 entry is invalidated by clearing one or more valid bits of the entry. The process continues to the optional step 1696.

Referring now to FIG. 29A, a process for determining a VCC ID for use in updating a VCC memory entry 1700 is shown in accordance with an embodiment of the invention. In some embodiments, each VCC 23 entry is associated with a VCC ID, the VCC ID serving to uniquely identify and/or to address the VCC memory 23 entry. In some embodiments, a VCC memory 23 entry is allocated for an operation prior to issuing of the operation into an operation pipeline, such as in accordance with operation pipeline stages 396, as illustrated in FIG. 15, and the pre-allocated VCC memory 23 entry is updated during execution of the operation. In some embodiments, an execution-derived key, such as a memory address or a unique cache location identifier, is used during execution of an operation to determine if a valid VCC memory 23 entry is already associated with the key. If a VCC memory 23 entry having the key is found, the found VCC memory 23 entry is updated by the operation, merging data from the operation into existing contents of the found VCC memory 23 entry. In some embodiments, a VCC memory 23 entry is dynamically allocated and updated during execution of the operation.

As shown in FIG. 29A, the process starts at step 1702 and continues to step 1710. At step 1710, a determination is made as to whether or not an operation that has been issued has completed execution to a point of producing a key.

In some embodiments, each operation is associated with a trace ID. In some embodiments, the trace ID is pipelined down an operation pipeline along with the operation. In some embodiments, attributes of the operation, such as whether a memory access of the operation is cacheable, or a type of the operation, are pipelined down an operation pipeline by the MRB 16 along with the operation. In some embodiments, some attributes of the operation, such as whether a memory access of the operation is cacheable, are determined during execution of the operation. If it is determined that an operation has not completed execution to a point of producing a key, the process stalls at step 1710.

However, if it is determined at step 1710 that an operation has completed execution to a point of producing a key, the process continues to step 1720. At step 1720, a determination is made as to whether or not the operation requires a VCC memory 23 entry. In some embodiments, cacheable, memory-modifying operations require VCC memory 23 entries. In some embodiments, cache operations, such as cache flushes or cache invalidates, require VCC memory 23 entries. If it is determined that the operation does not require a VCC memory 23 entry, the process continues to step 1710.

If, however, it is determined at step 1720 that the operation does require a VCC memory 23 entry, the process continues to step 1730. At step 1730, the MOQ 19 (or in the case where the VCC is more complicated, the VCC) makes a determination as to whether or not an existing entry matches the operation in the VCC 22. In some embodiments, an entry in a VCC 22 or an MOQ 19 matches the operation if the entry is valid and has a same key as the key of the operation. In some embodiments, an entry in a VCC 22 or an MOQ 19 matches the operation if the entry is valid and has a same key and a same trace ID as the key and the trace ID of the operation. In some embodiments, no entry in a VCC 22 or an MOQ 19 matches the operation—all operations receive new VCC memory 23 entries. In some embodiments, such as a VCC 22 comprising entries such as those illustrated in FIG. 16G, matching entries are searched for among entries in the VCC 22, and a matching VCC memory 23 entry, if any, is identified. In some embodiments where MOQ memory 20 entries are associated with VCC memory 23 entries, matching entries are searched for among entries in an MOQ 19, and the VCC memory 23 entry associated with a matching MOQ memory 20 entry, if any, is identified. If it is determined that there was a matching entry (a "hit"), the process continues to step 1734.

At step 1734, the MOQ 19 (or VCC in the case where the VCC is more complicated) uses the VCC ID of the "hit" entry in the VCC memory 23 for the operation. The process then continues to the optional step 1738. At step 1738, the deallocation unit 25 deallocates (frees) a VCC memory 23 entry that was pre-allocated prior to issuing the operation into an operation pipeline. The pre-allocated VCC memory 23 entry is not needed by the operation since the operation was a "hit" in the VCC 22. The process continues to step 1748.

At step 1748, the MOQ 19 (or VCC in the case where the VCC is more complicated) updates the VCC memory 23 entry associated with the VCC ID. In some embodiments, updating a VCC memory 23 entry writes information of the operation into the VCC memory 23 entry and marks the VCC memory 23 entry as valid. In some embodiments, updating a VCC memory 23 entry merges information of the operation into an already-valid VCC memory 23 entry. In some embodiments, updating a VCC memory 23 entry writes at least one of the data items in the VCC memory 23 entry. In some embodiments, updating a VCC memory 23 entry sets at least one of the data valid bits in the VCC memory 23 entry. In some embodiments, the update of a VCC memory 23 entry uses a process illustrated in FIG. 29B. The process then continues to step 1710.

However, if at step 1730 it is determined that there is no matching entry (a "miss"), the process continues to step 1740. At step 1740, a determination is made as to whether or not a pre-allocated entry for the operation exists in the VCC memory 23. In some embodiments, the operation is pre-allocated a VCC memory 23 entry before being issued into an operation pipeline, and if the operation misses in the VCC 22, a VCC ID of the pre-allocated VCC memory 23 entry is used by the operation. In some embodiments, some or all operations are not pre-allocated VCC memory 23 entries before being issued, and the MOQ 19 (or VCC in the case where the VCC is more complicated) attempts to allocate a VCC memory 23 entry for the operation. If the allocation is successful, a VCC ID of an allocated VCC memory 23 entry is used by the operation, and processing continues as though the entry was allocated. If it is determined that there is no allocated entry at 1740, the process continues to the optional step 1742. In some embodiments when allocation is not successful, the operation stalls, as illustrated by path 1741, until allocation completes successfully, or in some embodiments, until a predetermined amount of time or number of clock cycles elapses. In some embodiments, stalling allocation also stalls the operation pipeline. In other embodiments when allocation is not successful, or when the operation has stalled for a predetermined amount of time or number of clock cycles, the process continues to step 1742.

At step 1742, optionally, after 1740, the operation is canceled, causing the operation to not complete execution in the operation pipeline, and returns the operation to an earlier pipeline stage where the operation is optionally re-issued. In some embodiments, canceling the operation does not result in any action because the IU 115 allocates in the beginning of the pipeline, thus, due to the pre-allocation, no action is required.

In some embodiments, cancelling an operation due to inability to allocate a VCC memory 23 entry entails corrective action, such as aborting one or more traces, or cancelling other operations. The process continues to step 1710.

However, if there is an allocated entry or an entry was successfully allocated as described above, the process continues to step 1746. At step 1746, the VCC control circuit 24 updates the VCC memory 23 entry for the specified VCC ID of the operation. The process then continues to step 1710.

While the description of FIG. 29A is from a perspective of a single operation, in some embodiments multiple operations are processed at a same time, each operation using the process illustrated in FIG. 29A. In some embodiments, different operations are at different blocks in the process on a same clock cycle. In some embodiments, multiple operations are at a given block in the process on a same clock cycle. For example, in some embodiments, multiple operations optionally perform a VCC lookup and/or multiple VCC memory 23 entries are optionally allocated in a single clock cycle or single pipeline stage.

Referring now to FIG. 29B, a process for updating a VCC memory entry 1750. In some embodiments, the process of FIG. 29B is performed in coordination with, and optionally sharing some or all functions of, a process for updating an MOQ memory 20 entry, such as illustrated in FIG. 26. Issues discussed in relation to FIG. 26 regarding operations having read (or write) accesses that span a cache line boundary apply similarly to the process of FIG. 29B. In some embodiments where a VCC memory 23 entry has storage for a full cache line of data, and in case of a cache-line spanning access, multiple data items corresponding to different cache lines are recorded in different data items of the VCC memory 23 entry.

The process 1750 starts at step 1752 and to step 1760. At step 1760, a determination is made by the MOQ 19 as to whether or not an ordered operation that has been assigned a VCC ID has completed sufficiently to enable a write of a VCC memory 23 entry. An "ordered operation" is an operation allocated a VCC memory 23 entry to ensure, at least in part, that the operation is processed without violating architectural constraints of a required order, despite out-of-order execution. In some embodiments, the VCC ID is the same as a corresponding MOQ ID assigned to the operation. In some embodiments, a VCC memory 23 entry is allocated for an operation and a corresponding VCC ID is sent down an operation pipeline when the operation issues. In some embodiments, a VCC 22 is searched by an operation during execution of the operation, such as during a data cache access pipeline stage, to determine if the operation hits an existing entry in the VCC memory 23. If the operation hits an entry in the VCC memory 23, the hit entry is used for the operation. If the operation does not hit any entry in the VCC memory 23, a new entry in the VCC 22 is allocated for the operation. If the operation does not hit any entry in the VCC memory 23 and there are no free entries in the VCC memory 23, the operation is canceled and is optionally subsequently be re-issued. In some embodiments, an operation completes to a point of being able to write a VCC memory 23 entry prior to when all execution of the operation is complete. If it is determined that an ordered operation that has been assigned a VCC ID has not completed sufficiently to enable a write of a VCC memory 23 entry, the process loops to step 1760. However, if it is determined that an ordered operation that has been assigned a VCC ID has completed sufficiently to enable a write of a VCC memory 23 entry, the process continues to step 1764.

At step 1764, the VCC control circuit 24 obtains inputs for a write to a VCC memory 23 entry from a prior pipeline stage, such as in accordance with data cache access pipeline stage 323 (which is the same as the DCA 45 stage of FIG. 8), as illustrated in FIG. 15. In some embodiments, the inputs comprise a VCC ID and data read from a cache. In some embodiments, the VCC ID is a VCC memory 23 entry pointer. In some embodiments, the inputs comprise a set of bank enables, the active bank enables corresponding to a portion of the data read from the cache that is valid. In some embodiments, the inputs comprise an address. In some embodiments, the inputs comprise a key, such as an execution-derived key. In some embodiments, the inputs comprise status for the operation. The process continues to step 1770.

At step 1770, a determination is made as to whether to perform a VCC 22 update for the operation. According to various embodiments, VCC 22 writes are performed for one or more of speculative store operations, non-speculative store operations, store operations issued out-of-order, store operations accessing cacheable memory, and store operations accessing write-combing memory. In some embodiments, VCC writes are omitted for store operations accessing uncacheable memory. If it is determined that a VCC 22 update is not needed, the process continues to step 1760.

However, if it is determined that a VCC 22 update is needed, the process continues to step 1774. At step 1774, a VCC memory 23 entry is written at the given VCC ID with the data read from the cache and, in some embodiments, related information such as status of the operation. In some embodiments, one or more of an address, bank enables, and status are written into the VCC memory 23 entry along with the data. In some embodiments, the writing of data into a VCC memory 23 entry writes a portion of the VCC memory 23 entry, the portion corresponding to banks of the cache accessed for a corresponding store operation. In some embodiments, bank enables provided with the data read from the cache control a portion of data in a VCC memory 23 entry that is written. In some embodiments, bank enables provided with the data read from the cache are written into a VCC memory 23 entry as data valid bits, the data valid bits indicating a portion of data in the VCC memory 23 entry that is valid. In some embodiments, an update of a VCC memory 23 entry merges data and related information of the update with existing data and related information in the VCC memory 23 entry. In some embodiments, step 1774 corresponds to a pipeline stage, such as in accordance with VCC write pipeline stage 364 as illustrated in FIG. 15. The process then continues to step 1760 to await substantial completion of a subsequent operation.

While the description of FIG. 29B is from a perspective of a single operation, in some embodiments multiple operations are processed at a same time, each operation using the process illustrated in FIG. 29B. In some embodiments, different operations are at different blocks in the process on a same clock cycle. In some embodiments, multiple operations are at a given block in the process on a same clock cycle. For example, in some embodiments, multiple VCC memory 23 entries are optionally written in a single clock cycle or single pipeline stage.

Referring now to FIG. 30A, a process for returning cache data selectively merged with data from a VCC 22 in response to a snoop request in a serial fashion 1800 is illustrated in accordance with an embodiment of the invention. FIG. 30A illustrates a serialized embodiment of the process 1800 operating on a single bank of a VCC. In some embodiments, one instance of the process operates across all banks of a VCC 22 in parallel. In some embodiments, multiple instances of the process operate, each on a respective bank of a VCC 22. In the process, entries are examined one at a time beginning with a starting entry and continuing through a tail entry. A first (oldest) hit entry having valid data in a bank position being processed, if any, is selectively merged into a corresponding bank position in cache line data to form a portion of a data result of the snoop request.

The process 1800 starts at step 1802 and continues to the optional step 1810. At step 1810, a determination is made as to whether or not the processing of the snoop request resulted in a conflict. In some embodiments with an MOQ 19 where MOQ memory 20 entries each have an associated VCC memory 23 entry, if there is no conflict in the MOQ 19, then there is no merging of data from the VCC 22 in response to a snoop request. In some embodiments without an MOQ 19, where a snoop request associatively searches the VCC 22 directly, if there is no conflict in the VCC 22, then there is no merging of data from the VCC 22 in response to a snoop request. If it is determined that there is no snoop conflict at 1810, the process continues to step 1812. At step 1812, the MOQ 19 continues processing and reports to the VCC 22 that no VCC 22 merge is needed, and that an unmodified cache line in the bank position being processed is to be returned in response to the snoop request. The process continues and ends at step 1848.

If, however, it is determined at step 1810 that there was a snoop conflict, the process continues to the optional step 1820. At step 1820, the MOQ 19 determines if the VCC 22 is empty. In some embodiments, the VCC 22 is empty if a head pointer and a tail pointer have a same value. In some embodiments, the VCC 22 is empty if there is no valid data in the VCC 22. If it is determined that the VCC 22 is empty at step 1820, the process continues to step 1822. At step 1822, the MOQ 19 reports to the VCC 22 that no VCC 22 merge is required, and that an unmodified cache line in the bank position being processed is to be returned in response to the snoop request. The process continues and ends at step 1848.

If it is instead determined at step 1820 that the VCC 22 is empty, the process continues to step 1824. At step 1824, the MOQ 22 initializes VCC 22 searching to begin at a starting VCC memory 23 entry by setting a current VCC memory 23 entry pointer to a starting entry pointer. In some embodiments, the starting entry is the same as a head entry. In other embodiments, the starting entry is chosen to skip an initial portion of entries in the VCC 22, such as a portion all of which is known to not conflict with the snoop request. The process continues to step 1828.

At step 1828, the MOQ 19 performs a conflict check between the snoop request and the current VCC memory 23 entry. In some embodiments, the conflict check compares, at least in part, a key associated with the snoop request and a key stored in the current VCC memory 23 entry. In some embodiments, the conflict check compares, at least in part, a key and additional status information associated with the snoop request and a key and additional status information stored in the current VCC memory 23 entry. In some embodiments, the conflict check is further affected by control signals from other logic. For example, certain VCC memory 23 entries are selectively masked and thus prevented from comparing successfully, or similarly prevented from being found as a conflict even if the entries compare successfully. In some embodiments where there is an association between MOQ memory 20 entries and VCC memory 23 entries, the MOQ 19 does not perform a comparison of the snoop request against the current VCC memory 23 entry, but instead uses results of such a comparison done between the snoop request and an MOQ memory 20 entry associated with the current VCC memory 23 entry, such as the comparison done in step 1618, as illustrated in FIG. 28A. The MOQ 20 uses results of a comparison between an associated MOQ memory 20 entry and the snoop request, combined with status information in the associated MOQ memory 20 entry and/or in the current VCC memory 23 entry, such as whether an operation associated with the MOQ memory 20 entry is of a store type and accesses cacheable memory. The process continues to step 1830.

At step 1830, a determination is made by the MOQ 19 as to whether or not the snoop request hit the current VCC memory 23 entry. If it is determined that the snoop request did not hit the current VCC memory 23 entry, the process continues to step 1840. At step 1840, a determination is made by the MOQ 19 as to whether or not the current VCC memory 23 entry pointer is the same as a tail pointer. If the current VCC memory 23 entry pointer is at the tail pointer, the process continues to step 1842. It is noted that the process shown in FIG. 30A is performed by embodiments where the MOQ 19 does not perform a parallel comparison of entries, such as shown in FIG. 8, rather, a sequential comparison is done for each entry.

At step 1842, the MOQ 19 reports that no VCC 22 merge is needed, and that an unmodified cache line in the bank position being processed is to be returned in response to the snoop request. The process then continues and ends at step 1848.

However, if it is determined that the current VCC memory 23 entry pointer is not at the tail pointer, the process continues to step 1844. At step 1844, the current VCC memory 23 entry pointer is advanced by the MOQ 19 to point at a next entry in a required order. In some embodiments, advancing the current entry pointer to the next entry in the required order is accomplished by incrementing the current entry pointer modulo the size of the VCC. In some embodiments, advancing the current entry pointer to the next entry in the required order is accomplished by following a pointer from the current entry to a next entry in the required order. In some embodiments, a new, current VCC memory 23 entry pointer is obtained by advancing a current MOQ memory 20 entry pointer, and then following a pointer from the new, current MOQ memory 20 entry to an associated VCC memory 23 entry. The process then continues to step 1828 to perform a conflict check of the snoop request against the new, current VCC memory 23 entry.

However, if at step 1830 the snoop request hit the current VCC memory 23 entry, the process continues to step 1832. At step 1832, a determination is made by the MOQ 19 to determine if the current VCC memory 23 entry is valid in the bank position being processed. If it is determined that the current VCC memory 23 entry is not valid in the bank position being processed, processing continues with step 1840 to continue searching. However, if at step 1832 the current VCC memory 23 entry is valid in the bank position being processed, then an oldest, hit VCC memory 23 entry with valid data in the bank position being processed has been found, and processing continues to step 1836. At step 1836, the MOQ 19 reports that a VCC 22 merge is needed, and the VCC control circuit 24 merges a data item of the current VCC memory 23 entry in the bank position being processed with a corresponding data item of a cache line read in response to the snoop request to produce a portion of the snoop data response in the bank position being processed.

In some embodiments, the snoop data response is sent over multiple clock cycles, such as half of a cache line in each of two clock cycles. In some embodiments, half of a cache line is accessible from a cache in a given clock cycle, and a snoop data response is sent over two clock cycles. In some embodiments, half of a cache line is accessible from a VCC in a given clock cycle, and a snoop data response is sent over two clock cycles. In some embodiments, a speculative MESI state of the cache line read from cache tags in response to the snoop request is sent with a first portion of the snoop data response, and the speculative MESI state is used to control processing of the snoop data response with respect to other caches in the system. In other embodiments, a prior MESI state of the cache line is obtained from the VCC as a function of a prior MESI state associated with each oldest, hit VCC memory 23 entry with valid data, if any, in each bank position, and the prior MESI state is returned as part of the snoop data response. At step 1836, the process continues and ends at step 1848.

Referring now to FIG. 30B, a process for returning cache data selectively merged with data from a VCC 22 in response to a snoop request in a parallel fashion 1870 is illustrated in accordance with an embodiment of the invention. In some embodiments, one instance of the process operates across all banks of a VCC 22 in parallel. In some embodiments, multiple instances of the process operate, each on a respective bank of a VCC 22. A first (oldest) matching data item in each data item position (such as a bank) is selectively merged into a corresponding position in cache line data to form a portion of a data result of the snoop request.

The process 1870 starts at step 1872 and continues to step 1874. At step 1874, the MOQ 19 performs a parallel comparison between the snoop request and all VCC memory 23 entries, generating a vector of "hit" indications. Performing parallel comparison advantageously improves performance, however, additional circuitry is needed.

In some embodiments, the comparison uses a key associated with the snoop request and a key stored in each of the entries. In some embodiments, the comparison uses a key and additional status information associated with the snoop request and a key and additional status information stored in each of the entries. In some embodiments, the comparison is further affected by control signals from other logic. For example, certain VCC memory 23 entries are selectively masked and thus prevented from comparing successfully, or similarly prevented from being found as a conflict even if the entries compare successfully. In some embodiments where there is an association between MOQ memory 20 entries and VCC memory 23 entries, the MOQ 19 does not perform a comparison of the snoop request against all of the VCC memory 23 entries, but instead uses results of such a comparison done between the snoop request and all of the MOQ memory 20 entries, such as the comparison done by the MOQ 19 from step 1644, as illustrated in FIG. 28B.

The process continues to step 1876, where the MOQ 19 masks the vector of hit indications independently for each bank position in the VCC 22. In some embodiments, each entry in the VCC 22 stores one data item with a corresponding valid bit. In some embodiments, each entry in the VCC 22 stores multiple data items, each with a corresponding valid bit. In some embodiments, each data item position corresponds to a bank of the VCC 22. In some embodiments, each data item position corresponds to a bank of a cache. In each bank position of the VCC 22, a vector of valid bits, one for a data item of each entry in the bank position, is used as a mask and applied to the vector of hit indications to generate a vector of masked hit indications for the bank position.

The process continues to step 1878, where the MOQ 19 performs, independently for each bank position, a "find first" operation (such as done in the MO2 stage) on the vector of masked hit indications (generated in block 1876), beginning with a starting entry and continuing through a tail entry. In some embodiments, the find first operation is performed in parallel; in other embodiments, the find first operation is performed serially. In various embodiments, the find first operation is performed by a structure similar to find first 990, as illustrated in FIG. 21B. In some embodiments, the starting entry is the same as a head entry. In other embodiments, the starting entry is chosen to skip an initial portion of entries in the VCC 22, such as a portion all of which is known to not conflict with the snoop request. In some embodiments, sequential entries are in a required order, and the find first operation proceeds sequentially. In some embodiments, entries in a required order are chained together in a linked list, and the find first operation uses an ordering determined by the linked list. In some embodiments, the find first operation produces a result comprising an indication of whether any bit in the vector of masked hit indications reported a hit. In some embodiments, the find first operation produces a result comprising an index of a first hit found in the vector of masked hit indications, the index being usable to extract a first hit data item from a VCC memory 23 entry corresponding to the index.

The process continues to step 1880, where a determination is made by the MOQ 19 independently for each bank position if the find first operation encountered a hit anywhere in the vector of masked hit indications. If it is determined that there were no hits found in any bank position of the VCC 22, the process continues to step 1884. At step 1884, the MOQ 19 reports to the VCC control circuit 24 that no VCC 22 merge is needed, and that an unmodified cache line is to be returned in response to the snoop request. The process continues and ends at step 1890.

However, if it is determined at step 1880 that there was a hit in the bank positions, the process continues to step 1882. At step 1882, the MOQ 19 reports that a VCC 22 merge is needed, and, independently for each bank position with a hit, merges the first hit data item in the bank position into a corresponding data item of a cache line read in response to the snoop request to produce a data response to the snoop request. Processing then ends with block 1890.

In some embodiments, the process of updating a VCC memory 23 entry, as illustrated in FIG. 29B, operates in parallel with either of the processes of FIG. 30A or 30B for returning cache data at least in part from a VCC in response to a snoop request. In some embodiments, a VCC has multiple ports, enabling one or more VCC update processes and VCC snoop response processes to operate in parallel without interference.

FIGS. 31A and 31B illustrate selected details of embodiments of processes for accessing a VCC to rollback data to a cache. Both FIGS. 31A and 31B illustrate serialized embodiments of rollback processes that replay all data stored in the VCC in reverse order (from youngest to oldest). In FIG. 31A, each entry is considered in turn, whereas in FIG. 31B, the process skips invalid entries. In some embodiments, the processes illustrated in FIGS. 31A and 31B operate on all banks in parallel, examining entries in the VCC in reverse order, and rolling back any valid data in each data item position (e.g., bank) of each entry into the cache.

Referring now to FIG. 31A, a process for sequentially accessing a VCC to rollback data to a cache 1900 is illustrated in accordance with an embodiment of the invention. The process is serialized, and, in some embodiments, the process operates on all banks in parallel, examines entries in the VCC 22 in reverse order, and rolls back any valid data in each data item position of each entry into the cache.

The process 1900 starts in step 1902 and continues to the optional step 1910. At step 1910, a determination is made by the MOQ 19 as to whether or not the VCC 22 is empty. In some embodiments, the VCC 22 is empty if a head pointer and a tail pointer have a same value. In an exemplary embodiment, the VCC memory 23 is a circular buffer and no head pointer is needed, as in the case of the MOQ. In some embodiments, the VCC 22 is empty if the VCC 22 contains no valid data items. If it is determined at step 1910 that the VCC 22 is empty, the process VCC control circuit 24 that no VCC 22 rollback is needed. The process 1900 continues and ends at step 1928.

However, if it is determined at 1910 that the VCC 22 is not empty, the process continues to step 1914. At step 1914, the MOQ 19 initializes the current VCC memory 23 entry pointer to begin at an ending entry of the VCC 22. In some embodiments, the ending entry is the same as an entry at a tail pointer. In some embodiments, the ending entry is the same as an entry at an allocation pointer. In some embodiments, the ending entry is a youngest entry with one or more valid data items. The process continues to step 1918.

At step 1918, the MOQ 19 examines the current VCC memory 23 entry and, for each valid data item in the current VCC memory 23 entry, writes the data item back into a corresponding data item position of the cache at a location associated with the current VCC memory 23 entry. In some embodiments, the MOQ 19 examines the current VCC memory 23 entry and, for each valid data item in the current VCC memory 23 entry, writes corresponding tag information back into tag state of the cache at a location associated with the current VCC memory 23 entry and, in some embodiments, the data item position.

The process continues to step 1920, where a determination is made by the MOQ 19 as to whether or not the current VCC memory 23 entry pointer is at a starting entry of the VCC 22. In some embodiments, the starting entry is the same as an entry at a head pointer. In some embodiments, the starting entry is an oldest entry with one or more valid data items. If it is determined that the current VCC memory 23 entry pointer is at a same entry as the starting entry, the process continues to step 1922. At step 1922, the MOQ 19 reports to the VCC control circuit 24 that the VCC rollback is complete. The process continues and ends at step 1928.

However, if at 1920 the current VCC memory 23 entry pointer does not indicate a same entry as the starting entry, the process continues to step 1924. At step 1924, the current VCC memory 23 entry pointer is retreated to point at a previous entry in a required order. In some embodiments, retreating the current VCC memory 23 entry pointer to the previous entry in the required order is accomplished by decrementing the current VCC memory 23 entry pointer modulo the size of the VCC 22. In some embodiments, retreating the current VCC memory 23 entry pointer to the previous entry in the required order is via following a pointer from the current VCC memory 23 entry to a previous entry in the required order. In some embodiments, a new, current VCC memory 23 entry is obtained by retreating a current MOQ memory 20 entry pointer, and then following a pointer from the new, current MOQ memory 20 entry to an associated VCC memory 23 entry. The process then continues to step 1918 to perform a rollback of the new, current VCC memory 23 entry.

Referring now to FIG. 31B, a process 1940 for accessing only valid VCC memory entries to rollback data to a cache is illustrated in accordance with an embodiment of the invention. The process is serialized, and, in some embodiments, the process operates on all banks in parallel, examines entries in the VCC 22 in reverse order, and rolls back any valid data in each data item position of each entry into the cache. In some embodiments, multiple instances of the process operate, one for each bank of the VCC 22. In some embodiments, one instance of the process operates across all banks in parallel. In the process, entries are examined one at a time beginning with an entry after an ending entry pointer, and continuing through a starting entry pointer. Valid entries are rolled back into the cache, and processing continues with a preceding (older) valid entry, if any. In some embodiments, the ending entry is the same as an entry at a tail pointer. In some embodiments, the ending entry is the same as an entry at an allocation pointer. In some embodiments, the ending entry is a youngest entry with one or more valid data items. In some embodiments, the starting entry is the same as an entry at a head pointer. In some embodiments, the starting entry is an oldest entry with one or more valid data items.

The process 1940 starts at step 1942 and continues to the optional step 1944. At step 1944, a determination is made by the MOQ 19 as to whether or not the VCC 22 is empty. In some embodiments, the VCC 22 is empty if a head pointer and a tail pointer have a same value. In some embodiments, the VCC 22 is empty if the VCC 22 contains no valid data items. If it is determined at step 1944 that the VCC 22 is empty, the process continues to step 1946. At step 1946, the MOQ 19 reports to the VCC control circuit 24 that no VCC 22 rollback is needed. The process 1900 continues and ends at step 1928. It is noted that FIGS. 31A and 31B represent alternate ways for accomplishing rollback and in the embodiment of FIG. 31B, because only valid entries are checked, the process is advantageously faster.

If it is determined at 1944 that the VCC is not empty, the process continues to step 1948. At step 1948, the MOQ 19 initializes a current entry pointer to begin at an entry subsequent to the ending entry of the VCC 22. The process continues to step 1950. At step 1950, the MOQ 19 retreats the current VCC memory 23 entry pointer to point at a previous valid entry in a required order, if any. A VCC memory 23 entry is valid, for the purposes of step 1940, if the entry has a valid data item in one or more of the data item positions being processed. In some embodiments, there is no prior valid entry if the retreating goes past the starting entry of the VCC 22. In some embodiments, retreating the current entry pointer to point at a previous valid entry in the required order is accomplished by decrementing the current entry pointer modulo the size of the VCC 22 until the entry reached is valid (i.e., has a valid data item), or until the starting entry is examined. In some embodiments, retreating the current entry pointer to point at a previous entry in the required order is accomplished by repeatedly following pointers to previous entries in the required order, starting with the current entry, until a valid entry is found. In some embodiments, a new, current VCC memory 23 entry is obtained by retreating a current MOQ memory 20 entry pointer until a valid VCC memory 23 entry is found, and then following a pointer from the new, current MOQ memory 20 entry to an associated VCC memory 23 entry. The process continues to step 1960.

At step 1960, a determination is made by the MOQ 19 as to whether or not there are any remaining valid entries in the VCC 22 (i.e., the retreating to a prior valid entry performed in step 1950 did not find a prior valid entry). If it is determined that there are no prior valid entries, the process continues to step 1962. At step 1962, the MOQ 19 reports to the IU 115 that VCC rollback is complete. The process continues and ends at step 1968.

However, if it is determined at 1960 that there is a prior valid entry, the process continues to step 1966. At step 1966, the MOQ 19 examines the current VCC memory 23 entry and, for each valid data item in the entry in a data item position being processed, writes the data item back into a corresponding data item position of the cache at a location associated with the current VCC memory 23 entry. In some embodiments, the MOQ 19 examines the current VCC memory 23 entry and, for each valid data item in the entry in a data item position being processed, writes corresponding tag information back into tag state of the cache at a location associated with the current VCC memory 23 entry and, in some embodiments, the data item position. The process continues to step 1950, where the VCC roll back continues by searching for a prior valid entry.

In some embodiments, the process 1940 runs independently on each bank of the VCC 22. In some embodiments, a first copy of process 1940 running on a first bank position of the VCC is enabled to find and to rollback a first valid data item from a first VCC memory 23 entry pointer to a first bank of the cache, and at substantially a same time, a second copy of process 1940 running on a second bank position of the VCC is enabled to find and to rollback a second valid data item from a second VCC memory 23 entry pointer to a second bank of the cache. In some embodiments, there is one copy of process 1940 running for each bank position of the VCC.

With regard to block 1918 of FIG. 31A and block 1966 of FIG. 31B, rollback of a VCC memory 23 entry to a cache uses a cache location associated with the VCC memory 23 entry. In some embodiments, a cache location associated with a VCC memory 23 entry is determined by a key of the VCC memory 23 entry. In some embodiments, a cache location associated with a VCC memory 23 entry is determined by a key of a corresponding MOQ memory 20 entry. In some embodiments, a key in a VCC memory 23 entry or in an MOQ memory 20 entry comprises a cache way number and an index within the given way. In some embodiments, a key in a VCC memory 23 entry or in an MOQ memory 20 entry comprises an address or a portion of an address. In some embodiments, a VCC memory 23 entry stores less than a cache line of data, and a key in a VCC memory 23 entry identifies a portion of a line in a cache. In some embodiments, a VCC memory 23 entry stores data, in one or more data items, that spans a cache line boundary, and writing back contents of the VCC memory 23 entry writes a first data item to a first cache line, and a second data item to a second cache line.

Further with regard to block 1918 of FIG. 31A and block 1966 of FIG. 31B, in some embodiments, rollback of an entry of a VCC to a location in a cache restores a prior tag state as well as a prior data state. In some embodiments, tag information in a VCC memory 23 entry comprises a MESI state value. In some embodiments, tag information in a VCC memory 23 entry comprises a clean/dirty portion of a MESI state value, but not a shared/owned portion. In some embodiments, each bank of the cache is accessible in parallel, and each valid data item position in the current VCC memory 23 entry is writable back to the cache in parallel. In some embodiments, a clean/dirty portion of a MESI state of a cache line is stored independently for each bank of the cache line, so that each bank is able to independently write clean/dirty state associated with a data item in a VCC memory 23 entry to a clean/dirty bit associated with a corresponding data item in a bank of the cache. In some embodiments, at least a portion of the MESI state of the cache is writable via independent write ports for each bank of the cache. In other embodiments, the MESI state of the cache has independent write ports for each cache-modifying operation or snoop request performable in parallel. In various embodiments, VCC memory 23 entries do not have tag information, a speculative store to a line of data (dirty, not-dirty, or either, according to embodiment) in the cache marks a MESI state of the line of data as dirty, a subsequent rollback of one or more VCC memory 23 entries to the line of data does not update the MESI state, and optionally a subsequent snoop request that hits the line of data returns a MESI state indicating dirty.

With regard to the process of FIG. 29B for updating a VCC memory 23 entry, and to the VCC rollback processes of either of FIG. 31A or 31B, in some embodiments, an order in which store operations issue optionally affects the validity for rollback of entries in a VCC. In some embodiments, two store operations from a single trace are issued in a required order (such as an order in which the store operations appear in the trace). In some embodiments, two store operations from a single trace are issued in an execution order that is optionally different from a required order. In some embodiments, two store operations from two different traces are always issued in a required order. In some embodiments, any two store operations, whether from a single trace or from two different traces, are issued in an execution order that is optionally different from a required order. In some embodiments, data read from a cache in response to execution of a store operation is staged in a pipeline to delay writing of a VCC memory 23 entry until after the execution of the store operation has searched the VCC.

In some embodiments where store operations from a single trace are issued in an execution order different from a required order, VCC memory 23 entries within the trace are allocated to the store operations in execution order, thus enabling a VCC rollback based on earlier-allocated VCC memory 23 entries representing older cache state. In some embodiments where VCC memory 23 entries within a single trace are allocated to store operations in an execution order, MOQ memory 20 entries comprise pointers to corresponding VCC memory 23 entries. In some embodiments where VCC memory 23 entries within a single trace are allocated to store operations in an execution order, VCC memory 23 entries of two store operations from two different traces are allocated in a required order.

In some embodiments where store operations from a single trace are issued in an execution order different from a required order, VCC memory 23 entries within the trace are allocated to the store operations in a required order. As an example, consider a younger (in the required order) store that executed prior to an older (in the required order) store and that writes at least a portion of the same data as the older store; the younger store has a VCC memory 23 entry (made earlier in execution order) that should supersede a VCC memory 23 entry of the older store for any VCC rollback. In some embodiments, writing of one or more data items to a VCC memory 23 entry is contingent on a conflict check being performed. In some embodiments, writing of data valid bits, indicating which data items of a VCC memory 23 entry are valid, to a VCC memory 23 entry is contingent on a conflict check being performed. In some embodiments, when an older store executes after a younger (in the required order) store and the older store conflicts with the younger store, data valid bits for the older store are cleared in any data item position that is valid for the younger store, so that the VCC memory 23 entry of the younger store will not be superseded by the older store in those data item positions. In some embodiments, a VCC memory 23 entry has an overall valid bit, indicating that the entry has at least some valid state. The overall valid bit is distinct from the (individual) data valid bits, indicating which data items of the VCC memory 23 entry are valid.

In some embodiments where store operations from a single trace are issued in an execution order different from a required order, in response to execution of a store operation, the VCC is searched. In some embodiments, if a matching entry is found, the execution of the store operation updates the matching entry in data item positions, if any, that are written in response to the executing store operation and are not already valid in the matching entry. In other embodiments, if a matching entry is found, the execution of the store operation writes an allocated entry in data item positions, if any, that are written in response to the execution of the store operation and are not already valid in the matching entry. In still other embodiments, if a matching entry is found, the execution of the store operation omits writing, and thus leaves unchanged the valid bit(s) of, a VCC memory 23 entry, since a VCC memory 23 entry for an access address of the store operation has already been created in response to execution of a prior store operation of the same trace. In some embodiments, execution of a store operation searches the VCC by searching corresponding entries in an MOQ 19. In some embodiments, an executing store operation matches an entry in the VCC if the entry is valid, the entry has a same key as the executing store operation, and the entry has a same trace ID as the executing store operation.

In some embodiments where store operations from two different traces are issued in an execution order different from a required order, a detected conflict between the store operations indicates that a VCC memory 23 entry written during processing of the older, in the required order, store operation does not have any older cache contents. In response to the detected conflict, VCC memory 23 entries written during processing of the older store operation are invalidated. In some embodiments, the invalidation is limited to invalidation of data in data item positions that are valid in the younger, in the required order, store operation.

Referring now to FIG. 32A, a process for updating a delayed store buffer entry 2000 is shown in accordance with an embodiment of the invention. In some embodiments, a DSB 840 entry is updated in response to a store operation executing in an operation pipeline, such as in accordance with operation pipeline stages 396, as illustrated in FIG. 15. In accordance with various embodiments, a DSB 840 is updated by one or more of: all store operations, store operations that access cacheable memory, store operations that, in response to execution, change a value of at least some data in a cache, and store operations accessing a write-combining portion of memory.

In various embodiments, there are three different strategies for allocation of DSB 840 entries described in FIG. 32A. In some embodiments, a DSB 840 entry is pre-allocated for an operation before the operation is issued. In other embodiments, an operation attempts to allocate a DSB 840 entry during execution, and stalls if a DSB 840 entry is not available. In still other embodiments, an operation that attempts to allocate a DSB 840 entry during execution is cancelled (and is selectively re-executed) if the allocation either fails, or if repeated attempts to allocate stall the operation longer than a threshold.

The process 2000 starts at step 2002 and continues to step 2010. At step 2010, a determination is made as to whether or not there is a store operation in an appropriate stage of an operation pipeline. If it is determined that there is not a store operation in the appropriate stage of the operation pipeline, the process stalls at step 2010 until there is a store operation in the appropriate stage of the operation pipeline. If it is determined that there is a store operation in the appropriate stage of the operation pipeline, the process continues to step 2014.

At step 2014, the DSB 81 receives the store operation along with associated access address, data, and status from a prior pipeline stage, such as in accordance with execute pipeline stage 322 as illustrated in FIG. 15. In some embodiments, the status comprises a trace ID of the store operation. In some embodiments, the status comprises a type of operation. In some embodiments, the status is provided in a different pipeline stage than the data. In some embodiments, the data is pipelined until a pipeline stage in which the status is available. In some embodiments, the access address is pipelined until a pipeline stage in which the status is available. The process continues to step 2020.

At step 2020, a determination is made as to whether or not the store operation needs a DSB 840 entry based upon the operation's status. In some embodiments, a DSB 840 entry is needed for any store operation accessing cacheable memory. In some embodiments, a DSB 840 entry is needed for any store operation accessing write-combining memory. In some embodiments, a DSB 840 entry is not needed for store operations accessing uncacheable memory. If it is determined that there is no need for a DSB 840 entry, the process continues to step 2010 to await a subsequent store operation.

However, if it is determined at 2020 that a DSB 840 entry is needed for the store operation, the process continues to step 2030. At step 2030, the DSB 840 determines if the store operation is a silent store. In some embodiments, the determination that a store operation is a silent store is made after the cache 720 is read to determine prior contents of at least a portion of a cache line. The cache 720 is analogous to the L1 cache 17 and the DSB 840 is analogous to the store operation buffer 81. In some embodiments, the cache is read in a pipeline stage, such as in accordance with data cache access pipeline stage 323 as illustrated in FIG. 15. In some embodiments, a read of a cache for silent store detection is also used to provide prior contents of a location of the cache. In some embodiments, the prior contents are copied to an entry in a VCC. In some embodiments, if a size of the store operation is less than a size of an entry in the DSB 840, the prior contents of the cache are merged with the data of the store operation to provide expanded data for the store operation that is the size of an entry in the DSB 840. In some embodiments, the size of an entry in the DSB 840 is the size of a bank in the cache. If it is determined that the store operation is a silent store, the process continues to step 2010 to await a subsequent store operation.

However, if it is determined at 2030 that the store operation is not a silent store, the process continues to step 2040. At step 2040, a determination is made as to whether or not the access address of the store operation is already in the DSB 840. In various embodiments, the determination is made via an associative lookup in the DSB 840 based on the access address or alternatively a key of the store operation. In some embodiments, the determination is based on at least one matching (already-present) entry in the DSB 840 being valid and having an address (or key) matching the access address (or the key) of the store operation, and optionally the already-present entry having a trace ID matching a trace ID of the store operation. If it is determined that the access address of the store operation is already present (i.e., hits) in the DSB 840, the process continues to step 2042. At step 2042, the already-present DSB 840 entry is updated with the data and at least a portion of the status of the store operation. In some embodiments, all store operations are pre-allocated a DSB 840 entry before being issued, and if the access address of the store operation is already in the DSB 840, then the pre-allocated DSB 840 entry is freed. The process continues to step 2010 to await a subsequent store operation.

If, however, it is determined at step 2040 that the access address of the store operation is not already present in the DSB 840, the process continues to step 2046. At step 2046, DSB 840 entries are written and deallocated with address and status data. In some embodiments, all store operations are pre-allocated a DSB 840 entry before being issued, and if the access address of the store operation is not already in the DSB 840, then the pre-allocated DSB 840 entry is used. In other embodiments, a new DSB 840 entry is attempted to be allocated; if the allocation is not successful, the store is canceled, returned to an earlier pipe stage, and is re-scheduled for later execution (not illustrated in FIG. 32A). The allocated DSB 840 entry are then filled in with the data and at least a portion of the status of the store operation. In some embodiments, the allocated DSB 840 entry is also written with some or all of the access address of the store operation. The process then continues to step 2010 to await a subsequent store operation.

In some embodiments, data written by a store operation is merged with data read from a cache so that one or more data items written into a DSB entry in response to the store operation are each the size of a bank of the cache, even if the write data of the store operation is of a size smaller than a bank of the cache, or even if the write data of the store operation spans bank boundaries. In some embodiments, a store operation that allocates and writes a DSB entry is processed to merge write data of the store operation with data read from a cache, and to write one or more data items in the DSB entry that are each a size of a bank of the cache; a subsequent store operation that updates the DSB entry is processed to modify portions of one or more data items of the DSB entry corresponding to bytes of memory that are to be written by the subsequent store operation.

Referring now to FIG. 32B, a process for flushing delayed store buffer entries into a cache 2050 is shown in accordance with an embodiment of the present invention. In some embodiments, a DSB 840 entry is flushed to the cache in order to empty the DSB 840, leaving free entries for subsequent store operations.

The process 2050 starts at step 2052 and continues to step 2060. At step 2060, a determination is made as to whether there is an unused cache port available for the DSB 840. In some embodiments, the DSB 840 shares one or more cache ports with operations in an operation pipeline, but has lower priority for access to the one or more cache ports than the operations. If it is determined that there are no usable cache ports, the process stalls at step 2060 until a usable cache port is found. If it is instead determined that a usable (available) cache port is found, the process continues to step processing continues with block 2064.

At step 2064, the DSB 81 (also known as the DSB 840) selects a DSB 840 entry, if any, to be flushed to the cache. In some embodiments, DSB 840 entries are flushed in an oldest-first order. In some embodiments, DSB 840 entries are flushed in an order determined by trace IDs of the DSB 840 entries, with DSB 840 entries having older trace IDs flushed first. In some embodiments, an oldest trace ID in the DSB 840 is tracked to determine oldest entries in the DSB 840. In some embodiments, a commit of a trace is conditional upon all DSB 840 entries having a trace ID corresponding to the trace being written to the cache and deallocated. The process continues to step 2070.

At step 2070, the DSB 840 determines if it is empty (e.g. if no DSB 840 entry was selected at step 2064). If it is determined that the DSB 840 is empty, the process continues to step 2060 to await another opportunity to use an unused cache port. However, if it is determined at 2070 that the DSB 840 is not empty (e.g. a DSB 840 entry was selected at step 2064), the process continues to step 2080.

At step 2080, a determination is made by the L1 cache 17 as to whether or not a desired bank for the selected store buffer (or DSB 840) entry is busy. In some embodiments, the desired bank is determined by a portion of an address associated with the store buffer entry. If it is determined that the desired bank is busy, the process continues to step 2060 to await another opportunity to use an unused cache port. In some embodiments, an oldest store buffer entry is selected that targets an available bank, thus avoiding a "bank busy" condition in the step 2080. However, if it is determined that the desired bank is not busy, the process continues to step 2082.

At step 2082, the DSB 840 uses the otherwise-unused cache port to write the selected DSB 840 entry into the L1 cache 17. In some embodiments where a size of data in a DSB 840 entry to be written to the cache is less than a size of a writable unit, such as a bank of the cache, writing the DSB 840 entry into the cache performs a read-modify-write of a line of the cache. In some embodiments, writing the selected DSB 840 entry into the cache comprises writing a data portion of the selected DSB 840 entry into a data portion of the cache at a location specified by the selected DSB 840 entry. In some embodiments, writing the selected DSB 840 entry into the cache comprises modifying a tag portion of the cache at a location specified by the selected DSB 840 entry. In some embodiments, writing the selected DSB 840 entry into the cache comprises setting a clean/dirty array of the cache at a location specified by the selected DSB 840 entry to dirty. In some embodiments, the location in the cache is specified by an address in the selected DSB 840 entry. In some embodiments, the location in the cache is specified by a key in the selected DSB 840 entry. In some embodiments, the location in the cache has a granularity as fine as a size of a bank of the cache. In some embodiments, a clean/dirty array of the cache is organized per bank of the cache, such that each bank of each cache line has a respective clean/dirty bit.

The process continues to step 2084. At step 2084, the DSB 840 deallocates the selected DSB 840 entry. The process continues to the optional step 2086. At step 2086, the DSB 840 updates an oldest trace ID in the DSB 840 for use in a subsequent iteration of the process 2050. The process then continues to step 2060 to await another opportunity to use an unused cache port.

Referring now to FIG. 33A, a process of committing a trace 2100 is illustrated in accordance with an embodiment of the invention. In some embodiments, committing a trace is an atomic operation.

The process 2100 starts in step 2102 and continues to step 2110. At step 2110, a determination is made by the IU 115 whether a trace is eligible to be committed. In various embodiments, a trace is, at least in part, eligible to commit when all operations in the trace have completed execution, and optionally data associated with store operations executed by the trace has been flushed from a DSB 840 into a cache. In some embodiments, completion of execution of an operation is contingent on a determination that the operation does not cause an exception. In some embodiments, completion of execution of an operation is contingent on a determination that the operation does not cause an ordering violation. If it is determined that the trace is not eligible to be committed, the process stalls at step 2110 until a trace is eligible to be committed. If it is instead determined that a trace is eligible to be committed, the process continues to step 2112.

At step 2112, the IU 115 calculates a new head pointer for an MOQ 19 based upon a current head pointer for the MOQ 19, and a number of ordered operations that are in the trace being committed, the ordered operations having had entries allocated in the MOQ 19. The IU 115 informs the MOQ 19 of the calculated new head pointer. The new head pointer is advanced past all MOQ memory 20 entries for the trace being committed. An example of head pointer updating on trace completion is illustrated in FIG. 23.

The process continues to the optional step 2114. At step 2114, the MOQ 19 clears valid bits of all entries in the MOQ 19 from the current head pointer to immediately prior to the new head pointer—that is, all entries for the trace being committed. In some embodiments, MOQ memory 20 entries are made invalid when the entries are deallocated, such as when a trace is being committed. In embodiments where valid entries are not used, rather, a region of MOQ memory 20 is noted as being of interest, MOQ memory 20 entries that are outside the region, i.e. not between a head pointer and a tail pointer, are not examined and ignored.

The process continues to step 2116, where the MOQ 19 sets the current head pointer to be the new head pointer, thus atomically committing the trace with respect to the MOQ 19. The process continues to optional step 2118. At step 2118, the MOQ 19 sets a tail pointer for the MOQ 19 to point at an entry immediately prior to one pointed to by the updated current head pointer. In some embodiments, the tail pointer is always at an entry immediately prior to an entry at the head pointer. The process continues to step 2110 to await eligibility for commitment of a subsequent trace.

Referring now to FIG. 33B, a process for aborting a trace 2150 is shown in accordance with an embodiment of the invention. In some embodiments, trace abort processing is performed after all outstanding operations have either completed or aborted. In some embodiments, aborting a trace undoes any side effects of whole or partial execution of the trace. In some embodiments, aborting a trace is an atomic operation. In some embodiments, multiple traces are aborted at a same time.

The process 2150 starts in at step 2152 and continues to step 2160. At step 2160, the IU 115 determines whether a trace abort is requested. In various embodiments and/or usage scenarios, a trace is aborted when an exception is taken by an operation in the trace, when an ordering violation is detected for an operation in the trace, or both. In some embodiments, aborting a trace also aborts all younger traces. In some embodiments, aborting a trace is performed without delay, while in alternate embodiments, the aborting is delayed until all older traces are either complete, or have also triggered an abort. In some embodiments, aborting a trace is delayed until all operations older than a first aborting operation are either complete, or have also triggered an abort. If it is determined that there was not a request for a trace abort, the process stalls at step 2160 until a trace abort request arrives. If it is determined that a trace abort was requested, the process continues to step 2162.

At step 2162, the IU 115 (or the MOQ 19 or both) resets a head pointer of an MOQ 19 to an initial value, such as zero. In some embodiments, the head pointer is not reset, and is instead left unchanged. The process continues to the optional step 2164. At step 2164, the MOQ 19 clears valid bits in all entries in the MOQ 19. In some embodiments, aborting a trace deallocates all entries in the MOQ 19, and valid bits in an MOQ memory 20 entry are cleared when the entry is deallocated. In other embodiments, such as those in which the tail pointer is not always at an entry immediately prior to an entry at the head pointer, MOQ memory 20 entries not between a head pointer and a tail pointer are not examined and contents of any entries not between a head pointer and a tail pointer inclusive are ignored.

The process continues to optional steps 2168.A or 2168.B. In some embodiments, block 2168.A sets a tail pointer for the MOQ 19 to point at an entry immediately prior to an entry at the reset head pointer. In some embodiments, the tail pointer is always at an entry immediately prior to an entry at the head pointer. In some embodiments, block 2168.B sets a tail pointer to be the same as the head pointer. In some embodiments, the MOQ 19 is empty when the head pointer and the tail pointer are at a same entry. Processing then returns to block 2110 to await a subsequent trace abort.

In some embodiments, after one or more traces are aborted, the traces (specifically, operations in the traces) are optionally sent from a trace unit to an issue unit for subsequent re-execution. In some embodiments, after an abort event, some aborted traces are provided to an issue unit in a different form and/or with different trace boundaries. In some embodiments, when operations are re-executed after an abort event, some of the operations have different trace IDs than on a prior execution. In some embodiments, when operations are re-executed after an abort event, the operations are not necessarily allocated to same entries in an MOQ 19 as on a prior execution.

FIG. 34 illustrates selected details of an example of MOQ 19 conflict detection and reporting. In FIG. 34, an executing store operation is updating MOQ memory entry 2220.2, as indicated by MOQ write pointer 2205. In some embodiments, write pointer 2005 is the same as write pointer 1005, as illustrated in FIG. 22A. Some operations older than the executing store operation and having an associated MOQ memory 20 entry, such as an operation that will write MOQ memory entry 2220.1, have not yet written an MOQ memory 20 entry. Compare information generated by the executing store operation is compared against entries associated with all subsequent (younger, in a required order) operations in the MOQ 19, some of which are already written (and some of which are not). The entries associated with the subsequent operations are those after write pointer 2205 and at or before tail pointer 2203 (entries 2220.3-2220.7). Each entry has a key, such as key A2 2242 illustrated for the executing store operation at entry 2220.2.

As illustrated in FIG. 34, not all entries subsequent, according to a required order, the executing store operation are valid, such as entry 2220.5 that is invalid. Entry 2220.3 (containing a load with key A3 2243), entry 2220.4 (containing a store with key A4 2244), and entry 2220.6 (containing a load with key A6 2246) are valid. Valid entries subsequent, according to a required order, to the executing store operation are relevant for conflict detection.

If an entry associated with the executing store operation has a same key as an entry for a subsequent, according to a required order, load, then a read-write conflict will be detected and reported. For example, if key A6 2246 of entry 2220.6 or key A3 2243 of entry 2220.3 is the same as key A2 2242 of the executing store operation, a read-write conflict is detected.

Similarly, if the executing store operation has a same key as a subsequent store, then a write-write conflict will be detected and reported. For example, if key A4 2244 of entry 2220.4 is the same as key A2 2242 of the executing store operation, a write-write conflict is detected.

If the executing operation is a load rather than a store, a write-read conflict is detected with a subsequent, valid store operation having a same key. A subsequent load operation, however, does not cause a conflict, regardless of a same key.

FIG. 35A and FIG. 35B illustrate selected details of examples of detecting snoop conflicts in an MOQ 19. FIG. 35A is applicable to various types of snoop requests; FIG. 35B is applicable to snoop downgrade requests. In FIGS. 35A and 35B, a snoop request is compared against all operations in the MOQ 19 between an entry at a head pointer and an entry at a tail pointer inclusive, some of which are already written (and some of which are not). Whether a snoop request hits an entry in the MOQ 19 depends not solely on contents of the entry, but also, in some embodiments, on contents of previous, according to a required order, entries.

As illustrated in FIG. 35A (FIG. 35B), the snoop request is compared against operations in the MOQ 19, some of which are already written (and some of which are not). The relevant operations in the MOQ 19 are those at entries starting with head pointer 2301 (2351) and at or before tail pointer 2303 (2353). Each entry has a key, such as key A2 2343 illustrated for a store operation at entry 2320.2 (2370.2). The snoop request is associated with a compatible key.

In some embodiments, if the snoop request hits any entries in the MOQ 19, a snoop conflict is detected. For example, as illustrated in FIG. 35A, if the key of the snoop request matches key A2 2342 of entry 2320.2 for a store operation, or if the key of the snoop request matches key A4 2344 of entry 2320.4 for a load operation, a snoop conflict will be detected.

In some embodiments, if the snoop request hits entries for load operations but does not hit any entry for a store operation, and if all previous, according to a required order, operations are written, a snoop conflict will not be detected. For example, as illustrated in FIG. 35A, if a snoop request hits any or all of entries 2320.0, 2320.1, 2320.3, or 2320.4 for load operations, as long as the snoop request does not hit entry 2320.2 for a store operation, a conflict is not detected. If, however, the snoop request hits entry 2320.6 for a load operation, a conflict is detected since a previous entry 2320.5 is not written.

In some embodiments, if the snoop request is a downgrade, then conflicts are detected for entries corresponding to store operations, but not for entries corresponding to load operations. For example, as illustrated in FIG. 35B, if a snoop downgrade request hits an entry corresponding to a store operation (such as entry 2370.2), then a conflict is detected. However, if the snoop downgrade request hits entries corresponding to load operations (such as 2370.0, 2370.1, or 2370.4) and does not hit any entry corresponding to a store operation, then no conflict is detected.

As illustrated in FIG. 35B, the snoop request is compared against operations in the MOQ 19, some of which are already written and some of which are not. The relevant operations in the MOQ 19 are those at entries starting with head pointer 2351 and at or before tail pointer 2353. Each entry has a key, such as key A2 2343 illustrated for a store operation at entry 2370.2. The snoop request is associated with a compatible key.

In some embodiments, if the snoop request hits any entries in the MOQ 19, a snoop conflict is detected. For example, as illustrated in FIG. 35A, if the key of the snoop request matches key A2 2342 of entry 2320.2 for a store operation, or if the key of the snoop request matches key A4 2344 of entry 2320.4 for a load operation, a snoop conflict will be detected.

In some embodiments, if the snoop request hits entries for load operations but does not hit any entry for a store operation, and if all previous, according to a required order, operations are written, a snoop conflict will not be detected. For example, as illustrated in FIG. 35A, if a snoop request hits any or all of entries 2320.0, 2320.1, 2320.3, or 2320.4 for load operations, as long as the snoop request does not hit entry 2320.2 for a store operation, a conflict is not detected. If, however, the snoop request hits entry 2320.6 for a load operation, a conflict is detected since a previous entry 2320.5 is not written.

In some embodiments, if the snoop request is a downgrade, then conflicts are detected for entries corresponding to store operations, but not for entries corresponding to load operations. For example, as illustrated in FIG. 35B, if a snoop downgrade request hits an entry corresponding to a store operation (such as entry 2370.2), then a conflict is detected. However, if the snoop downgrade request hits entries corresponding to load operations (such as 2370.0, 2370.1, or 2370.4) and does not hit any entry corresponding to a store operation, then no conflict is detected.

While various embodiments have been described with respect to atomic traces, the aforementioned techniques are equally applicable to non-atomic traces and other groups of instructions or operations.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements is variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A circuit for tracking memory operations in an out-of-order and speculative processor, where the circuit is adapted for use with a trace unit and with an execution unit of the processor, where the trace unit sequences traces for execution thereby forming a trace sequence order, where each of the traces includes a sequence of operations that includes zero or more of the memory operations, where the execution unit executes the operations and has an architectural state, and where the circuit comprises:

a first memory configured to cache at least some of the data accessed by the memory operations, where the memory operations being executed form a set of active memory operations, where the active memory operations have a predefined program order among themselves, where the predefined program order imposes a set of ordering constraints, and where at least some of the active memory operations access the memory in an execution order that is different from the predefined program order;

a second memory configured to receive and hold a set of checkpoint entries, where each checkpoint entry is associated with one of the traces, where each checkpoint entry is of a checkpoint location within the first memory, where each checkpoint entry includes checkpoint data indicating a state of the checkpoint location within the first memory prior to an update of the checkpoint location, and where the update results from executing one of the active memory operations; and a sub-circuit configured to invalidate all of the checkpoint entries associated with the first particular trace after a commitment of the first particular trace, provided that the first particular trace does commit;

where none of the operations of a first particular one of the traces has any effect on the architectural state prior to the commitment of the first particular trace, and where the first particular trace becomes eligible for the commitment after the execution completes for all operations of the first particular trace.

2. The circuit of claim 1, where:

the second memory is further configured to hold all of the checkpoint entries associated with a second particular one of the traces until after the second particular trace commits, provided that the second particular trace does commit.

3. The circuit of claim 1, where:

none of the operations of a third particular one of the traces has any effect on the architectural state, provided that the third particular trace does abort; and the second memory is further configured to invalidate all of the checkpoint entries associated with the third particular trace after the third particular trace does abort, provided that the third particular trace aborts.

4. The circuit of claim 1, where:

none of the operations of a fourth particular one of the traces has any effect on the architectural state, provided that the fourth particular trace does abort; and the second memory is further configured to hold all of the checkpoint entries associated with the fourth particular trace until after the fourth particular trace abort, provided that the fourth particular trace does abort.

5. The circuit of claim 1, where the operation sequences of a set of at least two of the traces are executed concurrently by the execution unit, where the active memory operations include a memory operation from a first particular one of the set, and where the active memory operations also include a memory operation from a second particular one of the set.

6. The circuit of claim 1, where:

the active memory operations include all memory operations being executed that are a cachable type of memory operation; and the first memory is further configured to cache at least some of the active memory operations that are the cachable type, and the second memory is further configured to hold operation ordering information for each one of the active memory operations that is of the cachable type.

7. The circuit of claim 1, where:
the active memory operations include all memory operations being executed that are a write combining type of memory operation; and the second memory is further configured to hold operation ordering information for each one of the active memory operations that is of the write combining type.

\* \* \* \* \*